US012147597B2

(12) United States Patent
Chiu et al.

(10) Patent No.: US 12,147,597 B2
(45) Date of Patent: Nov. 19, 2024

(54) METHODS FOR CURSOR-BASED INTERACTIONS WITH AN ELECTRONIC DEVICE

(71) Applicant: Apple Inc., Cupertino, CA (US)

(72) Inventors: Shih-Sang Chiu, San Francisco, CA (US); Christopher D. McKenzie, Burlingame, CA (US); Pol Pla I Conesa, San Francisco, CA (US); Jonathan Ravasz, Sunnyvale, CA (US); Zoey C. Taylor, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/935,095

(22) Filed: Sep. 24, 2022

(65) Prior Publication Data

US 2023/0100689 A1 Mar. 30, 2023

Related U.S. Application Data

(60) Provisional application No. 63/261,666, filed on Sep. 25, 2021, provisional application No. 63/266,539, (Continued)

(51) Int. Cl.

| | |
|---|---|
| ***G06F 3/01*** | (2006.01) |
| ***G06F 3/04815*** | (2022.01) |
| *G06F 3/0488* | (2022.01) |

(52) U.S. Cl.

CPC ............. *G06F 3/013* (2013.01); *G06F 3/017* (2013.01); *G06F 3/04815* (2013.01); *G06F 3/0488* (2013.01)

(58) Field of Classification Search

CPC ...... G06F 3/013; G06F 3/017; G06F 3/04815; G06F 3/0488; G06F 3/04842;

(Continued)

(56) References Cited

U.S. PATENT DOCUMENTS

| | | | |
|---|---|---|---|
| 6,323,846 | B1 | 11/2001 | Westerman et al. |
| 6,570,557 | B1 | 5/2003 | Westerman et al. |

(Continued)

FOREIGN PATENT DOCUMENTS

| | | | |
|---|---|---|---|
| EP | 3316075 | A1 | 5/2018 |
| EP | 3570144 | A1 | 11/2019 |

(Continued)

OTHER PUBLICATIONS

International Search Report received for PCT Patent Application No. PCT/US2022/076985, mailed on Feb. 20, 2023, 5 pages.

(Continued)

*Primary Examiner* — Richard J Hong

(74) *Attorney, Agent, or Firm* — Kubota & Basol LLP

(57) ABSTRACT

In some embodiments, an electronic device facilitates cursor interactions in different regions in a three-dimensional environment. In some embodiments, an electronic device facilitates cursor interactions in content. In some embodiments, an electronic device facilitates cursor movement. In some embodiments, an electronic device facilitates interaction with multiple input devices. In some embodiments, a computer system facilitates cursor movement based on movement of a hand of a user of the computer system and a location of a gaze of the user in the three-dimensional environment. In some embodiments, a computer system facilitates cursor selection and scrolling of content in the three-dimensional environment.

30 Claims, 96 Drawing Sheets

Related U.S. Application Data filed on Jan. 7, 2022, provisional application No. 63/374,868, filed on Sep. 7, 2022.

(58) Field of Classification Search
CPC ...... G06F 3/0482; G06F 3/0481; G06F 3/011; G06F 3/014; G06F 3/04812; G06F 1/1694; G06T 19/20; G06T 7/74
See application file for complete search history.

(56) References Cited

U.S. PATENT DOCUMENTS

| | | | | |
|---|---|---|---|---|
| 6,677,932 | B1 | 1/2004 | Westerman | |
| 7,614,008 | B2 | 11/2009 | Ording | |
| 7,633,076 | B2 | 12/2009 | Huppi et al. | |
| 7,653,883 | B2 | 1/2010 | Hotelling et al. | |
| 7,657,849 | B2 | 2/2010 | Chaudhri et al. | |
| 7,663,607 | B2 | 2/2010 | Hotelling et al. | |
| 7,844,914 | B2 | 11/2010 | Andre et al. | |
| 7,957,762 | B2 | 6/2011 | Herz et al. | |
| 8,006,002 | B2 | 8/2011 | Kalayjian et al. | |
| 8,239,784 | B2 | 8/2012 | Hotelling et al. | |
| 8,279,180 | B2 | 10/2012 | Hotelling et al. | |
| 8,381,135 | B2 | 2/2013 | Hotelling et al. | |
| 8,479,122 | B2 | 7/2013 | Hotelling et al. | |
| 9,348,458 | B2 | 5/2016 | Hotelling et al. | |
| 9,448,687 | B1 * | 9/2016 | McKenzie | G06F 3/0481 |
| 9,933,937 | B2 | 4/2018 | Lemay et al. | |
| 11,232,643 | B1 * | 1/2022 | Stevens | G06F 3/014 |
| 2002/0015024 | A1 | 2/2002 | Westerman et al. | |
| 2005/0190059 | A1 | 9/2005 | Wehrenberg | |
| 2006/0017692 | A1 | 1/2006 | Wehrenberg et al. | |
| 2006/0033724 | A1 | 2/2006 | Chaudhri et al. | |
| 2006/0197753 | A1 | 9/2006 | Hotelling | |
| 2012/0272179 | A1 * | 10/2012 | Stafford | G06F 3/0482 345/157 |
| 2013/0169533 | A1 * | 7/2013 | Jahnke | G06F 3/017 345/158 |
| 2014/0351753 | A1 | 11/2014 | Shin et al. | |
| 2015/0131850 | A1 * | 5/2015 | Qvarfordt | G06T 7/74 382/103 |
| 2018/0150204 | A1 * | 5/2018 | MacGillivray | G06F 3/04815 |
| 2018/0275753 | A1 * | 9/2018 | Publicover | G06F 3/04812 |
| 2019/0172261 | A1 * | 6/2019 | Alt | G06T 19/20 |
| 2019/0294312 | A1 * | 9/2019 | Rohrbacher | G06F 3/017 |
| 2019/0354259 | A1 * | 11/2019 | Park | G06F 1/1694 |
| 2019/0361521 | A1 * | 11/2019 | Stellmach | G06F 3/04842 |
| 2020/0387287 | A1 * | 12/2020 | Ravasz | G06F 3/011 |
| 2024/0094882 | A1 | 3/2024 | Brewer et al. | |

FOREIGN PATENT DOCUMENTS

| | | | |
|---|---|---|---|
| WO | 2012/145180 | A1 | 10/2012 |
| WO | 2013/169849 | A2 | 11/2013 |
| WO | 2014/105276 | A1 | 7/2014 |
| WO | 2018/175735 | A1 | 9/2018 |
| WO | 2022/147146 | A1 | 7/2022 |

OTHER PUBLICATIONS

International Search Report received for PCT Patent Application No. PCT/US2023/074793, mailed on Feb. 6, 2024, 6 pages.

* cited by examiner

Figure 14E:
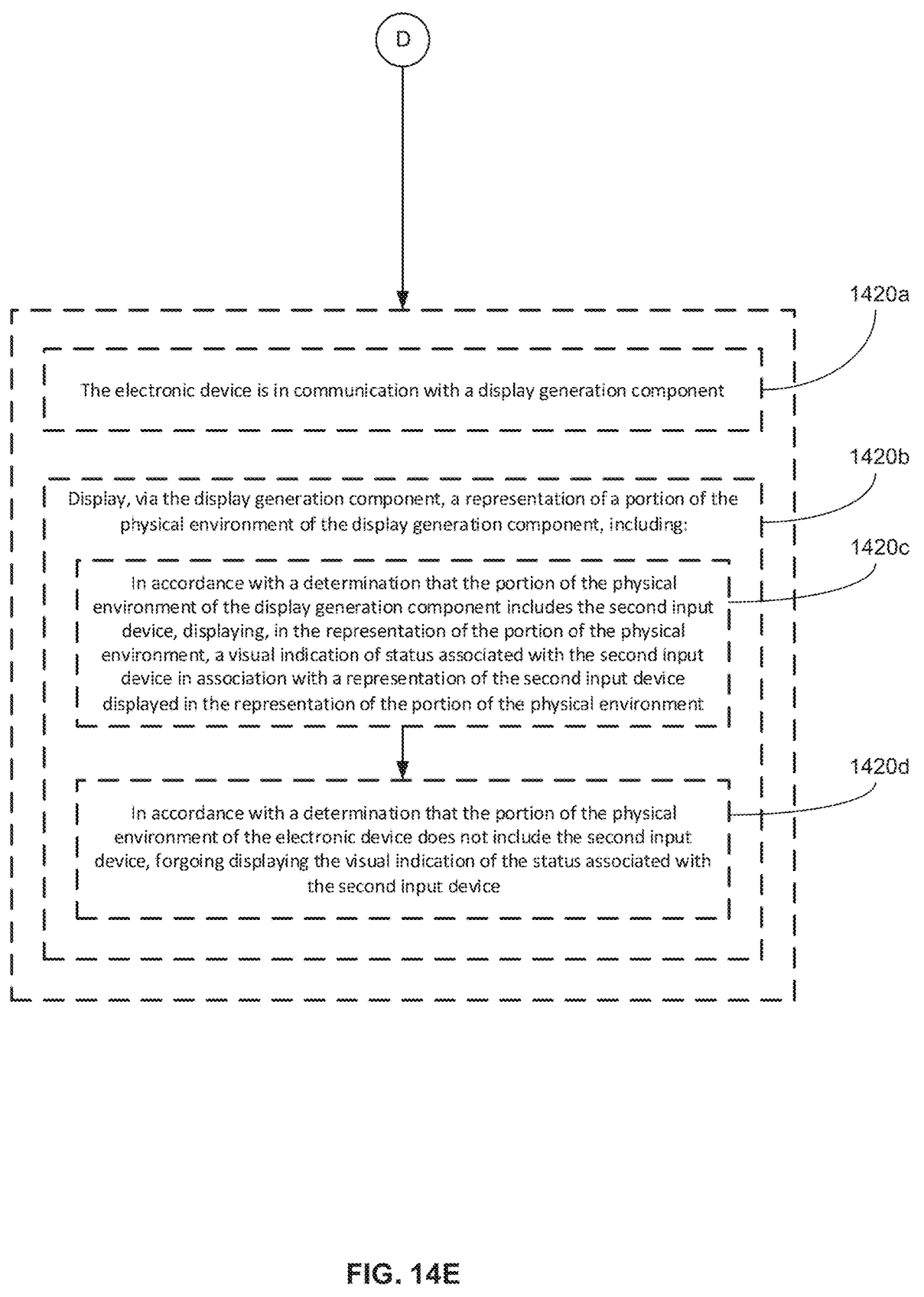

D

1420a

The electronic device is in communication with a display generation component

1420b

Display, via the display generation component, a representation of a portion of the physical environment of the display generation component, including:

1420c

In accordance with a determination that the portion of the physical environment of the display generation component includes the second input device, displaying, in the representation of the portion of the physical environment, a visual indication of status associated with the second input device in association with a representation of the second input device displayed in the representation of the portion of the physical environment 1420d In accordance with a determination that the portion of the physical environment of the electronic device does not include the second input device, forgoing displaying the visual indication of the status associated with the second input device

METHODS FOR CURSOR-BASED INTERACTIONS WITH AN ELECTRONIC DEVICE

CROSS-REFERENCE TO RELATED APPLICATIONS

This application claims the benefit of U.S. Provisional Application No. 63/261,666, filed Sep. 25, 2021, U.S. Provisional Application No. 63/266,539, filed Jan. 7, 2022, and U.S. Provisional Application No. 63/374,868, filed Sep. 7, 2022, the contents of which are incorporated herein by reference in its entireties for all purposes.

TECHNICAL FIELD

This relates generally to computer systems with a display generation component and one or more input devices that present graphical user interfaces, including but not limited to electronic devices that provide for various interaction with three-dimensional environments.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with content in a three-dimensional environment. Such methods and interfaces may complement or replace conventional methods for interacting with content in a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, an electronic device facilitates cursor interactions in different regions in a three-dimensional environment. In some embodiments, an electronic device facilitates cursor interactions in content. In some embodiments, an electronic device facilitates cursor movement. In some embodiments, an electronic device facilitates interaction with multiple input devices. In some embodiments, a computer system facilitates cursor movement based on movement of a hand of a user of the computer system and a location of a gaze of the user in the three-dimensional environment. In some embodiments, a computer system facilitates cursor selection and scrolling of content in the three-dimensional environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 14A-14E is a flowchart illustrating a method of facilitating interaction with multiple input devices in accordance with some embodiments.

DESCRIPTION OF EMBODIMENTS

Figure 1:
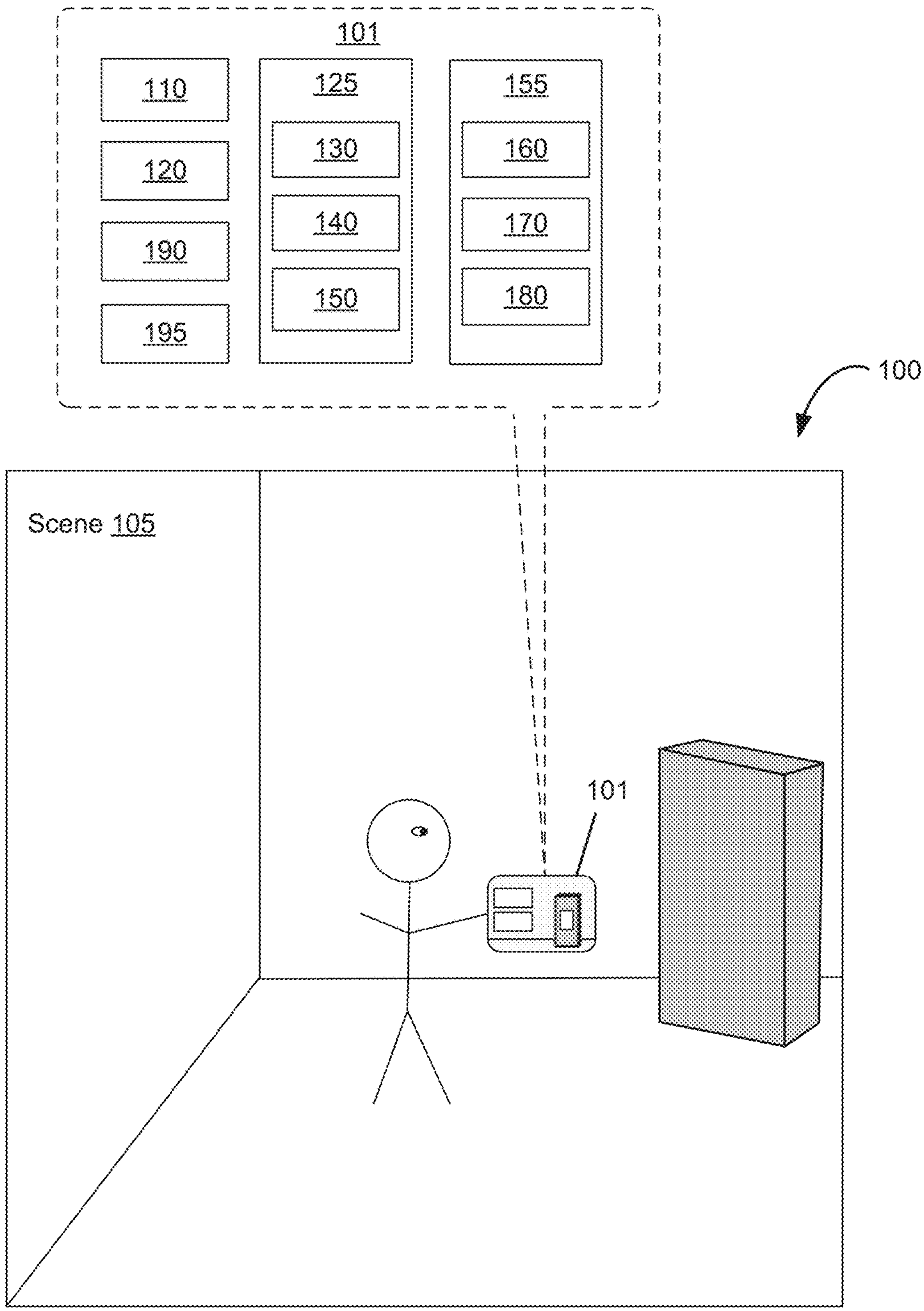
FIG. 1 is a block diagram illustrating an operating environment of a computer system for providing XR experiences in accordance with some embodiments.

The present disclosure relates to user interfaces for providing a computer generated (CGR) experience to a user, in accordance with some embodiments.

The systems, methods, and GUIs described herein provide improved ways for an electronic device to facilitate interaction with and manipulate objects in a three-dimensional environment.

In some embodiments, a computer system allows for cursor interaction in a first region in a three-dimensional environment. In some embodiments, after that cursor interaction, the computer system detects interaction with a second region of the three-dimensional environment. In response to detecting cursor movement input directed again to the first region, the computer system optionally moves the cursor from its last location in the first region in accordance with the cursor movement input.

In some embodiments, a computer system displays content (e.g., text content) and a cursor. In some embodiments, depending on the type of input detected by the computer system, and depending on whether the gaze of the user is directed to the cursor when the input is detected, the computer system performs different operations (e.g., text selection operations, cursor movement operations, etc.). In some embodiments, the cursor is moved continuously in response to movement input directed to the cursor, and in some embodiments, the cursor jumps to a new location in the content in response to a different input directed to the cursor.

In some embodiments, a computer system displays a cursor. In some embodiments, movement of the cursor towards a gaze location of the user is accelerated relative to movement of the cursor away from the gaze location of the user. In some embodiments, the computer system does not apply such variable acceleration of cursor movement to the cursor if the cursor is currently engaged with the underlying environment or user interface (e.g., selecting content, creating marks, etc.).

In some embodiments, a computer system is configured to receive input from multiple input devices. In some embodiments, in response to detecting an input from a hand of the user, if the hand of the user is within a threshold distance of a first of the input devices, the computer system does not respond to that input from the hand as detected via a second of the input devices. However, if the hand is outside of the threshold distance of the first input device, the computer system optionally does respond to that input from that hand as detected via the second input device. In some embodiments, the first input device detects input based on contact of the hand of the user with the first input device (e.g., a trackpad). In some embodiments, the second input device detects input based on gestures and/or movements of the hand in the physical environment of the computer system.

In some embodiments, a computer system displays a cursor in a three-dimensional environment. In some embodiments, movement of the cursor in the three-dimensional environment is based on movement of a hand of the user of the computer system, but the movement is constrained by a location of the gaze of the user in the three-dimensional environment. In some embodiments, in response to detecting movement of the hand of the user with a respective magnitude and/or in a respective direction that corresponds to movement of the cursor within a threshold distance of the location of the gaze, the computer system moves the cursor in accordance with the movement of the hand. In some embodiments, in response to detecting movement of the hand of the user with a respective magnitude and/or in a respective direction that corresponds to movement of the cursor beyond the threshold distance of the location of the gaze, the computer system moves the cursor to a respective location in the three-dimensional environment that is within the threshold distance of the location of the gaze. In some embodiments, movement of the cursor in the three-dimensional environment is based on movement of the gaze of the user while the hand of the user remains substantially stationary.

In some embodiments, a computer system displays content in a three-dimensional environment. In some embodiments, the content is selectable and/or scrollable in the three-dimensional environment based on input provided by a hand of the user of the computer system. In some embodiments, in response to detecting a long air pinch and drag gesture provided by the hand of the user, if a cursor is displayed with the content in the three-dimensional environment, the computer system selects a portion of the content in accordance with a direction and/or magnitude of movement of the hand of the user. In some embodiments, in response to detecting a long air pinch and drag gesture provided by the hand of the user, if a cursor is not displayed with the content in the three-dimensional environment, the computer system scrolls through the content in accordance with a direction and/or magnitude of movement of the hand of the user.

FIGS. 1-6 provide a description of example computer systems for providing XR experiences to users (such as described below with respect to methods 800, 1000, 1200, 1400, 1600, and/or 1800). FIGS. 7A-7D illustrate example techniques for facilitating cursor interactions in different regions in a three-dimensional environment, in accordance with some embodiments. FIGS. 8A-8E is a flow diagram of methods of facilitating cursor interactions in different regions in a three-dimensional environment, in accordance with various embodiments. The user interfaces in FIGS. 7A-7D are used to illustrate the processes in FIGS. 8A-8E. FIGS. 9A-9E illustrate example techniques for facilitating cursor interactions in content in accordance with some embodiments, in accordance with some embodiments. FIGS. 10A-10K is a flow diagram of methods of facilitating cursor interactions in content, in accordance with various embodiments. The user interfaces in FIGS. 9A-9E are used to illustrate the processes in FIGS. 10A-10K. FIGS. 11A-11G illustrate example techniques of facilitating cursor movement in accordance with some embodiments. FIGS. 12A-12O is a flow diagram of methods of facilitating cursor movement in accordance with some embodiments. The user interfaces in FIGS. 11A-11G are used to illustrate the processes in FIGS. 12A-12O. FIGS. 13A-13E illustrate example techniques for facilitating interaction with multiple input devices in accordance with some embodiments. FIGS. 14A-14E is a flow diagram of methods of facilitating interaction with multiple input devices in accordance with some embodiments. The user interfaces of FIGS. 13A-13E are used to illustrate the processes in FIGS. 14A-14E. FIGS. 15A-15H illustrate example techniques for facilitating cursor movement in accordance with some embodiments. FIGS. 16A-16L is a flow diagram of methods of facilitating cursor movement in accordance with some embodiments. The user interfaces of FIGS. 15A-15H are used to illustrate the processes in FIGS. 16A-16L. FIGS. 17A-17E illustrate example techniques for facilitating content selection and scrolling in accordance with some embodiments. FIGS. 18A-18G is a flow diagram of methods of facilitating content selection and scrolling in accordance with some embodiments. The user interfaces of FIGS. 17A-17E are used to illustrate the processes in FIGS. 18A-18G.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
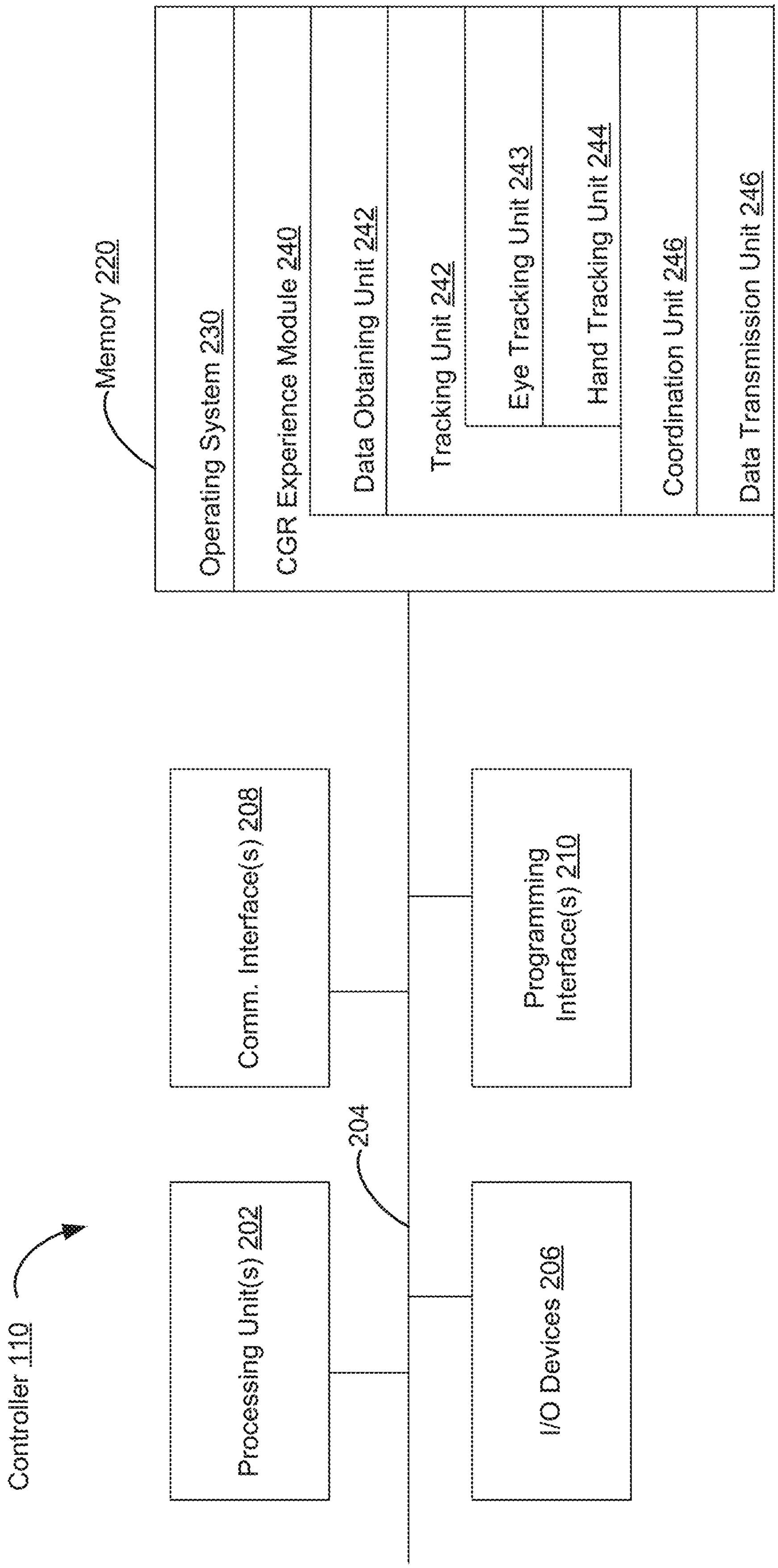
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
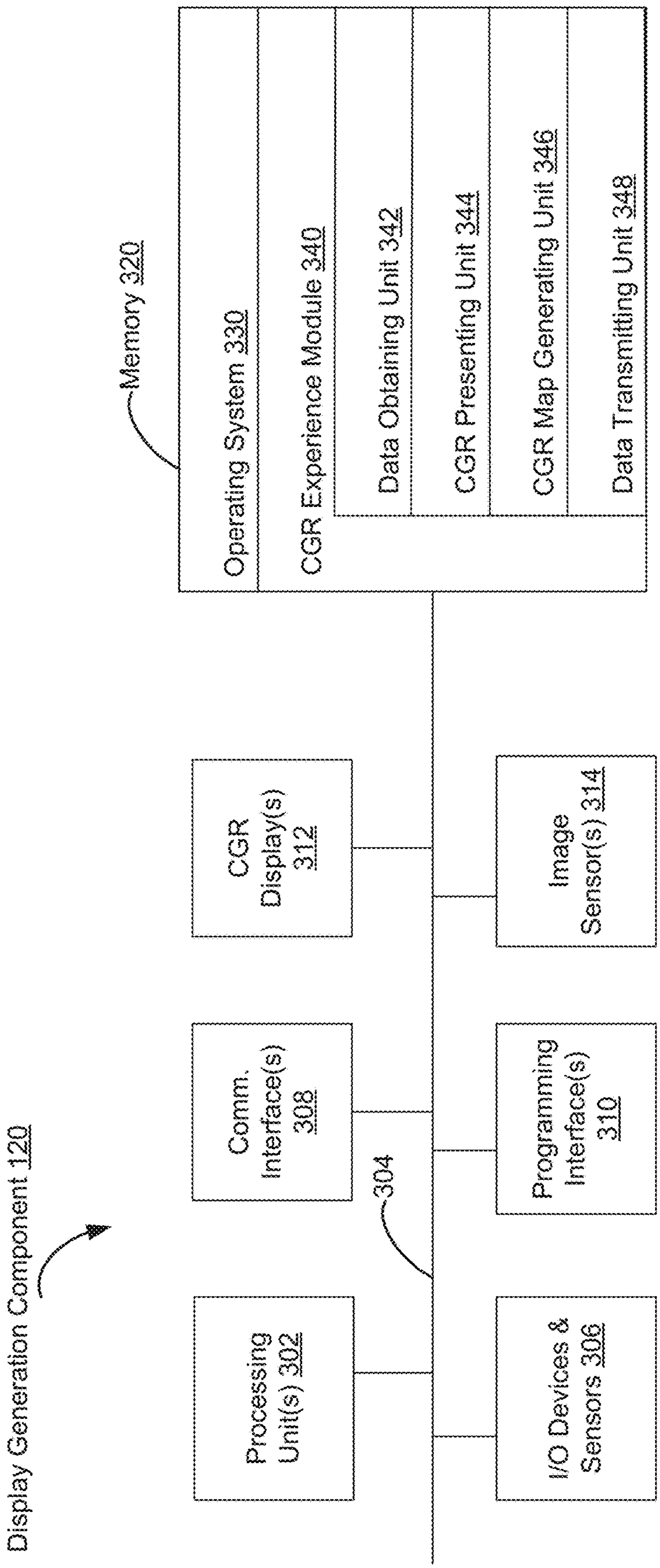
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
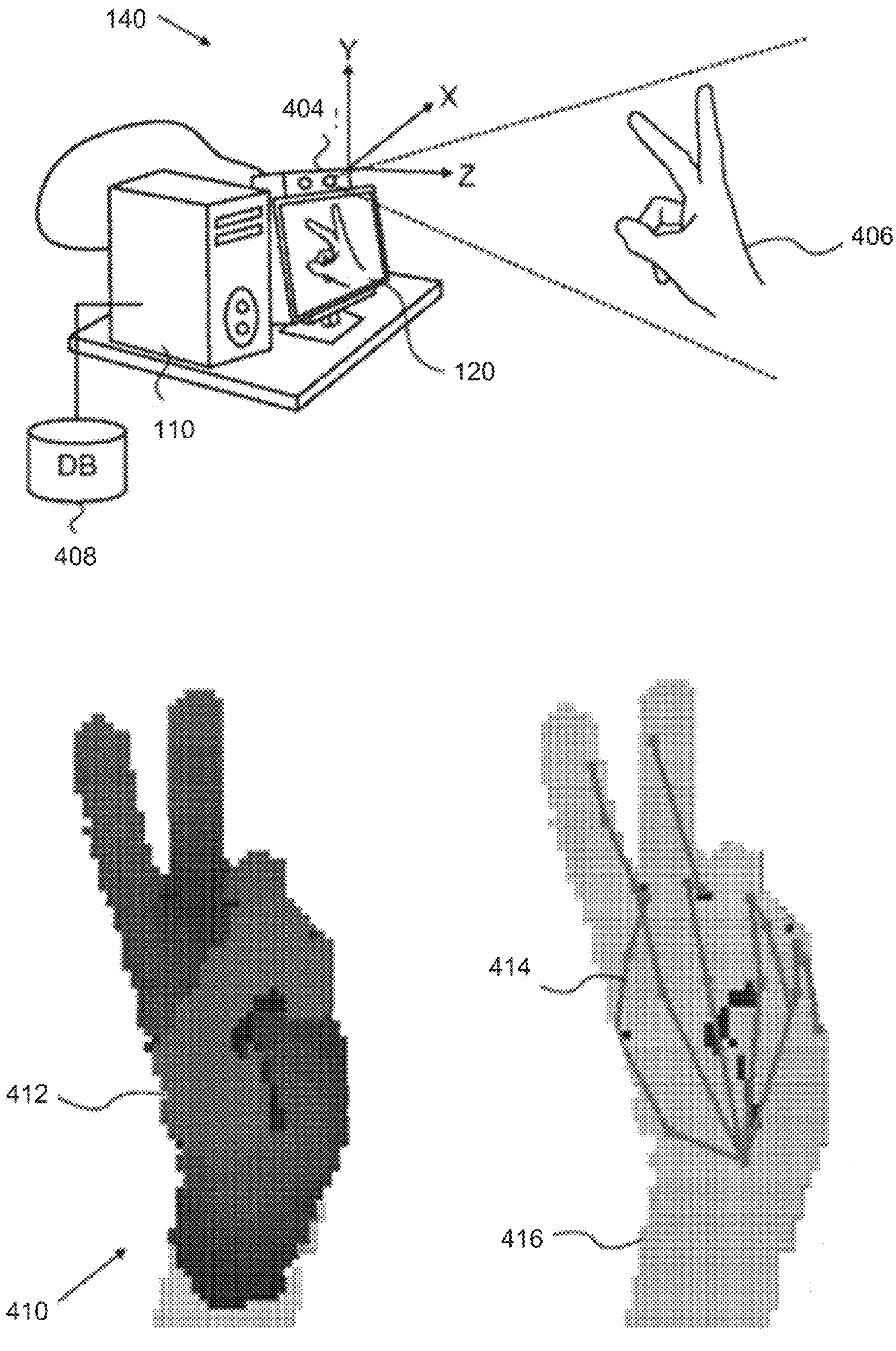
FIG. 4 is a block diagram illustrating a hand tracking unit of a computer system that is configured to capture gesture inputs of the user in accordance with some embodiments.

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands)

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
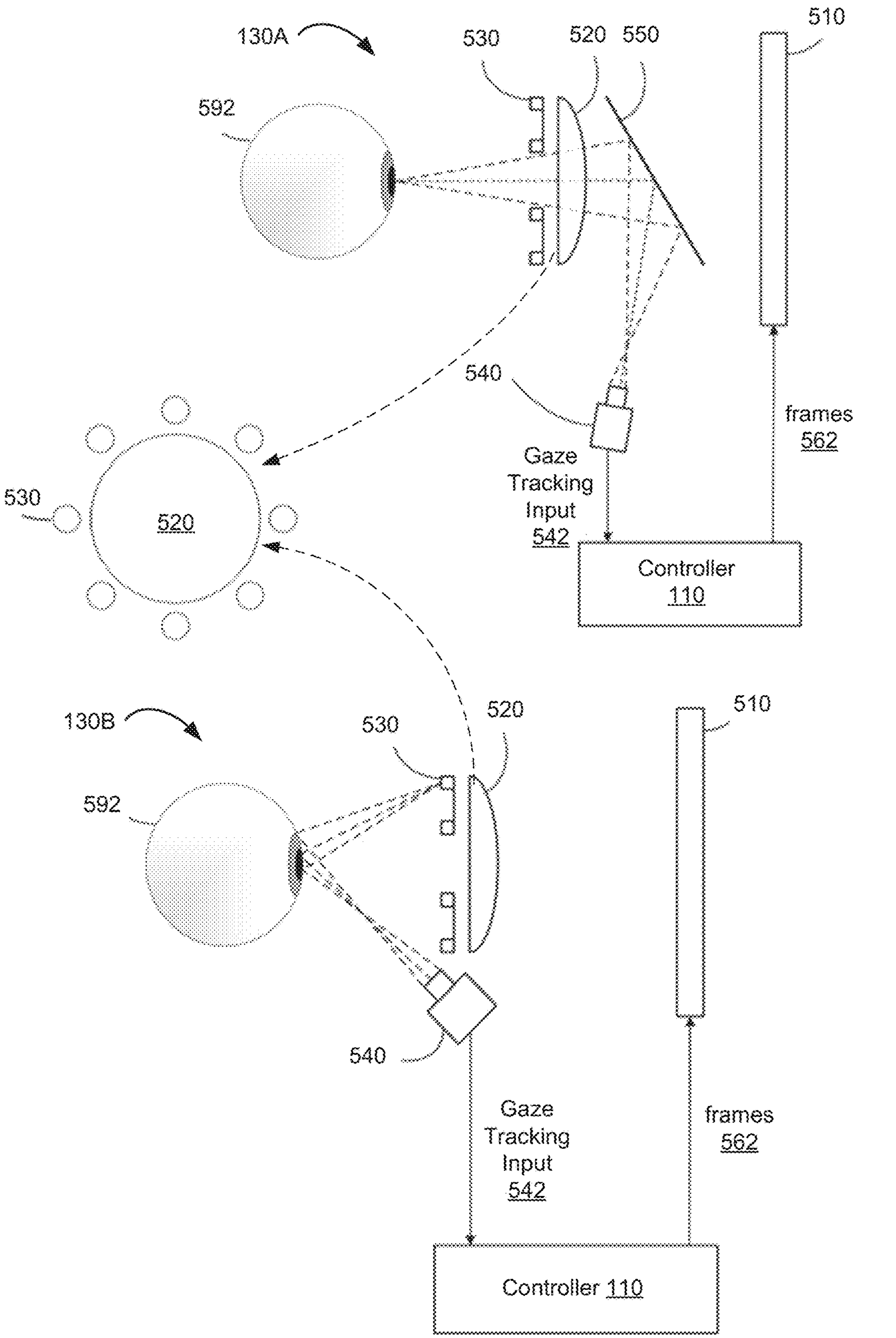
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6A:
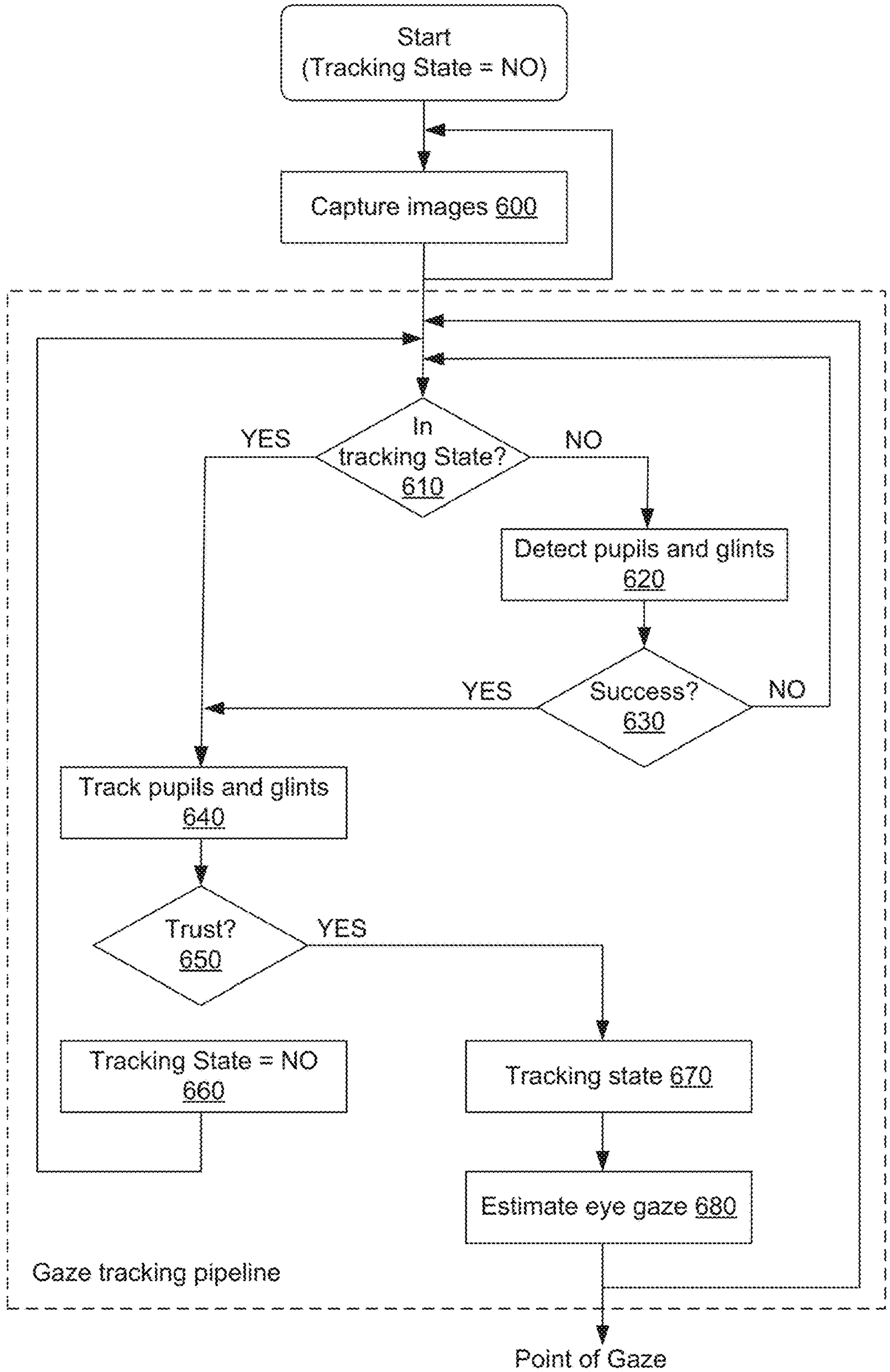
FIG. 6A is a flowchart illustrating a glint-assisted gaze tracking pipeline in accordance with some embodiments.

FIG. 6A illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6A, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6A is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Figure 6B:
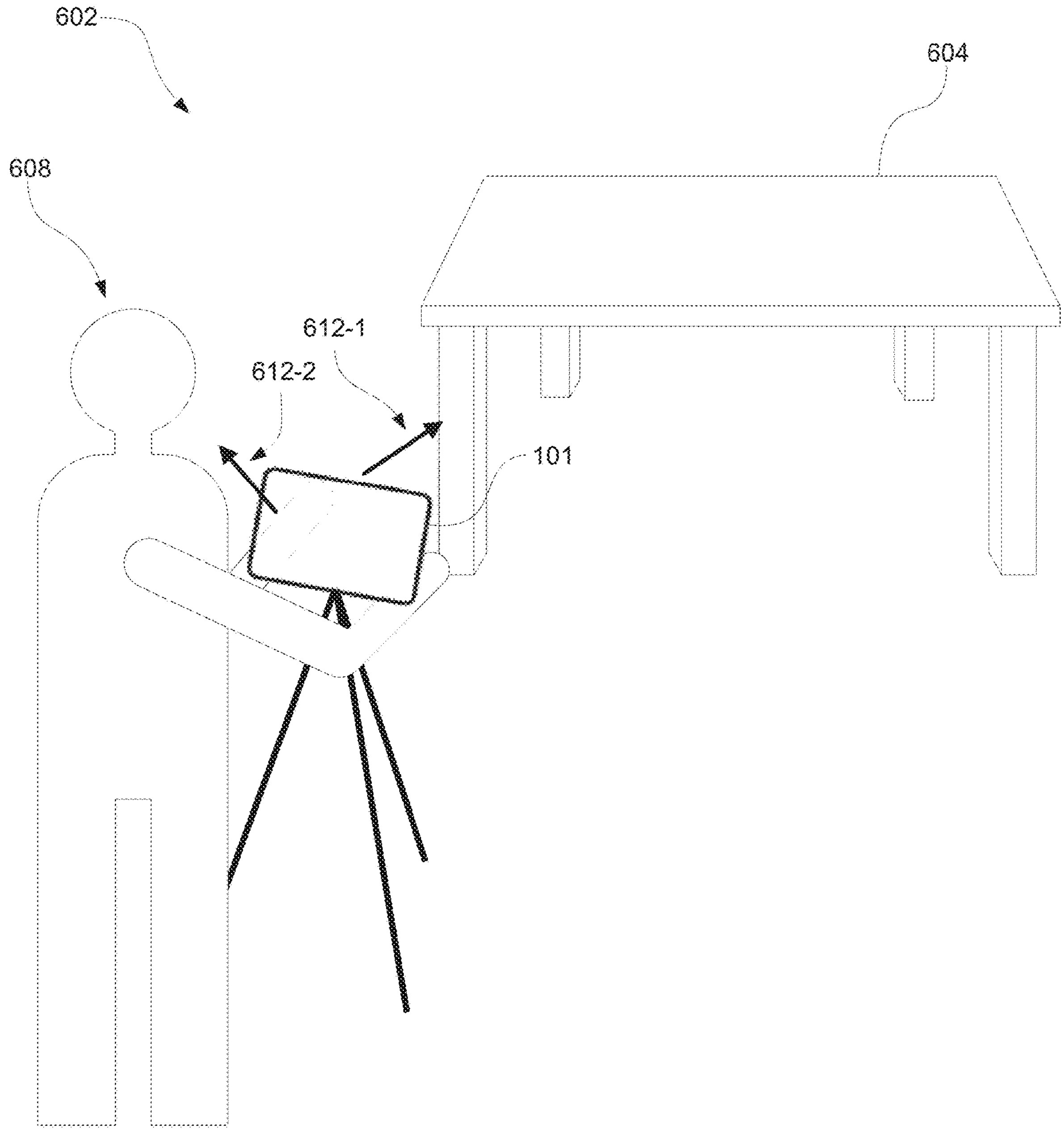
FIG. 6B illustrates an exemplary environment of an electronic device providing a CGR experience in accordance with some embodiments.

FIG. 6B illustrates an exemplary environment of an electronic device 101 providing a XR experience in accordance with some embodiments. In FIG. 6B, real world environment 602 includes electronic device 101, user 608, and a real world object (e.g., table 604). As shown in FIG. 6B, electronic device 101 is optionally mounted on a tripod or otherwise secured in real world environment 602 such that one or more hands of user 608 are free (e.g., user 608 is optionally not holding device 101 with one or more hands). As described above, device 101 optionally has one or more groups of sensors positioned on different sides of device 101. For example, device 101 optionally includes sensor group 612-1 and sensor group 612-2 located on the "back" and "front" sides of device 101, respectively (e.g., which are able to capture information from the respective sides of device 101). As used herein, the front side of device 101 is the side that is facing user 608, and the back side of device 101 is the side facing away from user 608.

In some embodiments, sensor group 612-2 includes an eye tracking unit (e.g., eye tracking unit 245 described above with reference to FIG. 2) that includes one or more sensors for tracking the eyes and/or gaze of the user such that the eye tracking unit is able to "look" at user 608 and track the eye(s) of user 608 in the manners previously described. In some embodiments, the eye tracking unit of device 101 is able to capture the movements, orientation, and/or gaze of the eyes of user 608 and treat the movements, orientation, and/or gaze as inputs.

In some embodiments, sensor group 612-1 includes a hand tracking unit (e.g., hand tracking unit 243 described above with reference to FIG. 2) that is able to track one or more hands of user 608 that are held on the "back" side of device 101, as shown in FIG. 6B. In some embodiments, the hand tracking unit is optionally included in sensor group 612-2 such that user 608 is able to additionally or alternatively hold one or more hands on the "front" side of device 101 while device 101 tracks the position of the one or more hands. As described above, the hand tracking unit of device 101 is able to capture the movements, positions, and/or gestures of the one or more hands of user 608 and treat the movements, positions, and/or gestures as inputs.

In some embodiments, sensor group 612-1 optionally includes one or more sensors configured to capture images of real world environment 602, including table 604 (e.g., such as image sensors 404 described above with reference to FIG. 4). As described above, device 101 is able to capture images of portions (e.g., some or all) of real world environment 602 and present the captured portions of real world environment 602 to the user via one or more display generation components of device 101 (e.g., the display of device 101, which is optionally located on the side of device 101 that is facing the user, opposite of the side of device 101 that is facing the captured portions of real world environment 602).

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of an computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

Similarly, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7D illustrate examples of an electronic device facilitating cursor interactions in different regions in a three-dimensional environment in accordance with some embodiments.

Figure 7A:
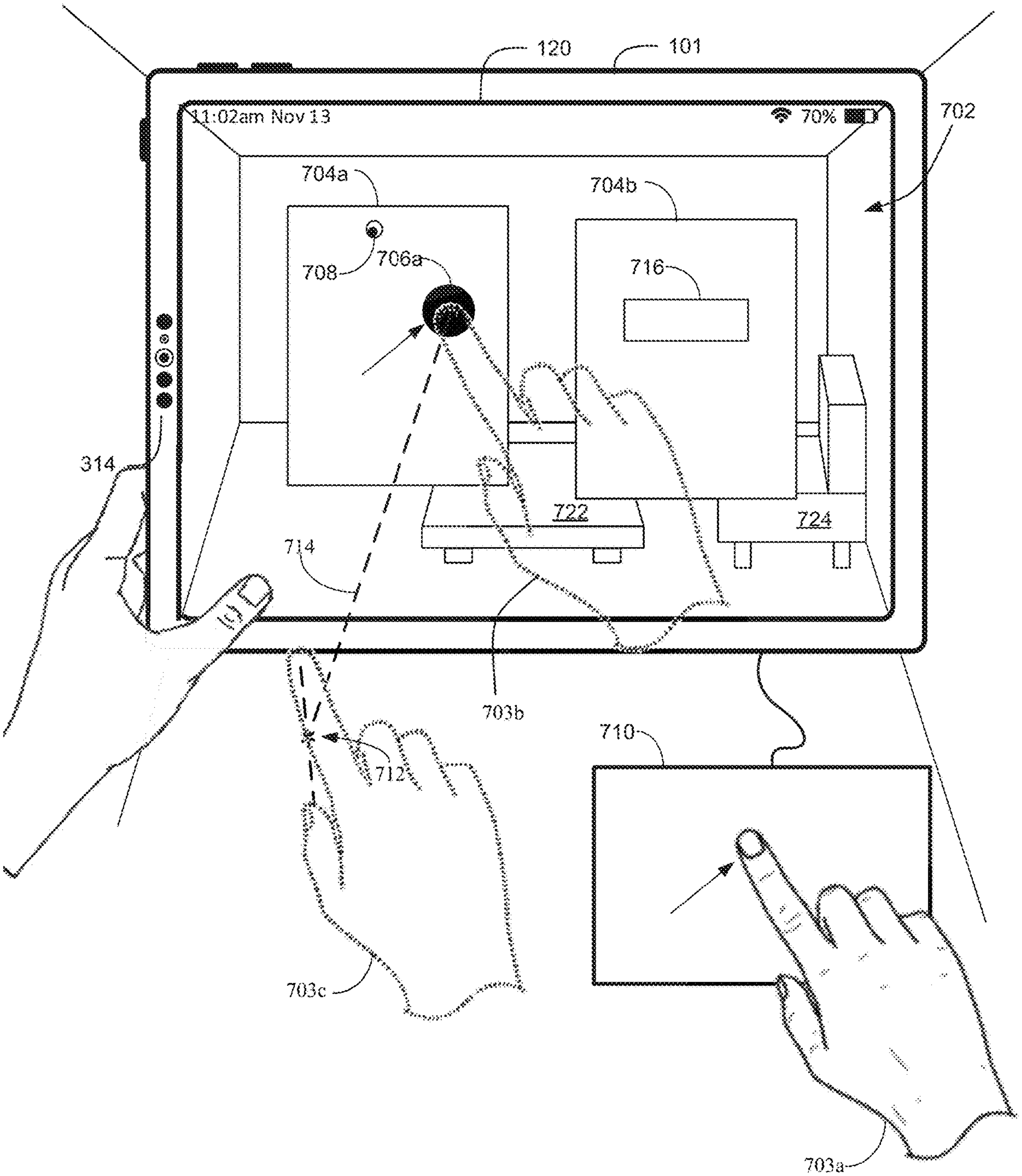
FIGS. 7A-7D illustrate examples of an electronic device facilitating cursor interactions in different regions in a three-dimensional environment in accordance with some embodiments.

FIG. 7A illustrates an electronic device 101 displaying, via a display generation component (e.g., display generation component 120 of FIG. 1), a three-dimensional environment 702 from a viewpoint of a user of the electronic device 101. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user (e.g., one or more hands of the user) while the user interacts with the electronic device 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 7A, device 101 captures one or more images of the physical environment around device 101 (e.g., operating environment 100), including one or more objects in the physical environment around device 101. In some embodiments, device 101 displays representations of the physical environment in three-dimensional environment 702. For example, three-dimensional environment 702 includes a representation 724 of a sofa, which is optionally a representation of a physical sofa in the physical environment; three-dimensional environment 702 also includes a representation 722 of a table, which is optionally a representation of a physical table in the physical environment. Three-dimensional environment 702 also includes representations of the physical floor, ceiling and back and side walls of the room in which device 101 is located.

In FIG. 7A, three-dimensional environment 702 also includes virtual objects 704*a* and 704*b* in different regions of three-dimensional environment 702. Virtual objects 704*a* and 704*b* are optionally one or more of user interfaces of applications (e.g., messaging user interfaces, content browsing user interfaces, etc.), three-dimensional objects (e.g., virtual clocks, virtual balls, virtual cars, etc.), representations of content (e.g., representations of photographs, videos, movies, music, etc.) or any other element displayed by device 101 that is not included in the physical environment of device 101. In FIG. 7A, virtual objects 704*a* are two-dimensional objects, but the examples described herein could apply analogously to three-dimensional objects.

In some embodiments, device 101 provides for cursor input and/or interaction with three-dimensional environment 702 (e.g., to select content or selectable options to perform operations, to create marks in three-dimensional environment 702, etc.). Device 101 is optionally able to detect input to control a cursor in three-dimensional environment 702 in various manners. For example, device 101 is optionally in communication with a physical trackpad or touch-sensitive surface 710 in the physical environment of device 101. Contacts (e.g., from one or more fingers) detected on trackpad 710 and movements of those contacts on trackpad 710 optionally cause a cursor displayed by device 101 to move in three-dimensional environment 702 in accordance with such inputs, as will be described in more detail later. Additionally or alternatively, gestures, shapes and/or movement of the hands of the user of device 101 in empty space in the physical environment are optionally detected by device 101 (e.g., using sensors 314), and optionally cause a cursor displayed by device 101 to move in three-dimensional environment 702 in accordance with such inputs, as will be described in more detail later.

In FIG. 7A, hands 703*a*, 703*b* and 703*c* are illustrated as providing input to device 101. It should be understood that while multiple hands and corresponding inputs are illustrated in FIGS. 7A-7D, such hands and inputs need not be detected by device 101 concurrently; rather, in some embodiments, device 101 independently responds to the hands and/or inputs illustrated and described in response to detecting such hands and/or inputs independently.

For example, in FIG. 7A, device 101 detects gaze 708 of the user directed to object 704*a*, and a finger from hand 703*a* in contact with trackpad 710. In response, device 101 displays cursor 706*a* within object 704*a*. Cursor 706*a* within object 704*a* is optionally for interacting with content, elements, etc. within object 704*a*. In some embodiments, cursor 706*a* is confined to object 704*a*, and cannot move outside of object 704*a*, even if movement inputs from hand 703*a* corresponding to movement of cursor 706*a* outside of object 704*a* are detected. In FIG. 7A, device 101 has detected movement of the finger of hand 703*a* in contact with trackpad 710 in an upward and rightward direction; in response, device 101 has moved cursor 706*a* upward and rightward in accordance with the movement of the finger of hand 703*a* in contact with trackpad 710.

FIG. 7A also illustrates device 101 detecting gaze 708 of the user directed to object 704*a* while hand 703*b* is within a threshold distance (e.g., 0.1, 0.3, 0.5, 1, 3, 5, 10, 20, 30, or 50 cm) of object 704*a*, and hand 703*b* is in a predefined pose. For example, the predefined pose is one in which the index finger of hand 703*b* is extended away from the palm of hand 703*b* while the other fingers of hand 703*b* are curled in towards the palm of hand 703*b* (e.g., hand 703*b* is in a pointing hand shape). In response to detecting the above, device 101 displays cursor 706*a* within object 704*a*. In some embodiments, cursor 706*a* is confined to object 704*a*, and cannot move outside of object 704*a*, even if movement inputs from hand 703*b* corresponding to movement of cursor 706*a* outside of object 704*a* are detected. In FIG. 7A, device 101 has detected movement of hand 703*b* while in the pointing hand shape in an upward and rightward direction; in response, device 101 has moved cursor 706*a* upward and rightward in accordance with the movement of hand 703*b*. Further, the placement of cursor 706*a* in relation to hand 703*b* is optionally such that device 101 displays cursor 706*a* at a location corresponding to the tip of the index finger of hand 703*b* (e.g., the finger that is extended away from the palm of hand 703*b*), as shown in FIG. 7A. Cursor 706*a* optionally follows the location of the tip of the index finger of hand 703*b* as hand 703*b* moves in space.

FIG. 7A also illustrates device 101 detecting gaze 708 of the user directed to object 704*a* while hand 703*c* is further than the threshold distance of object 704*a*, and hand 703*b* is in a predefined pose. For example, the predefined pose is a pre-pinch hand shape in which the index finger of hand 703*c* and the thumb of hand 703*c* are curled towards each other, and the tips of the index finger and thumb are within a threshold distance (e.g., 0.1, 0.3, 0.5, 1, 2, 3, 5, 10, or 20 cm) of touching, but are not touching. In response to detecting the above, device 101 displays cursor 706*a* within object 704*a*. In some embodiments, cursor 706*a* is confined to object 704*a*, and cannot move outside of object 704*a*, even if movement inputs from hand 703*c* corresponding to movement of cursor 706*a* outside of object 704*a* are detected. In FIG. 7A, device 101 has detected movement of hand 703*c* while in the pre-pinch hand shape in an upward and rightward direction; in response, device 101 has moved cursor 706*a* upward and rightward in accordance with the movement of hand 703*c*. Further, the placement of cursor 706*a* in relation to hand 703*c* is optionally such that device 101 displays cursor 706*a* at a location corresponding to the location 712 between the tip of the index finger of hand 703*c* and the tip of the thumb of hand 703*c*, as shown in FIG. 7A. Location 712 is optionally the pinch location of the tip of the index finger and the tip of the thumb (e.g., the location at which the index finger and thumb will come together and touch once hand 703*c* performs a pinch gesture). Cursor 706*a* is optionally displayed in object 704*a* at a perpendicular projection 714 of location 712 onto the surface of object 704*a*. Cursor 706*a* optionally follows location 712 as hand 703*c* moves in space.

Figure 7B:
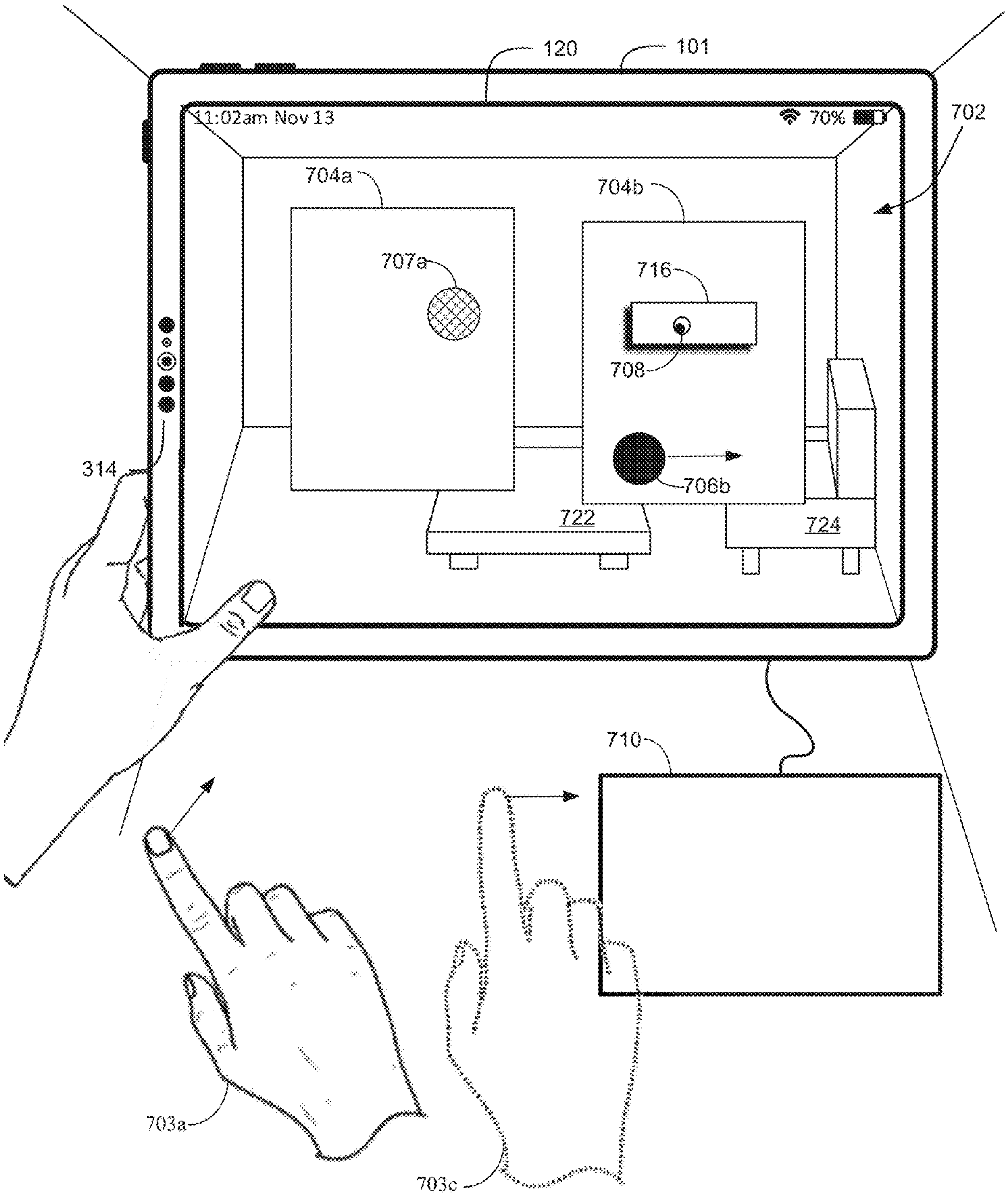

After detecting the one or more inputs directed to object 704*a* in FIG. 7A, in FIG. 7B device 101 detects inputs directed to a different region in three-dimensional environment 702, other than the region including object 704*a*; for example, device 101 detects inputs directed to the region that includes object 704*b*. For example, in FIG. 704*b*, device detects gaze 708 of the user directed to object 704*b* and/or input from hands 703*a* and/or 703*c* directed to object 704*b*. In response, device 101 has ceased display of cursor 706*a* in object 704*a*. Instead, device 101 is displaying indication 707*a* at the last location of cursor 706*a* in object 704*a*. Indication 707*a* is optionally a ghosted version of cursor 706*a* and/or an outline or other indication of cursor 706*a*. Indication 707*a* optionally indicates the location at which cursor 706*a* will be redisplayed in object 704*a* when device 101 again detects inputs directed to object 704*a* and/or the region that includes object 704*a*, as will be described in more detail later.

The inputs directed to object 704*b* are optionally inputs of different kinds. For example, hand 703*c* is optionally providing a cursor input to object 704*b* (e.g., such as described with reference to hands 703*a*, 703*b* and/or 703*c* in FIG. 7A), which optionally causes device 101 to display cursor 706*b*—optionally a different cursor than cursor 706*a*—in object 704*b*. Cursor 706*b* within object 704*b* is optionally for interacting with content, elements, etc. within object 704*b*. In some embodiments, cursor 706*b* is confined to object 704*b*, and cannot move outside of object 704*b*, even if movement inputs from hand 703*c* corresponding to movement of cursor 706*b* outside of object 704*b* are detected. In FIG. 7B, device 101 is detecting movement of hand 703*c* (e.g., while in the pre-pinch hand shape, in the pointing hand shape, etc.) in a rightward direction; in response, device 101 is moving cursor 706*b* rightward in accordance with the movement of hand 703*c*.

As another example, hand 703*a* is optionally providing a button selection input to object 704*b* in FIG. 7B. For example, element 716 in object 704*b* is optionally a button element that becomes selected when pushed sufficiently back towards object 704*b* to make contact with object 704*b*. In FIG. 7A, button 716 is optionally flush with (e.g., not visually separated from) object 704*b*. In FIG. 7B, in response to detecting gaze 708 of the user directed to button 716 (or object 704*b*), and hand 703*a* in the previously described pre-pinch hand shape (e.g., if hand 703*a* is further than the above-described threshold distance from button 716) or in the previously described pointing hand shape (e.g., if hand 703*a* is closer than the above-described threshold distance from button 716), device 101 has visually separated button 716 from object 704*b*. Button 716 is optionally pushed back towards object 704*b* in response to detecting movement of hand 703*a* towards button 716 and/or object 704*b*, optionally while gaze 708 remains directed to button 716. For example, sufficient movement of hand 703*a* in the pointing hand shape to move button 716 to make contact with object 704*b* optionally causes button 716 to become selected. As another example, detecting hand 703*a* changing from the pre-pinch hand shape to a pinch hand shape (e.g., detecting the tip of the index finger and thumb of hand 703*a* coming together and touching) while gaze 708 of the user is directed to button 716, followed by sufficient movement of hand 703 in the pinch hand shape to move button 716 to make contact with object 704*b* optionally causes button 716 to become selected.

Figure 7C:
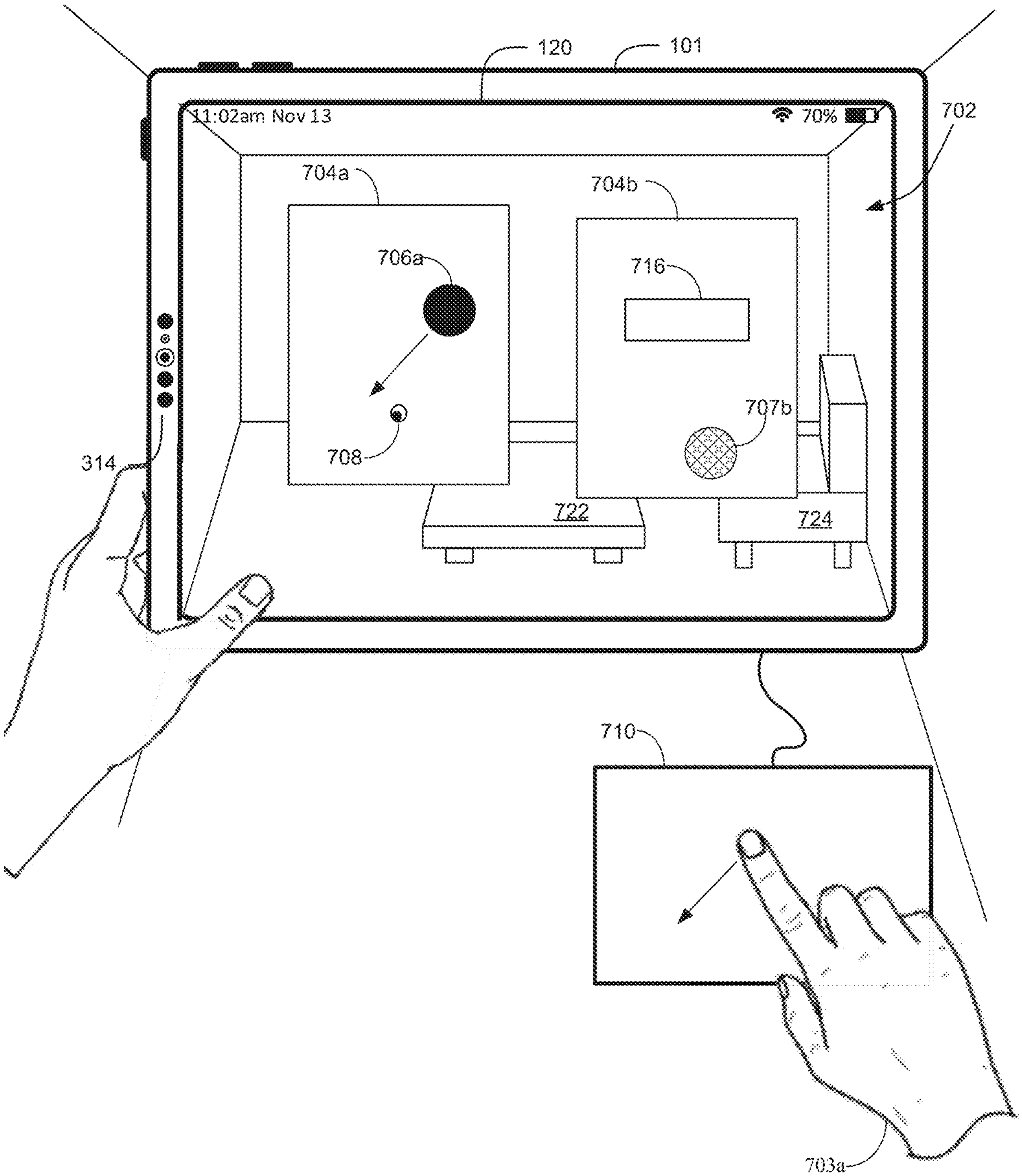

After detecting the one or more inputs directed to object 704*b* in FIG. 7B, in FIG. 7C device 101 detects a cursor input directed to the region including object 704*a*; for example, device 101 detects gaze 708 of the user directed to object 704*a* and/or a finger of hand 703*a* in contact with trackpad 710. While FIG. 7C illustrates a trackpad 710 cursor input, is it understood that the cursor input in FIG. 7C is optionally any other type of cursor input described with reference to FIGS. 7A and/or 7B. In response to the cursor input directed to object 704*a*, device 101 redisplays cursor 706*a* in object 704*a*, and ceases display of indication 707*a* in object 704*a*, as shown in FIG. 7C. Further, in some embodiments, device 101 ceases display of cursor 706*b* in object 704*b*, and displays indication 707*b* of cursor 706*b* in object 704*b* at the last location of cursor 706*b* in object 704*b*. Indication 707*b* optionally has one or more of the characteristics of indication 707*a*, previously described.

Figure 7D:
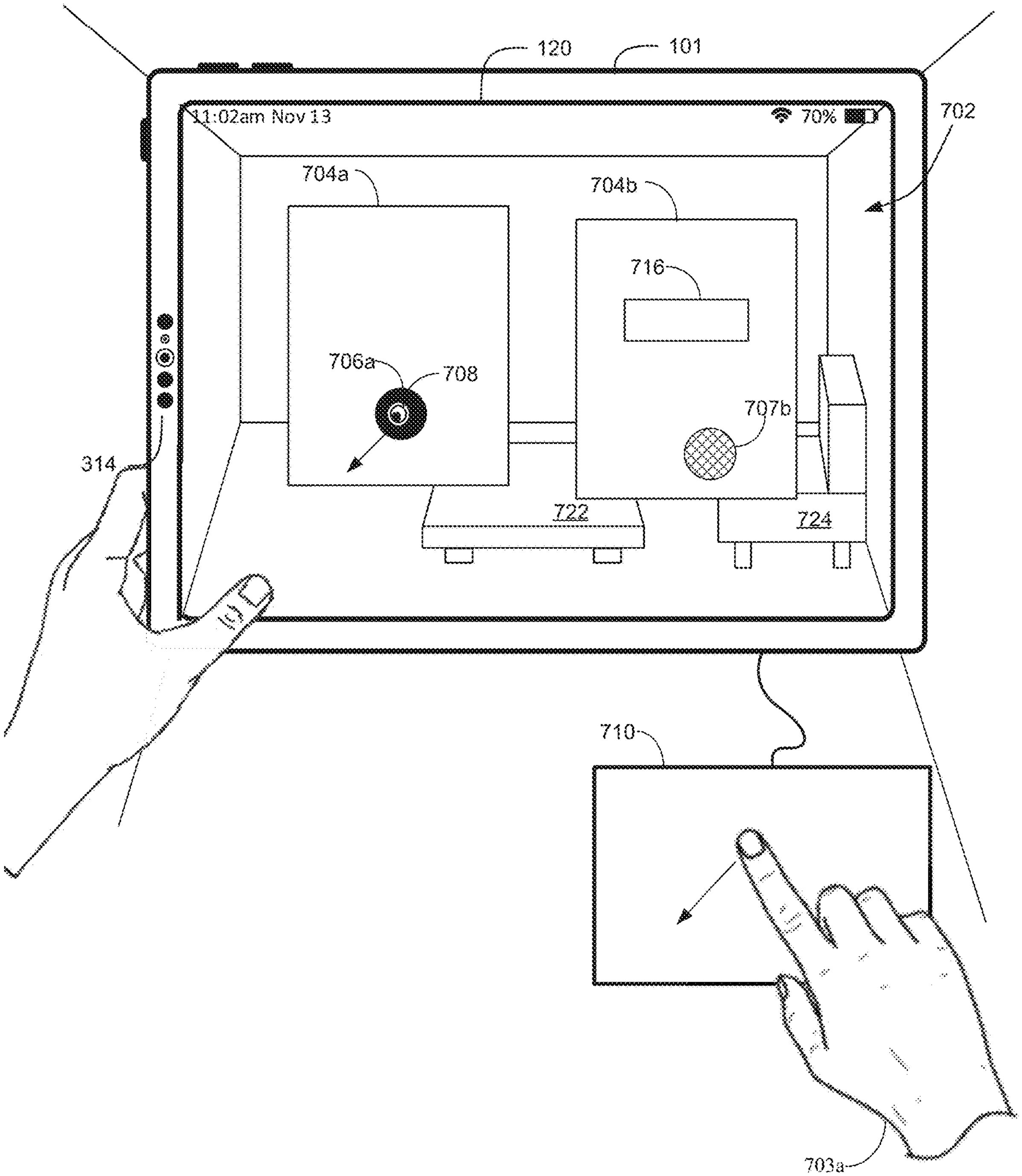
Figure 8A:
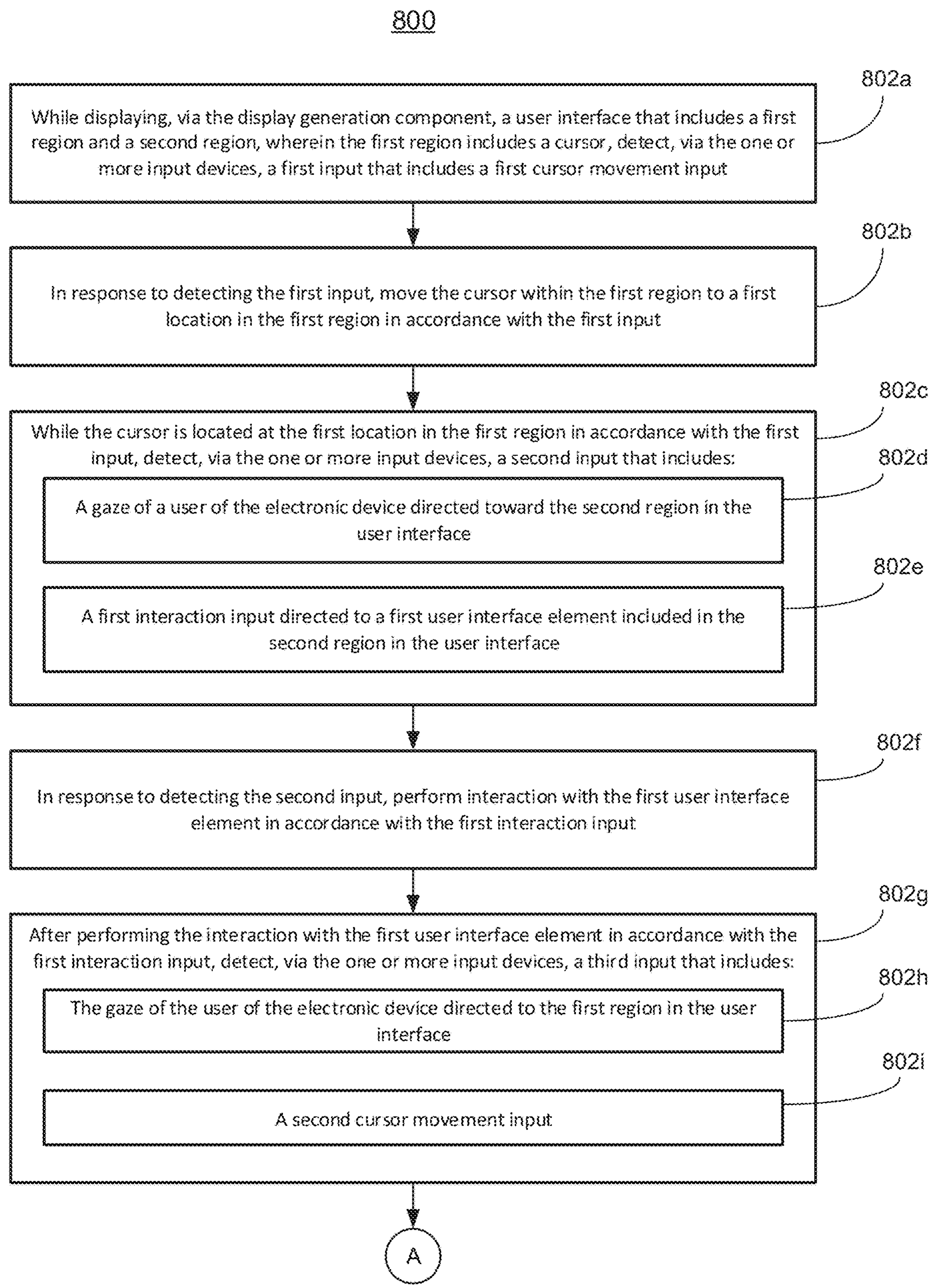
FIGS. 8A-8E is a flowchart illustrating a method of facilitating cursor interactions in different regions in a three-dimensional environment in accordance with some embodiments.
Figure 8B:
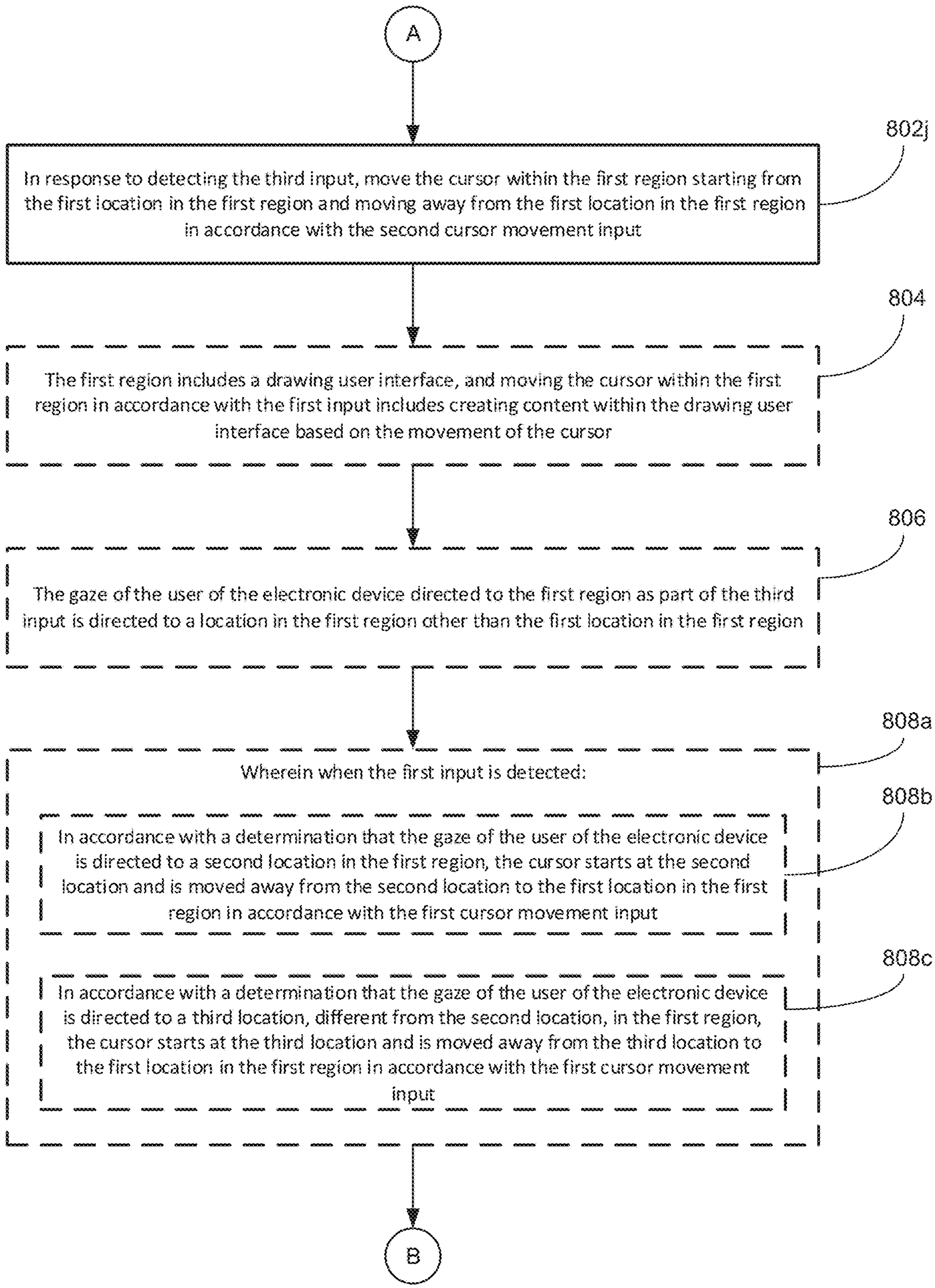
Figure 8C:
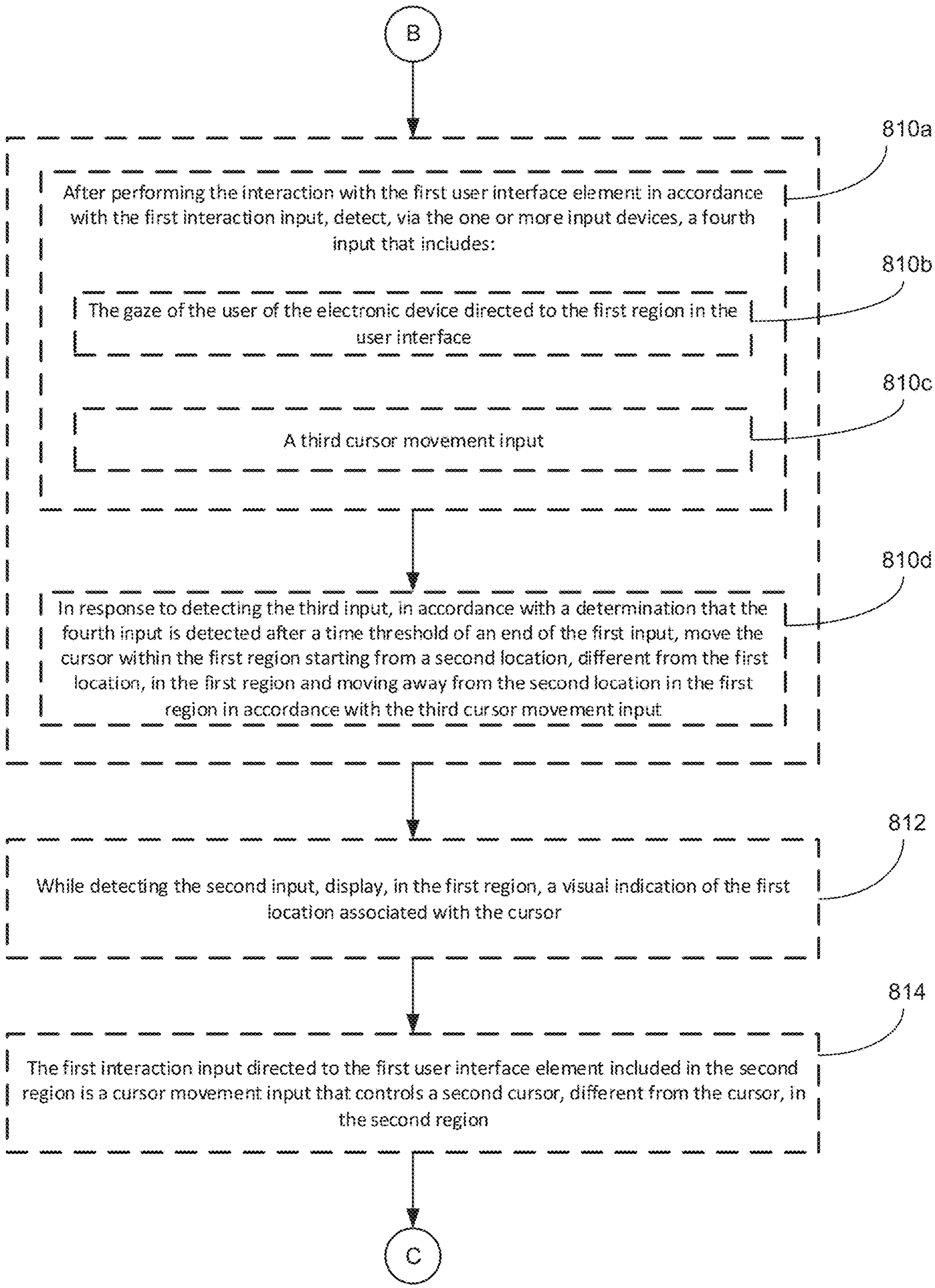
Figure 8D:
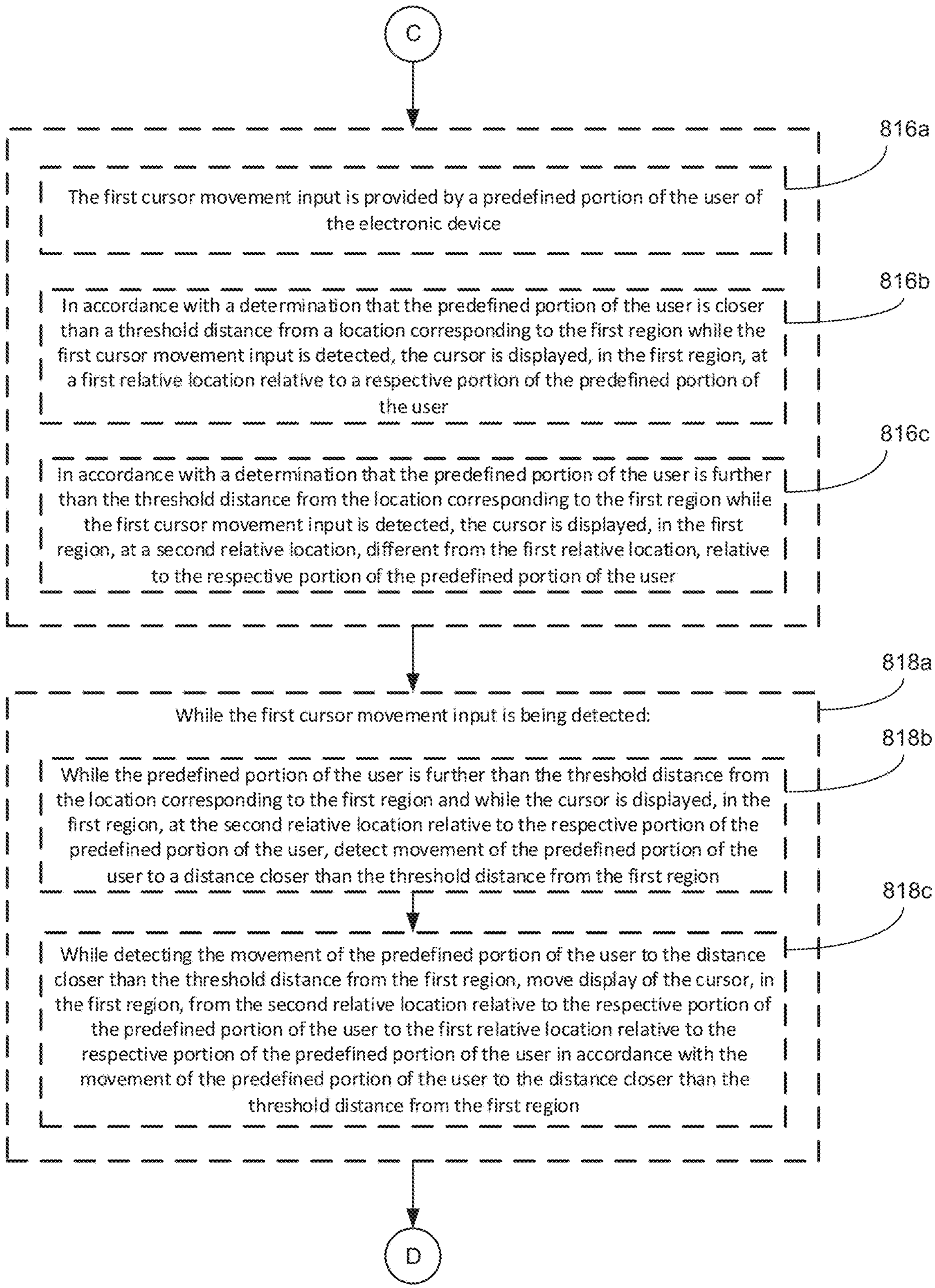
Figure 8E:
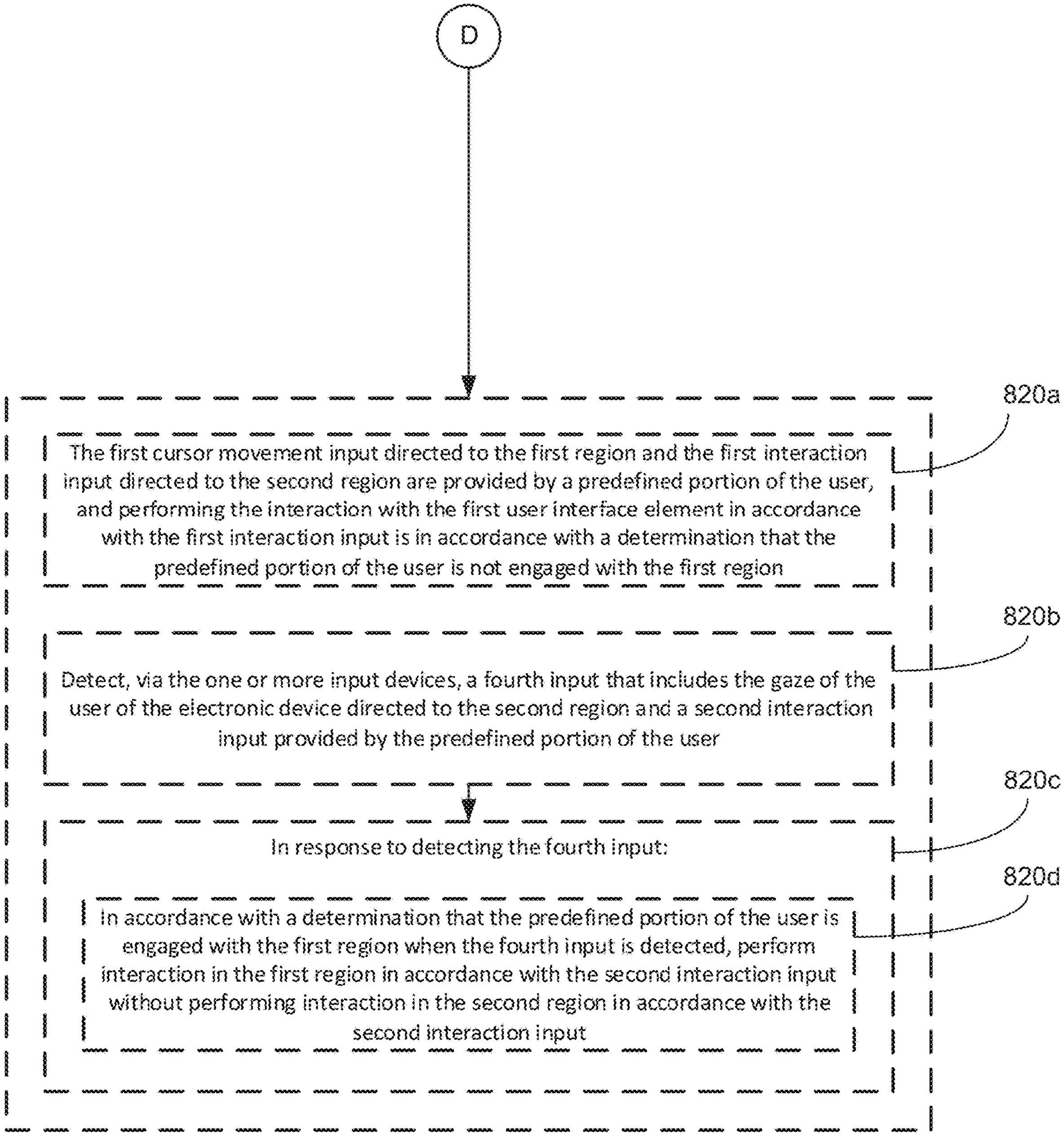

In some embodiments, device 101 redisplays cursor 706*a* at the last location of cursor 706*a* in object 704*a* (e.g., the location at which indication 707*a* was displayed), as shown in FIG. 7C. Device 101 optionally only redisplays cursor 706*a* at the last location of cursor 706*a* in object 704*a* if the time that has elapsed between the last cursor input directed to object 704*a* (e.g., the end(s) of the cursor input(s) described with reference to FIG. 7A) and the beginning of the cursor input directed to object 704*a* in FIG. 7C is less than a time threshold (e.g., 1, 5, 10, 30, or 60 seconds, or 3, 5, 10, 20, or 30 minutes). Otherwise, device 101 optionally redisplays cursor 706*a* at the current location of gaze 708 of the user in object 704*a*, as shown in FIG. 7D. In both FIGS. 7C and 7D, device 101 optionally moves cursor 706*a* from the location at which cursor 706*a* was redisplayed in response to subsequent cursor movement input detected by device 101 (e.g., movement of the finger of hand 703*a* in contact with trackpad 710).

FIGS. 8A-8E is a flowchart illustrating a method 800 of facilitating cursor interactions in different regions in a three-dimensional environment in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at an electronic device (e.g., 101) in communication with a display generation component (e.g., 120) and one or more input devices (e.g., 314). For example, a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, while displaying, via the display generation component, a user interface that includes a first region, such as including object 704*a*, and a second region, such as including object 704*b* (e.g., the user interface includes a first user interface for a first application, such as a drawing application to which user input is provided to draw content, and a second user interface for a second application, such as a content browsing or collection application that includes representations of a plurality of objects or content items that are included in the content browsing or collection application. In some embodiments, the user interface and/or regions are displayed in a three-dimensional environment (e.g., the user interface is the three-dimensional environment and/or is displayed within a three-dimensional environment) that is generated, displayed, or otherwise caused to be viewable by the device (e.g., a computer-generated reality (CGR) environment such as a virtual reality (VR) environment, a mixed reality (MR) environment, or an augmented reality (AR) environment, etc.), wherein the first region includes a cursor (e.g., a pointer or other visual indicator that is controlled by user input. In some embodiments, a selection input detected while the cursor is over an object or content causes the object or content to be selected. In some embodiments, the cursor can be moved within the first region in response to movement-based inputs provided to the electronic device, as described below. In some embodiments, the cursor is located within content, such as described with reference to method 1000), the electronic device detects (802*a*), via the one or more input devices, a first input that includes a first cursor movement input, such as the inputs directed to cursor 706*a* in FIG. 7A. For example, an input that includes at least one component for moving the cursor. For example, an input at a virtual trackpad object displayed in the user interface that includes a finger of a user of the electronic device touching or within a threshold distance of (e.g., 0.1, 0.2, 0.5, 1, 2, 4, or 10 cm) of the surface of the virtual trackpad, and movement of the finger while touching or within the threshold distance of the surface of the virtual trackpad. In some embodiments, the input is at a physical trackpad (or other cursor input device, such as a mouse) that is in communication with the electronic device, and has one or more of the characteristics described above with respect to the virtual trackpad input. In some embodiments, the first input and/or one or more inputs described with reference to method 800 are air gesture inputs. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, in response to detecting the first input, the electronic device moves (802*b*) the cursor within the first region to a first location in the first region in accordance with the first input, such as shown with cursor 706*a* in FIG. 7A. For example, the cursor was at a second location, different from the first location, in the first region when the first input was detected, and the first cursor movement input (e.g., included in the first input) corresponds to movement of the cursor from the second location to the first location in the first region. In some embodiments, when the cursor is located within the first region, cursor movement input directed to that cursor can only move the cursor within the first region, and cannot cause the cursor to move from the first region to the second region (e.g., cursor movement inputs are mapped to the area and/or volume of the first region).

In some embodiments, while the cursor is located at the first location in the first region in accordance with the first input (e.g., (immediately) after the first input that moved the cursor to the first location in the first region, and without further (e.g., cursor movement) input directed to the cursor in the first region), the electronic device detects (802*c*), via the one or more input devices, a second input that includes a gaze of a user of the electronic device directed toward the second region in the user interface (802*d*), such as gaze 708 in FIG. 7B (e.g., the electronic device detects that the user is looking at the second region in the user interface, and not looking at the first region in the user interface. In some embodiments, the first input was detected while the user of the electronic device was looking at the first region in the user interface and not looking at the second region (e.g., the gaze of the user was directed toward the first region)).

In some embodiments, the second input includes a first interaction input directed to a first user interface element included in the second region in the user interface (802*e*), such as interaction with cursor 706*b* or element 716 in FIG. 7B. For example, the electronic device detects selection of a selectable option (e.g., a button) in the second region, such as via the gaze of the user being directed to the selectable option when a pinch gesture of the hand of the user is detected by the electronic device (e.g., a thumb and index finger of the hand starting apart and coming together to touch fingertips). In some embodiments, the hand that performed the pinch gesture is the same hand that provided the cursor movement input in the first input. In some embodiments, the hand that performed the pinch gesture is a different hand than the hand that provided the cursor movement input in the first input. In some embodiments, the first interaction input is a cursor movement input for controlling a cursor (in some embodiments, a different cursor than the cursor in the first region) in the second region.

In some embodiments, in response to detecting the second input, the electronic device performs (802*f*) interaction with the first user interface element in accordance with the first interaction input, such as described with reference to FIG. 7B. For example, moving the cursor in the second region in accordance with a cursor control input in the first interaction input, or performing an operation or action in accordance with a button selection input in the first interaction input, such as causing display of a user interface of an application if an application icon is selected in the second region.

In some embodiments, after performing the interaction with the first user interface element in accordance with the first interaction input (e.g., and without having detected any cursor movement input directed to the cursor in the first region after the first input), the electronic device detects (802*g*), via the one or more input devices, a third input that includes the gaze of the user of the electronic device directed to the first region in the user interface (802*h*), such as shown with gaze 708 in FIG. 7C (optionally, without regard to whether or not the gaze of the user is directed to the first location) (e.g., the electronic device detects that the user is looking at the first region in the user interface, and not looking at the second region in the user interface).

In some embodiments, the third input includes a second cursor movement input (802*i*), such as the input from hand 703*a* in FIG. 7C (e.g., an input that has one or more of the characteristics of the first cursor movement input).

In some embodiments, in response to detecting the third input, the electronic device moves (802*j*) the cursor within the first region starting from the first location in the first region and moving away from the first location in the first region in accordance with the second cursor movement input, such as shown in FIG. 7C. For example, the cursor was at the first location in the first region when the third input was detected, and the second cursor movement input (e.g., included in the third input) corresponds to movement of the cursor from the first location to a third location in the first region. In some embodiments, when the electronic device detected the gaze of the user directed toward the second region (e.g., as part of the second input), the electronic device ceased displaying the cursor in the first region, and when the electronic device detected the gaze of the user directed toward the first region (e.g., as part of the third input), the electronic device redisplayed the cursor in the first region at the first location (e.g., the location to which the cursor was moved or at which it was located when the gaze of the user was last directed toward the first region). In some embodiments, the electronic device only redisplays the cursor when a trackpad input is detected (e.g., a touchdown on the virtual or physical trackpad, before or in response to subsequent movement of the finger on the trackpad). In some embodiments, the electronic device maintains display of the cursor (or a representation of the cursor such as a faded or minimized cursor representation) at the first location in the first region even when the gaze of the user moved to the second region and then to the first region. Thus, in the ways described above, the electronic device optionally maintains the location of the cursor in the first region even when intervening input is directed to the second region such that subsequent cursor interaction with the first region begins from the last location of the cursor in the first region. Maintaining the last location of the cursor in a given region of the user interface facilitates interaction with multiple different regions in a user interface while maintaining consistency in the location of the cursor, thereby simplifying the interaction between the user and the electronic device and reducing errors in usage (e.g., which might occur if the cursor were to appear in a different, unexpected location in a given region after intervening interaction with a different region in the user interface).

In some embodiments, the first region includes a drawing user interface (e.g., a drawing canvas into which content, such as drawings, are entered via input from the cursor. For example, the cursor is optionally a drawing cursor that draws lines/curves/etc. into the drawing canvas based on the movement of the cursor), and moving the cursor within the first region in accordance with the first input includes creating content within the drawing user interface based on the movement of the cursor (804), such as if cursor 706*a* were creating content within object 704*a* as it moves in object 704*a* (e.g., if the cursor moves in a circular movement, a circular drawing corresponding to the movement of the cursor is displayed in the drawing user interface). Providing for cursor-based drawing input allows a user to easily enter content into the user interface, thereby improving user-device interaction.

In some embodiments, the gaze of the user of the electronic device directed to the first region as part of the third input is directed to a location in the first region other than the first location in the first region (806), such as gaze 708 not being at the same location as cursor 706*a* in FIG. 7C (e.g., after interacting with the second region while the gaze of the user was directed to the second region, the gaze of the user is detected as being redirected to the first region, but not to the last location of the cursor in the first region prior to the interaction with the second region). Thus, in some embodiments, even when the gaze of the user is not directed to the last location of the cursor in the first region, cursor movement in the first region resumes from the last location of the cursor in the first region. In some embodiments, the gaze of the user is directed to the last location of the cursor in the first region, and the cursor movement in the first region still resumes from the last location of the cursor in the first region. Resuming cursor movement from the last location of the cursor in the first region even if the gaze of the user is not directed to that last location allows the user to direct attention to other portions of the first region (e.g., portions with which the user will next interact) without having to first direct attention to the location of the cursor, thereby facilitating efficient interaction with the user interface.

In some embodiments, when the first input is detected (808*a*), in accordance with a determination that the gaze of the user of the electronic device is directed to a second location in the first region, the cursor starts at the second location and is moved away from the second location to the first location in the first region in accordance with the first cursor movement input (808*b*), such as shown with cursor 706*a* in FIG. 7D.

In some embodiments, in accordance with a determination that the gaze of the user of the electronic device is directed to a third location, different from the second location, in the first region, the cursor starts at the third location and is moved away from the third location to the first location in the first region in accordance with the first cursor movement input (808*c*), such as if gaze 708 were directed to a different location of object 704*a* in FIG. 7D. In some embodiments, the location of the cursor for the initial interaction with the first region (e.g., before the interaction with the second region and/or the subsequent interaction with the first region) is based on the gaze location of the user. For example, the initial location of the cursor in the first region is optionally the location to which the gaze of the user is directed when the start of the first cursor movement input is detected, such as: a predefined gesture, such as a pinch gesture, performed by a hand of the user (e.g., followed by movement of the pinched hand, which optionally corresponds to the movement of the cursor); or touchdown of a finger of the user on a virtual or physical touch surface (e.g., followed by movement of the touched down finger, which optionally corresponds to the movement of the cursor). Thus, in some embodiments, when initially interacting with the first region, cursor movement begins from the gaze location of the user in the first region, and when subsequently interacting with the first region, cursor movement begins from the last location of the cursor in the first region, which is optionally different from the gaze location of the user in the first region. Starting cursor movement from the gaze location of the user allows the user to place the cursor where the user is looking without having to provide separate input to move the cursor to that location, thereby facilitating efficient interaction with the user interface.

In some embodiments, after performing the interaction with the first user interface element in accordance with the first interaction input (e.g., and without having detected any cursor movement input directed to the cursor in the first region after the first input), the electronic device detects (810*a*), via the one or more input devices, a fourth input that includes the gaze of the user of the electronic device directed to the first region in the user interface (810*b*), such as in FIG. 7C (optionally, without regard to whether or not the gaze of the user is directed to the first location) (e.g., the electronic device detects that the user is looking at the first region in the user interface, and not looking at the second region in the user interface).

In some embodiments, the fourth input includes a third cursor movement input (810*c*), such as from hand 703*a* in FIG. 7C or 7D (e.g., an input that has one or more of the characteristics of the first cursor movement input).

In some embodiments, in response to detecting the third input, in accordance with a determination that the fourth input is detected after a time threshold (e.g., 1, 5, 10, 30, or 60 seconds, or 3, 5, 10, 20, or 30 minutes) of an end of the first input (e.g., the fourth input directed to the first region is detected after the time threshold of the end of the first input directed to the first region. In some embodiments, the end of the first input is when the electronic device detects liftoff of a finger of the user from a physical or virtual touch surface, or when the electronic device detects release of a pinch gesture (e.g., using the thumb and index finger) made by the hand of the user), the electronic device moves (810*d*) the cursor within the first region starting from a second location (e.g., a location in the first region to which the gaze of the user is directed when the start of the third cursor movement input is detected, a default (e.g., center) location in the first region, etc.), different from the first location, in the first region and moving away from the second location in the first region in accordance with the third cursor movement input, such as shown and described with reference to FIG. 7D. In some embodiments, the third input was detected within the time threshold of the end of the first input—if it had not been, the cursor movement in response to the third input optionally would have started from the second location. In some embodiments, the cursor movement in the first region for subsequent cursor movement input directed to the first region automatically resets (e.g., no longer starts from the last location of the cursor in the first region) when the electronic device does not detect (e.g., cursor) interaction with the first region for longer than the time threshold. Automatically resetting the cursor location in the first region in response to non-interaction with the first region for the time threshold allows the user to initiate cursor movement in the first region from a location that is not tethered to the previous location of the cursor in the first region when such cursor movement is not likely to be related to the previous cursor location, thereby facilitating efficient interaction with the user interface.

In some embodiments, while detecting the second input, the electronic device displays (812), in the first region, a visual indication of the first location associated with the cursor, such as indication 707*a* in FIG. 7B. In some embodiments, before detecting the second cursor movement and while (e.g., and/or in response to) detecting the gaze of the user directed to the first region after detecting the second input, the electronic device displays the visual indication of the first location associated with the cursor. In some embodiments, the visual indication of the first location associated with the cursor is a visual hint, shadow, etc. of the cursor displayed at the last location of the cursor in the first region that indicates the location from where the movement of the cursor will start when subsequent cursor movement input is detected. Indicating the last location of the cursor in the first region clearly indicates the location from which cursor movement will begin when subsequent cursor movement input is detected, thereby facilitating efficient interaction with the user interface.

In some embodiments, the first interaction input directed to the first user interface element included in the second region is a cursor movement input that controls a second cursor, different from the cursor, in the second region (814), such as cursor 706*b* in FIG. 7B. Thus, in some embodiments, the gaze of the user of the electronic device being directed to the first region while cursor movement input is detected causes the electronic device to display and/or control a first cursor in the first region in accordance with that cursor movement input, and the gaze of the user of the electronic device being directed to the second region while cursor movement input is detected causes the electronic device to display and/or control a second cursor in the second region in accordance with that cursor movement input. Accordingly, in some embodiments, the first and second regions have their own cursors that are separately controllable in response to cursor movement inputs. Providing different cursors in different regions of the user interface allows a user to independently interact with different regions of the user interface without affecting the cursor locations in those different regions of the user interface, thereby facilitating efficient interaction with the user interface.

In some embodiments, the first cursor movement input is provided by a predefined portion of the user of the electronic device (816*a*), such as hands 703*b* or 703*c* in FIG. 7A (e.g., the cursor movement input is provided by a hand of the user of the electronic device).

In some embodiments, in accordance with a determination that the predefined portion of the user is closer than a threshold distance (e.g., 1, 3, 5, 10, 12, 24, 36, 72, 108 or 216 cm) from a location corresponding to the first region while the first cursor movement input is detected (e.g., the hand of the user is relatively close to a surface in the first region in which the cursor is located during the first cursor movement input), the cursor is displayed, in the first region, at a first relative location relative to a respective portion of the predefined portion of the user (816*b*), such as relative to the tip of the index finger of hand 703*b* in FIG. 7A. For example, when the hand of the user is providing relatively close input (e.g., direct input) to the first region, such as with the index finger of the hand extended towards the first region with the other fingers of the hand curled in towards the palm of the hand (e.g., not extended towards the first region), the cursor is displayed on a surface in the first region that coincides with the tip of the index finger of the hand, and the cursor moves in accordance with movement of the tip of the index finger. If the index finger of the hand is not touching the surface (e.g., is separated from the surface in the first region), the cursor is optionally displayed at a location on the surface whose normal intersects with the tip of the index finger, and the cursor moves in accordance with movement of the tip of the index finger (e.g., moves to locations on the surface whose normal continues to intersect with the updated position of the tip of the index finger).

In some embodiments, in accordance with a determination that the predefined portion of the user is further than the threshold distance (e.g., 1, 3, 5, 10, 12, 24, 36, 72, 108 or 216 cm) from the location corresponding to the first region while the first cursor movement input is detected (e.g., the hand of the user is relatively far from a surface in the first region in which the cursor is located during the first cursor movement input), the cursor is displayed, in the first region, at a second relative location, different from the first relative location, relative to the respective portion of the predefined portion of the user (816*c*), such as relative to location 712 of hand 703*c* in FIG. 7A. For example, when the hand of the user is providing relatively far input (e.g., indirect input, such as described with reference to method 1000) to the first region, such as with the index finger of the hand and the thumb touching (or nearly touching) each other in a pinch gesture hand shape, or even before the index finger and the thumb are touching (or nearly touching) each other, the cursor is displayed at a location on the surface in the first region whose normal intersects with a (e.g., middle) point (e.g., a "pinch point" or a "potential pinch point") between the tip of the thumb and the tip of the index finger of the hand of the user, and the cursor moves in accordance with movement of the "pinch point" or the "potential pinch point" (e.g., moves to locations on the surface whose normal continues to intersect with the updated position of the "pinch point" or the "potential pinch point"). Placing the cursor at different relative locations relative to the hand of the user depending on whether the cursor movement input is detected while the hand of the user is relatively close or far from the first region ensures that cursor placement corresponds to user expectations for the type of interaction provided by the user, thereby facilitating efficient interaction with the user interface and reducing errors in usage.

In some embodiments, while the first cursor movement input is being detected (818*a*) (e.g., while the cursor is being moved in the first region in accordance with movement of the hand of the user, and before detecting an end of the first cursor movement input, such as liftoff of a finger of the user from a virtual or physical touch surface, or release of a pinch performed by the thumb and index finger of the hand of the user), while the predefined portion of the user is further than the threshold distance (e.g., 1, 3, 5, 10, 12, 24, 36, 72, 108 or 216 cm) from the location corresponding to the first region and while the cursor is displayed, in the first region, at the second relative location relative to the respective portion of the predefined portion of the user (e.g., the cursor is displayed at a location corresponding to the "pinch point" or the "potential pinch point" of the hand of the user, and not corresponding to the tip of the index finger of the hand of the user), the electronic device detects (818*b*) movement of the predefined portion of the user to a distance closer than the threshold distance from the first region, such as if hand 703*c* in FIG. 7A were to move closer than the threshold distance from object 704*a* (e.g., the hand of the user gradually moves towards the surface that includes the cursor in the first region).

In some embodiments, while detecting the movement of the predefined portion of the user to the distance closer than the threshold distance from the first region (e.g., as the hand of the user gets closer to the surface in the first region that includes the cursor), the electronic device moves (818*c*) display of the cursor, in the first region, from the second relative location relative to the respective portion of the predefined portion of the user to the first relative location relative to the respective portion of the predefined portion of the user in accordance with the movement of the predefined portion of the user to the distance closer than the threshold distance from the first region (e.g., gradually changing the displayed location of the cursor from corresponding to the "pinch point" or the "potential pinch point" of the hand of the user to corresponding to the tip of the index finger of the hand of the user). Thus, in some embodiments, as the hand of the user gets closer to the first region, the cursor moves closer to being displayed at a location corresponding to the tip of the index finger of the hand of the user, and as the hand of the user gets further from the first region, the cursor moves closer to being displayed at a location corresponding to the "pinch point" or the "potential pinch point" of the hand of the user. Throughout the movement of the hand closer to or further away from the first region, the cursor optionally remains located (e.g., on a surface) in the first region (e.g., the cursor does not move in accordance with movement of the hand of the user towards or away from the first region. Gradually transitioning the display location of the cursor in response to movement of the hand of the user provides for a smooth and predictable transition of the position of the displayed cursor, thereby facilitating efficient interaction with the user interface and reducing errors in usage.

In some embodiments, the first cursor movement input directed to the first region and the first interaction input directed to the second region are provided by a predefined portion of the user (e.g., the same hand of the user), and performing the interaction with the first user interface element in accordance with the first interaction input is in accordance with a determination that the predefined portion of the user is not engaged with the first region (820*a*), for example in accordance with a determination that hands 703*a*, 703*b* or 703*c* are no longer interacting with object 704*a* when the gaze of the user moves to object 704*b* (e.g., the hand of the user is no longer interacting with the first region, such as no longer providing input for selecting text, refining a selection, drawing, scrolling, etc. in the first region. Thus, in some embodiments, the first interaction input was detected after completion of interaction between the hand of the user and the first region in the user interface).

In some embodiments, the electronic device detects (820*b*), via the one or more input devices, a fourth input that includes the gaze of the user of the electronic device directed to the second region (e.g., the electronic device detects that the user is looking at the second region in the user interface, and not looking at the first region in the user interface) and a second interaction input provided by the predefined portion of the user (e.g., an interaction input such as described with reference to the first interaction input, such as hand gestures, shapes and/or movements that correspond to various direct or indirect inputs).

In some embodiments, in response to detecting the fourth input (820*c*), in accordance with a determination that the predefined portion of the user is engaged with the first region when the fourth input is detected (e.g., the hand gestures, shapes and/or movements that are detected are continuations of interactions between the hand of the user and the first region, such as the hand performing hand gestures, shapes and/or movements for selecting text, refining a selection, drawing, scrolling, etc. in the first region. In some embodiments, the gaze of the user switched from the first region to the second region in the middle of (e.g., before the end of) the interaction(s) between the hand of the user and the first region), the electronic device performs (820*d*) interaction in the first region in accordance with the second interaction input (e.g., continuing the interaction that was occurring between the hand of the user and the first region) without performing interaction in the second region in accordance with the second interaction input, such as if in FIG. 7B hand 703*a* were still interacting with object 704*a* and not object 704*b*. Thus, in some embodiments, even if the gaze of the user switches to being directed to the second region, inputs detected from the hands of the user are not directed to the second region unless (and/or until) interactions that were occurring with the first region when the gaze of the user switched are completed. Forgoing switching inputs to a new region while prior interactions with a previous region are still occurring allows a user to look at various regions of the user interface without losing the ability to continue interactions with the previous region, thereby facilitating user interface exploration while maintaining efficient user-device interaction.

FIGS. 9A-9E illustrate examples of an electronic device facilitating cursor interactions in content in accordance with some embodiments.

Figure 9A:
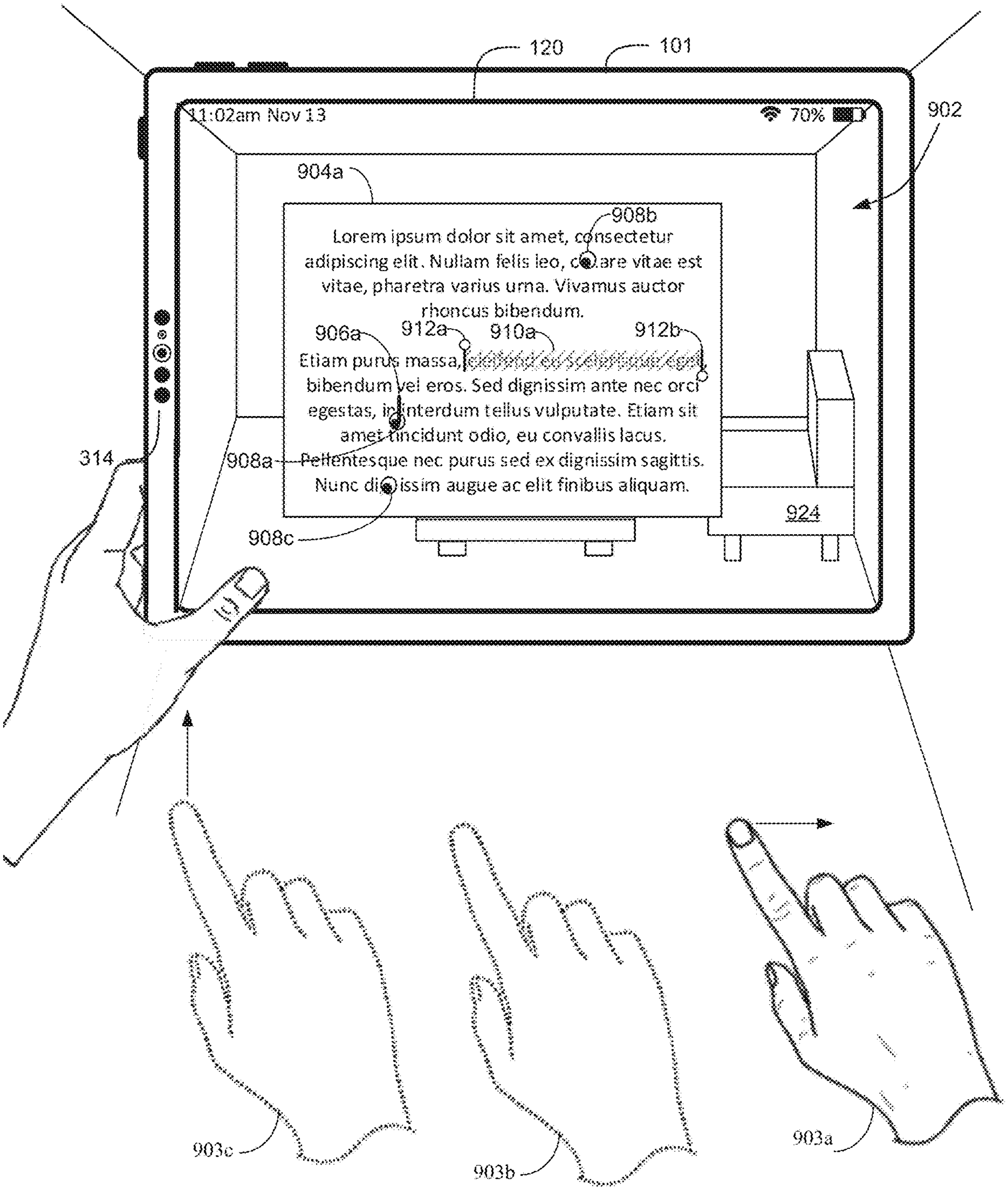
FIGS. 9A-9E illustrate examples of an electronic device facilitating cursor interactions in content in accordance with some embodiments.

FIG. 9A illustrates an electronic device 101 displaying, via a display generation component (e.g., display generation component 120 of FIG. 1), a three-dimensional environment 902 from a viewpoint of a user of the electronic device 101. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user (e.g., one or more hands of the user) while the user interacts with the electronic device 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 9A, device 101 captures one or more images of the physical environment around device 101 (e.g., operating environment 100), including one or more objects in the physical environment around device 101. In some embodiments, device 101 displays representations of the physical environment in three-dimensional environment 902. For example, three-dimensional environment 902 includes a representation 924 of a sofa, which is optionally a representation of a physical sofa in the physical environment; three-dimensional environment 902 also includes a representation of a table (e.g., partially occluded by object 904*a*), which is optionally a representation of a physical table in the physical environment. Three-dimensional environment 902 also includes representations of the physical floor, ceiling and back and side walls of the room in which device 101 is located.

In FIG. 9A, three-dimensional environment 902 also includes a virtual object 904*a*. Virtual object 904*a* is optionally one or more of a user interface of an application (e.g., messaging user interface, content browsing user interface, etc.), a three-dimensional object (e.g., virtual clock, virtual ball, virtual car, etc.), a representation of content (e.g., representation of photographs, videos, movies, music, etc.) or any other element displayed by device 101 that is not included in the physical environment of device 101. In FIG. 9A, virtual object 904*a* is a two-dimensional object, but the examples described herein could apply analogously to three-dimensional objects.

Object 904*a* in FIG. 9A includes text content (e.g., "Lorem ipsum dolor . . . "), and the text content includes cursor 906*a* at a location within the content (e.g., at the start of the word "interdum"). Cursor 906*a* is optionally an object selection and/or interaction cursor that interacts with a displayed object or selectable option in response to a selection input detected while the cursor is coincident with the object or selectable option. In some embodiments, the cursor 906*a* is a text selection cursor that controls selection of text or other content in response to selection inputs detected by the device 101. In some embodiments, the cursor 906*a* is a text insertion cursor that defines a location within the content at which text or content input will cause text or content to be inserted. Device 101 optionally facilitates different operations with respect to the content in object 904*a* in response to inputs directed to object 904*a* depending on whether the gaze of the user is directed to cursor 906*a* when the inputs are detected, as will be described below. It should be understood that while multiple hands of the user, multiple gaze locations of the user and corresponding inputs are illustrated in FIGS. 9A-9E, such hands, gaze locations and inputs need not be detected by device 101 concurrently; rather, in some embodiments, device 101 independently responds to the hands, gaze locations and/or inputs illustrated and described in response to detecting such hands, gaze locations and/or inputs independently.

Figure 9B:
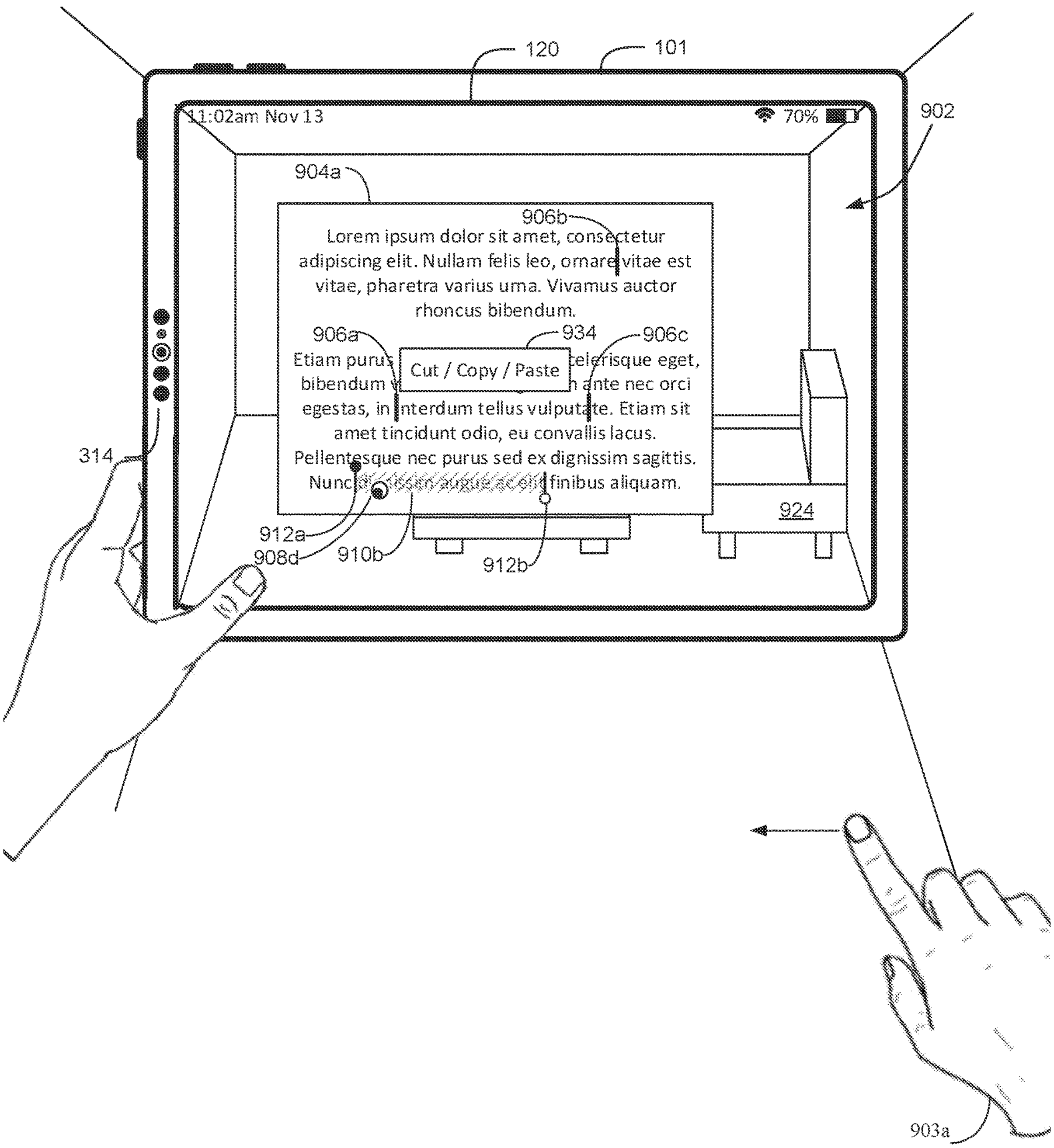
Figure 9C:
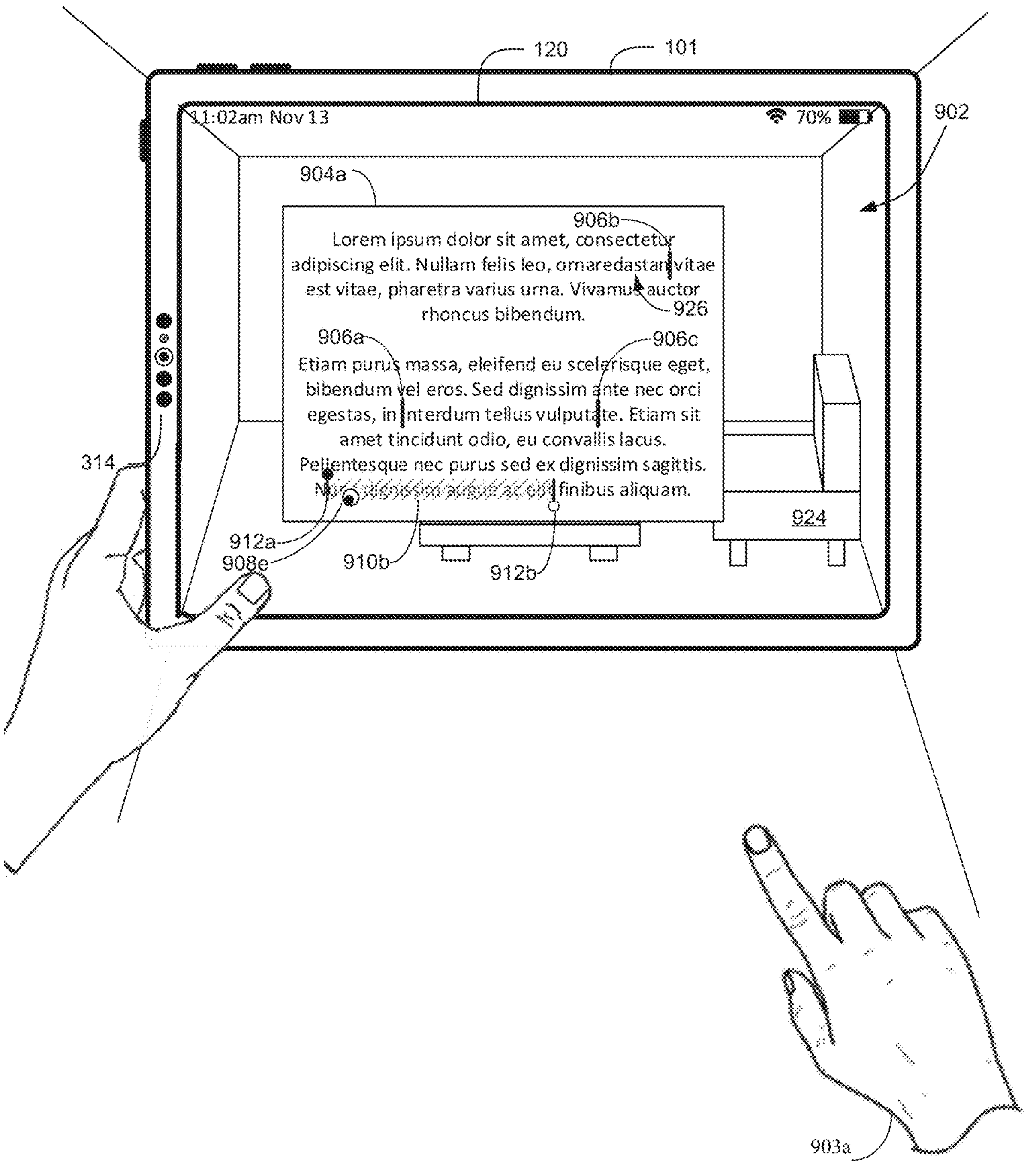
Figure 9D:
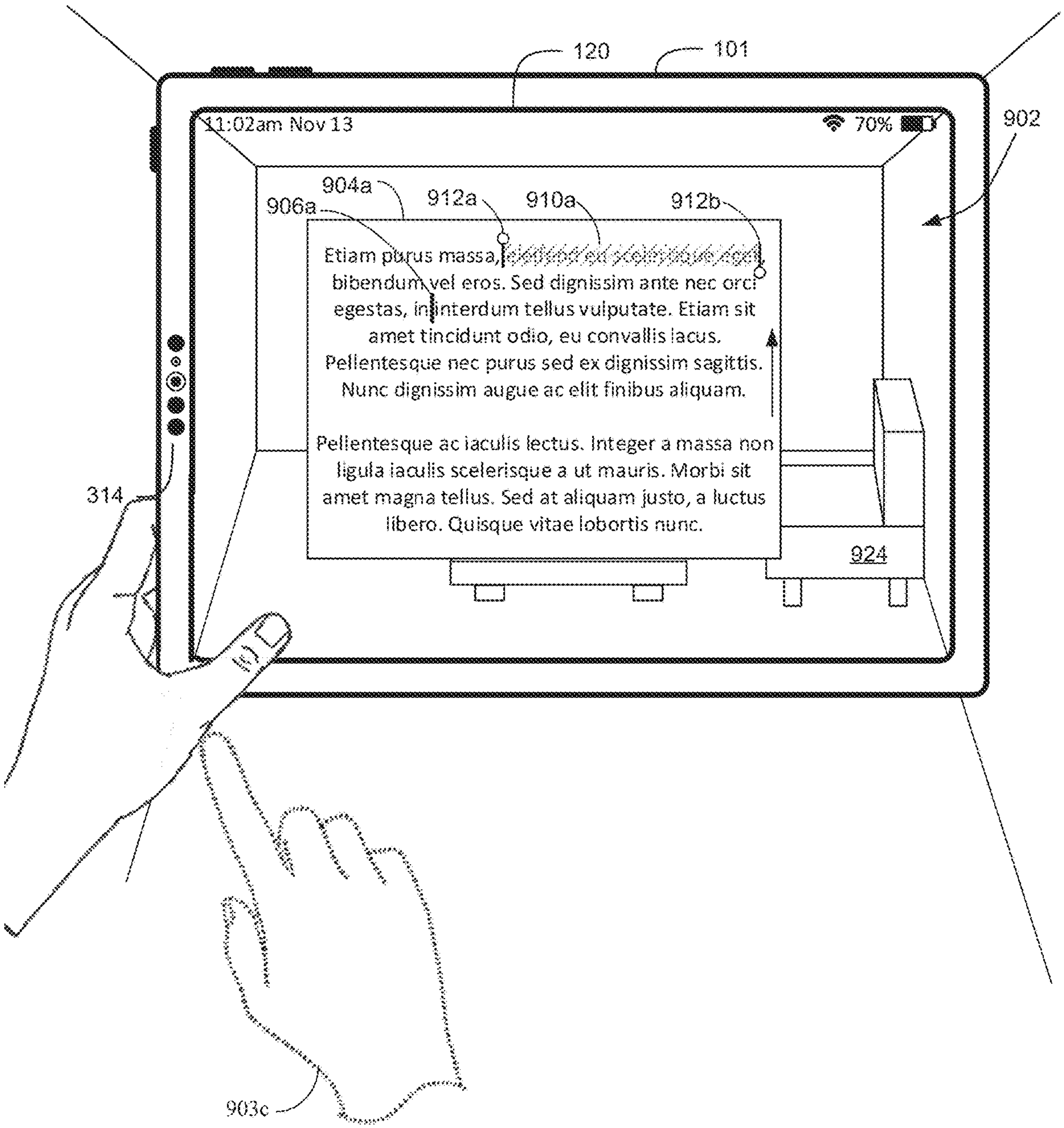

For example, in FIG. 9A, device 101 detects a gaze of the user directed to object 904*a* (e.g., gaze 908*a*, 908*b* or 908*c*) when hand 903*c* performs a pinch gesture in which the thumb and the tip of the index finger of hand 903*c* come together and touch while hand 903*c* is further than a threshold distance (e.g., 1, 2, 5, 10, 20, 50, 100, 500, or 1000 cm) away from object 904*a* and/or the content included in object 904*a*. If hand 903*c* subsequently moves vertically while maintaining the pinch hand shape (e.g., with the thumb and tip of the index finger of hand 903*c* remaining touching each other) within a time threshold (e.g., 0.1, 0.3, 0.5, 1, 2, 3, 5 or 10 seconds) of detection of the pinch gesture, device 101 optionally scrolls the content within object 904*a* vertically in accordance with the movement of hand 903*c*. For example, hand 903*c* in FIG. 9A has provided such an upward input, and in response, device 101 scrolls the content within object 904*a* upward, as shown in FIG. 9D. In some embodiments, if a portion of the content was highlighted/selected when the input from hand 903*c* was received (e.g., indicated by highlighting 910*a* in FIG. 9A), that portion of the content remains highlighted/selected during and/or in response to the scrolling input from hand 903*c* (e.g., as indicated by highlighting 910*a* in FIG. 9D). Cursor 906*a* also optionally remains at its location in the content in response to such a scrolling input from hand 903*c*, as also shown in FIG. 9D.

Other inputs and resulting operations are also possible. For example, a long pinch gesture (e.g., one in which the thumb and the tip of the index finger of the user come together and contact each other, and remain in contact for longer than a time threshold such as 0.1, 0.2, 0.3, 0.5, 1, 1.5, 2, 3, or 5 seconds) optionally results in different operations depending on whether the gaze of the user was directed to the cursor 906*a* when the long pinch gesture was detected. For example, in FIG. 9A, hand 903*a* is performing the long pinch gesture while hand 903*a* is further than the threshold distance away from object 904*a* and/or the content included in object 904*a* and/or cursor 906*a*. In the circumstance in which gaze 908*a* of the user is directed to cursor 906*a* when the long pinch gesture is detected, device 101 optionally performs a cursor movement operation in accordance with the long pinch gesture. For example, with hand 903*a* performing the long pinch gesture while gaze 908*a* is directed to cursor 906*a*, followed by movement of hand 903*a* to the right while maintaining the pinch hand shape, device 101 moves cursor 906*a* within the content in accordance with the movement of hand 903*a*. Subsequent detection of an unpinching gesture by hand 903*a* (e.g., with the thumb and the tip of the index finger of hand 903*a* moving apart from one another) optionally causes device 101 to place cursor 906*a* at its new location in the content based on the movement of hand 903*a*. For example, in FIG. 9B, the rightward movement of hand 903*a* in FIG. 9A described above has moved the cursor rightward in the content in accordance with the movement of the hand to a new location indicated by cursor 906*c*. Cursor 906*c* has been placed within a word (e.g., "vulputate") in the content, because the movement of hand 903*a* corresponded to movement of the cursor to within that word (e.g., between the letters "a" and "t" in that word). In some embodiments, if a portion of the content was highlighted/selected when the input from hand 903*a* was received (e.g., indicated by highlighting 910*a* in FIG. 9A), that portion of the content becomes unhighlighted/unselected in response to the input from hand 903*a* (e.g., as indicated by highlighting 910*a* no longer being shown in FIG. 9B). Thus, in some embodiments, device 101 moves the cursor freely within the content in accordance with the movement of hand 903*a* when the cursor movement input results from a long pinch gesture detected while the gaze of the user is directed to the cursor. It should be understood that while FIGS. 9B-9C display multiple cursors, those cursors optionally correspond to alternative resulting positions of cursor 906*a* in FIG. 9A in response to the various inputs described herein.

Returning to FIG. 9A, if the long pinch gesture by hand 903*a* had instead been detected while gaze 908*c* was not directed to cursor 906*a*, but rather was directed to another portion of the content (e.g., to the word "dignissim"), instead of performing a cursor movement operation, device 101 optionally performs a content selection operation in accordance with the movement of hand 903*a* while remaining in the pinch hand shape. For example, in response to such an input from hand 903*a*, device 101 has highlighted/selected content starting from the word to which gaze 908*c* was directed when the long pinch gesture was detected, and expanding from there in accordance with the movement of hand 903*a*, as shown in FIG. 9B. In FIG. 9B, a new portion of the content has been highlighted/selected, indicated by highlighting 910*b*. This portion of highlighted content includes the word "dignissim", and extends to the right (e.g., corresponding to the rightward movement of hand 903*a*) through the word "elit". In some embodiments, the entire word to which gaze 908*c* was directed when the long pinch was detected is included in the selection, independent of a particular location of gaze 908*c* within that word, as shown in FIGS. 9A-9B. In contrast, the location of the end of the highlighting 910*b* is optionally controllable by hand 903*a* on a character-by-character basis based on the movement of hand 903*a* (e.g., similar to the cursor movement operation described above). Cursor 906*a* optionally remains at its location throughout the content selection operation. Further, if a portion of the content was highlighted/selected when the input from hand 903*a* was received (e.g., indicated by highlighting 910*a* in FIG. 9A), that portion of the content optionally becomes unhighlighted/unselected in response to the input from hand 903*a* (e.g., as indicated by highlighting 910*a* no longer being shown in FIG. 9B).

Returning to FIG. 9A, a short pinch gesture (e.g., one in which the thumb and the tip of the index finger of the user come together and contact each other, and remain in contact for less than a time threshold such as 0.1, 0.2, 0.3, 0.5, 1, 1.5, 2, 3, or 5 seconds) optionally results in different operations depending on whether the gaze of the user was directed to the cursor 906*a* when the short pinch gesture was detected. For example, in FIG. 9A, hand 903*b* is performing the short pinch gesture while hand 903*b* is further than the threshold distance away from object 904*a* and/or the content included in object 904*a* and/or cursor 906*a*. In the circumstance in which gaze 908*a* of the user is directed to cursor 906*a* when the short pinch gesture is detected, device 101 optionally displays a content modification menu 934 at the location of cursor 906*a* (e.g., which has optionally not changed in response to the short pinch gesture by hand 903*b*), such as shown in FIG. 9B. The content modification menu 934 optionally includes one or more selectable options for modifying the content (e.g., word, sentence, paragraph, etc.) in which cursor 906*a* is located—for example, the content modification menu 934 optionally includes one or more of an option to cut the content in which cursor 906*a* is located (e.g., for subsequent pasting of the content at a future location of cursor 906*a*), an option to copy the content in which cursor 906*a* is located (e.g., for subsequent pasting of the content at a future location of cursor 906*a*), and an option to paste previously copied content at the location at which cursor 906*a* is located. Additionally or alternatively, in some embodiments, the content modification menu 934 includes one or more selectable options for performing one or more operations involving the text of the content. For example, the content modification menu 934 optionally includes one or more of an option to define (e.g., display a definition of) a particular word or phrase in the content (e.g., the highlighted word or phrase, the word or phrase within which the cursor is placed, and/or the word or phrase to which the gaze of the user is directed), and an option to translate (e.g., display a translation of) a particular word, phrase, sentence, or paragraph in the content (e.g., the highlighted word, phrase, sentence, or paragraph, the word, phrase, sentence, or paragraph within which the cursor is placed, and/or the word, phrase, sentence, or paragraph to which the gaze of the user is directed).

Returning to FIG. 9A, if the short pinch gesture by hand 903*b* had instead been detected while gaze 908*b* was not directed to cursor 906*a*, but rather was directed to another portion of the content (e.g., to the word "ornare"), instead of performing a content modification operation, device 101 optionally performs a cursor movement operation that is not based on the movement of hand 903*b*. For example, in response to such an input from hand 903*b* in FIG. 9A, device 101 has moved the cursor to the end of the word "ornare" in FIG. 9B, indicated by cursor 906*b*. Cursor 906*b* is optionally placed at the end of the word "ornare" independent of the exact location within the word to which gaze 908*b* was directed when the short pinch gesture was detected in FIG. 9A. In some embodiments, the cursor movement operation is based on whether the word to which the gaze of the user is directed is editable. For example, in FIG. 9B, the word "ornare" is optionally a text-editable word, which causes electronic device 101 to move the cursor to the end of the word "ornare". If the word "ornare" were alternatively a read-only word (e.g., a word that currently cannot be edited), the electronic device 101 optionally would have moved the cursor to the beginning of the word "ornare". Further, if a portion of the content was highlighted/selected when the input from hand 903*b* was received (e.g., indicated by highlighting 910*a* in FIG. 9A), that portion of the content optionally becomes unhighlighted/unselected in response to the input from hand 903*b* (e.g., as indicated by highlighting 910*a* no longer being shown in FIG. 9B).

Content that has been selected/highlighted is optionally displayed with highlighting 910 by device 101. For example, in FIG. 9A, highlighting 910*a* indicates the content that is selected/highlighted, and in FIG. 9B, highlighting 910*b* indicates the content that is selected/highlighted. The highlighting 910 is optionally displayed with indications of the beginning and the end of the highlighting. For example, in FIG. 9B, highlighting 910*b* is displayed with indication 912*a* at the location of the beginning of the highlighting 910*b*, and indication 912*b* at the location of the end of the highlighting 910*b*. Indications 912*a* and 912*b* optionally have two different visual appearances: one appearance when the indication is not targeted by gaze 908*d* of the user, and a different appearance when the indication is targeted by gaze 908*d* of the user. For example, when targeted, the circular portion of the indication 912 becomes filled, and when not targeted, the circular portion of the indication 912 becomes unfilled. Other modifications (e.g., color, size, transparency, etc.) are also contemplated, such as any visual change that emphasizes the targeted indication 912 (e.g., relative to the content, relative to the other indication, relative to object 904*a* and/or relative to three-dimensional environment 902).

Changing (e.g., expanding, contracting) the selection of content is optionally performed when device 101 detects a hand of the user perform a pinch gesture while an indication 912 is targeted by the gaze 908*d* of the user, followed by detecting movement of the hand of the user while maintaining the pinch hand shape. For example, in FIG. 9B, indication 912*a* at the beginning of highlighting 910*b* is targeted by gaze 908*d*. Gaze 908*d* optionally targets indication 912*a* when gaze 908*d* is directed to indication 912*a*, or when gaze 908*d* is directed to the first (e.g., quarter, third, or half) portion of highlighting 910*b*, and gaze 908*d* optionally targets indication 912*b* when gaze 908*d* is directed to indication 912*b*, or when gaze 908*d* is directed to the last (e.g., quarter, third, or half) portion of highlighting 910*b*. In FIG. 9B, while indication 912*a* is targeted by gaze 908*d*, hand 903*a* performs a pinch gesture while hand 903*a* is further than the threshold distance away from object 904*a* and/or the content included in object 904*a* and/or highlighting 910*b*, followed by leftward movement of hand 903*a* while maintaining the pinch hand shape. In response, as shown in FIG. 9C, device 101 expands highlighting 910*b* leftward in accordance with the movement of hand 903*a*. The updated location of the beginning of highlighting 910*b*, indicated by indication 912*a*, is optionally controllable by hand 903*a* on a character-by-character basis based on the movement of hand 903*a* (e.g., similar to the cursor movement operation described above). The expansion or contraction of highlighting 910*b* as described optionally does not change the location of the cursor in the content (e.g., whether the cursor is cursor 906*a*, 906*b* or 906*c*), as shown in FIG. 9C.

As previously described, in some embodiments, the cursor (e.g., cursor 906*a*, 906*b* and/or 906*c*) is a content (e.g., text) insertion cursor at which content will be inserted if a content (e.g., text) input is received by device 101. For example, in FIG. 9B, while cursor 906*b* is located at the end of the word "ornare", device 101 receives a text input for inserting content "dastan" into object 904*a*. In response, as shown in FIG. 9C, device 101 has inserted the content "dastan" 926 at the end of the word "ornare", and has updated the location of cursor 906*b* to be at the end of the newly added content "dastan" 926.

In some embodiments, electronic device 101 changes an appearance of the cursor in response to detecting the gaze of the user directed to the cursor. For example, in FIG. 9E, the gaze 908*e* is directed to (e.g., at least a portion of or within a threshold distance (e.g., 0.1, 0.2, 0.5, 1, 1.5, 2, or 3 cm) of) the cursor 906*a* in object 904*a* in three-dimensional environment 902. In response to detecting the gaze 908*e* directed to the cursor 906*a*, electronic device 101 optionally changes the appearance of cursor 906*a* from FIG. 9D to FIG. 9E. For example, in FIG. 9E, the cursor 906*a* is displayed at a different size (e.g., a larger size) in three-dimensional environment 902 compared with the size of the cursor 906*a* in FIG. 9D. Additionally or alternatively, in some embodiments, in response to detecting the gaze 908*e* directed to the cursor 906*a*, electronic device 101 changes a color of the cursor 906*a*. For example, the electronic device 101 changes the color of the cursor 906*a* from black to blue in three-dimensional environment 902. In some embodiments, in response to detecting the gaze 908*e* directed to the cursor 906*a*, electronic device 101 changes an animation of the cursor 906*a* in three-dimensional environment 902. For example, prior to detecting the gaze 908*e* directed to the cursor 906*a*, the electronic device 101 optionally animates the cursor 906*a* in object 904*a*. For example, the electronic device 101 causes the cursor 906*a* to periodically blink in object 904*a*. In response to detecting the gaze 908*e* directed to the cursor 906*a*, the electronic device 101 optionally causes the cursor 906*a* to cease blinking in object 904*a*.

FIGS. 10A-10G is a flowchart illustrating a method 1000 of facilitating cursor interactions in content in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, method 1000 is performed at an electronic device (e.g., 101) in communication with a display generation component (e.g., 120) and one or more input devices (e.g., 314). For example, a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, while displaying, via the display generation component, a three-dimensional environment that includes content (e.g., text content displayed within a text entry and/or editing user interface in the three-dimensional environment. In some embodiments, the content includes non-text content, such as images, videos, etc. displayed in the three-dimensional environment), wherein the content includes a cursor (e.g., an object selection and/or interaction cursor that interacts with a displayed object or selectable option in response to a selection input detected while the cursor is coincident with the object or selectable option. In some embodiments, the cursor is a text insertion cursor that controls selection of text or other content in response to selection inputs detected by the device. In some embodiments, the cursor is a text insertion cursor that defines a location within the content at which text or content input will cause text or content to be inserted. In some embodiments, the cursor is a cursor displayed in a region of the three-dimensional environment that includes the content, such as described with reference to method 800. In some embodiments, the content and cursor are displayed in a three-dimensional environment that is generated, displayed, or otherwise caused to be viewable by the device (e.g., a computer-generated reality (CGR) environment such as a virtual reality (VR) environment, a mixed reality (MR) environment, or an augmented reality (AR) environment, etc.), the electronic device detects (1002*a*), via the one or more input devices, a first input of a first type provided by a predefined portion of a user (e.g., hand) of the electronic device, such as an input from hand 903*a*, 903*b* or 903*c* in FIG. 9A (e.g., a pinch gesture performed by a hand of the user of the electronic device—such as the thumb and index finger of the hand of the user starting more than a threshold distance (e.g., 0.1, 0.2, 0.5, 1, 2, or 5 cm) apart and coming together at the tips—that is detected by a hand tracking device in communication with the electronic device. In some embodiments, the pinch gesture is of a first type when a duration of the pinch (e.g., the duration of the hand holding the pinch hand shape in which the thumb tip is touching the finger tip) satisfies one or more criteria (e.g., is longer than a time threshold (e.g., 0.1, 0.2, 0.3, 0.5, 1, 1.5, 2, 3, or 5 seconds)), after which the pinch is released (e.g., the thumb tip and index finger tip move more than a threshold distance (e.g., 0.1, 0.2, 0.5, 1, 2, or 5 cm) apart from one another). In some embodiments, the pinch gesture is of a second type if the duration of the pinch does not satisfy the one or more criteria. In some embodiments, the pinch gesture is of the first type when another characteristic of the pinch gesture (e.g., hand movement, pinch speed, pinch number (e.g., double, triple, etc. pinch), etc.) satisfies one or more criteria, and is of a second type when the other characteristic of the pinch gesture does not satisfy the one or more criteria) while the predefined portion of the user is further than a threshold distance (e.g., 1, 2, 5, 10, 20, 50, 100, 500, or 1000 cm) away from a location corresponding to a location of the content in the three-dimensional environment (e.g., the hand of the user is far away from the content and/or the cursor in the three-dimensional environment). While the hand of the user is far away from the content and/or the cursor in the three-dimensional environment, the hand of the user optionally provides input to the content and/or the cursor without touching or coming within a threshold distance (e.g., 0.1, 0.2, 0.5, 1, 2, or 5 cm) of the content and/or cursor (e.g., corresponding to an "indirect input"). In some embodiments, if the hand of the user is close to (e.g., within 1, 2, 5, 10, 20, 50, 100, 500, or 1000 cm of) the content and/or the cursor, the hand of the user provides input to the content and/or cursor by touching or coming within the threshold distance (e.g., 0.1, 0.2, 0.5, 1, 2, or 5 cm) of the content and/or the cursor (e.g., corresponding to a "direct input"). In some embodiments, the first input and/or one or more inputs described with reference to method 1000 are air gesture inputs, such as described with reference to method 800.

In some embodiments, in response to detecting the first input of the first type provided by the predefined portion of the user (1002*b*), in accordance with a determination that a gaze of the user was directed toward the cursor when the first input was detected, such as gaze 908*a* in FIG. 9A (e.g., the device detects, via an eye tracking device, that the gaze of the user is directed to the cursor, or is directed to within a threshold distance such as 0.1, 0.2, 0.5, 1, 2, or 5 cm of the cursor when the first input is detected), the electronic device performs (1002*c*) a first operation of a first type in accordance with the first input, such as moving cursor 906*a* in accordance with hand 903*a* from FIGS. 9A-9B (e.g., performing a cursor movement operation in which the cursor is lifted and/or separated away from the content, and movement of the hand while maintaining the pinch hand shape causes the cursor to be moved to a different location within the content in accordance with the movement of the hand. In some embodiments, in response to detecting release of the pinch hand shape, the cursor is moved back down into the content at its new location within the content. In some embodiments, the second operation of the second type, as described below, is not performed).

In some embodiments, in accordance with a determination that the gaze of the user was not directed toward the cursor when the first input was detected, such as gaze 908*c* in FIG. 9A (e.g., the device detects, via an eye tracking device, that the gaze of the user is not directed to the cursor, or is not directed to within the threshold distance such as 0.1, 0.2, 0.5, 1, 2, or 5 cm of the cursor when the first input is detected. In some embodiments, the device detects that the gaze of the user is directed to the content, such as directed to a word or a letter (e.g., within a word) within text), the electronic device performs (1002*d*) a second operation of a second type, different from the first type, in accordance with the first input, such as selecting text in accordance with hand 903*a* from FIGS. 9A-9B (e.g., and not performing the first operation of the first type). In some embodiments, the second type of operation is a content or text selection operation, rather than a cursor movement operation (e.g., the first type of operation). In some embodiments, the amount of content or text selected is based on an amount of movement of the hand of the user included in the first input (e.g., while holding the pinch hand shape). In some embodiments, the amount of content or text selected is not based on an amount of movement of the hand of the user in the first input (e.g., while holding the pinch hand shape). Selecting an operation of a first type or a second type based on gaze allows a user to quickly and efficiently select an operation to be performed in response to an input of a given type, thereby making the user-device interaction more efficient.

In some embodiments, the content includes text content (1004*a*), such as in FIG. 9A (e.g., the content is or includes font-based text and/or handwritten text; in some embodiments, the content also includes non-text content, but the cursor is displayed within the text content portion of the content). In some embodiments, the cursor is a text cursor displayed within the text content (1004*b*), such as in FIG. 9A. For example, the cursor is an I-beam type of cursor that controls the location in the content at which text that is inputted via a physical or virtual keyboard, for example, will be entered. For example, text input (if detected) will optionally be entered into the content at the location of the text cursor.

In some embodiments, the first input of the first type includes a pinch hand shape held by a hand of the user of the electronic device for longer than a time threshold (1004*c*), such as described with reference to hand 903*a* in FIG. 9A (e.g., 0.1, 0.2, 0.3, 0.5, 1, 1.5, 2, 3, or 5 seconds), For example, the pinch hand shape corresponds to the tip of the index finger and the tip of the thumb of the hand of the user being brought together (or within a threshold distance of one another, such as 0.1, 0.2, 0.5, 1, 2, or 5 cm). The input is optionally of the first type when the pinch hand shape is held for longer than the time threshold. The input is optionally not of the first type (e.g., is of a second type) when the pinch hand shape is released (e.g., the tip of the index finger and the tip of the thumb move away from one another (e.g., more than a threshold distance, such as 0.1, 0.2, 0.5, 1, 2, or 5 cm) before the time threshold since the pinch hand shape was detected.

In some embodiments, the first operation of the first type includes initiating a cursor movement mode in which the text cursor is moved within the text content in accordance with (e.g., subsequent) movement of the hand of the user (1004*d*), such as initiating a mode to move cursor 906*a* in FIG. 9A (e.g., without selecting/highlighting a portion of the text content). For example, a pinch and hold input detected while the gaze of the user is directed to the text cursor causes the text cursor to be lifted up off from the plane(s) that contains the text content (e.g., to separate from the text content by 0.1, 0.2, 0.5, 1, 2, 5, or 10 cm). Subsequent movement of the hand while holding the pinch hand shape optionally causes the device to move the text cursor within the content and/or the text content in accordance with the movement of the hand. In response to detecting release of the pinch hand shape, the electronic device optionally places the text cursor into the text content at its current location (e.g., reducing the separation of the text cursor from the plane(s) that contain the text content, such as to zero cm to the distance at which the text cursor was separated from the text content before the pinch and hold input was detected).

In some embodiments, the second operation of the second type includes initiating a text selection mode in which at least a portion of the text content is selected in accordance with (e.g., subsequent) movement of the hand of the user (1004*e*), such as initiating a mode to select text in FIG. 9A (e.g., without moving the text cursor within the text content). For example, a pinch and hold input detected while the gaze of the user is not directed to the text cursor causes the electronic device to enter a content and/or text selection/highlighting mode. Subsequent movement of the hand while holding the pinch hand shape optionally causes the device to select content and/or text content in accordance with the movement of the hand. In some embodiments, the content being selected starts with the content (e.g., word) towards which the gaze of the user was directed when the pinch and hold input was detected, and expands from there in the direction(s) of the subsequent movement of the hand while maintaining the pinch hand shape. In response to detecting release of the pinch hand shape, the electronic device optionally exits the content selection mode, and the content/text that is currently selected/highlighted remains selected/highlighted for further interaction (e.g., further expansion/contraction of the portion of the content that is selected, copy operations directed to the selected portion of the content, paste operations directed to the selected portion of the content, cut operations directed to the selected portion of the content, etc.). Initiating cursor movement or content selection modes based on gaze location allows a user to efficiently interact with the cursor or content in the user interface without the need for additional inputs, thereby providing efficient user-device interaction.

In some embodiments, after detecting the first input of the first type (e.g., once the electronic device has entered the cursor movement mode or the content selection mode in response to the pinch and hold input from the hand of the user), the electronic device detects (1006*a*), via the one or more input devices, a second input that includes movement of the predefined portion of the user (e.g., movement of the hand of the user while maintaining the pinch hand shape).

In some embodiments, in response to detecting the second input, the electronic device performs (1006*b*) a respective operation, different from the first operation and the second operation, in accordance with the movement of the predefined portion of the user, such as moving cursor 906*a* in FIG. 9B or selecting the portion of text indicated by highlighting 910*b* in FIG. 9B. For example, moving the cursor within the content in accordance with the hand movement while maintaining the pinch hand shape (which is optionally different from the operation of lifting the cursor away from the content, which is what optionally occurs in response to detecting the first input of the first type), or selecting a portion of the content within the content in accordance with the hand movement while maintaining the pinch hand shape (which is optionally different from the operation of entering into a content selection mode before content has yet to be selected, which is what optionally occurs in response to detecting the first input of the first type). Initiating further (e.g., different) operations in response to hand movement subsequent to the first input allows for further types of operations to occur without the need to restart interactions with/inputs to the device, thereby providing efficient user-device interaction.

In some embodiments, in accordance with the determination that the gaze of the user was directed toward the cursor when the first input was detected, the respective operation is a third operation (1008*a*), such as moving cursor 906*a* in FIG. 9B. For example, a pinch and hold input detected while the gaze of the user is directed to the text cursor causes the text cursor to be lifted up off from the plane(s) that contains the text content (e.g., to separate from the text content by 0.1, 0.2, 0.5, 1, 2, 5, or 10 cm). Subsequent movement of the hand while holding the pinch hand shape optionally causes the device to move the text cursor within the content and/or the text content in accordance with the movement of the hand. In response to detecting release of the pinch hand shape, the electronic device optionally places the text cursor into the text content at its current location (e.g., reducing the separation of the text cursor from the plane(s) that contain the text content, such as to zero cm to the distance at which the text cursor was separated from the text content before the pinch and hold input was detected).

In some embodiments, in accordance with the determination that the gaze of the user was not directed toward the cursor when the first input was detected, the respective operation is a fourth operation, different from the third operation (1008*b*), such as selecting the portion of text indicated by highlighting 910*b* in FIG. 9B. For example, a pinch and hold input detected while the gaze of the user is not directed to the text cursor causes the electronic device to enter a content and/or text selection/highlighting mode. Subsequent movement of the hand while holding the pinch hand shape optionally causes the device to select content and/or text content in accordance with the movement of the hand. In some embodiments, the content being selected starts with the content (e.g., word) towards which the gaze of the user was directed when the pinch and hold input was detected, and expands from there in the direction(s) of the subsequent movement of the hand while maintaining the pinch hand shape. In response to detecting release of the pinch hand shape, the electronic device optionally exits the content selection mode, and the content/text that is currently selected/highlighted remains selected/highlighted for further interaction (e.g., further expansion/contraction of the portion of the content that is selected, copy operations directed to the selected portion of the content, paste operations directed to the selected portion of the content, cut operations directed to the selected portion of the content, etc.). Initiating different operations based on gaze location allows a user to efficiently interact with the cursor or content in the user interface without the need for additional inputs, thereby providing efficient user-device interaction.

In some embodiments, while displaying, via the display generation component, the three-dimensional environment that includes the content that includes the cursor, the electronic device detects (1010*a*), via the one or more input devices, a second input of a second type, different from the first type, provided by the predefined portion of the user while the predefined portion of the user is further than the threshold distance (e.g., 1, 2, 5, 10, 20, 50, 100, 500, or 1000 cm) away from the location corresponding to the location of the content in the three-dimensional environment, such as the input from hand 903*b* in FIG. 9A (e.g., the hand is providing indirect input to the content and/or the cursor). For example, the second input optionally includes a pinch gesture performed by a hand of the user of the electronic device— such as the thumb and index finger of the hand of the user starting more than a threshold distance (e.g., 0.1, 0.2, 0.5, 1, 2, or 5 cm) apart and coming together at the tips—that is detected by a hand tracking device in communication with the electronic device. In some embodiments, the pinch gesture is of the second type when a duration of the pinch (e.g., the duration of the hand holding the pinch hand shape in which the thumb tip is touching the finger tip) is shorter than a time threshold (e.g., 0.1, 0.2, 0.3, 0.5, 1, 1.5, 2, 3, or 5 seconds), after which the pinch is released (e.g., the thumb tip and index finger tip move more than a threshold distance (e.g., 0.1, 0.2, 0.5, 1, 2, or 5 cm) apart from one another.

In some embodiments, in response to detecting the second input of the second type provided by the predefined portion of the user (1010*b*), in accordance with a determination that the gaze of the user was directed toward the cursor when the second input was detected (e.g., the device detects, via an eye tracking device, that the gaze of the user is directed to the cursor, or is directed to within a threshold distance such as 0.1, 0.2, 0.5, 1, 2, or 5 cm of the cursor when the second input is detected), the electronic device performs (1010*c*) a third operation, different from the first and second operations, in accordance with the second input, such as displaying menu 924 in FIG. 9B (e.g., and not performing the first second or fourth operations, which is described below).

In some embodiments, in accordance with a determination that the gaze of the user was not directed toward the cursor when the second input was detected (e.g., the device detects, via an eye tracking device, that the gaze of the user is not directed to the cursor, or is not directed to within the threshold distance such as 0.1, 0.2, 0.5, 1, 2, or 5 cm of the cursor when the second input is detected. In some embodiments, the device detects that the gaze of the user is directed to the content, such as directed to a word or a letter (e.g., within a word) within text), the electronic device performs (1010*d*) a fourth operation, different from the first, second and third operations, in accordance with the second input, such as moving cursor 906*a* as indicated by cursor 906*b* in FIG. 9B (e.g., and not performing the first second or third operations). Selecting between different operations based on gaze and/or input type (e.g., first type or second type) allows a user to quickly and efficiently select an operation to be performed in response to an input of a given type, thereby making the user-device interaction more efficient.

In some embodiments, the second input of the second type includes a pinch gesture performed by a hand of the user of the electronic device (e.g., the thumb and index finger of the hand of the user starting more than a threshold distance (e.g., 0.1, 0.2, 0.5, 1, 2, or 5 cm) apart and coming together at the tips) followed by release of the pinch gesture within a time threshold (e.g., 0.1, 0.2, 0.3, 0.5, 1, 1.5, 2, 3, or 5 seconds) of the pinch gesture (1012*a*), such as described with reference to hand 903*b* in FIG. 9A.

In some embodiments, the third operation includes displaying one or more content modification options corresponding to a portion of the content in which the cursor is located (1012*b*), such as within menu 934 in FIG. 9B (e.g., without performing the fourth operation, described below). For example, displaying cut, copy and/or paste options that are selectable to perform those operations on the portion (e.g., word, sentence, paragraph) of the (e.g., text) content in which the cursor is located. In some embodiments, the portion of the content in which the cursor is located is already selected/highlighted when the second input is detected. In some embodiments, the portion of the content in which the cursor is located becomes selected/highlighted when the second input is detected.

In some embodiments, the fourth operation includes moving the cursor to a respective location in the content based on a location to which the gaze of the user was directed when the second input was detected (1012*c*), such as shown with cursor 906*b* in FIG. 9B (e.g., without performing the third operation, described above). For example, without providing hand movement input to the device to move the cursor, the cursor is moved (e.g., jumps) to the location in the content (e.g., text content) to which the gaze of the user is directed when the second input is detected. Selecting between moving the cursor and displaying content modification options based on gaze and/or input type (e.g., first type or second type) allows a user to quickly and efficiently perform those different types of operations, thereby making the user-device interaction more efficient.

In some embodiments, the fourth operation includes (1014*a*), in accordance with a determination that a portion of the content was selected when the second input was detected (e.g., some of the content (e.g., text content) in which the cursor is located was already selected/highlighted when the second input was detected), deselecting the portion of the content (1014*b*), such as highlighting 910*a* in FIG. 9A no longer being included in FIG. 9B (e.g., that portion of the content that was selected/highlighted when the second input was detected is no longer selected/highlighted). For example, if the second input corresponds to an input to move the cursor to a new location in the content, the previously-selected/highlighted content becomes unselected/unhighlighted in addition to the device moving the cursor in accordance with the second input. If no content was selected/highlighted when the second input was detected, the third or fourth operations are optionally performed without unselecting/unhighlighting any content. Unselecting selected content in conjunction with performing the third and/or fourth operations provides an efficient way of unselecting content, thereby making the user-device interaction more efficient.

In some embodiments, the fourth operation includes (1016*a*), in accordance with a determination that the location to which the gaze of the user was directed when the second input was detected is within a first word in the content, moving the cursor to an end of the first word (1016*b*), such as shown with cursor 906*b* in FIG. 9B.

In some embodiments, the fourth operation includes in accordance with a determination that the location to which the gaze of the user was directed when the second input was detected is within a second word, different from the first word, in the content, moving the cursor to an end of the second word (1016*c*), such as if gaze 908*b* were directed to a different word in the content in FIG. 9A. For example, when the second input corresponds to an input to move the cursor to a new location in the content based on gaze (e.g., not based on hand movement), the device optionally inserts the cursor into a predetermined relative position of the portion of the content (e.g., word, sentence, paragraph, etc.) to which the gaze of the user was directed when the second input was detected (e.g., irrespective of the exact location within that portion of the content to which the gaze was directed). In some embodiments, the predetermined relative position is immediately after the last letter of a word to which the gaze of the user was directed. In some embodiments, the predetermined relative position is immediately before the first letter of the word to which the gaze of the user was directed. In some embodiments, the predetermined relative position is a different position in the portion of the content to which the gaze of the user was directed. In some embodiments, the electronic device does not insert the cursor in such a predetermined relative position when the cursor is being moved based on hand movement (e.g., such as in response to the first input of the first type)—in such embodiments, the electronic device optionally inserts the cursor into the content at the location in the content to which the movement of the hand corresponds. Thus, if the movement of the hand corresponds to (e.g., moves the cursor to) different parts of a given word in the content, upon detecting release of the movement input, the electronic device inserts the cursor into those corresponding different parts of the word. Inserting the cursor into a predetermined relative position of the portion of the content provides consistent and predictable response to gaze-based inputs, which can be unsteady, thereby making the user-device interaction more efficient.

In some embodiments, the second operation of the second type includes selecting a portion of the content (e.g., selecting/highlighting a letter, a collection of letters, a word, a collection of words, a sentence, etc. in the content), and the selected portion of the content is displayed with a first selection indicator at a beginning of the selected portion of the content (e.g., a visual "handle" displayed at the leading edge of the highlighting/selection indicator. This leading edge handle is optionally manipulable (e.g., selectable and subsequently movable) to expand/contract the amount of the content that is selected/highlighted starting from the leading edge of the highlighting/selection indicator) and a second selection indicator at an end of the selected portion of the content (1018*a*), such as indicators 912*a* and 912*b* in FIG. 9B (e.g., a visual "handle" displayed at the trailing edge of the highlighting/selection indicator. This trailing edge handle is optionally manipulable (e.g., selectable and subsequently movable) to expand/contract the amount of the content that is selected/highlighted starting from the trailing edge of the highlighting/selection indicator).

In some embodiments, while the selected portion of the content is selected and displayed with the first and second selection indicators, the electronic device detects (1018*b*), via the one or more input devices, a second input corresponding to a request to modify which portion of the content is selected using the first or second selection indicators (e.g., detection of the gaze of the user directed to one of the handles and/or to a portion of the selected/highlighted content, and a pinch (e.g., and hold) hand gesture performed by a hand of the user of the electronic device).

In some embodiments, in response to detecting the second input (1018*c*), in accordance with a determination that the second input includes the gaze of the user directed to a first portion of the selected portion of the content corresponding to the first selection indicator, such as gaze 908*d* in FIG. 9B directed to the first indicator 912*a* (e.g., the gaze of the user is directed to the leading edge handle or to a portion of the selected content that is within a threshold distance (e.g., 0.1, 0.2, 0.5, 1, 3, 5, 10, or 20 cm) of the leading edge handle. In some embodiments, the gaze of the user is directed to a portion of the selected portion of the content that corresponds to the leading edge handle when the gaze of the user is directed to a left half of the selected portion of the content, such as if a logical divide bisects the selected portion of the content through the horizontal center of the selected portion of the content into a left half and a right half), the electronic device modifies (1018*d*) which portion of the content is selected based on movement of the first selection indicator in accordance with the second input, such as shown in FIG. 9C (e.g., if the gaze of the user corresponds to selection of the leading edge handle, subsequent movement input (e.g., movement of the hand of the user while maintaining the pinch hand shape) optionally causes the leading edge of the selection/highlighting to change in accordance with the movement input).

In some embodiments, in accordance with a determination that the second input includes the gaze of the user directed to a second portion, different from the first portion, of the selected portion of the content corresponding to the second selection indicator, such as if gaze 908*d* had been directed to indicator 912*b* in FIG. 9B (e.g., the gaze of the user is directed to the trailing edge handle or to a portion of the selected content that is within a threshold distance (e.g., 0.1, 0.2, 0.5, 1, 3, 5, 10, or 20 cm) of the trailing edge handle.

In some embodiments, the gaze of the user is directed to a portion of the selected portion of the content that corresponds to the trailing edge handle when the gaze of the user is directed to a right half of the selected portion of the content, such as if a logical divide bisects the selected portion of the content through the horizontal center of the selected portion of the content into a left half and a right half), the electronic device modifies (1018*e*) which portion of the content is selected based on movement of the second selection indicator in accordance with the second input, such as movement of indicator 912*b* in FIG. 9B (e.g., if the gaze of the user corresponds to selection of the trailing edge handle, subsequent movement input (e.g., movement of the hand of the user while maintaining the pinch hand shape) optionally causes the trailing edge of the selection/highlighting to change in accordance with the movement input). Controlling selection expansion and contraction based on gaze allows a user to easily, without additional input, modify a selection, thereby making the user-device interaction more efficient.

In some embodiments, while the selected portion of the content is selected and displayed with the first and second selection indicators (e.g., before or during detection of the second input) (1020*a*), in accordance with a determination that the gaze of the user is directed to the first portion of the selected portion of the content corresponding to the first selection indicator, the electronic device changes (1020*b*) a visual appearance of the first selection indicator to indicate that further input will interact with the first selection indicator, such as shown with indicator 912*a* in FIG. 9B (e.g., and not the second selection indicator). For example, highlighting, changing the color of, changing the brightness of, changing a size of, or otherwise visually emphasizing the leading edge handle (e.g., which will move in response to movement input, if a selection and subsequent movement input, such as the second input, is detected) relative to the trailing edge handle (e.g., which will not move in response to movement input, if a selection and subsequent movement input, such as the second input, is detected).

In some embodiments, in accordance with a determination that the gaze of the user is directed to the second portion of the selected portion of the content corresponding to the second selection indicator, the electronic device changes (1020*c*) a visual appearance of the second selection indicator to indicate that further input will interact with the second selection indicator, such as if indicator 912*b* were displayed with a different visual appearance in response to gaze 908*d* being directed to it in FIG. 9B (e.g., and not the first selection indicator). For example, highlighting, changing the color of, changing the brightness of, changing a size of, or otherwise visually emphasizing the trailing edge handle (e.g., which will move in response to movement input, if a selection and subsequent movement input, such as the second input, is detected) relative to the leading edge handle (e.g., which will not move in response to movement input, if a selection and subsequent movement input, such as the second input, is detected). Visually indicating which handle will be activated in response to a selection input provides feedback to a user before potentially incorrect input is provided by the user and/or detected by the device, thereby making the user-device interaction more efficient.

In some embodiments, while displaying, via the display generation component, the three-dimensional environment that includes the content that includes the cursor, the electronic device detects (1022*a*), via the one or more input devices, a second input including a pinch gesture performed by a hand of the user and, within a time threshold (e.g., 0.1, 0.2, 0.3, 0.5, 1, 1.5, 2, 3, or 5 seconds) of the pinch gesture, movement of the hand while holding a pinch hand shape while the hand is further than the threshold distance (e.g., 1, 2, 5, 10, 20, 50, 100, 500, or 1000 cm) away from the location corresponding to the location of the content in the three-dimensional environment, such as described with reference to hand 903*c* in FIG. 9A (e.g., the hand is providing indirect input to the content and/or the cursor). For example, the second input includes a pinch gesture performed by a hand of the user of the electronic device—such as the thumb and index finger of the hand of the user starting more than a threshold distance (e.g., 0.1, 0.2, 0.5, 1, 2, or 5 cm) apart and coming together at the tips—that is detected by a hand tracking device in communication with the electronic device. In some embodiments, while holding the pinch hand shape and before the threshold time has elapsed since the pinch hand shape was created, the electronic device detects movement (e.g., more than a threshold distance, such as 0.1, 0.2, 0.5, 1, 2, 5, 10, 20, or 50 cm) of the hand while maintaining the pinch hand shape.

In some embodiments, in response to detecting the second input, the electronic device scrolls (1022*b*) through the content in accordance with the movement of the hand, such as shown in FIG. 9D (e.g., without moving the cursor and/or without selecting/highlighting content). For example, if the hand moves vertically, the content is optionally scrolled vertically in accordance with the movement of the hand, and if the hand moves horizontally, the content is optionally scrolled horizontally in accordance with the movement of the hand. In some embodiments, in response to detecting release of the pinch hand shape, the electronic device no longer scrolls the content in accordance with further movement of the hand that is not in the pinch hand shape. In some embodiments, the electronic device scrolls the content as described above irrespective of whether the gaze of the user was directed to the cursor or not directed to the cursor when the second input was detected. Allowing for hand movement-based scrolling (e.g., optionally in combination with the ability to provide hand movement-based cursor movement and/or text selection inputs) provides for consistent types of user interaction with the device (e.g., hand movement-based inputs), thereby making the user-device interaction more efficient and reducing errors in usage.

In some embodiments, the content includes text content (e.g., the content is or includes font-based text and/or handwritten text; in some embodiments, the content also includes non-text content, but the cursor is displayed within the text content portion of the content), and the cursor is a text insertion cursor within the text content (1024), such as shown and described with reference to FIGS. 9A-9C. For example, the cursor is an I-beam type of cursor that controls the location in the content at which text that is inputted via a physical or virtual keyboard, for example, will be entered. For example, text input (if detected) will optionally be entered into the content at the location of the text cursor. Providing the above-described gaze-based and/or hand movement-based control of a text insertion cursor within text content provides for efficient text content manipulation and/or editing, thereby making the user-device interaction more efficient.

In some embodiments, while displaying the text insertion cursor within the text content, the electronic device detects (1026*a*), via the one or more input devices, text insertion input corresponding to respective text. For example, detecting input from a physical keyboard in communication with the electronic device or a virtual keyboard displayed by the electronic device. The respective text is optionally the characters corresponding to the keys of the physical/virtual keyboard that were detected as being selected (e.g., "Hello world!").

In some embodiments, in response to detecting the text insertion input, the electronic device inserts (1026*b*) into the text content the respective text at a location of the text insertion cursor, such as shown in FIG. 9C. The detected text insertion input (e.g., corresponding to "Hello world!") is inserted into the text content at the location of the text insertion cursor. Thus, in some embodiments, the various above-described interactions with the cursor are interactions with a text insertion cursor within text content. Providing the above-described gaze-based and/or hand movement-based control of a text insertion cursor within text content provides for efficient control for entering text into the text content, thereby making the user-device interaction more efficient.

Figure 9E:
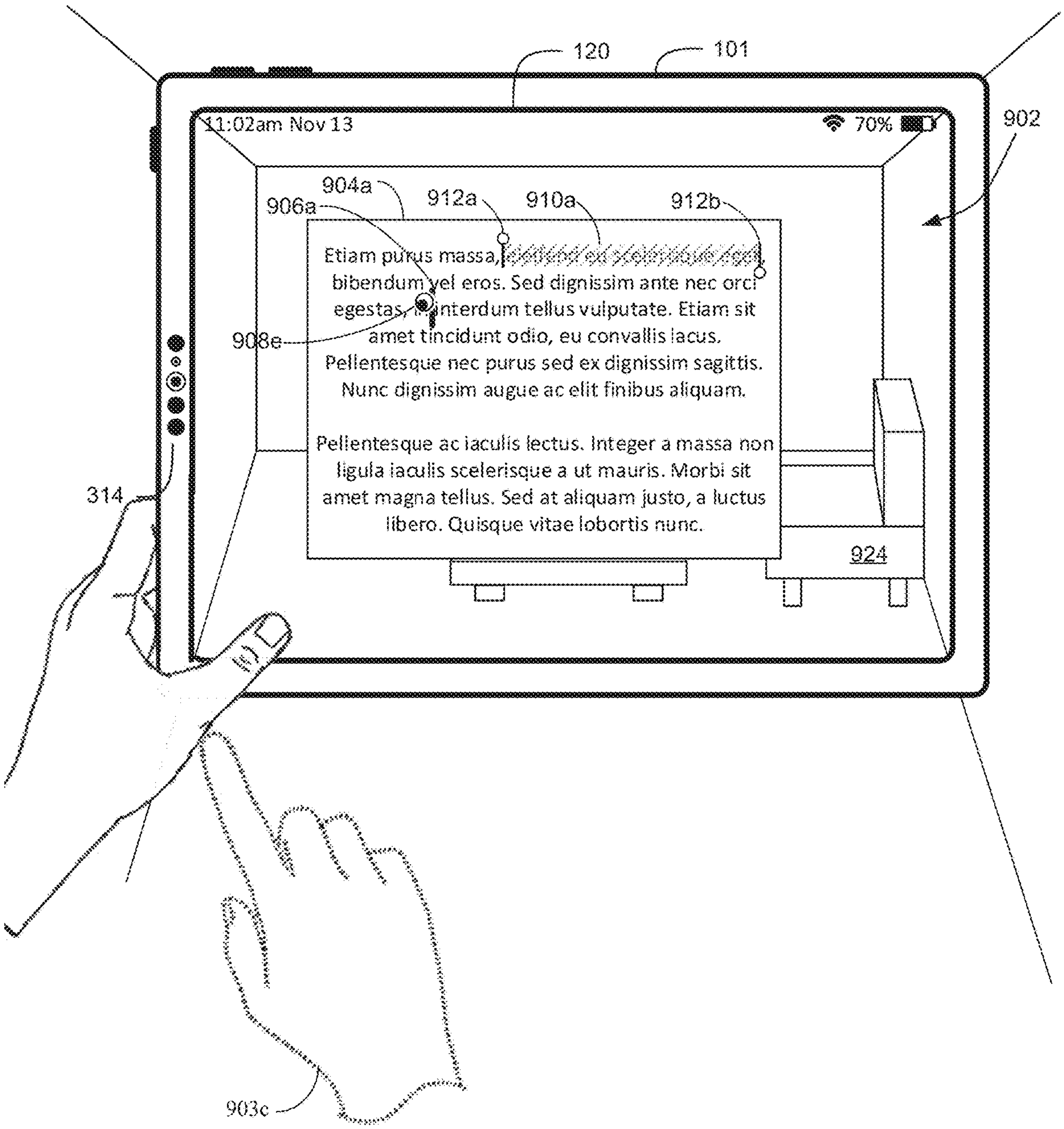
Figure 10A:
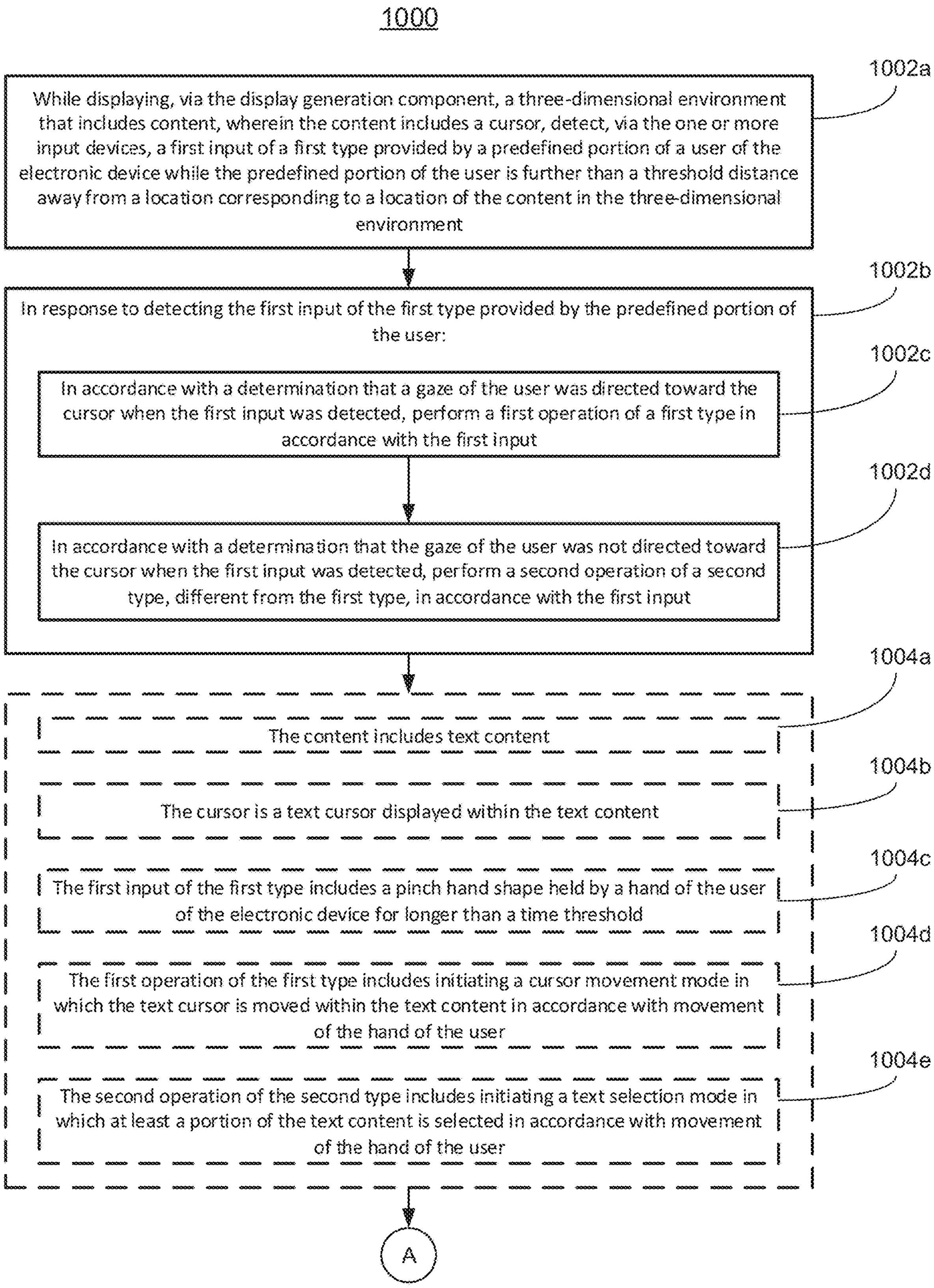
FIGS. 10A-10K is a flowchart illustrating a method of facilitating cursor interactions in content in accordance with some embodiments.
Figure 10B:
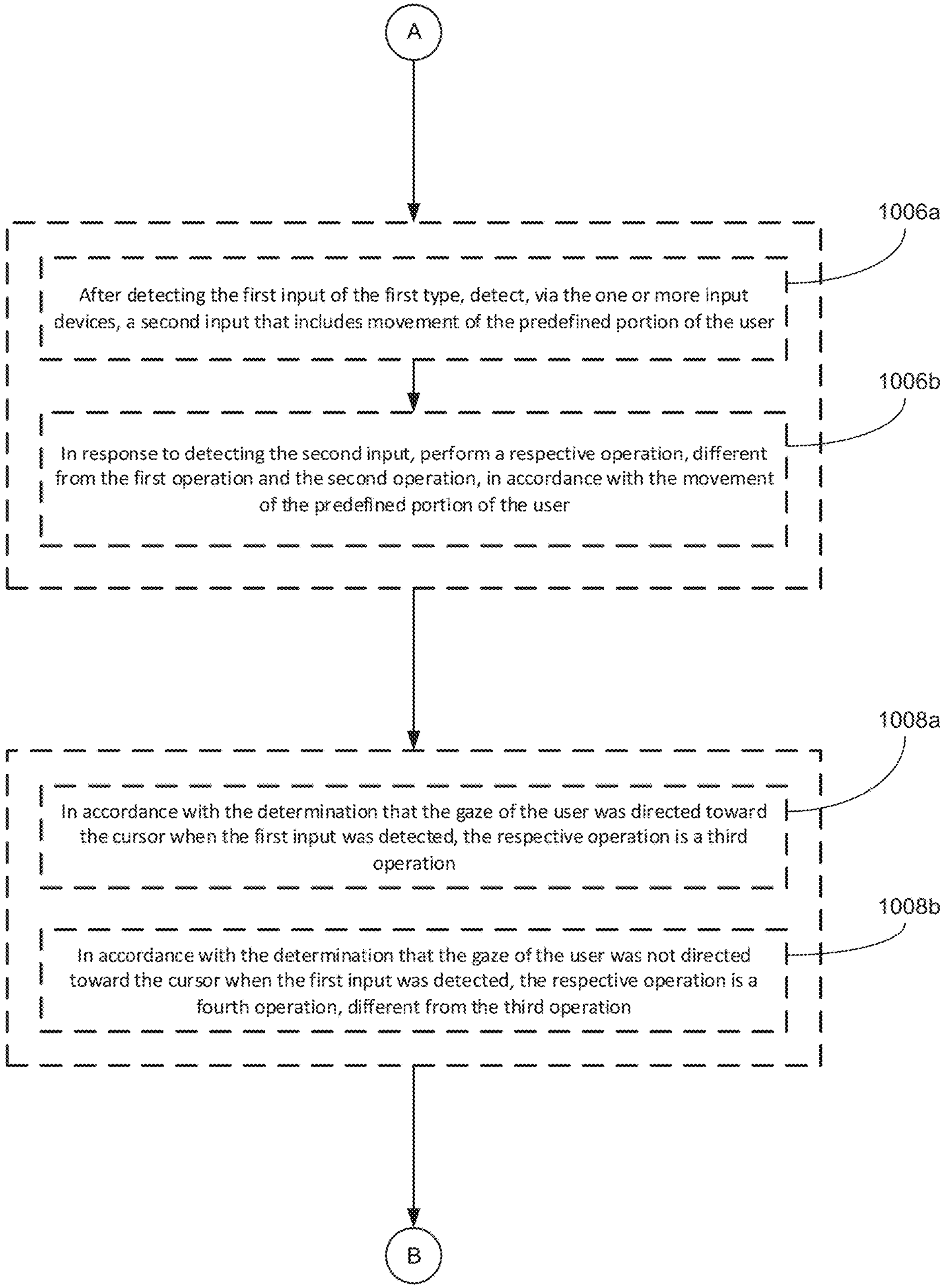
Figure 10C:
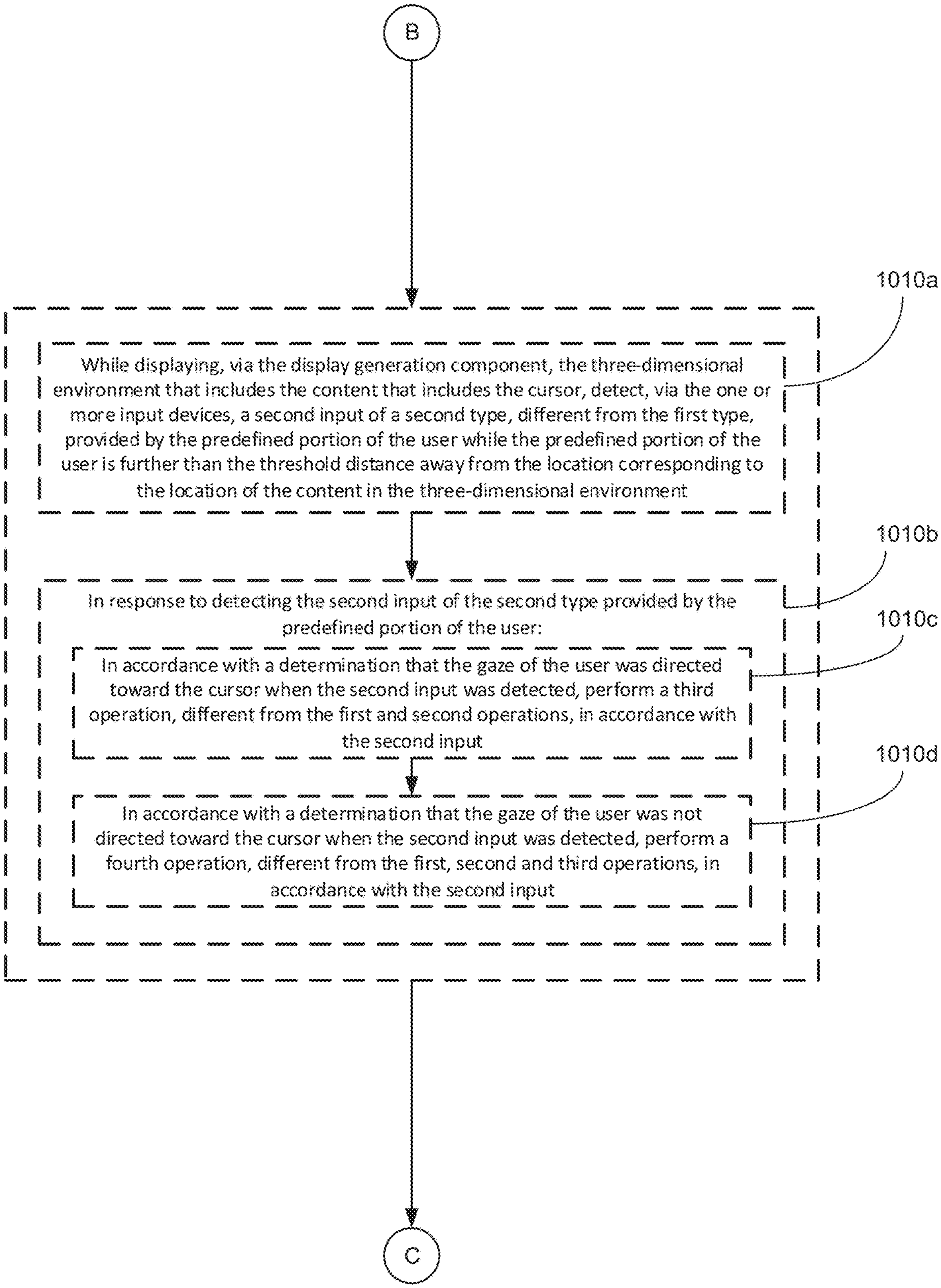
Figure 10D:
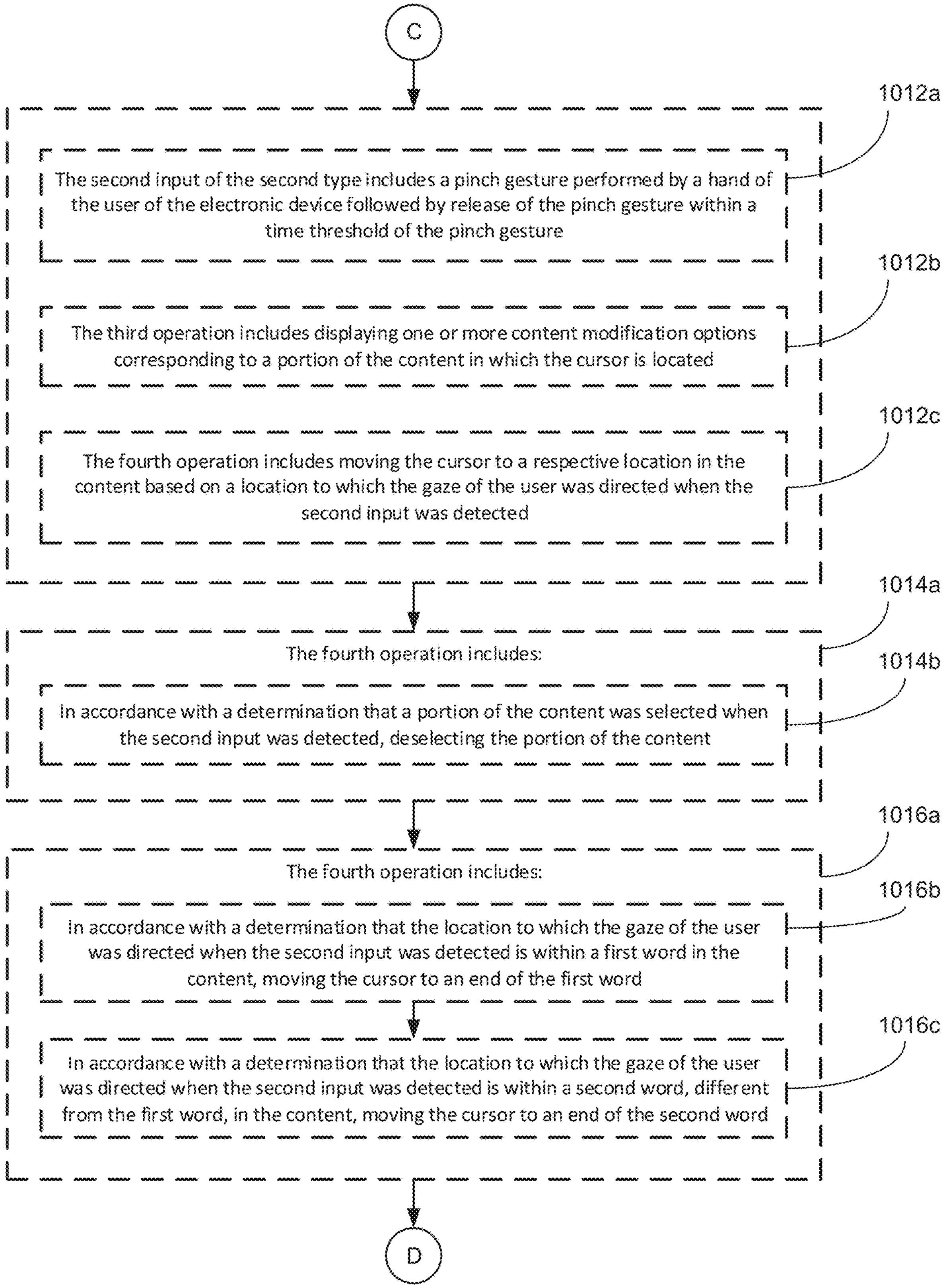
Figure 10E:
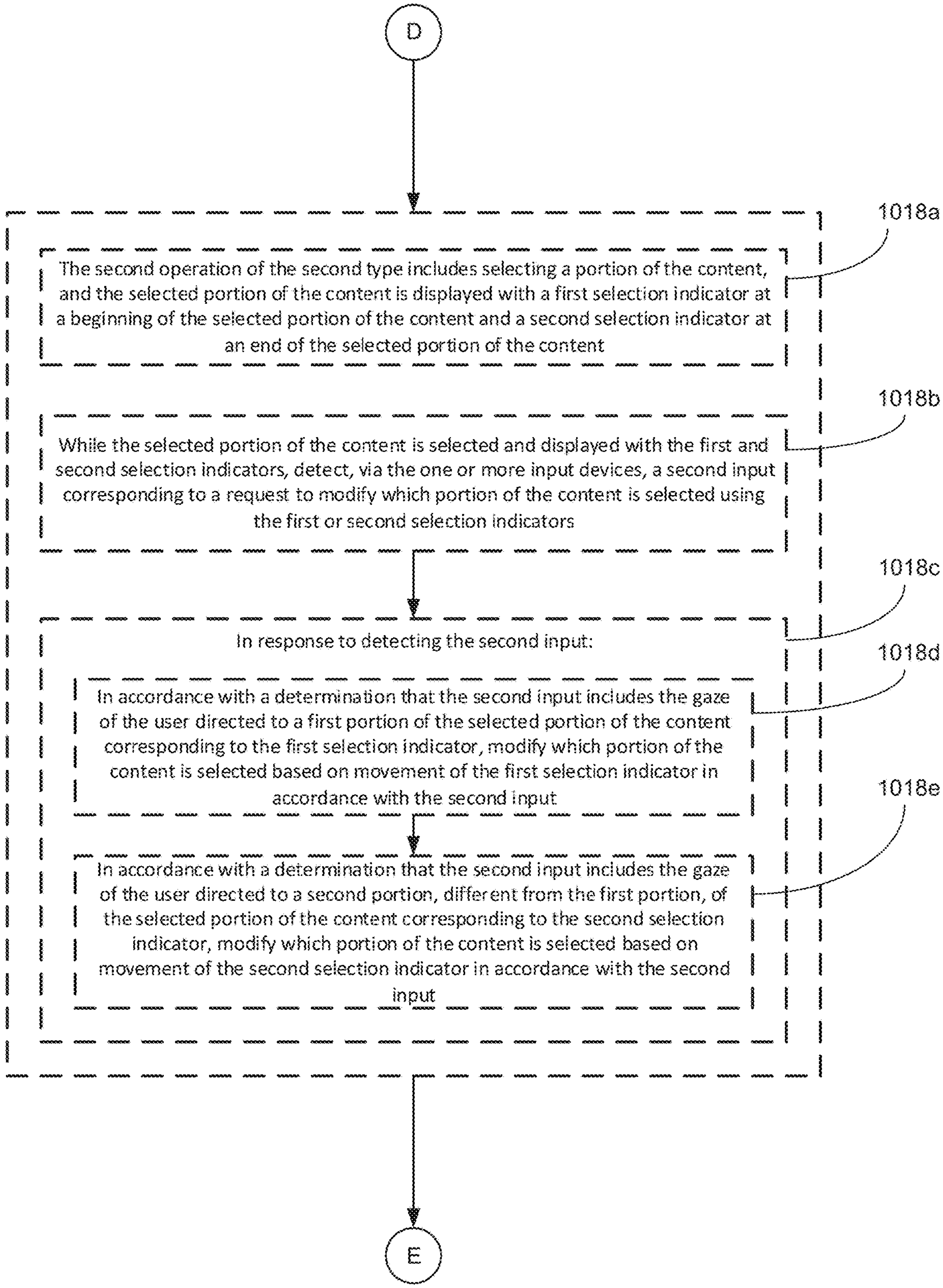
Figure 10F:
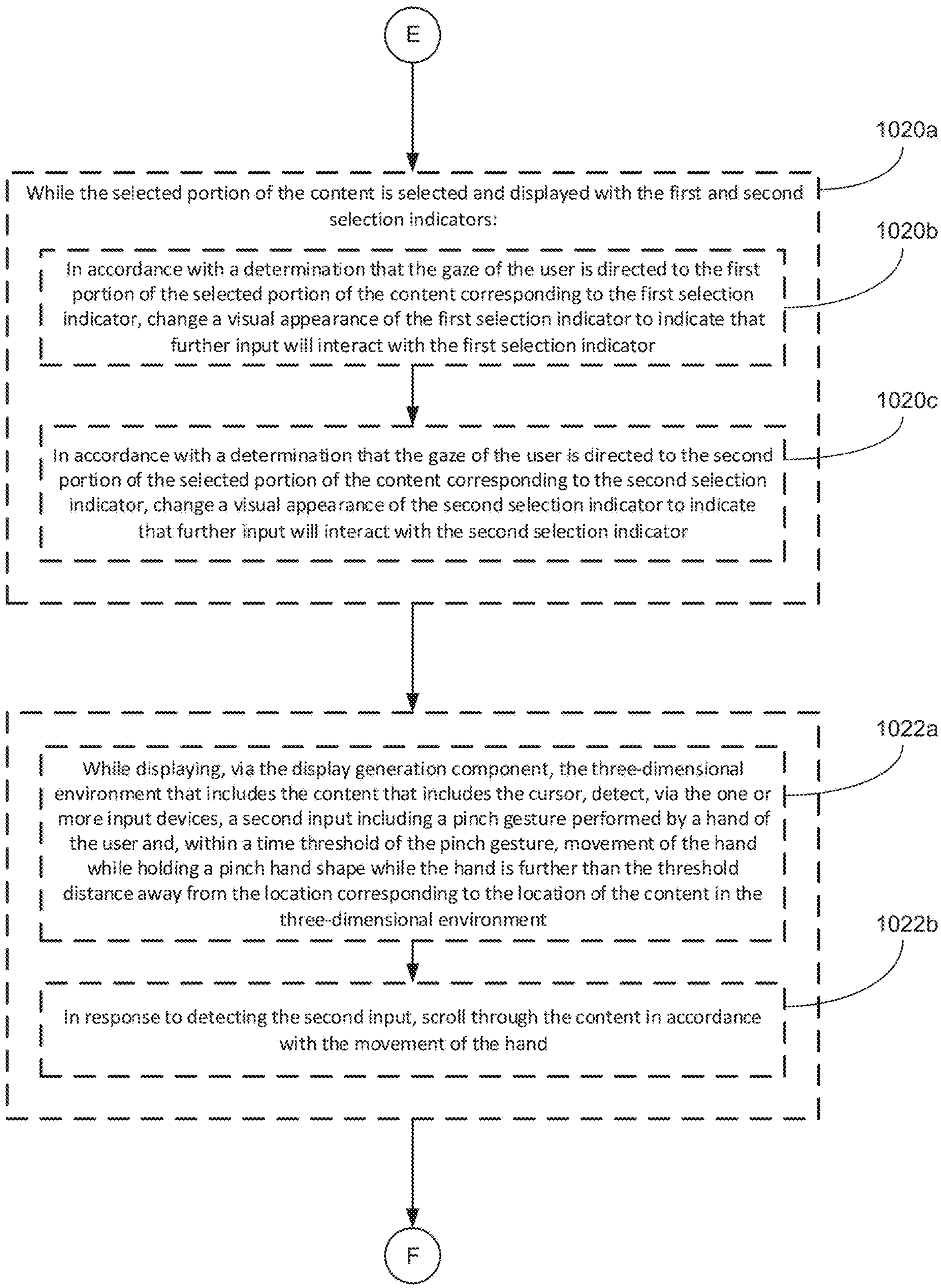
Figure 10G:
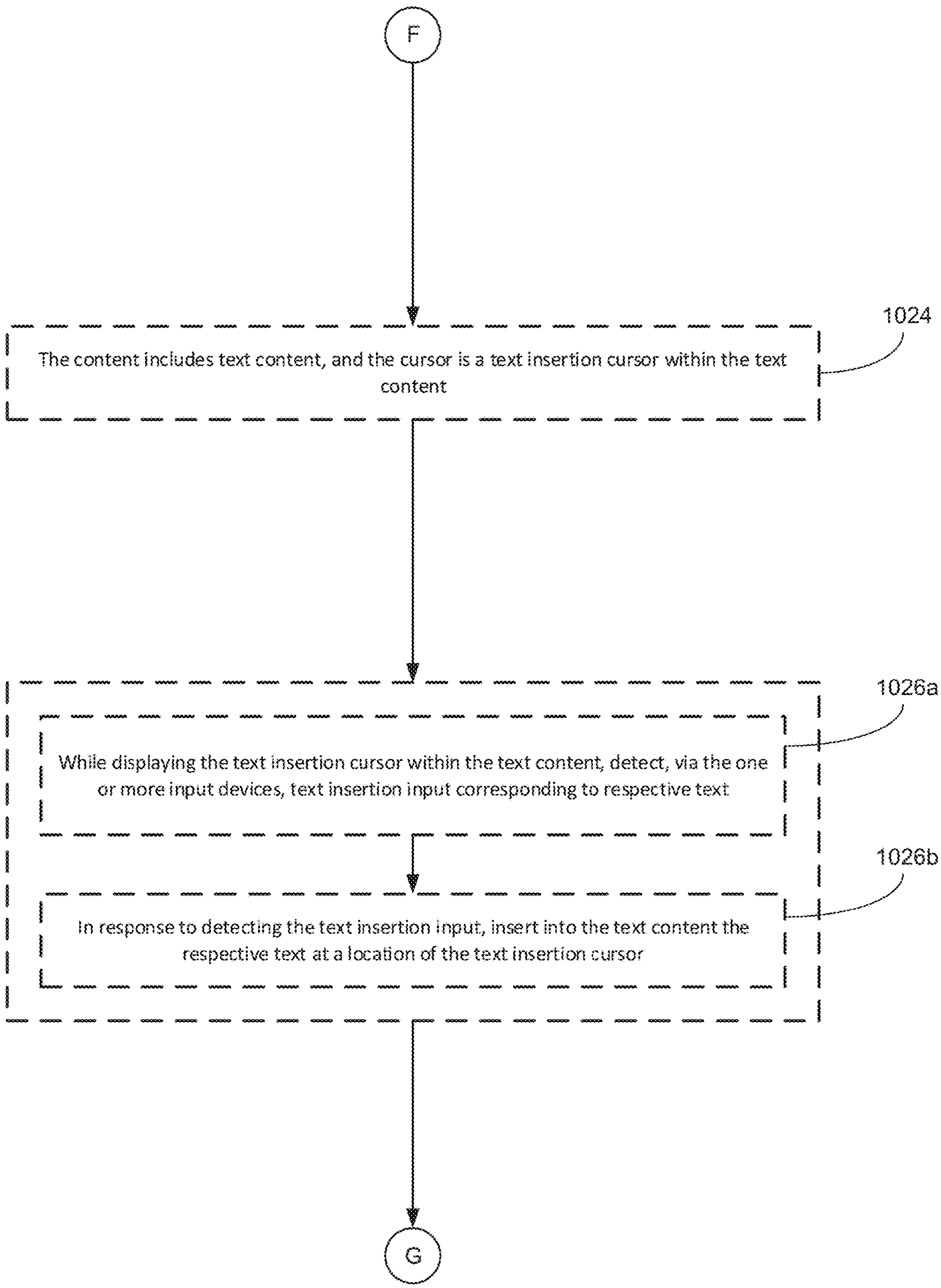
Figure 10H:
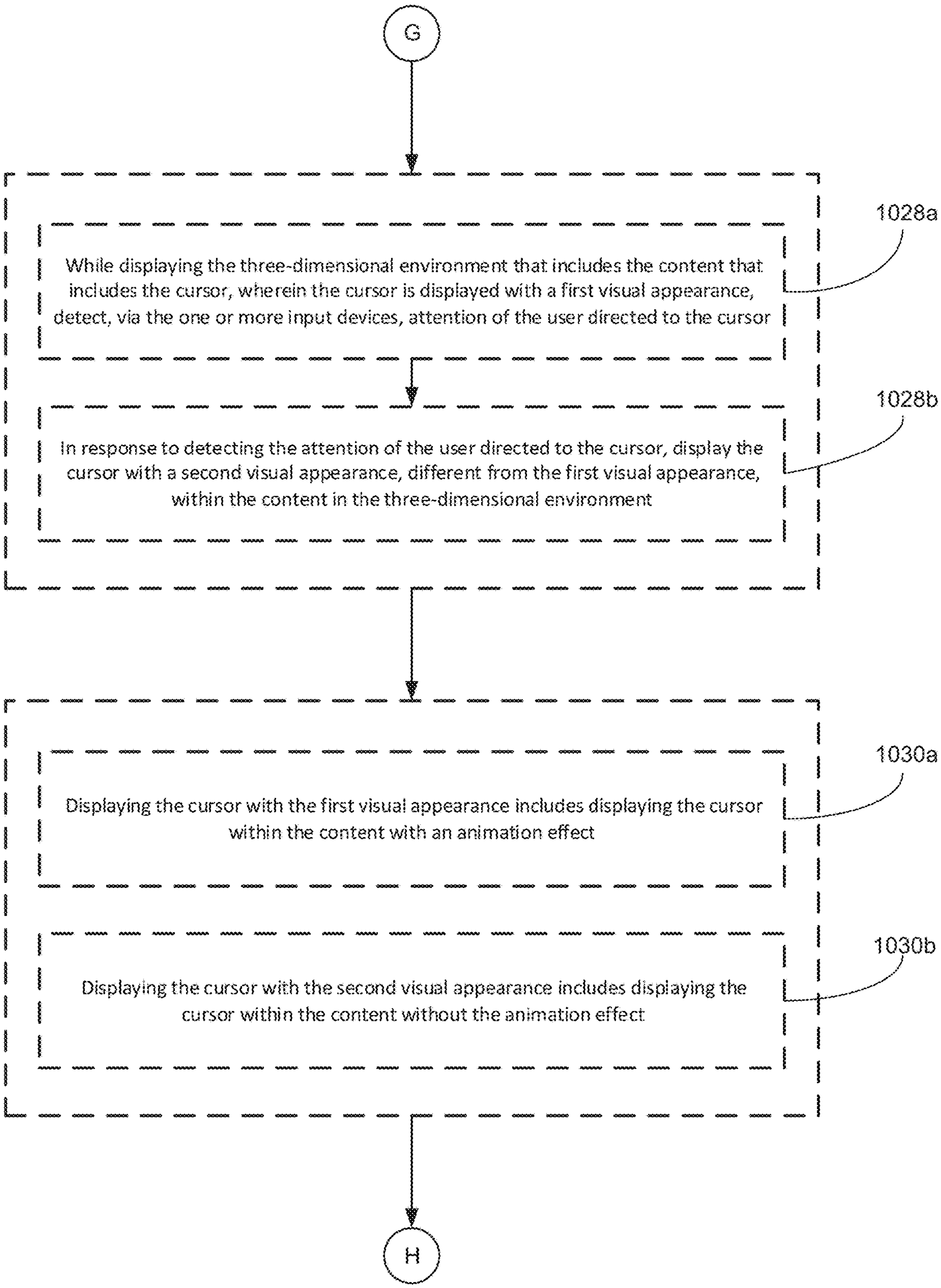
Figure 10I:
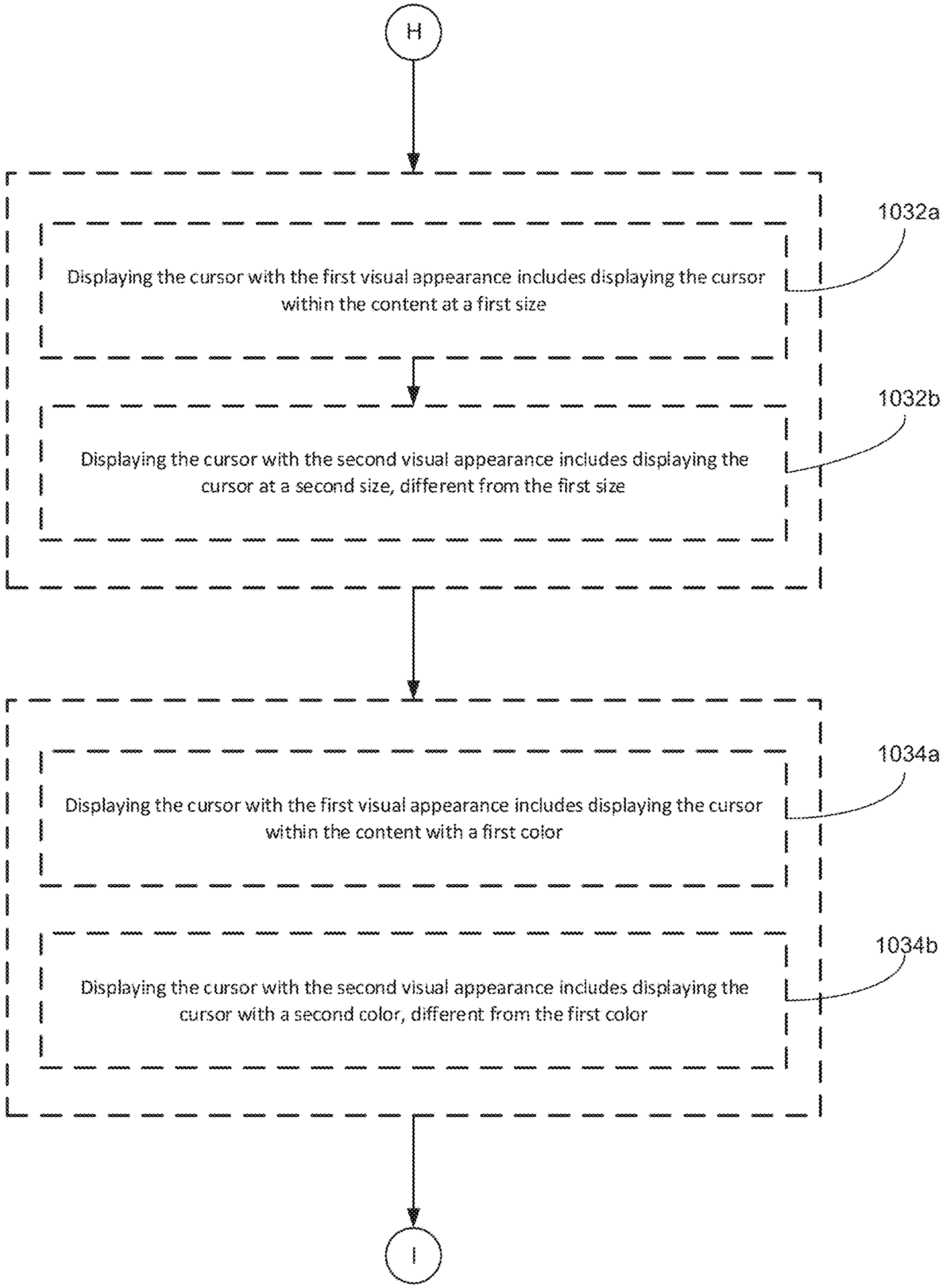
Figure 10J:
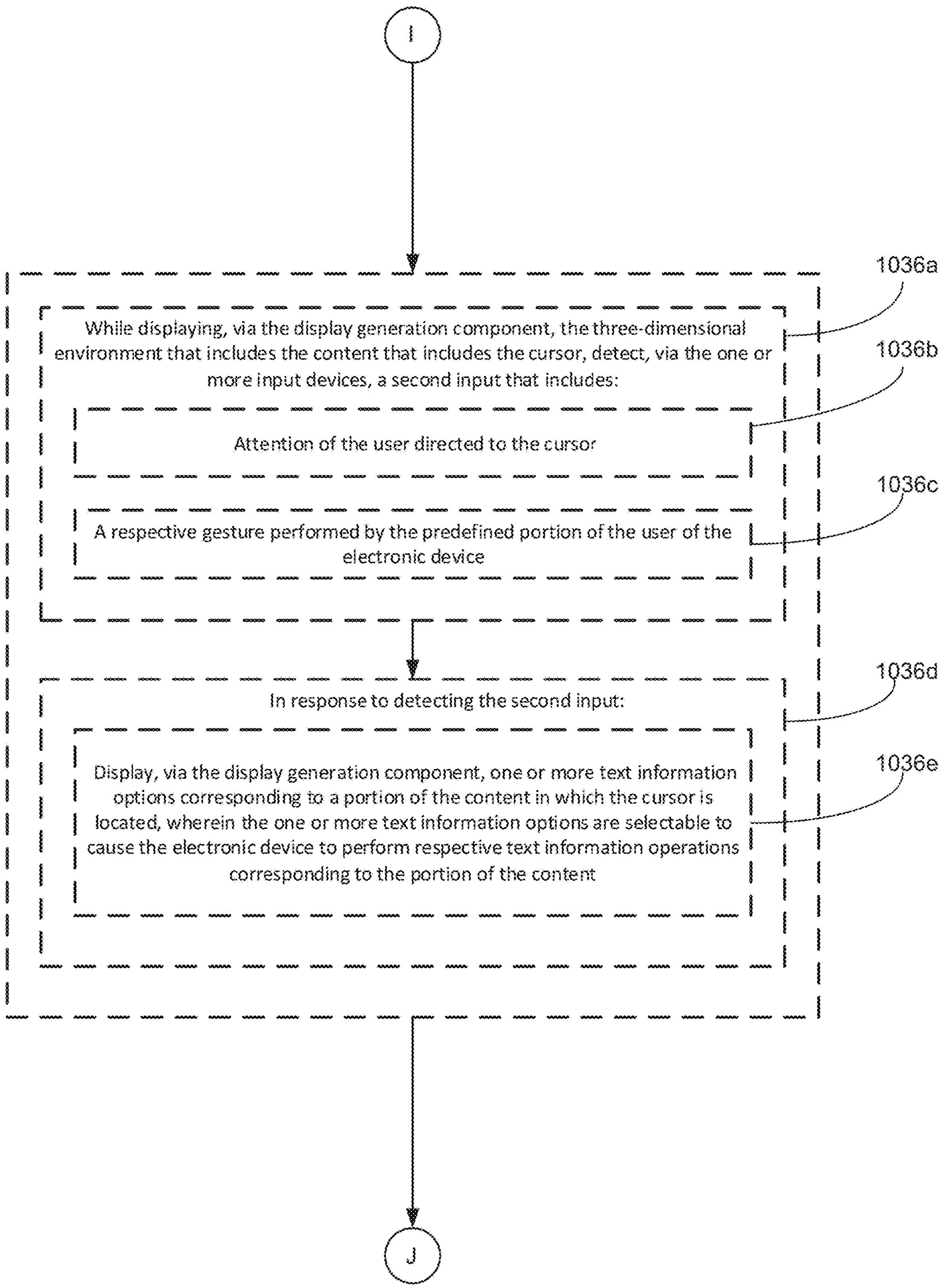
Figure 10K:
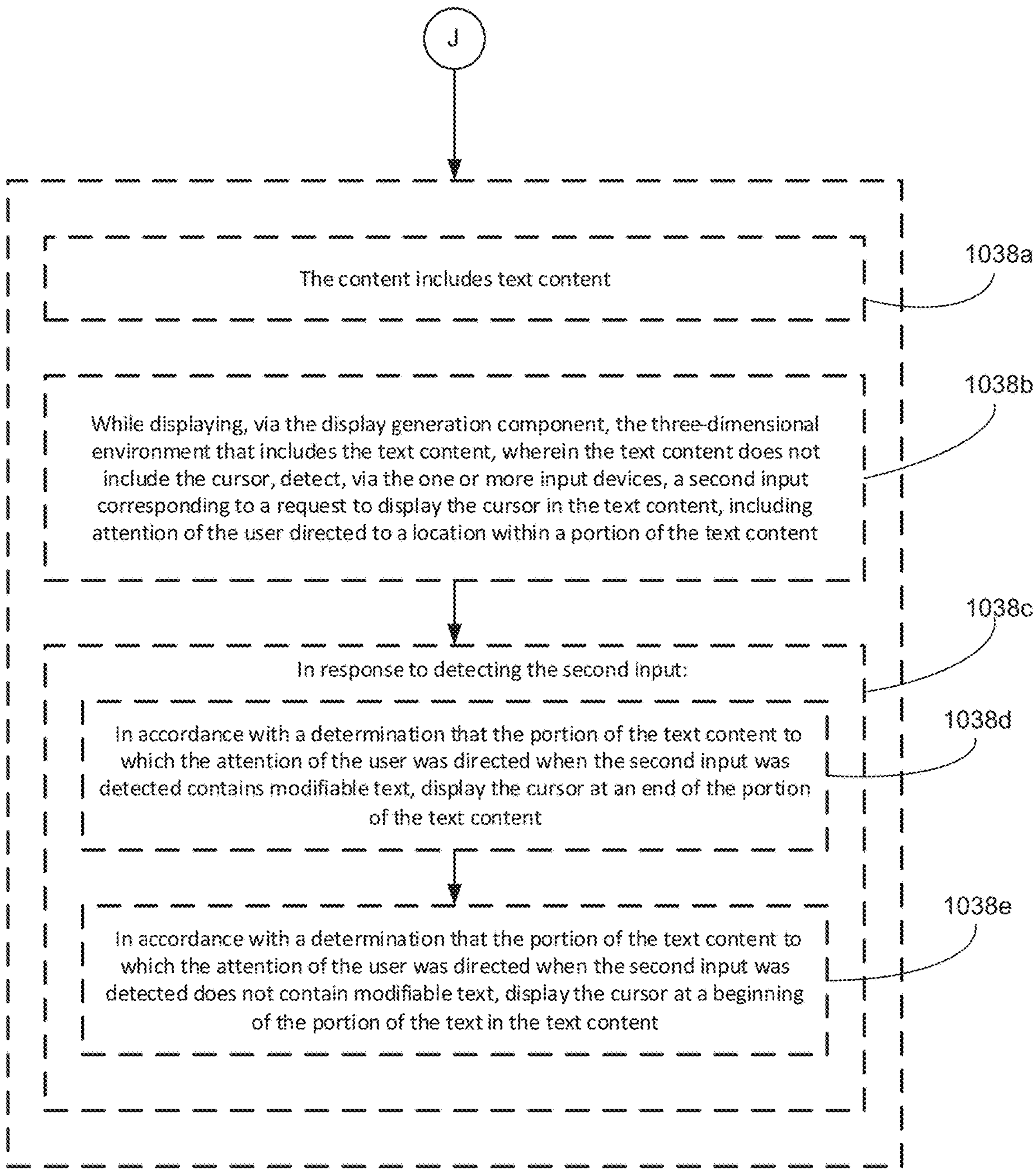

In some embodiments, while displaying the three-dimensional environment that includes the content that includes the cursor, wherein the cursor is displayed with a first visual appearance (e.g., the cursor is displayed in the three-dimensional environment with a first animation effect, at a first size, and/or with a first color, as described in more detail below), the computer system detects (1028*a*), via the one or more input devices, attention of the user directed to the cursor, such as gaze 908*e* directed to cursor 906*a* as shown in FIG. 9E (e.g., the gaze of the user is directed to or within a threshold distance of (e.g., 0.5, 0.75, 1, 1.5, 2, 5, 7, or 10 cm of, or 5, 10, 15, 20, 25, 30, 40, 50, or 90 degrees (e.g., as measured between (1) a "ray" extending from the viewpoint and/or location of the eyes of the user and the cursor and (2) a ray extending from the gaze of the user) of) the cursor in the three-dimensional environment). In some embodiments, in response to detecting the attention of the user directed to the cursor, the computer system displays (1028*b*) the cursor with a second visual appearance, different from the first visual appearance, within the content in the three-dimensional environment, such as display of cursor 906*a* at a larger size in FIG. 9E than that of cursor 906*a* shown in FIG. 9D. For example, display of the cursor is updated in the three-dimensional environment while the gaze of the user is directed toward the cursor. In some embodiments, the cursor is displayed with a second animation effect, at a second size, and/or with a second color, as described in more detail below. In some embodiments, the cursor is redisplayed with the first visual appearance when the gaze of the user is no longer directed to the cursor in the three-dimensional environment. Changing a visual appearance of a cursor within content in the three-dimensional environment when a gaze of the user is directed toward the cursor facilitates user input for performing one or more additional actions involving the content in which the cursor is positioned in the three-dimensional environment, thereby improving user-device interaction.

In some embodiments, displaying the cursor with the first visual appearance includes displaying the cursor within the content with an animation effect (1030*a*) (e.g., while the gaze of the user is not directed to the cursor within the content, the cursor is displayed with a blinking effect in the three-dimensional environment). In some embodiments, displaying the cursor with the second visual appearance includes displaying the cursor within the content without the animation effect (1030*b*), as described herein with reference to FIG. 9E. For example, when the gaze of the user is directed to the cursor within the content, the cursor is no longer displayed with the blinking effect in the three-dimensional environment. In some embodiments, when the gaze of the user is no longer directed to the cursor, the cursor again begins blinking in the three-dimensional environment. Changing an animation effect of a cursor within content in the three-dimensional environment when a gaze of the user is directed toward the cursor facilitates user input for performing one or more additional actions involving the content in which the cursor is positioned in the three-dimensional environment, thereby improving user-device interaction.

In some embodiments, displaying the cursor with the first visual appearance includes displaying the cursor within the content at a first size (1032*a*) (e.g., while the gaze of the user is not directed to the cursor within the content, the cursor is displayed at a first height and/or a first width in the three-dimensional environment). In some embodiments, displaying the cursor with the second visual appearance includes displaying the cursor at a second size, different from the first size (1032*b*), such as the display of cursor 906*a* at a larger size in FIG. 9E than that of cursor 906*a* shown in FIG. 9D. For example, when the gaze of the user is directed to the cursor within the content, the cursor is displayed at a second height and/or a second width in the three-dimensional environment. In some embodiments, when the gaze is directed to the cursor, the cursor is displayed at a larger size (e.g., a larger height and/or a larger width) in the three-dimensional environment. In some embodiments, when the gaze of the user is no longer directed to the cursor, the cursor is redisplayed at the first size in the three-dimensional environment. Changing a size of a cursor within content in the three-dimensional environment when a gaze of the user is directed toward the cursor facilitates user input for performing one or more additional actions involving the content in which the cursor is positioned in the three-dimensional environment, thereby improving user-device interaction.

In some embodiments, displaying the cursor with the first visual appearance includes displaying the cursor within the content with a first color (1034*a*) (e.g., while the gaze of the user is not directed to the cursor within the content, the cursor is displayed with a color such as black, blue, red, green, orange, or purple in the three-dimensional environment). In some embodiments, displaying the cursor with the second visual appearance includes displaying the cursor with a second color, different from the first color (1034*b*), as described herein with reference to FIG. 9E. For example, when the gaze of the user is directed to the cursor within the content, the cursor is displayed with a different color in the three-dimensional environment. In some embodiments, if the first color is black, the second color is blue. In some embodiments, when the gaze of the user is no longer directed to the cursor, the cursor is redisplayed with the first color in the three-dimensional environment. Changing a color of a cursor within content in the three-dimensional environment when a gaze of the user is directed toward the cursor facilitates user input for performing one or more additional actions involving the content in which the cursor is positioned in the three-dimensional environment, thereby improving user-device interaction.

In some embodiments, while displaying, via the display generation component, the three-dimensional environment that includes the content that includes the cursor, the computer system detects (1036*a*), via the one or more input devices, a second input that includes attention of the user directed to the cursor (1036*b*), such as gaze 908*e* directed to cursor 906*a* as shown in FIG. 9E (e.g., the gaze of the user is directed to or within a threshold distance of (e.g., 0.5, 0.75, 1, 1.5, 2, 5, 7, or 10 cm of, or 5, 10, 15, 20, 25, 30, 40, 50, or 90 degrees (e.g., as measured between (1) a "ray" extending from the viewpoint and/or location of the eyes of the user and the cursor and (2) a ray extending from the gaze of the user) of) the cursor in the three-dimensional environment) and a respective gesture performed by the predefined portion of the user of the electronic device (1036*c*), such as pinch input provided by hand 903*b* in FIG. 9A (e.g., a pinch gesture, such as an air pinch gesture, performed by a hand of the user of the electronic device that is detected by a hand tracking device in communication with the electronic device, as described above). In some embodiments, a duration of the respective gesture (e.g., initiation of the pinch gesture to an end of the pinch gesture, in which the index finger and the thumb of the hand are no longer touching (e.g., move 0.1, 0.2, 0.5, 1, 2, or 5 cm apart from one another) is less than a time threshold (e.g., 0.1, 0.2, 0.3, 0.5, 1, 1.5, 2, 3, or 5 seconds)).

In some embodiments, in response to detecting the second input (1036*d*), the computer system displays (1036*e*), via the display generation component, one or more text information options (e.g., within content modification menu 934 in FIG. 9B) corresponding to a portion of the content in which the cursor is located, wherein the one or more text information options are selectable to cause the electronic device to perform respective text information operations corresponding to the portion of the content, as described herein with reference to FIG. 9B. For example, displaying definition, translation and/or dictation options that are selectable to perform those operations (e.g., display a definition, display a translation in a respective language, and/or dictate) involving the portion (e.g., word, sentence, paragraph) of the (e.g., text) content in which the cursor is located. In some embodiments, the portion of the content in which the cursor is located is already selected/highlighted when the second input is detected. In some embodiments, the portion of the content in which the cursor is located becomes selected/highlighted when the second input is detected. Displaying text information options when a pinch hand gesture is detected while the gaze of the user is directed to text content in the three-dimensional environment reduces the number of inputs needed to perform respective actions involving the text content, thereby improving user-device interaction.

In some embodiments, the content includes text content (1038*a*) (e.g., word(s), sentence(s), and/or paragraph(s)). In some embodiments, while displaying, via the display generation component, the three-dimensional environment that includes the text content, wherein the text content does not include the cursor (e.g., either the cursor is not displayed in the three-dimensional environment, or the cursor is displayed in a different portion of the three-dimensional environment that is different from the portion that includes the text content), the computer system detects (1038*b*), via the one or more input devices, a second input corresponding to a request to display the cursor in the text content, such as pinch input provided by hand 903*b* in FIG. 9A (e.g., a pinch gesture, such as an air pinch gesture, performed by the hand of the user, as described above, followed by release of the pinch gesture (e.g., in which the index finger and thumb of the user are no longer touching) within a time threshold (e.g., 0.1, 0.2, 0.3, 0.5, 1, 1.5, 2, 3, or 5 seconds) after the pinch gesture was first detected), including attention of the user (e.g., gaze 908*b* in FIG. 9A) directed to a location within a portion of the text content (e.g., the gaze of the user is directed to a portion of a word or words within the text content). In some embodiments, in response to detecting the second input (1038*c*), in accordance with a determination that the portion of the text content to which the attention of the user was directed when the second input was detected contains modifiable text (e.g., the text is editable (e.g., the text or portions of the text can be deleted, additional text can be added to existing text, and/or the text can be moved (e.g., copied and pasted) into a different location within the text content)), the computer system displays (1038*d*) the cursor at an end of the portion of the text content, such as display of cursor 906*b* at the end of the word "ornare" as shown in FIG. 9B (e.g., the cursor is inserted at the end of the portion of the text content to which the gaze was directed when the second input was detected irrespective of the exact location within that portion of the text content to which the gaze was directed. In some embodiments, the cursor is inserted immediately after the last letter of a word to which the gaze of the user was directed).

In some embodiments, in accordance with a determination that the portion of the text content to which the attention of the user was directed when the second input was detected does not contain modifiable text (e.g., the text is read-only (e.g., the text or portions of the text cannot be deleted, additional text cannot be added to existing text, and/or the text cannot be moved (e.g., copied and pasted) into a different location within the text content)), the computer system displays (1038*e*) the cursor at a beginning of the portion of the text in the text content, as described herein with reference to FIG. 9B. For example, the cursor is inserted at the beginning of the portion of the text content to which the gaze was directed when the second input was detected irrespective of the exact location within that portion of the text content to which the gaze was directed. In some embodiments, the cursor is inserted immediately before the first letter of a word to which the gaze of the user was directed. Inserting the cursor into a predetermined relative position of the portion of the text content based on the type of the text content facilitates user input for interacting with the text content, thereby improving user-device interaction.

FIGS. 11A-11G illustrate examples of an electronic device facilitating cursor movement in accordance with some embodiments.

Figure 11A:
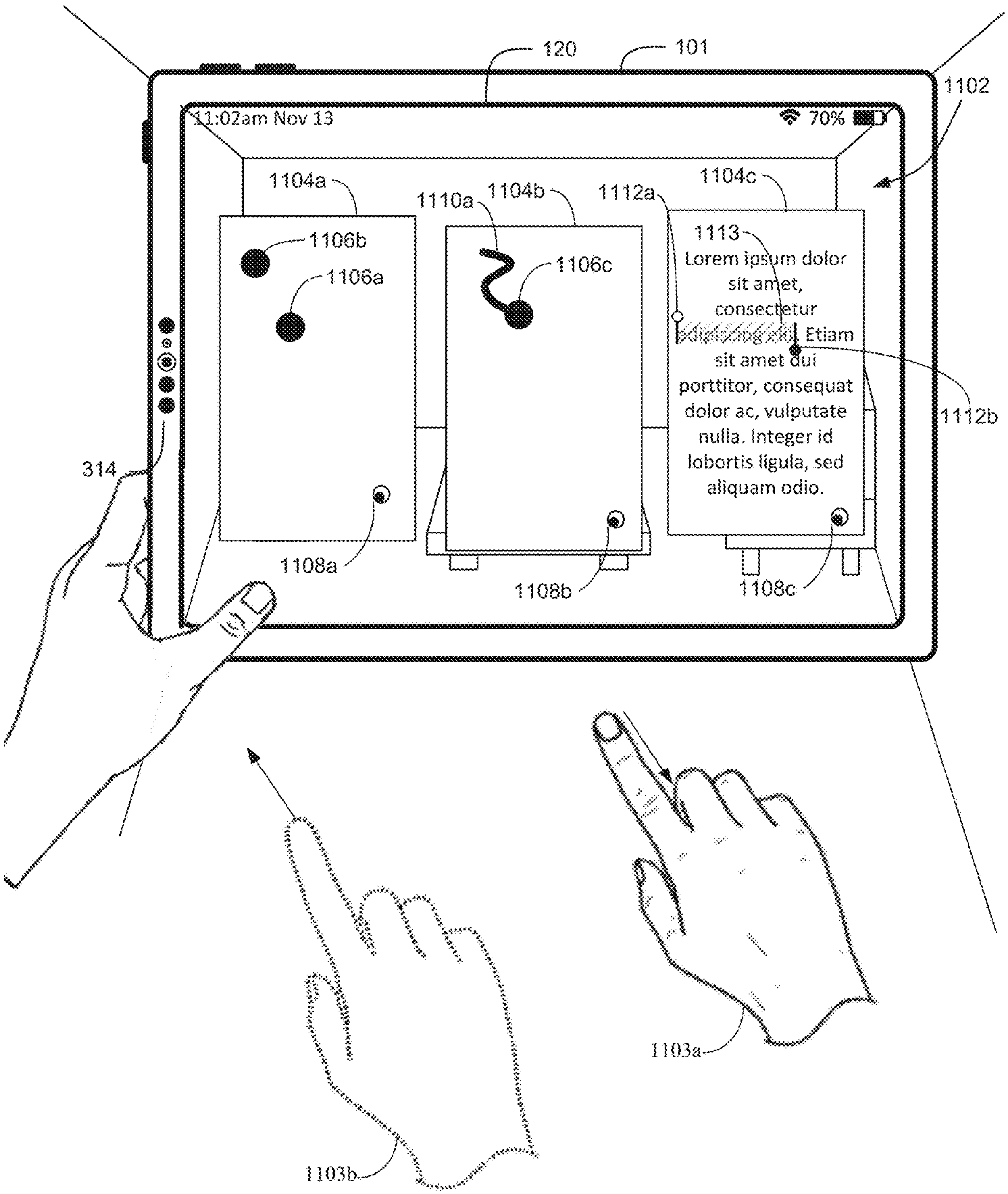
FIGS. 11A-11G illustrate examples of an electronic device facilitating cursor movement in accordance with some embodiments.
Figure 12A:
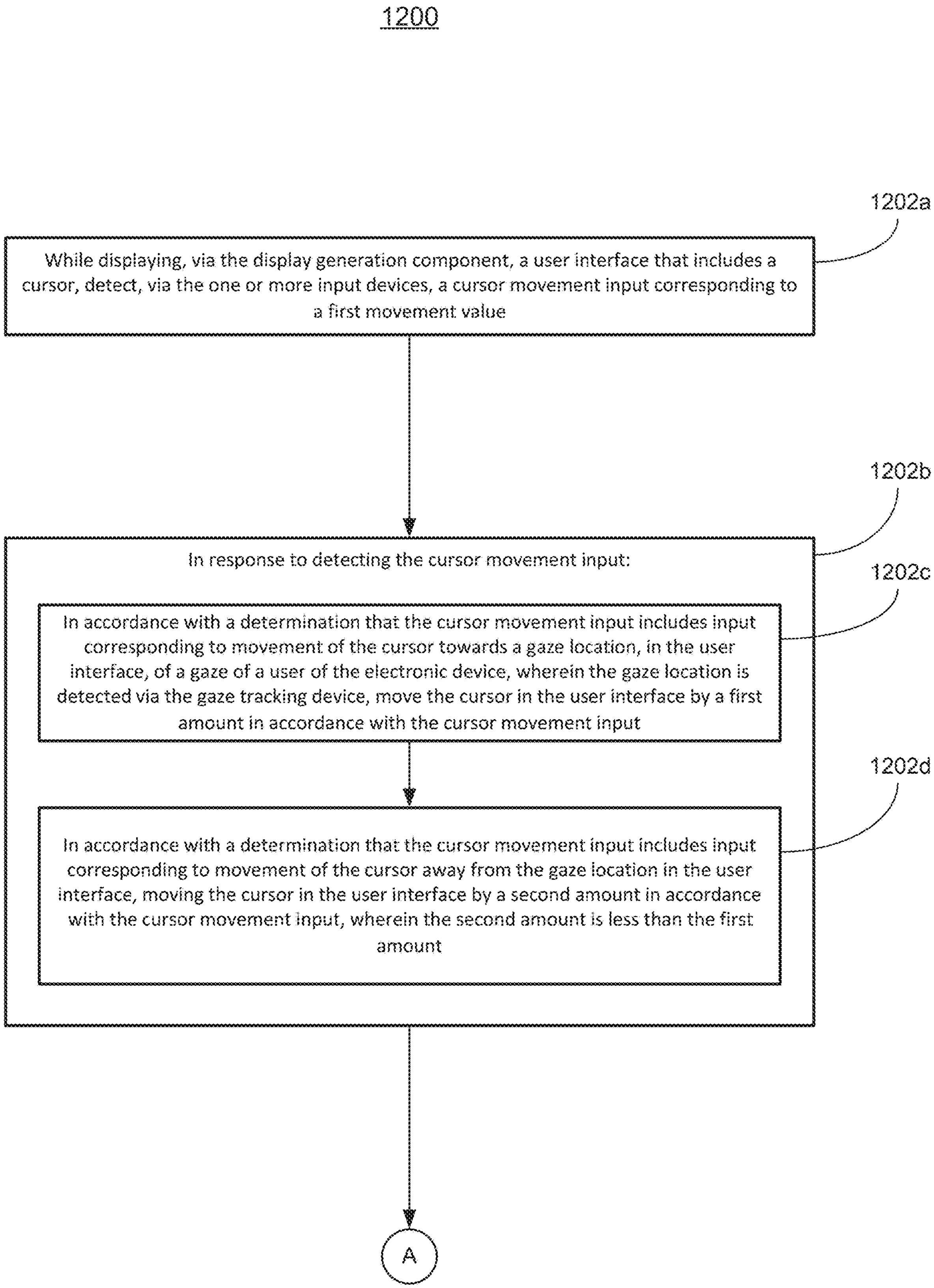
FIGS. 12A-12O is a flowchart illustrating a method of facilitating cursor movement in accordance with some embodiments.
Figure 12B:
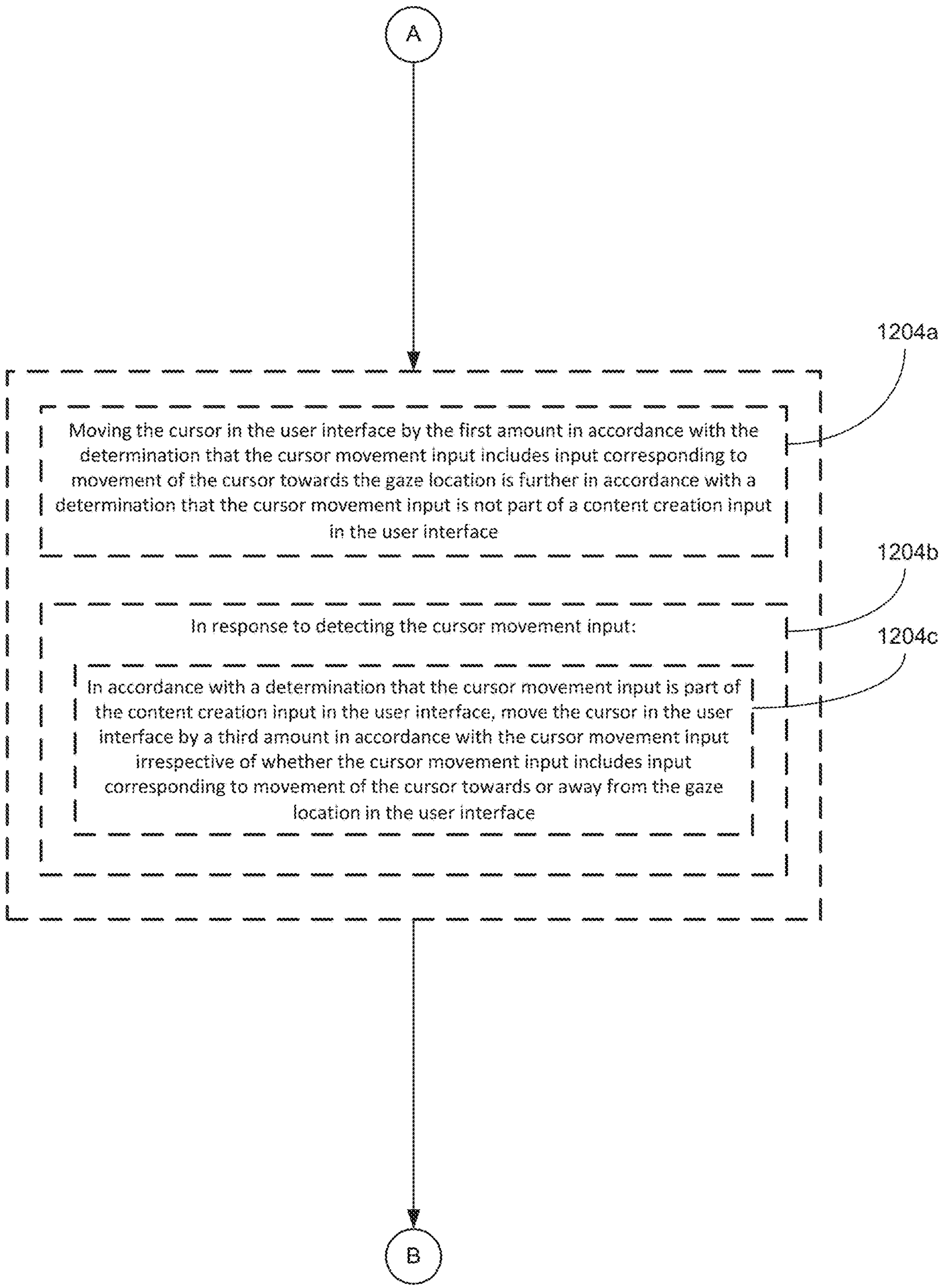
Figure 12C:
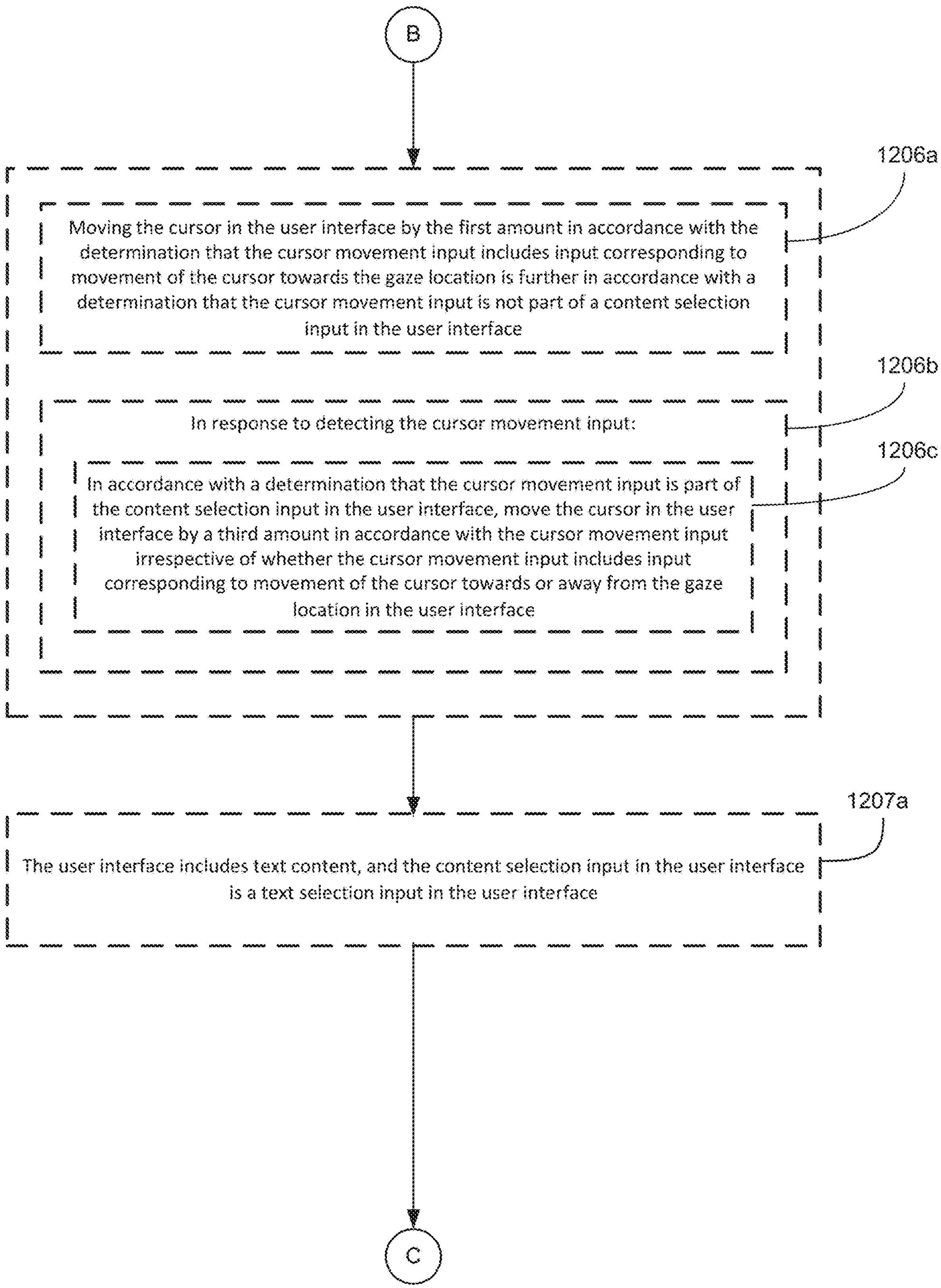
Figure 12D:
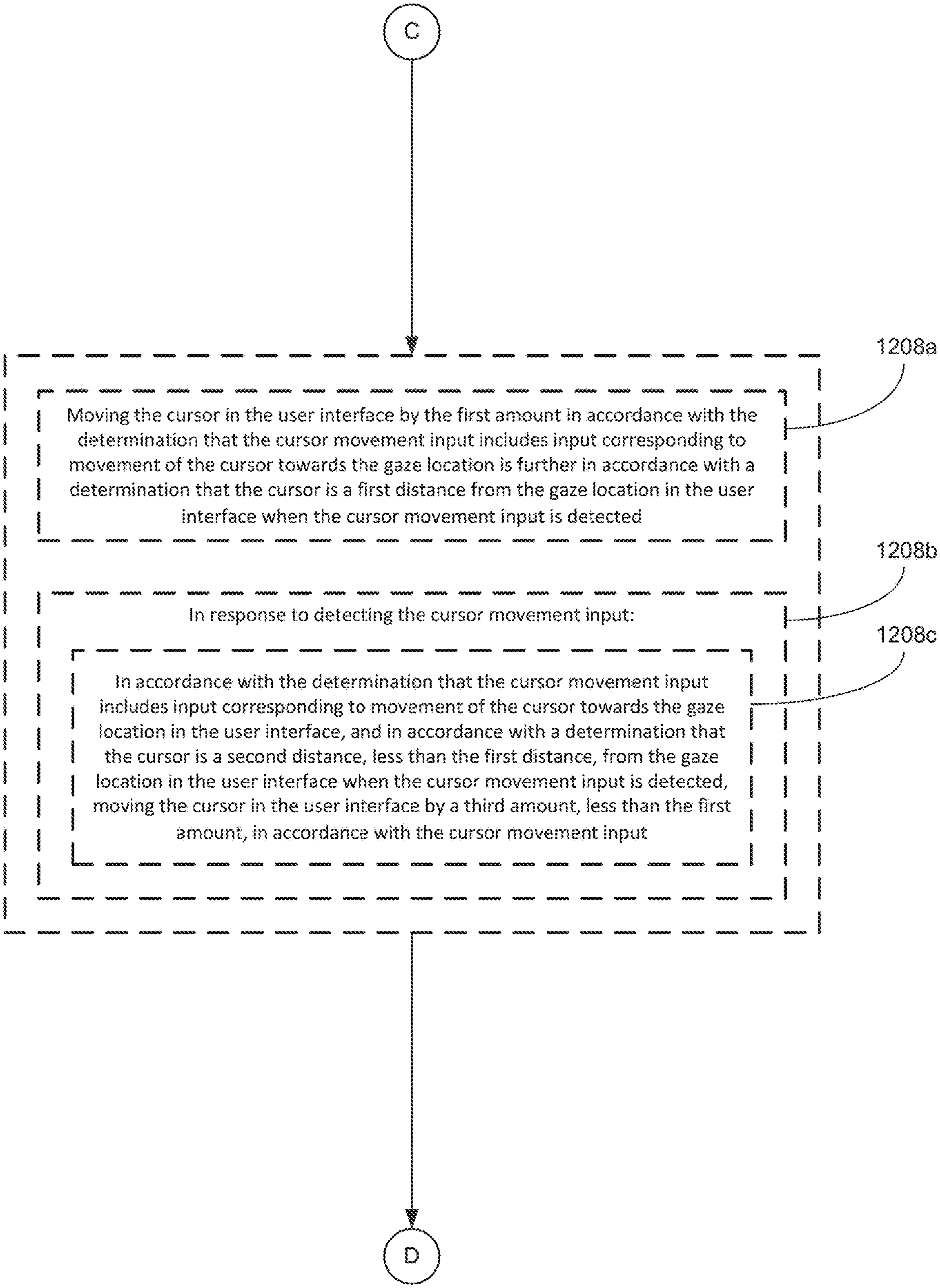
Figure 12E:
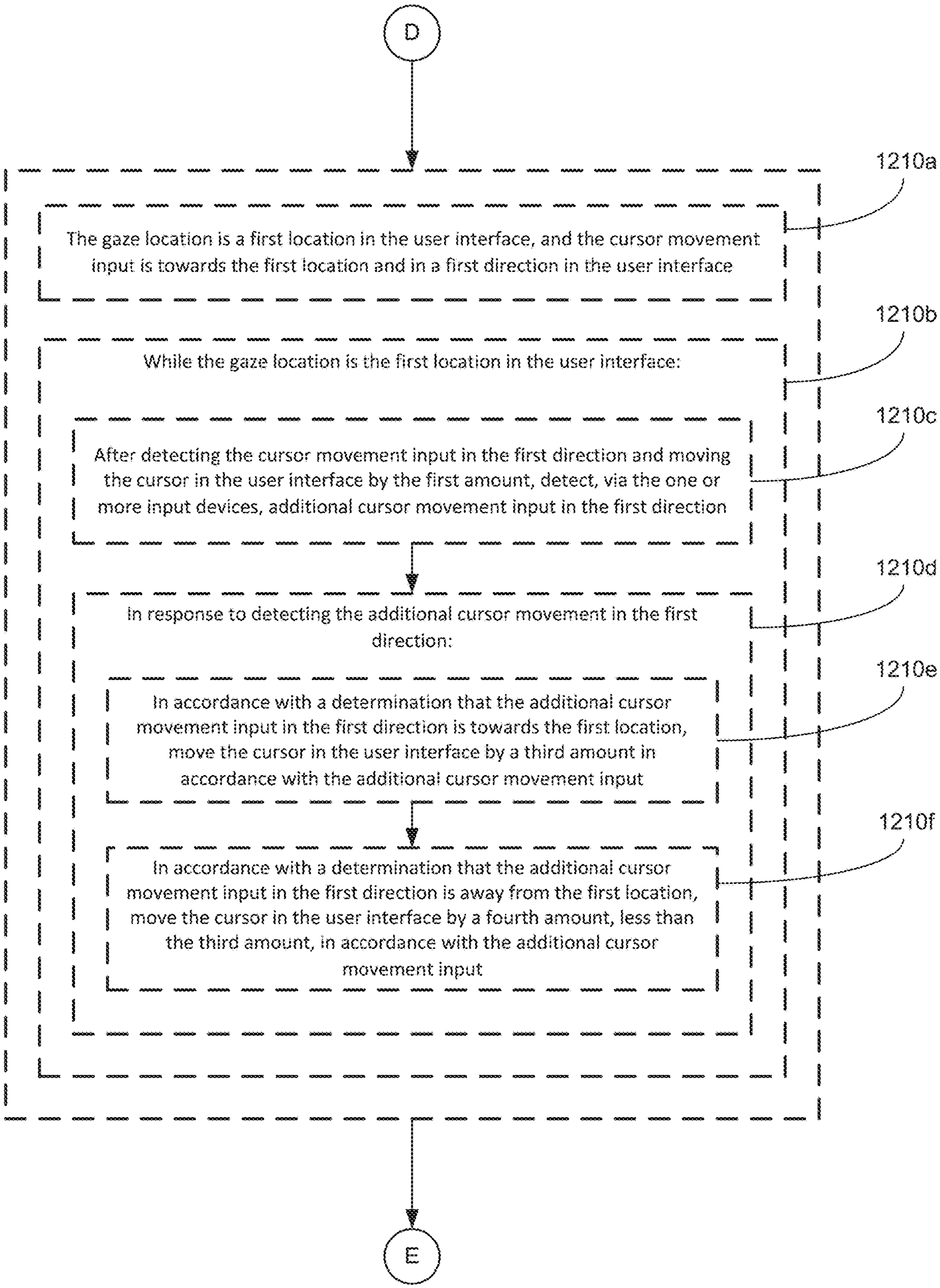
Figure 12F:
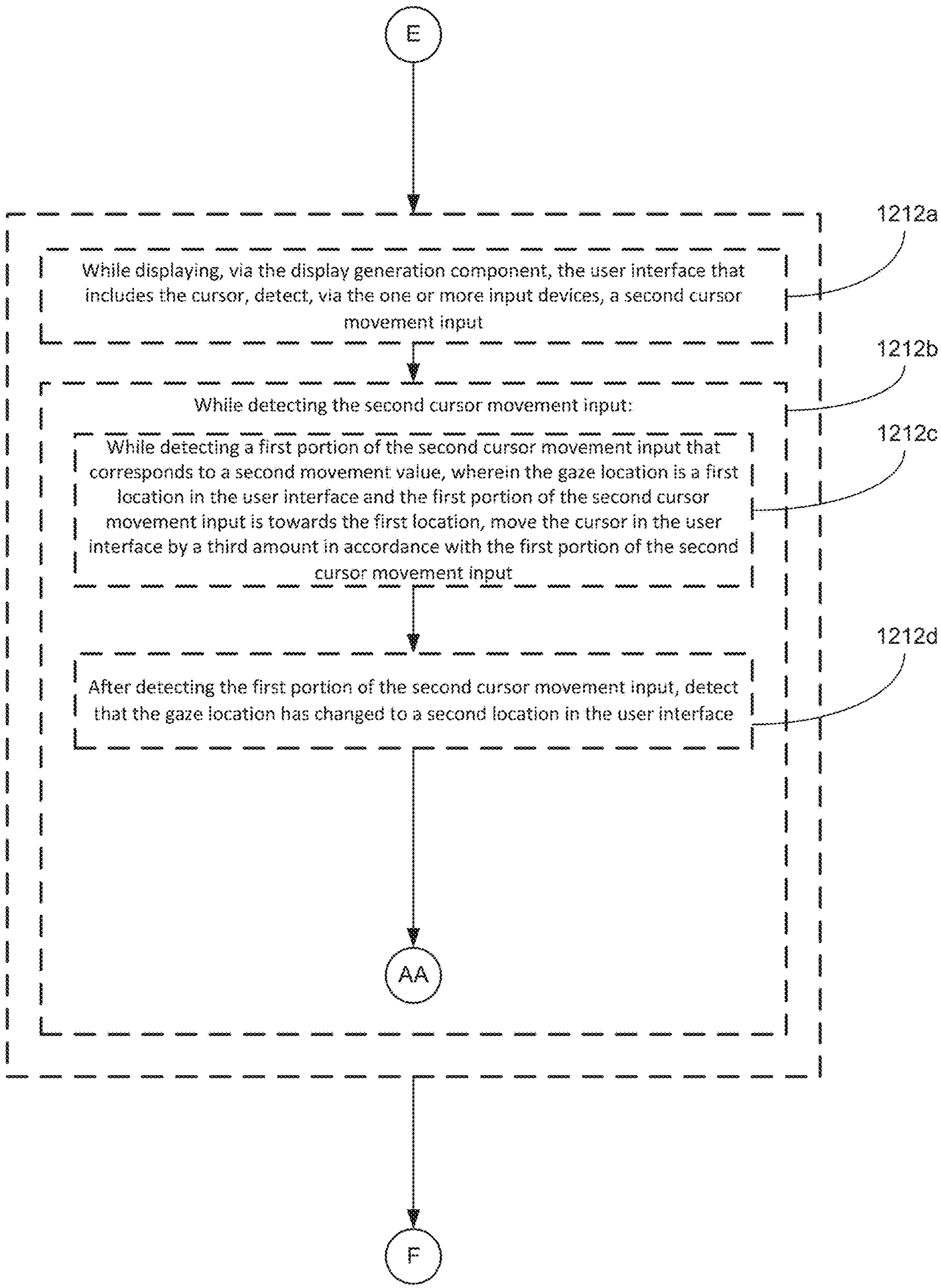
Figure 12G:
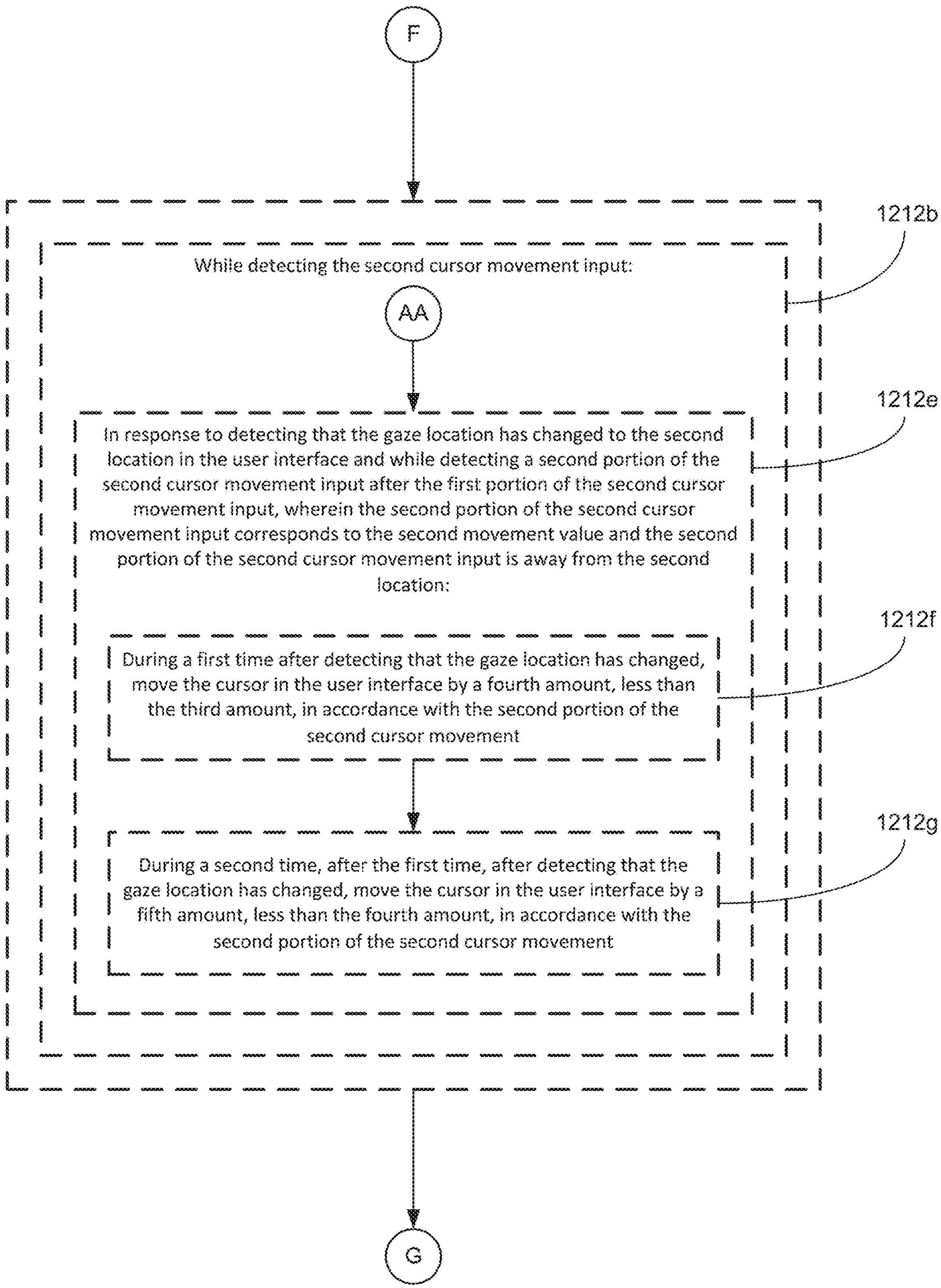
Figure 12H:
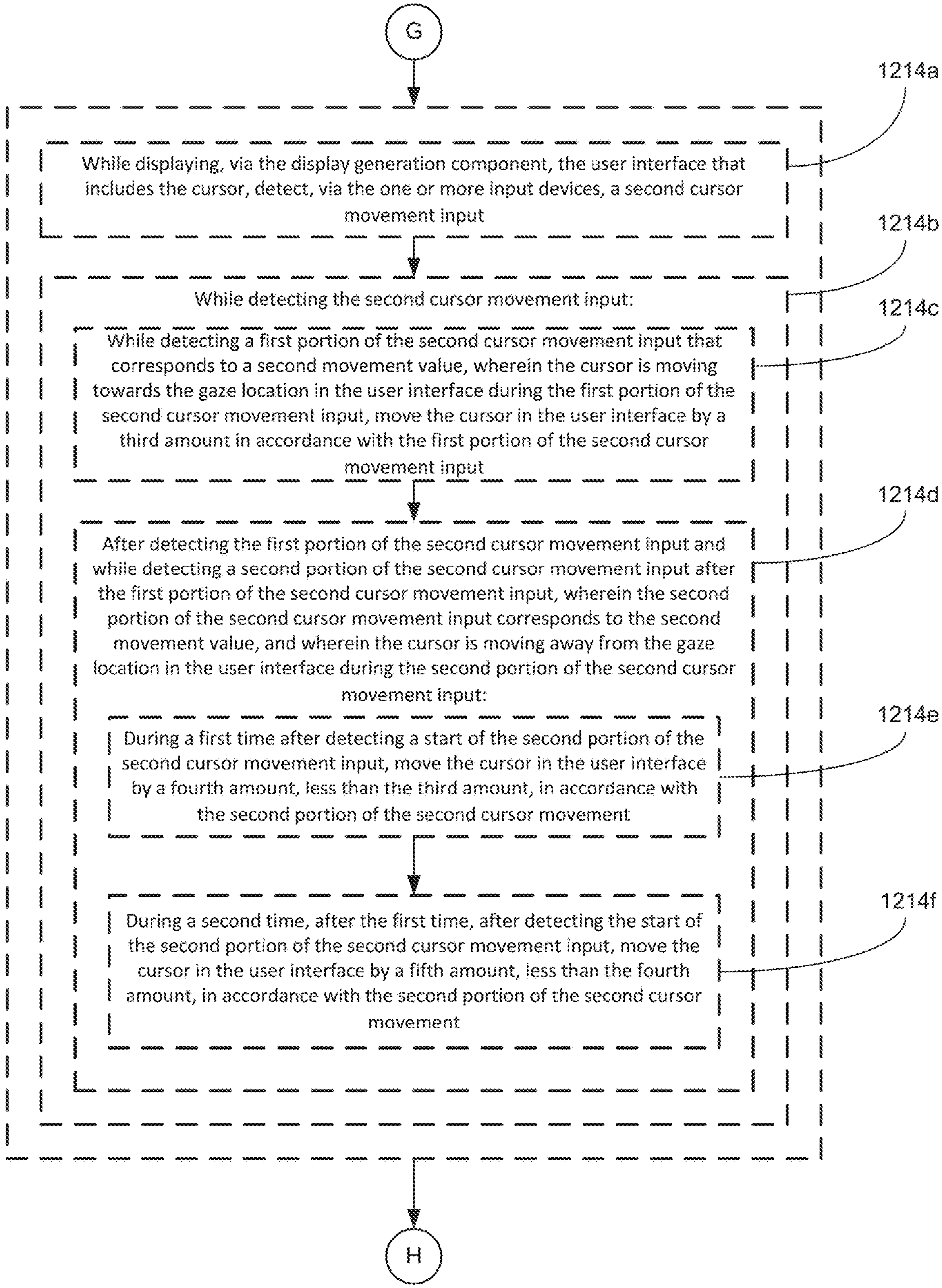
Figure 12I:
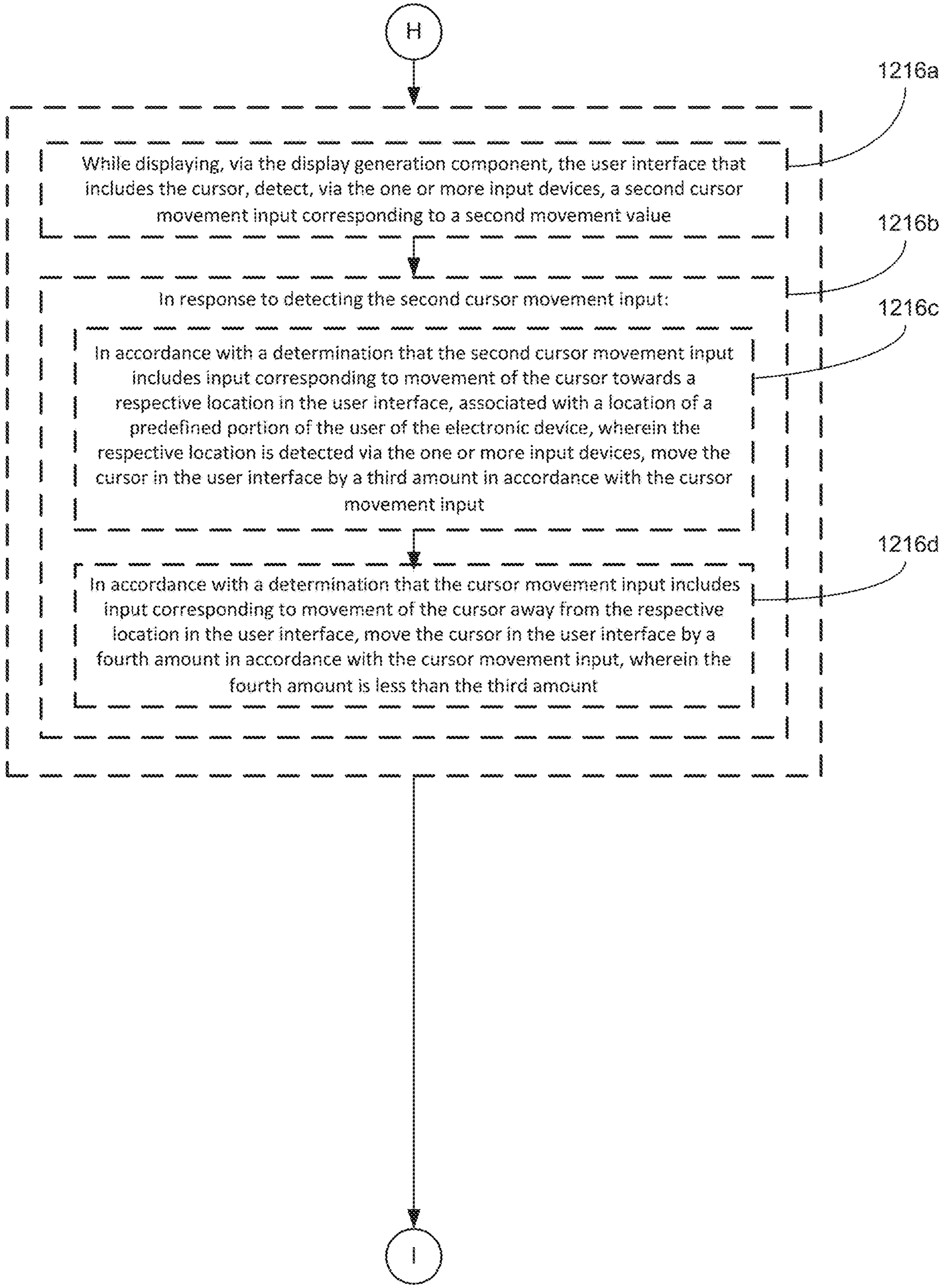
Figure 12J:
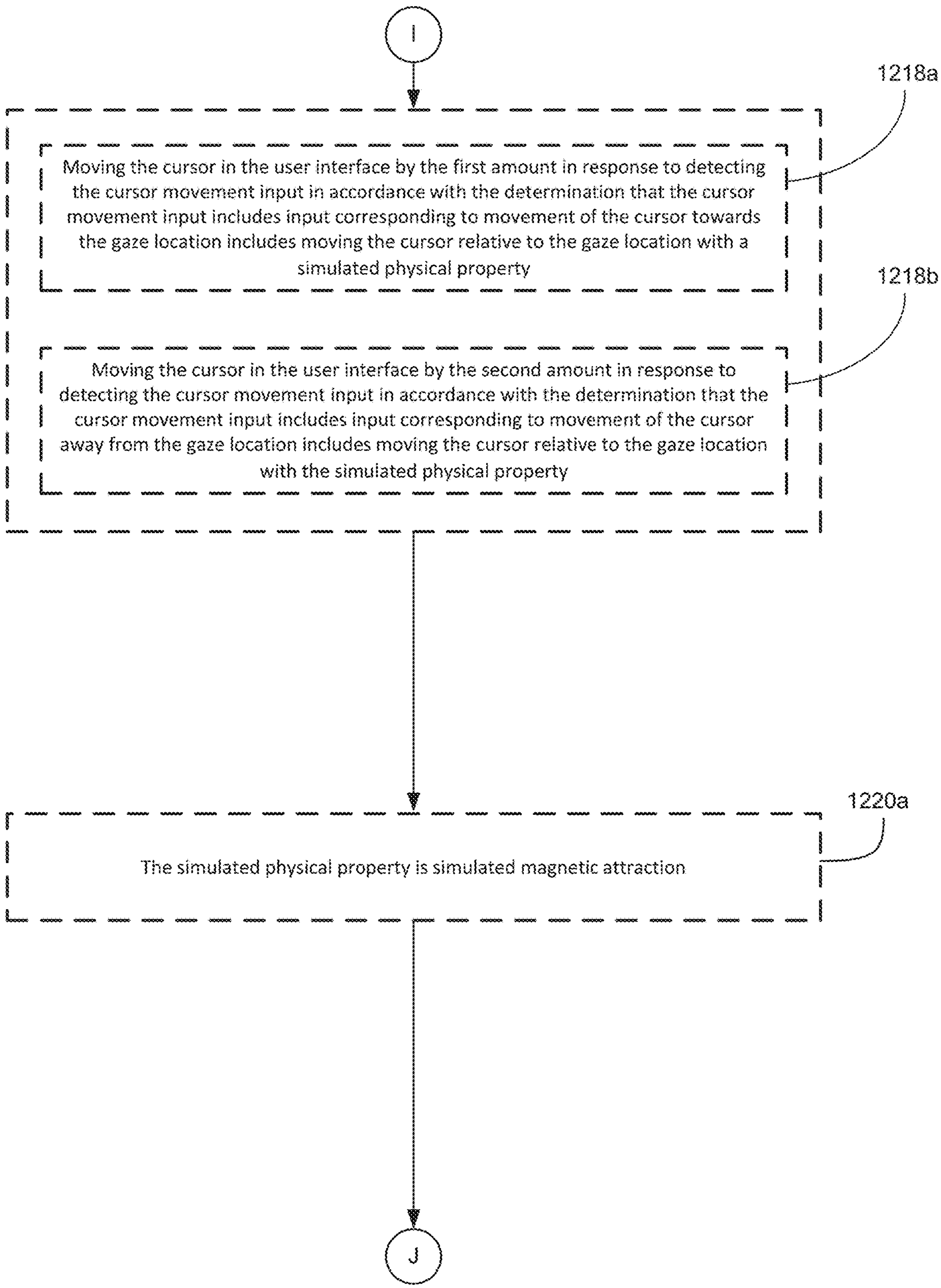
Figure 12K:
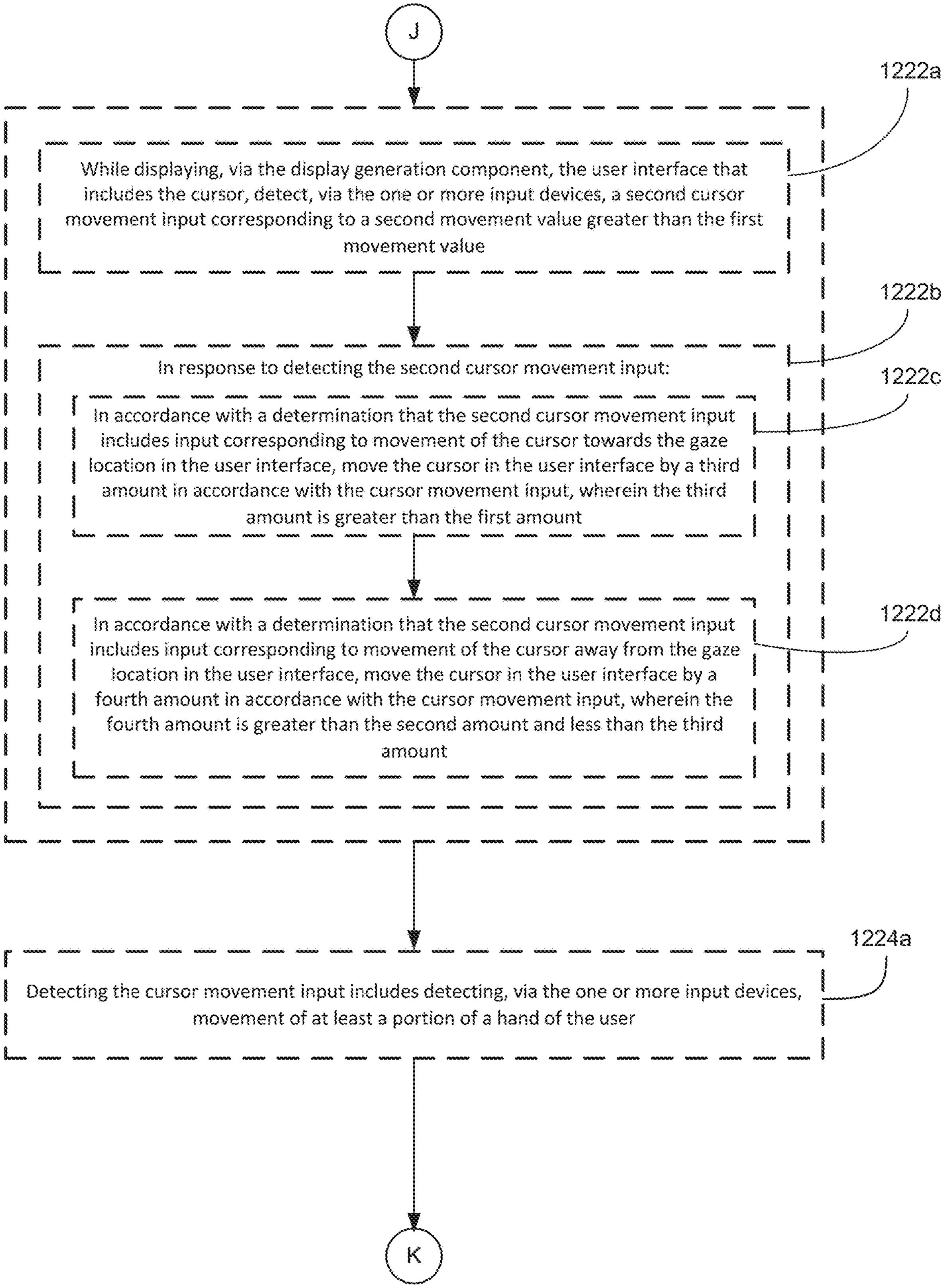
Figure 12L:
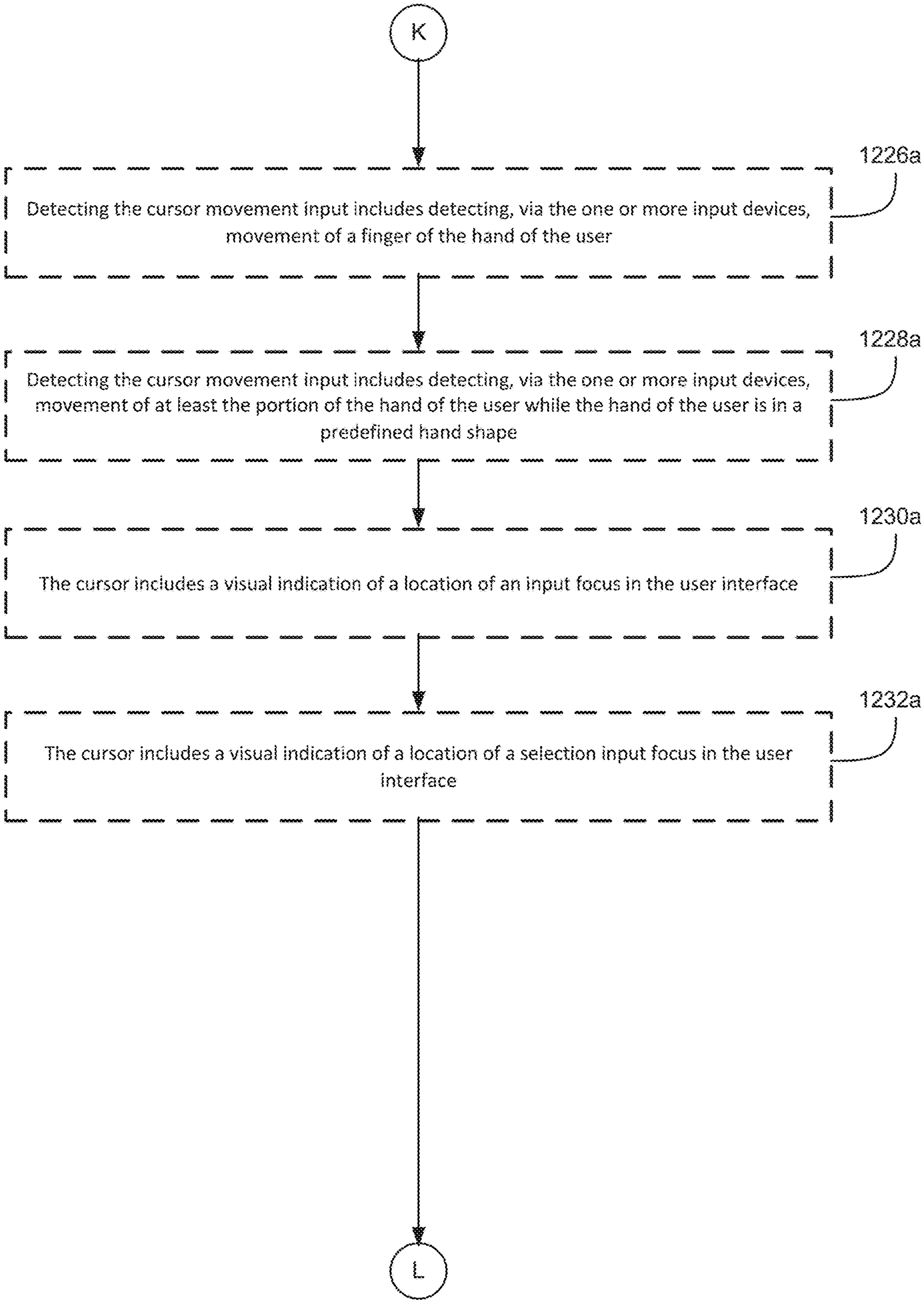
Figure 12M:
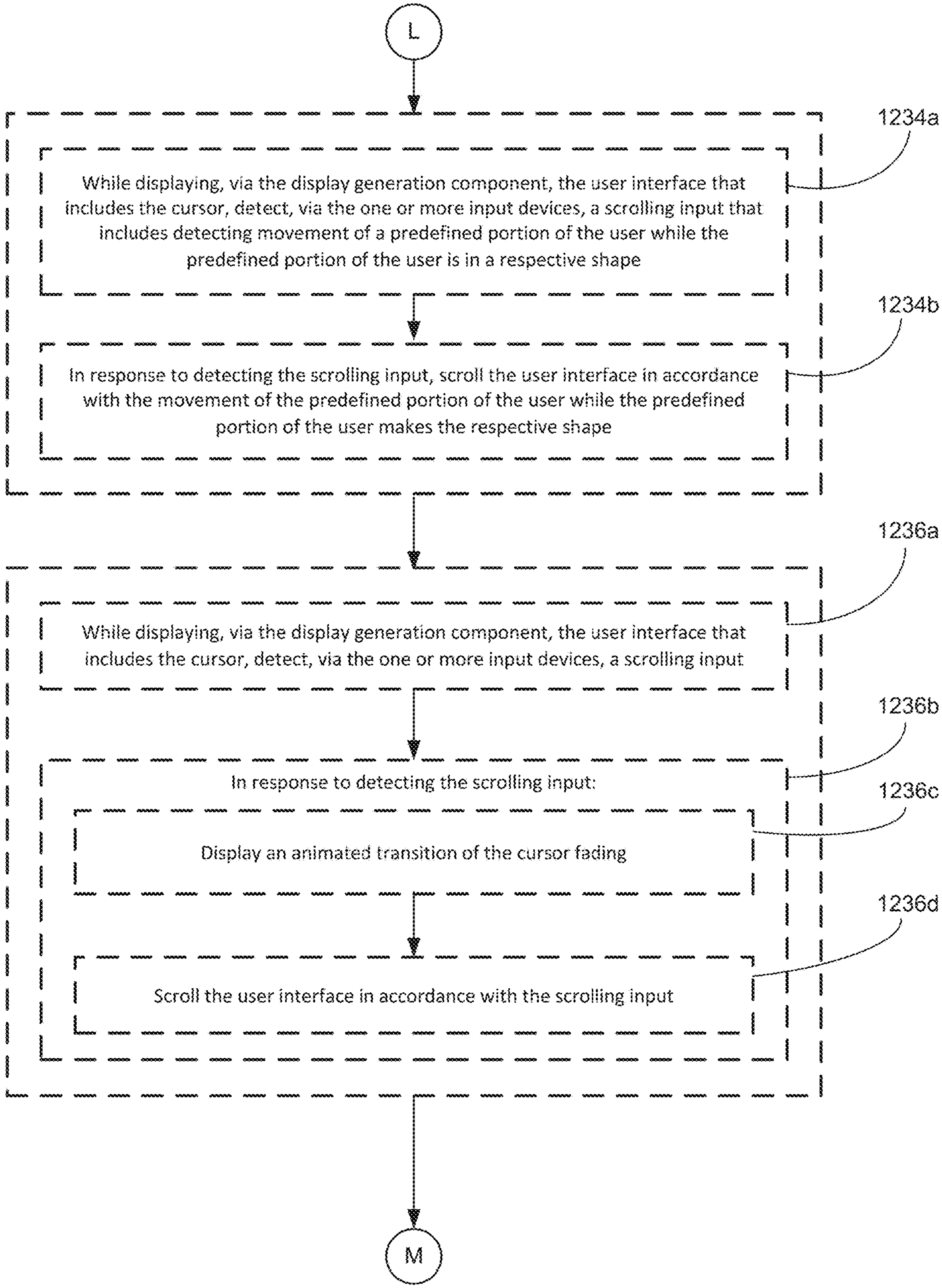
Figure 12N:
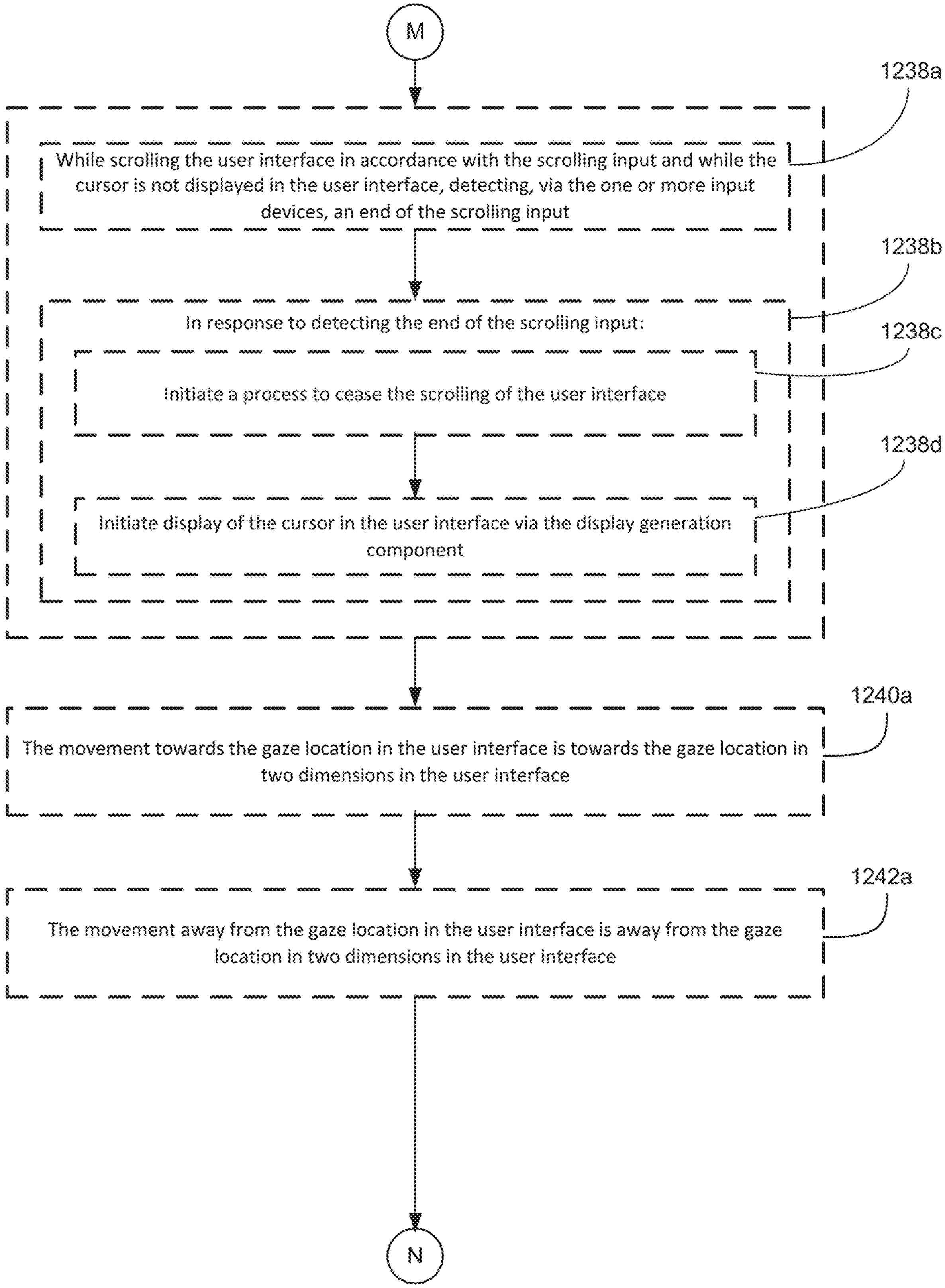
Figure 12O:
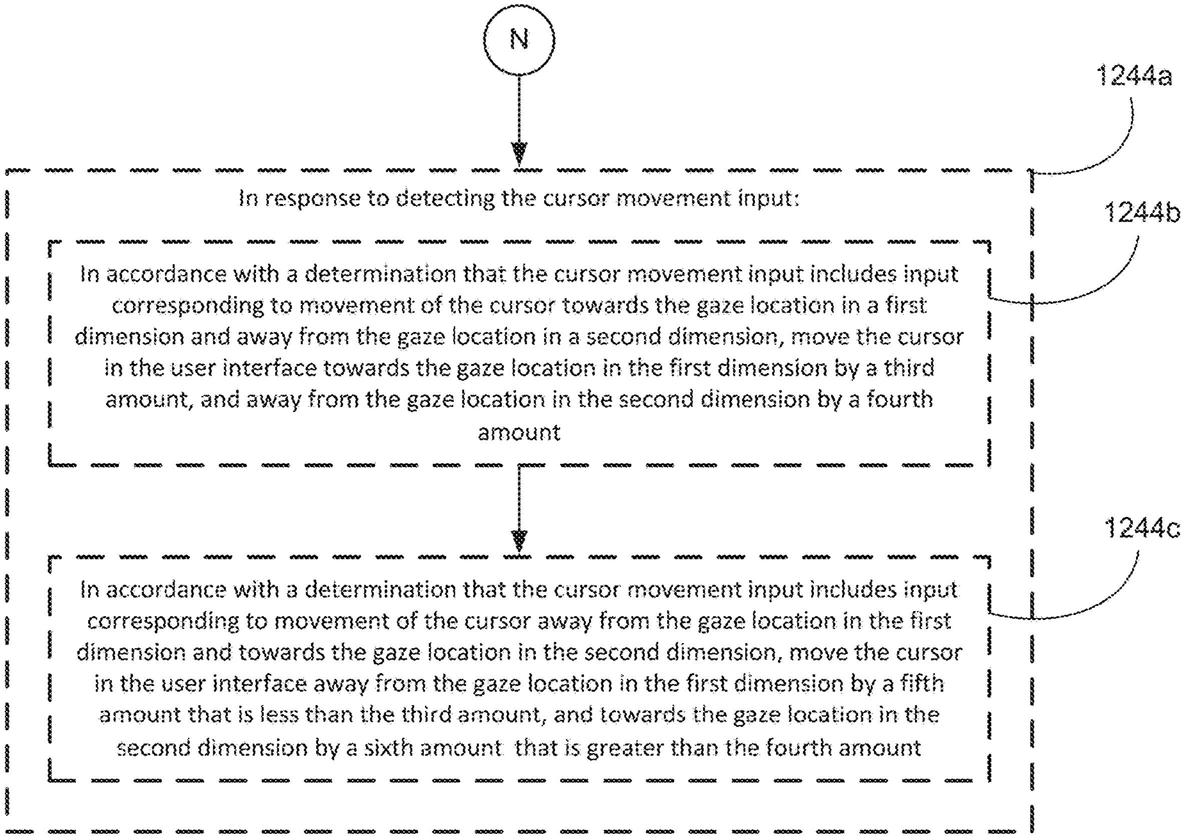

FIG. 11A illustrates an electronic device 101 displaying, via a display generation component (e.g., display generation component 120 of FIG. 1), a three-dimensional environment 1102 from a viewpoint of a user of the electronic device 101. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user (e.g., one or more hands of the user) while the user interacts with the electronic device 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 11A, device 101 captures one or more images of the physical environment around device 101 (e.g., operating environment 100), including one or more objects in the physical environment around device 101. In some embodiments, device 101 displays representations of the physical environment in three-dimensional environment 1102. For example, three-dimensional environment 1102 includes a representation of a sofa (partially occluded by object 1104*c*), which is optionally a representation of a physical sofa in the physical environment; three-dimensional environment 1102 also includes a representation of a table (e.g., partially occluded by object 1104*b*), which is optionally a representation of a physical table in the physical environment. Three-dimensional environment 1102 also includes representations of the physical floor, ceiling and back and side walls of the room in which device 101 is located.

In FIG. 11A, three-dimensional environment 1102 also includes virtual objects 1104*a*, 1104*b* and 1104*c*. Virtual objects 1104*a*, 1104*b* and 1104*c* are optionally one or more of user interfaces of applications (e.g., messaging user interfaces, content browsing user interfaces, etc.), three-dimensional objects (e.g., virtual clocks, virtual balls, virtual cars, etc.), representations of content (e.g., representations of photographs, videos, movies, music, etc.) or any other element displayed by device 101 that is not included in the physical environment of device 101. In FIG. 11A, virtual objects 1104*a*, 1104*b* and 1104*c* are two-dimensional objects, but the examples described herein could apply analogously to three-dimensional objects. Further, in some embodiments, device 101 does not display objects 1104*a*, 1104*b* and 1104*c* concurrently; in such embodiments, the below-described interactions with objects 1104*a*, 1104*b* and 1104*c* optionally occur independently.

In FIG. 11A, object 1104*a* includes cursors 1106*a* and 1106*b*, object 1104*b* includes cursor 1106*c*, and object 1104*c* includes indication 1112*b* (e.g., which is optionally operating as a content selection cursor, as will be described in more detail below and which is also described in the FIG. 9 series of figures). Just as objects 1104*a*, 1104*b* and 1104*c* are not necessarily concurrently displayed by device 101, cursors 1106*a*-*d* are also optionally not concurrently displayed by device 101. In such embodiments, device 101 optionally performs the cursor operations described below independently.

Figure 11B:
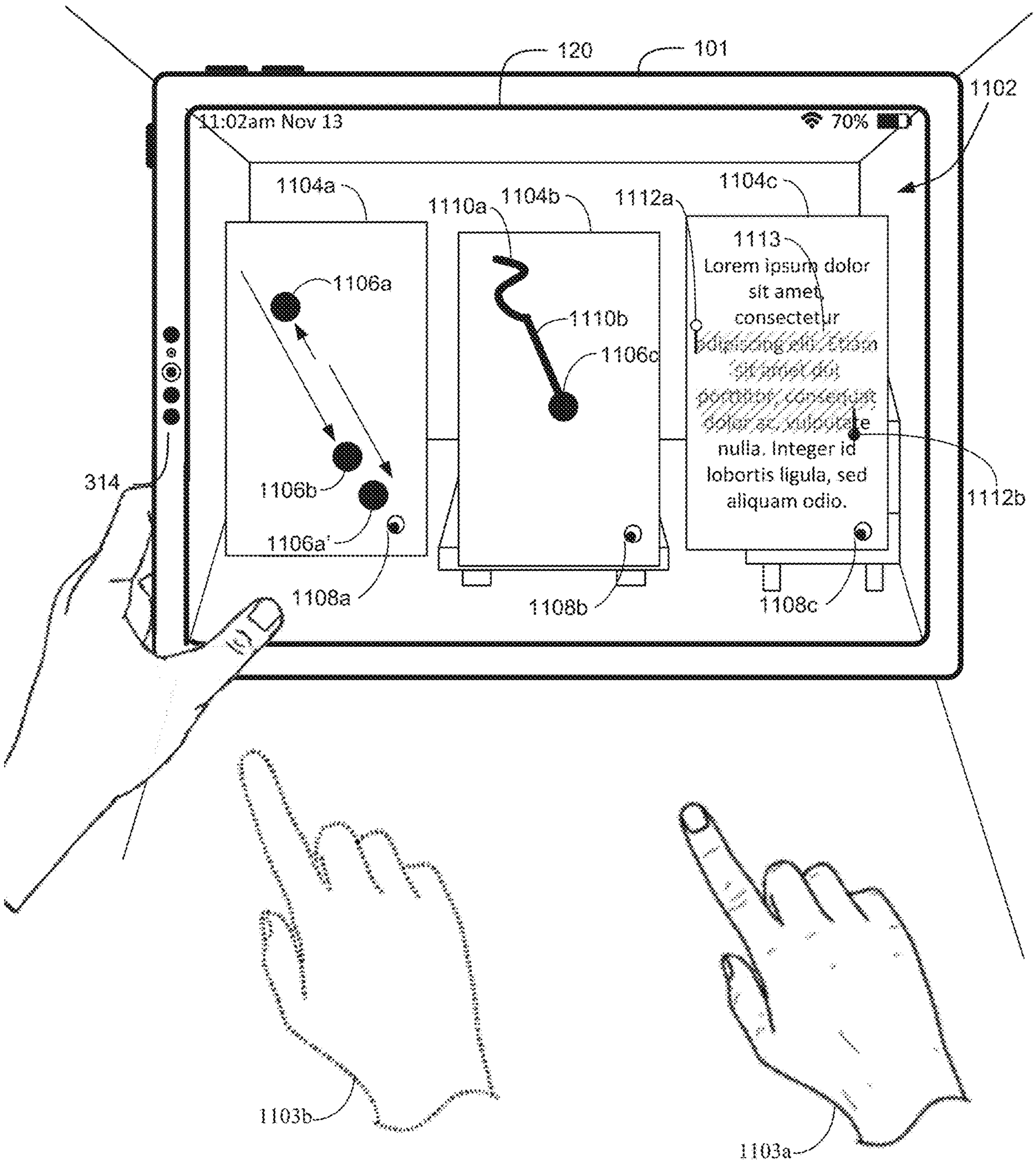
Figure 11C:
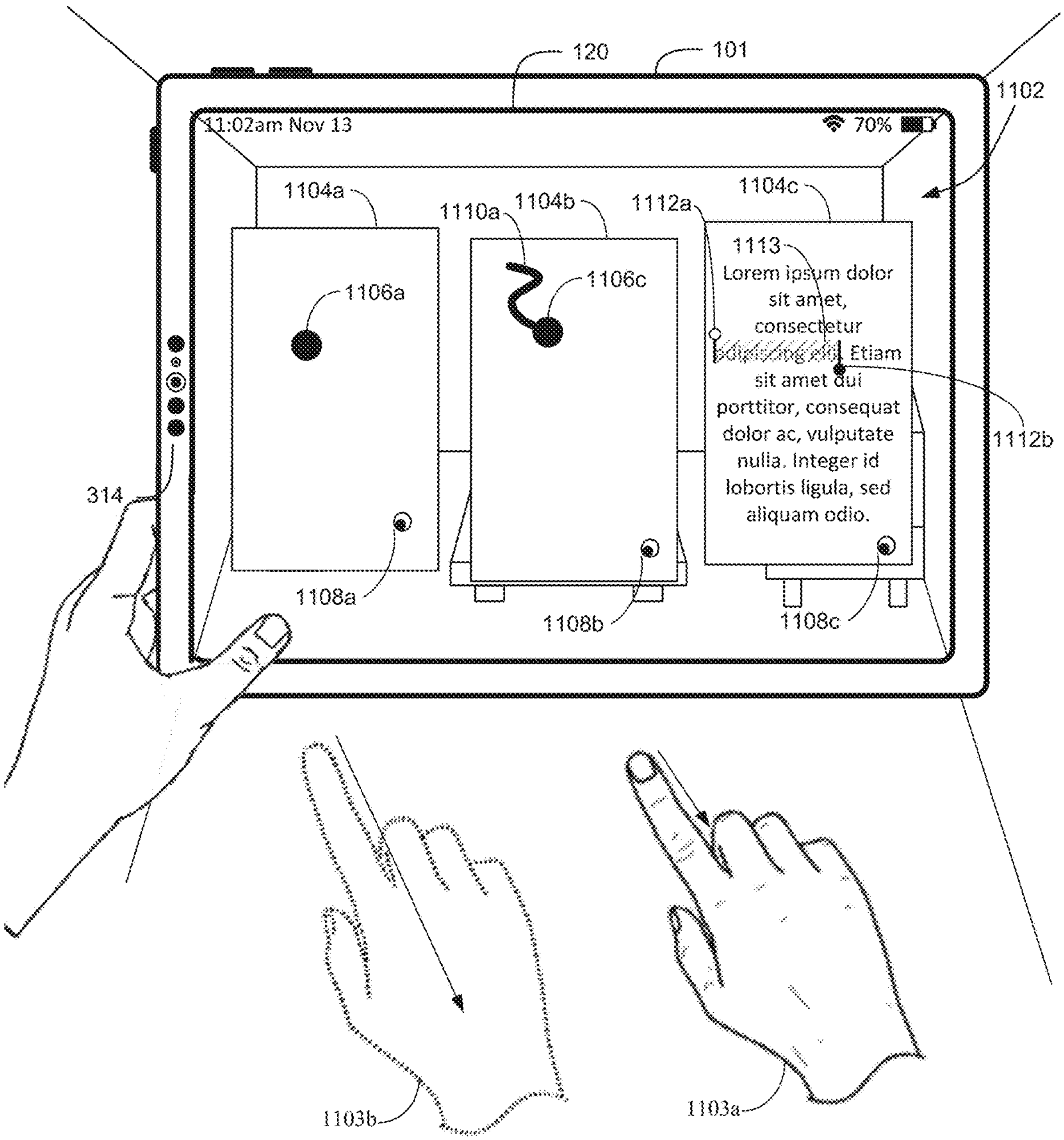

Device 101 optionally facilitates movement of cursors differently depending on whether the cursors are moving towards a gaze of the user of device 101 and/or depending on the operation being controlled and/or performed by the cursors during the movement. Such examples will now be described. In FIG. 11A, device 101 is detecting a first cursor movement input from hand 1103*a*, and a second cursor movement input from hand 1103*b*. It should be understood that while multiple hands and corresponding inputs are illustrated in FIGS. 11A-11C, such hands and inputs need not be detected by device 101 concurrently; rather, in some embodiments, device 101 independently responds to the hands and/or inputs illustrated and described in response to detecting such hands and/or inputs independently. The cursor movement input from hand 1103*a* optionally includes detecting hand 1103*a* in a pinch hand shape (e.g., with the thumb and the tip of the index finger of hand 1103*a* touching), and movement of hand 1103*a* in a downward and rightward direction while maintaining the pinch hand shape. The cursor movement input from hand 1103*b* optionally includes detecting hand 1103*b* in a pinch hand shape (e.g., with the thumb and the tip of the index finger of hand 1103*b* touching), and movement of hand 1103*b* in an upward and leftward direction while maintaining the pinch hand shape. The magnitudes of the movements of hands 1103*a* and 1103*b* are optionally the same.

The response of device 101 to the inputs from hand 1103*a* and/or 1103*b* optionally varies, as mentioned previously. For example, in FIG. 11A, cursors 1106*a* and 1106*b* are optionally not performing operations in object 1104*a* (e.g., not performing drawing or marking operations, not performing content selection operations, etc.). Therefore, in response to cursor movement inputs from hands 1103*a* or 1103*b*, device 101 optionally moves cursors 1106*a* and/or 1106*b* within object 1104*a* while those cursors do not perform operations in object 1104*a* other than being moved. In such a circumstance, device 101 optionally accelerates movement of a cursor that is towards a gaze of the user more than movement of a cursor that is away from the gaze of the user. Further, in some embodiments, device 101 optionally accelerates movement of a cursor that is towards the gaze of the user more the further the cursor is from the gaze of the user. For example, in FIG. 11A, gaze 1108*a* of the user is directed to the lower-right portion of object 1104*a*, and cursor 1106*a* is closer to gaze 1108*a* than cursor 1106*b*. In the example in which the input from hand 1103*a* is directed to cursor 1106*a* in FIG. 11A, device 101 moves cursor 1106*a* a moderate distance (e.g., towards gaze 1108*a*) in accordance with the movement of hand 1103*a*, as shown by cursor 1106*a*' in FIG. 11B. However, in the example in which the same input from hand 1103*a* is directed to cursor 1106*b* in FIG. 11B, device 101 moves cursor 1106*b* a relatively large distance (e.g., towards gaze 1108*a*) in accordance with the movement of hand 1103*b*, as shown in FIG. 11B. Device 101 optionally moves cursor 1106*b* more than cursor 1106*a* in response to the same magnitude of movement of hand 1103*a*, because cursor 1106*b* was further from gaze 1108*a* than cursor 1106*a*. Thus, device 101 optionally accelerates movement of a cursor towards gaze 1108*a* more the further the cursor is from gaze 1108*a*.

In contrast, in the example in which the input from hand 1103*b* is directed to cursor 1106*a* in FIG. 11A, device 101 moves cursor 1106*a* a relative small distance (e.g., away from gaze 1108*a*) in accordance with the movement of hand 1103*b*, as shown in FIG. 11B. Device 101 optionally moves cursor 1106*a* less than corresponding movements towards gaze 1108*a*, because device 101 either does not accelerate or decelerates movements of cursors away from gaze 1108*a*. In this way, device 101 facilitates quick and efficient movement of a cursor to a region of the three-dimensional environment 1102 to which the gaze of the user is currently directed.

As previously mentioned, in some embodiments, device 101 does not accelerate or decelerate movement of a cursor based on whether the cursor is being moved towards or away from the gaze of the user if the cursor is performing an operation (other than moving) in the three-dimensional environment 1102 while it is being moved. For example, in FIG. 11A, object 1104*b* includes cursor 1106*c*. Cursor 1106*c* is optionally performing marking operations in object 1104*b* (e.g., is creating marks in object 1104*b*) that correspond to the movement of cursor 1106*c*, and cursor 1106*c* has created marks 1110*a*. Gaze 1108*b* of the user is directed to the lower-right corner of object 1104*b*. In the example in which the input from hand 1103*a* is directed to cursor 1106*c* in FIG. 11A, device 101 moves cursor 1106*c* a distance (e.g., towards gaze 1108*b*) in accordance with the movement of hand 1103*a*, as shown in FIG. 11B. While moving, cursor 1106*c* has created marks 1110*b* in object 1104*b* in accordance with the movement of hand 1103*a*. The amount that cursor 1106*c* has moved in response to the input from hand 1103*a* is optionally less than the amounts that cursors 1106*a* and/or 1106*b* moved in response to the same input from hand 1103*a*, because although all three cursor movements are optionally toward the gaze of the user, cursor 1106*c* was performing a marking operation in object 1104*b* while moving whereas cursors 1106*a* and 1106*b* were not performing operations (other than moving) in object 1104*a* while moving. In this way, device 101 avoids potentially undesired results of operations performed by a cursor while moving the cursor in three-dimensional environment 1102.

Similarly, in FIG. 11A indication 1112*b* (operating at a content selection cursor) is also performing an operation in three-dimensional environment 1102. Specifically, object 1104*c* includes (e.g., text) content. A portion of the content has been highlighted/selected, indicated by highlighting 1113 (e.g., similar to highlighting 910*a* and/or 910*b* described with reference to FIGS. 9A-9D). Highlighting 1113 is displayed with indication 1112*a* at the beginning of the highlighting 1113, and indication 1112*b* at the end of the highlighting 1113. Indication 1112*a* is optionally selectable and movable to expand or contract highlighting 1113 of content from the start of highlighting 1113, and indication 1112*b* is optionally selectable and movable to expand or contract highlighting 1113 of content from the end of highlighting 1113. Indications 1112*a* and 1112*b* optionally have one or more of the characteristics of indications 912*a* and 912*b* described with reference to FIGS. 9A-9D. In FIG. 11A, indication 1112*b* is currently active (e.g., in a cursor control mode, operating like a cursor) such that cursor movement input directed to indication 1112*b* will cause highlighting 1113 to expand or contract from the end of highlighting 1113 in accordance with the cursor movement input.

In the example in which gaze 1108*c* of the user is directed to the lower-right corner of object 1104*c* and the input from hand 1103*a* is directed to indication 1112*b* in FIG. 11A, device 101 moves indication 1112*b* a distance (e.g., towards gaze 1108*c*) in accordance with the movement of hand 1103*a*, as shown in FIG. 11B. While moving, indication 1112*b* has expanded selection 1113 downward and rightward in accordance with the movement of hand 1103*a*. The amount that indication 1112*b* has moved in response to the input from hand 1103*a* is optionally less than the amounts that cursors 1106*a* and/or 1106*b* moved in response to the same input from hand 1103*a*—and is optionally the same amount that cursor 1106*c* moved in response to the same input from hand 1103*a*—because although all three cursor movements are optionally toward the gaze of the user, indication 1112*b* was performing a content selection operation in object 1104*c* while moving whereas cursors 1106*a* and 1106*b* were not performing operations (other than moving) in object 1104*a* while moving. In this way, device 101 avoids potentially undesired results of operations performed by a cursor while moving the cursor in three-dimensional environment 1102.

It should be understood that, in some embodiments, one or more of the techniques described above with reference to gaze location are performed with respect to attention location. In some embodiments, the attention location is a location in the three-dimensional environment at which the user is paying attention according to the criteria described above. Additional example techniques will now be described with reference to FIGS. 11C-11G with respect to attention location. In some embodiments, these techniques described with reference to attention location are performed with respect to gaze location.

FIG. 11C illustrates the computer system 101 displaying object 1104*a* with cursor 1106*a*, object 1104*b* with drawing 1110*a* and cursor 1106*c*, and object 1104*c* with highlighting 1113 and indications 1112*a* and 1112*b*. As described above, in some embodiments, the computer system 101 displays one or two of objects 1104*a*, 1104*b*, and/or 1104*c* without displaying objects 1104*a*, 1104*b*, and 1104*c* concurrently. In some embodiments, the computer system 101 displays objects 1104*a*, 1104*b*, and 1104*c* concurrently. For brevity, FIGS. 11C-11G illustrate the computer system performing operations in response to one or more inputs with respect to objects 1104*a*, 1104*b*, or 1104*c* concurrently. In some embodiments, in response to receiving a cursor movement input, the computer system 101 manipulates one of cursor 1106*a* or 1106*c* or indication 1112*a* or 1112*b* depending on which object 1104*a*, 1104*b*, or 1104*c* has the current focus of the computer system 101. While displaying the objects 1104*a*, 1104*b*, and 1104*c*, the computer system 101 receives a cursor movement input, such as the cursor movement input provided by hand 1103*a* or the cursor movement input provided by hand 1103*b*. In some embodiments, the computer system 101 receives the inputs provided by hands 1103*a* and 1103*b* sequentially, rather than simultaneously. In some embodiments, the computer system 101 receives a cursor movement input similar to the input provided by hand 1103*a* or the input provided by hand 1103*b*.

In FIG. 11C, detecting the cursor movement inputs provided by hands 1103*a* and 1103*b* include detecting the user make a pinch hand shape with hand 1103*a* or hand 1103*b* and move the hand 1103*a* or 1103*b* as illustrated in FIG. 11C while holding the pinch hand shape. For example, the cursor movement input provided by hand 1103*a* includes movement of the hand 1103*a* while the hand 1103*a* is in the pinch hand shape that is down and to the right by a respective magnitude. As another example, the cursor movement input provided by hand 1103*b* includes movement of the hand 1103*b* while the hand 1103*b* is in the pinch hand shape that is down and to the right by a magnitude that is greater than the respective magnitude of the hand movement of the cursor movement input provided by hand 1103*a*. In some embodiments, detecting the cursor movement input includes detecting movement of a finger of hand 1103*a* or hand 1103*b*. For example, the computer system 101 detects the movement of the finger of the hand 1103*a* or 1103*b* while the hand 1103*a* or 1103*b* is in the pinch hand shape. As another example, detecting the cursor movement input includes detecting the user make a pointing hand shape with hand 1103*a* or 1103*b* in which one or more fingers are extended and one or more fingers are curled towards the palm and movement of the hand 1103*a* or 1103*b* while in the pointing hand shape. In some embodiments, in response to detecting the cursor movement input in this way, the computer system 101 moves the cursor 1106*a* or 1106*c* or indication 1112*a* or 1112*b* in accordance with the movement of the extended finger while the hand 1103*a* or 1103*b* is in the pointing hand shape. As described above with reference to FIGS. 11A-11B, in response to the cursor movement input provided by hand 1103*a* or hand 1103*b*, the computer system 101 moves cursor 1106*a* or 1106*c* or indication 1112*a* or 1112*b* in accordance with the direction and magnitude of the movement of hand 1103*a* or 1103*b*. For example, FIG. 11D illustrates movement of cursors 1106*a* and 1106*c* and indication 1112*b* in response to the cursor movement input provided by hand 1103*a* and the cursor movement input provided by hand 1103*b* illustrated in FIG. 11C.

Figure 11D:
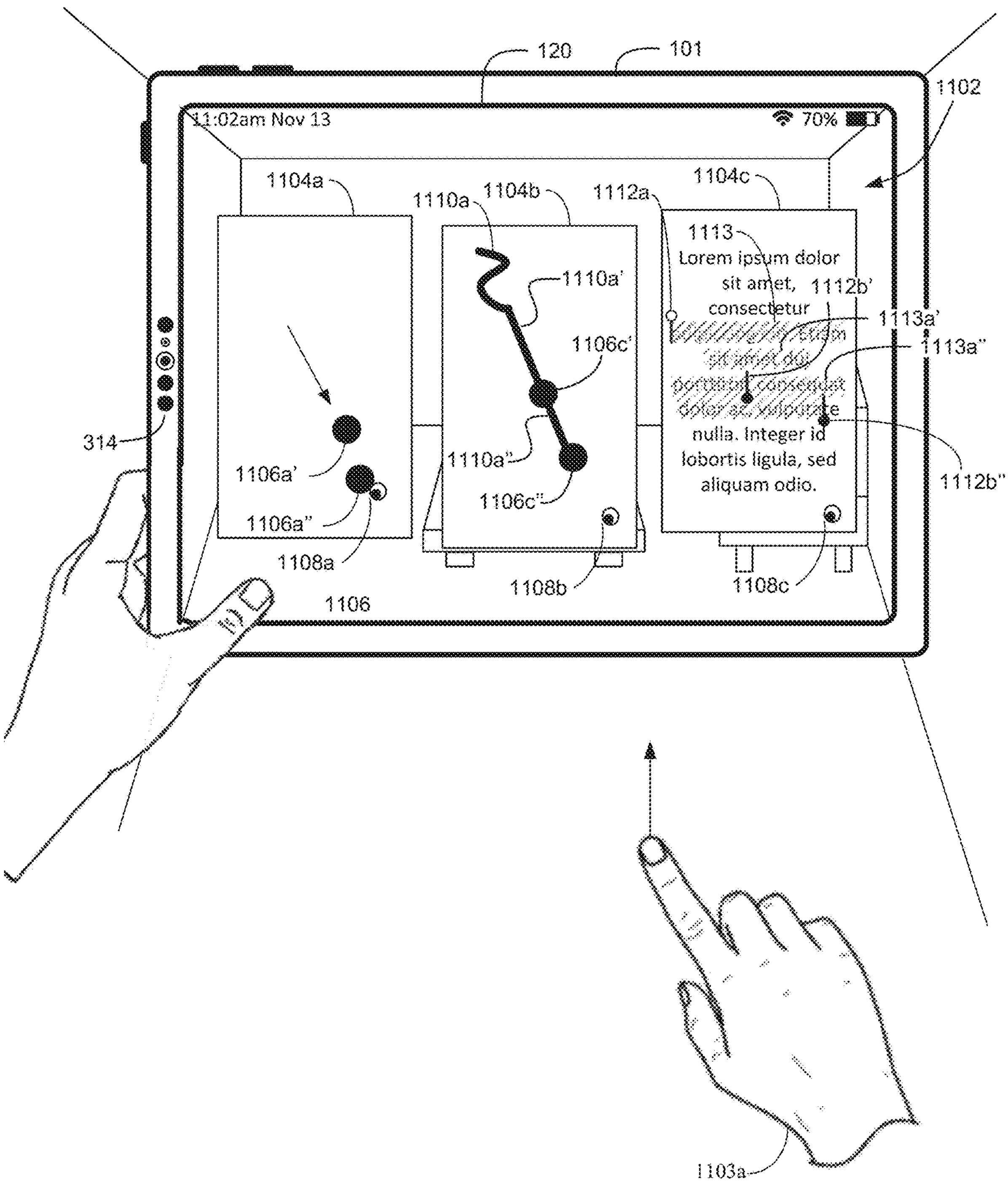

FIG. 11D illustrates movement of cursors 1106*a* and 1106*c* and indication 1112*b* in response to the cursor movement input provided by hand 1103*a* and the cursor movement input provided by hand 1103*b* illustrated in FIG. 11C. In response to the cursor movement input provided by hand 1103*a* in FIG. 11C, the computer system 101 moves cursor 1106*a* from the position illustrated in FIG. 11C to position of cursor 1106*a*' illustrated in FIG. 11D. In response to the cursor movement input provided by hand 1103*b* in FIG. 11C, the computer system 101 moves cursor 1106*a* from the position illustrated in FIG. 11C to position of cursor 1106*a*"

illustrated in FIG. 11D. In some embodiments, because the amount of movement of hand 1103*b* is greater than the amount of movement of hand 1103*a* in FIG. 11C, cursor 1106*a*" moves a greater distance from the location of cursor 1106*a* in FIG. 11C than the movement of cursor 1106*a*'. In some embodiments, the movement of hands 1103*a* and 1103*b* are towards an attention location 1108*a* in the object 1104*a*, so the amount of movement of cursor 1106*a* is increased from an amount that corresponds to the amount of movement of hand 1103*a* or 1103*b* if acceleration were not applied.

In response to the cursor movement input provided by hand 1103*a* in FIG. 11C, the computer system 101 moves cursor 1106*c* from the position illustrated in FIG. 11C to position of cursor 1106*c*' illustrated in FIG. 11D and adds drawing 1110*a*' to object 1104*b*. In response to the cursor movement input provided by hand 1103*b* in FIG. 11C, the computer system 101 moves cursor 1106*c* from the position illustrated in FIG. 11C to position of cursor 1106*c*" illustrated in FIG. 11D and adds drawing 1110*a*' and 1110*a*" to object 1104*b*. In some embodiments, because the amount of movement of hand 1103*b* is greater than the amount of movement of hand 1103*a* in FIG. 11C, cursor 1106*c*" moves a greater distance from the location of cursor 1106*c* in FIG. 11C than the movement of cursor 1106*c*' and drawing 1110*a*" adds length to drawing 1110*a*'. In some embodiments, the movement of hands 1103*a* and 1103*b* are towards an attention location 1108*b* in the object 1104*b*, so the amount of movement of cursor 1106*c* is increased from an amount that corresponds to the amount of movement of hand 1103*a* or 1103*b* if acceleration were not applied. In some embodiments, because the user is drawing with cursor 1106*c*, the computer system does not accelerate cursor 1106*c* movement towards attention location 1108*b*.

In response to the cursor movement input provided by hand 1103*a* in FIG. 11C, the computer system 101 moves indication 1112*b* from the position illustrated in FIG. 11C to position of indication 1112*b*' illustrated in FIG. 11D and adds highlighting 1113*a*' to object 1104*c*. In response to the cursor movement input provided by hand 1103*b* in FIG. 11C, the computer system 101 moves indication 1112*b* from the position illustrated in FIG. 11C to position of indication 1112*b*" illustrated in FIG. 11D and adds highlighting 1113*a*' and 1113*a*" to object 1104*c*. In some embodiments, because the amount of movement of hand 1103*b* is greater than the amount of movement of hand 1103*a* in FIG. 11C, indication 1112*b*" moves a greater distance from the location of indication 1112*b* in FIG. 11C than the movement of indication 1112*b*' and highlighting 1113*a*" adds content to highlighting 1113*a*'. In some embodiments, the movement of hands 1103*a* and 1103*b* are towards an attention location 1108*c* in the object 1104*b*, so the amount of movement of cursor 1106*c* is increased from an amount that corresponds to the amount of movement of hand 1103*a* or 1103*b* if acceleration were not applied. In some embodiments, while selecting text, as is the case in object 1104*c*, the computer system 101 does not apply acceleration towards the attention location 1108*c*, and moves the indication 1112*b* in accordance with the amount of movement of the hand 1103*a* or 1103*b* independent from the gaze location 1108*c*.

Thus, in some embodiments, as described above with reference to FIGS. 11A-11D, the computer system 101 accelerates movement of a cursor 1106*a* or 1106*c* or indication 1112*a* or 1112*b* towards a location in the user interface to which the user is looking or paying attention. Additionally or alternatively in some embodiments, the computer system 101 accelerates or restricts cursor or indication movement within a region of the environment to which a portion of the user's body is pointing, such as a region to which the user's forearm is pointing. For example, if the user initiates the cursor movement input(s) shown in FIG. 11C while the forearm is pointed towards attention location 1108*a*, the cursor 1106*a* would optionally move in accordance with movement of hand 1103*a* or hand 1103*b* by a larger magnitude (e.g., of speed, distance, and/or duration) than would be the case if the cursor movement input is initiated while the forearm is pointed at the location of cursor 1106*a* in FIG. 11C. As another example, if the user moves hand 1103*a* or hand 1103*b* as shown in FIG. 11C while the forearm of the user is pointing at the location of cursor 1106*a*, the computer system 101 optionally would not move the cursor 1106*a* outside of a region of the three-dimensional environment to which the forearm is pointing, resulting in the cursor 1106*a* moving a smaller distance than moving to the location of cursor 1106*a*' or 1106*a*" in FIG. 11D. As another example, if the user moves their forearm in a coordinated manner with hand 1103*a* or hand 1103*b* in FIG. 11C such that the forearm remains pointed towards the cursor 1106*a* while the cursor movement input is received, the computer system 101 optionally moves the cursor 1106*a* in accordance with the movement of the hand 1103*a* or 1103*b* and the attention location 1108*a* without additional acceleration or restriction based on the forearm of the user because the forearm remains pointed at the cursor 1106*a* while the cursor moves.

In some embodiments, the computer system 101 determines a location and/or region in the user interface to which the forearm is pointing by following a vector from the user's elbow to the user's wrist to a location and/or region in the user interface. In some embodiments, the location is a discrete location. In some embodiments, the region is a region with a predefined size (e.g., height, width, diameter), such as 10, 20, 30, 50, 100, 200, or 500 centimeters or 1, 2, 3, 5, or 10 meters. In some embodiments, the size of the region depends on the distance between the forearm of the user and the region of the user interface, such as basing the size of the region on a cone-shaped projection from the wrist of the user in the direction in which the forearm of the user is pointing. In some embodiments, the cone has an angle of 0.1, 0.2, 0.3, 0.5, 1, 2, 3, 5, 10, 15, or 30 degrees. For example, if the region is relatively close to the forearm of the user, the region is smaller than the region would be if it was relatively far from the forearm of the user.

In some embodiments, accelerating movement of cursors 1106*a*', 1106*a*", 1106*c*', and 1106*c*" and indications 1112*a*, 1112*b*', and 1112*b*" with respect to the location of the user's gaze, attention, or where the forearm of the user is pointing includes simulating a physical property between the cursors 1106*a*', 1106*a*", 1106*c*', and 1106*c*" and indications 1112*a*, 1112*b*', and 1112*b*" and location of the user's gaze, attention, or where the forearm of the user is pointing. In some embodiments, the simulated physical property is gravity, magnetism, inertia, or electric potential. For example, when moving a cursor with simulated magnetism relative to a location to which the user is paying attention, the simulated magnetism is stronger (e.g., there is more cursor acceleration) when the cursor is closer to the attention location than is the case when the cursor is further from the attention location.

Figure 11E:
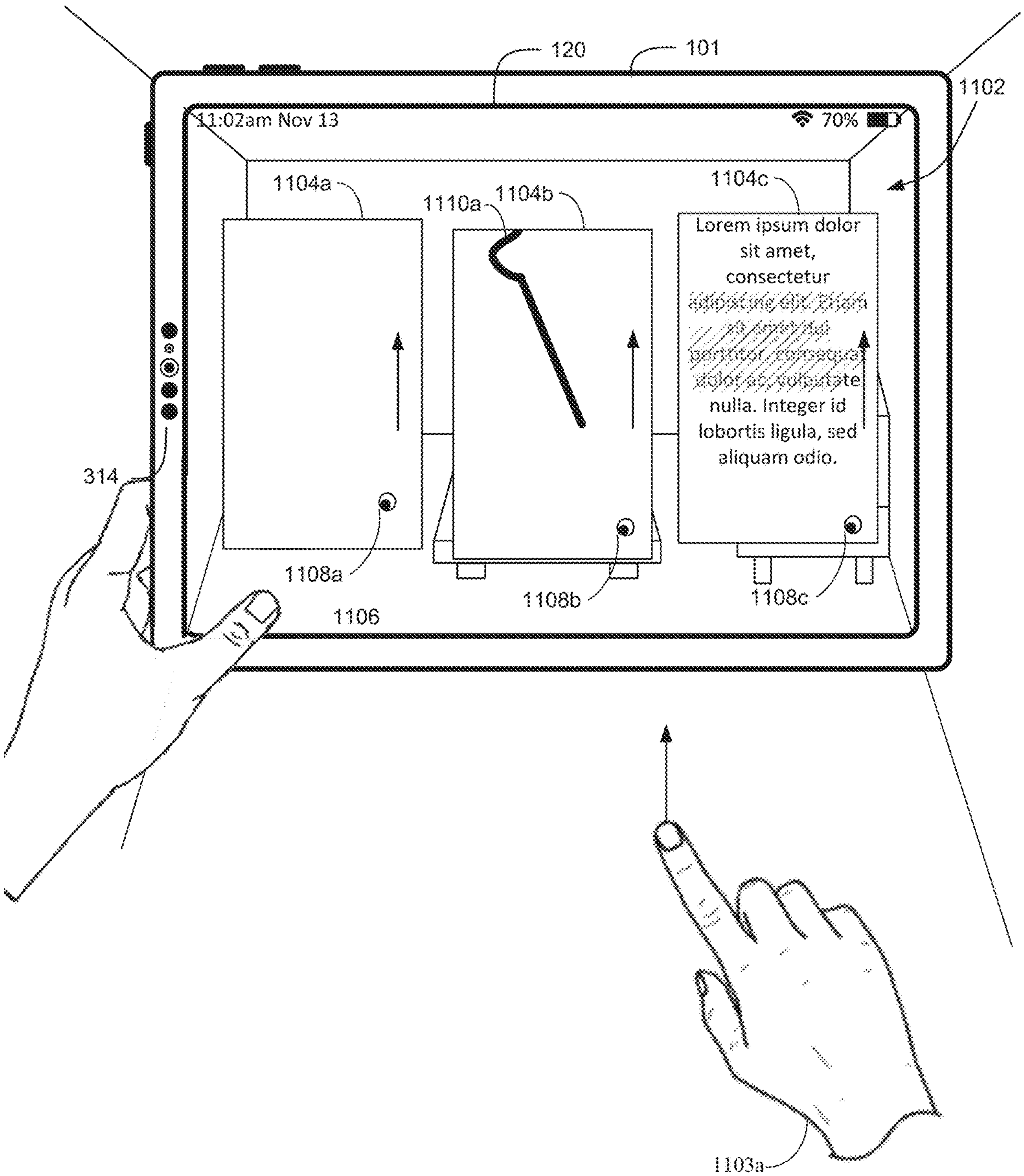

In FIG. 11D, the computer system 101 receives a scrolling input including movement of hand 1103*a*. In some embodiments, detecting the scrolling input includes detecting that one or more criteria are satisfied that distinguish scrolling inputs from cursor movement inputs. For example, the computer system 101 detects the scrolling input being provided with a first hand whereas cursor movement inputs are provided with a second hand. As another example, detecting the scrolling input includes detecting the user hold the pinch hand shape without moving the hand more than a threshold amount for a threshold time, whereas cursor movement inputs include movement of the hand by more than the threshold amount within the threshold time. Example time thresholds are included in the description of method 1200 below. In some embodiments, in response to receiving the scrolling input illustrated in FIG. 11D, the computer system 101 scrolls the contents of object 1104*a*, 1104*b*, or 1104*c* and ceases display of cursors 1106*a*', 1106*a*", 1106*c*', and 1106*c*" and indications 1112*a*, 1112*b*', and 1112*b*" as shown in FIG. 11E. In some embodiments, ceasing display of cursors 1106*a*', 1106*a*", 1106*c*', and 1106*c*" and indications 1112*a*, 1112*b*', and 1112*b*" includes displaying an animated transition of the cursors 1106*a*', 1106*a*", 1106*c*', and 1106*c*" and indications 1112*a*, 1112*b*', and 1112*b*" fading (e.g., decreasing in translucency, changing color, and/or shrinking in size).

FIG. 11E illustrates the computer system 101 scrolling the contents of objects 1104*a*, 1104*b*, and 1104*c* without displaying cursors 1106*a*', 1106*a*", 1106*c*', and 1106*c*" and indications 1112*a*, 1112*b*', and 1112*b*" in response to the scrolling input illustrated in FIG. 11E. As shown in FIG. 11E, in response to the scrolling input in FIG. 11D, the computer system 101 scrolls the drawing 1110*a* in object 1104*b* and the text and highlighting in object 1104*c* by a direction and amount (e.g., of distance, speed, and/or duration) that corresponds to the direction and amount of movement of hand 1103*a* in FIG. 11D. If object 1104*a* had contents, in some embodiments, the computer system 101 would scroll the contents of object 1104*a* in accordance with the scrolling input in a manner similar to how the computer system 101 scrolls the contents of objects 1104*b* and 1104*c* as shown in FIG. 11E. The computer system 101 ceases display of cursors 1106*a*', 1106*a*", 1106*c*', and 1106*c*" and indications 1112*a*, 1112*b*', and 1112*b*" in FIG. 11E in response to the scrolling input in FIG. 11E.

FIG. 11E shows the computer system 101 continuing to detect the scrolling input provided by hand 1103*a*. In some embodiments, the computer system 101 continues to forgo display of the cursors 1106*a*', 1106*a*", 1106*c*', and 1106*c*" and indications 1112*a*, 1112*b*', and 1112*b*" and to scroll the contents of objects 1104*a*, 1104*b*, and 1104*c* in accordance with further movement of hand 1103*a* while the scrolling input continues to be detected. In some embodiments, the computer system 101 detects the end of the scrolling input, including detecting the hand 1103*a* cease to make the pinch hand shape. In some embodiments, in response to detecting the end of the scrolling input, the computer system 101 ceases to scroll the contents of objects 1104*a*, 1104*b*, and 1104*c* in accordance with further movement of hand 1103*a* while the hand 1103*a* is not in the pinch hand shape and resumes display of cursors 1106*a*', 1106*a*", 1106*c*', and 1106*c*" and indications 1112*a*, 1112*b*', and 1112*b*".

In some embodiments, resuming display of cursors 1106*a*', 1106*a*", 1106*c*', and 1106*c*" and indications 1112*a*, 1112*b*', and 1112*b*" includes displaying an animated transition of cursors 1106*a*', 1106*a*", 1106*c*', and 1106*c*" and indications 1112*a*, 1112*b*', and 1112*b*" fading into view (e.g., by decreasing translucency, increasing size, and/or changing color). In some embodiments, the computer system 101 initiates display of cursors 1106*a*', 1106*a*", 1106*c*', and 1106*c*" and indications 1112*a*, 1112*b*', and 1112*b*" in response to detecting the end of the scrolling input at the same locations in the three-dimensional environment, the objects 1104*a*, 1104*b*, and 1104*c*, the contents of the objects 1104*a*, 1104*b*, and 1104*c*, or the display generation component 101 as their respective locations when the computer system 101 detected the scrolling input.

Figure 11F:
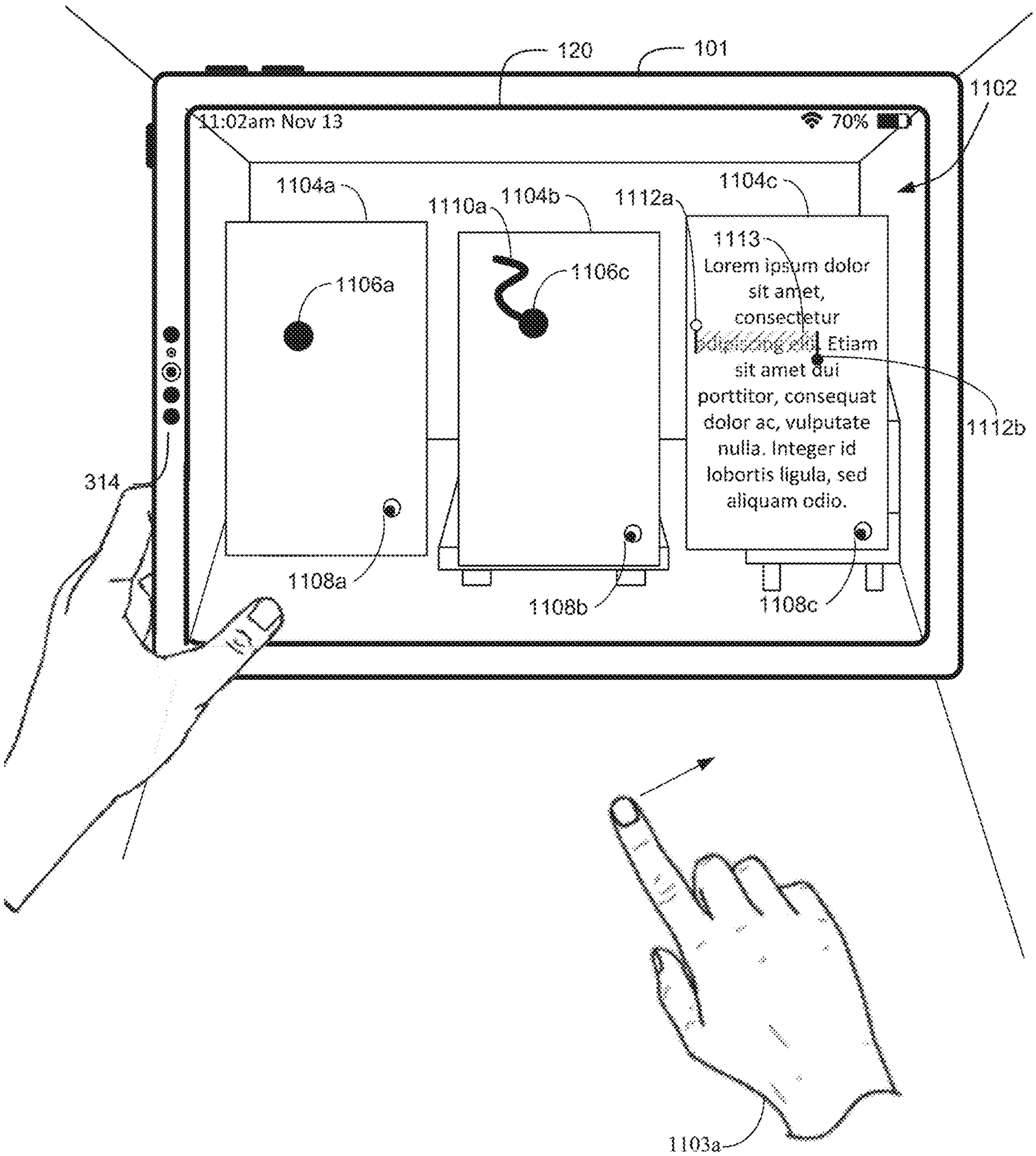
Figure 11G:
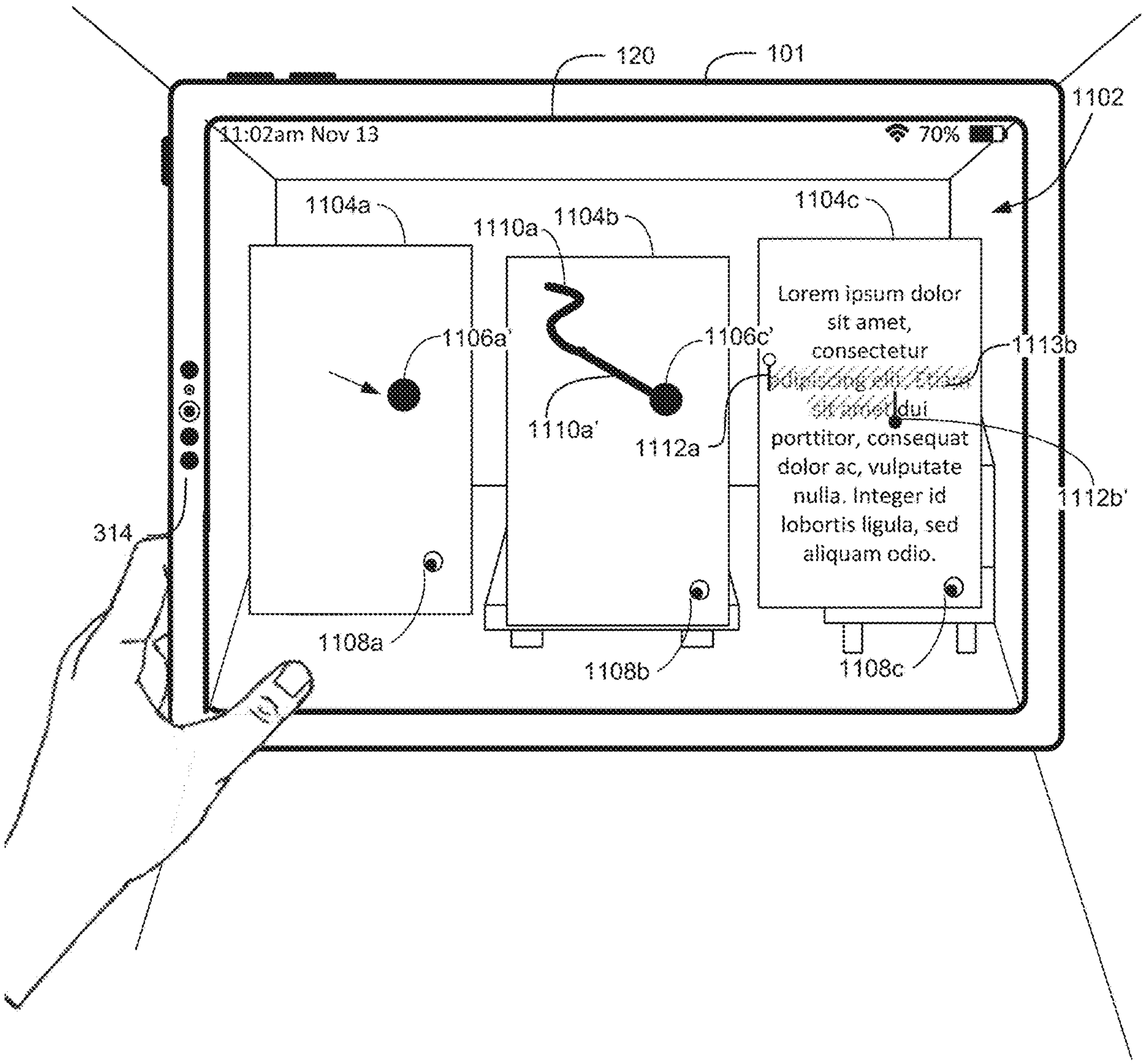

FIG. 11F illustrates the computer system 101 receiving a cursor movement input provided by hand 1103*a* that corresponds to moving cursor 1106*a*, cursor 1106*c*, indication 1112*a*, and/or indication 1112*b* towards the attention location 1108*a*, 1108*b*, or 1108*c*, respectively, in the horizontal direction and away from the attention location 1108*a*, 1108*b*, or 1108*c*, respectively, in the vertical direction. In some embodiments, in response to detecting a cursor movement input that corresponds to movement of the cursor away from attention location in a first dimension and towards the attention location in the second dimension, the computer system 101 accelerates movement of the cursor towards the attention location, resulting in the cursor moving in a direction different from the direction of movement of hand 1103*a*. For example, in response to the cursor movement input illustrated in FIG. 11F, the computer system 101 moves the cursor 1106*a*, cursor 1106*c*, and indication 1112*b* as shown in FIG. 11G. In some embodiments, the computer system 101 accelerates portions of the movement that are towards the attention location but does not accelerate portions of the movement that are away from the attention location.

FIG. 11G illustrates movement of cursors 1106*a* and 1106*c* and indication 1112*b* to the locations of cursors 1106*a*' and 1106*c*' and indication 1112*b*' in response to the cursor movement input illustrated in FIG. 11F. As shown in FIG. 11G, the computer system 101 accelerates the movement of cursor 1106*a*' towards attention location 1108*a*, the movement of cursor 1106*c*' towards attention location 1108*b*, and the movement of indication 1112*b*' towards attention location 1108*c*, including increasing the amount of horizontal movement corresponding to the direction of horizontal movement of hand 1103*a* in FIG. 11F and decreasing the amount of vertical movement corresponding to the direction of vertical movement of hand 1103*a* in FIG. 11F. As shown in FIG. 11G, accelerating cursors 1106*a*' and 1106*c*' and indication 1112*b*' towards attention locations 11080*a*, 1108*b*, and 1108*c*, respectively, distorts the direction of movement of the cursors down and towards the right. In some embodiments, the computer system 101 accelerates the cursor movement in the direction towards the attention location without accelerating the cursor movement in the direction away from the attention location, such as moving cursors 1106*a*' and 1106*c*' and indication 1112*b*' up and to the right, with more movement to the right than would be the case if the movement of cursors 1106*a*' and 1106*c*' and indication 1112*b*' was not accelerated towards attention locations 1108*a*, 1108*b*, and 1108*c*.

FIGS. 12A-12O is a flowchart illustrating a method 1200 of facilitating cursor movement in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In some embodiments, method 1200 is performed at an electronic device (e.g., 101) in communication with a display generation component (e.g., 120) and one or more input devices (e.g., 314). For example, a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, while displaying, via the display generation component, a user interface that includes a cursor (e.g., a cursor such as described with reference to methods 800 and/or 1000 displayed in a user interface such as described with reference to methods 800 and/or 1000. In some embodiments, the user interface is a drawing and/or content creation user interface in which the cursor is used to create content (e.g., create a drawing or representation based on the movement of the cursor, such as a curved line or any other line or shape corresponding to such movement of the cursor). In some embodiments, user interface is or is displayed in a three-dimensional environment that is generated, displayed, or otherwise caused to be viewable by the device (e.g., a computer-generated reality (CGR) environment such as a virtual reality (VR) environment, a mixed reality (MR) environment, or an augmented reality (AR) environment, etc.).), the electronic device detects (1202*a*), via the one or more input devices, a cursor movement input corresponding to a first movement value, such as from hands 1103*a* or 1103*b* in FIG. 11A (e.g., the cursor movement input is optionally detection of a hand of a user of the electronic device performing a pinch gesture (e.g., the tip of the thumb touching the tip of the index finger), and while maintaining the pinch hand shape, moving the hand. In some embodiments, such an input causes the cursor to draw into the user interface in accordance with the movement of the hand). In some embodiments, if the hand of the user has not performed the pinch gesture and/or is not holding the pinch hand shape when the movement of the hand is detected, the electronic device moves the cursor in accordance with the movement of the hand without drawing content in the user interface in accordance with the movement of the hand. In some embodiments, the cursor movement input is movement of a finger on a physical touch-sensitive surface in communication with the electronic device (e.g., a trackpad). In some embodiments, the cursor movement input is movement of a finger on (e.g., while the finger is in contact with or within a threshold distance of—such as 0.1, 0.2, 0.5, 1, 2, 5, or 10 cm—a surface of) a virtual touch-sensitive surface that is displayed in the user interface along with the cursor. In some embodiments, the movement value is a distance/length of the movement (e.g., longer distance causes more cursor movement), a velocity of the movement (e.g., faster velocity causes more cursor movement for the same distance), and/or an acceleration of the movement (e.g., faster acceleration causes more cursor movement for the same distance). In some embodiments, the cursor movement input and/or one or more inputs described with reference to method 1200 are air gesture inputs, such as described with reference to method 800.

In some embodiments, in response to detecting the cursor movement input (1202*b*), in accordance with a determination that the cursor movement input includes input corresponding to movement of the cursor towards a gaze location (e.g., and not away from the gaze location), in the user interface, of a gaze of a user of the electronic device (e.g., if the cursor movement input corresponds to movement of the cursor towards a location in the user interface towards which the gaze of the user is directed. In some embodiments, the cursor movement input is towards the gaze location if at least one component of the movement of the cursor is towards the gaze location), wherein the gaze location is detected via the gaze tracking device, the electronic device moves (1202*c*) the cursor in the user interface by a first amount in accordance with the cursor movement input, such as with cursor 1106*a*' in FIG. 11B.

In some embodiments, in accordance with a determination that the cursor movement input includes input corresponding to movement of the cursor away from the gaze location in the user interface (e.g., and not towards the gaze location) (e.g., if the cursor movement input corresponds to movement of the cursor not towards (e.g., away from) a location in the user interface towards which the gaze of the user is directed. In some embodiments, the cursor movement input is not towards the gaze location if at least one component of the movement of the cursor is not towards the gaze location), the electronic device moves (1202*d*) the cursor in the user interface by a second amount in accordance with the cursor movement input, wherein the second amount is less than the first amount, such as with cursor 1106*a* in FIG. 11B (e.g., moving the cursor by a second amount, less than the first amount, in accordance with the cursor movement input, or not moving the cursor in the user interface). Therefore, in some embodiments, inputs for moving the cursor towards the gaze location in the user interface are accelerated (e.g., relative to the movement value or metric of the input) as compared with inputs for moving the cursor away from—or neither towards nor away from—the gaze location in the user interface. For example, a cursor movement input that would correspond to movement of the cursor 1 cm in the user interface if the cursor movement input were not toward or away from the gaze location would optionally result in 1.5 or 2 cm of movement of the cursor in the user interface if the curser movement input were toward the gaze location, and would optionally result in 1 (e.g., no acceleration), 0.5, or 0 cm of movement of the cursor in the user interface if the cursor movement input were away from the gaze location. In some embodiments, the entirety of the movement of the cursor (e.g., all directional components of the movement of the cursor) are accelerated (or not) when the movement of the cursor is towards the gaze location. In some embodiments, only the directional components of the movement of the cursor that are towards the gaze location are accelerated when the movement of the cursor is towards the gaze location (e.g., and other directional components of the movement of the cursor are not accelerated). Controlling the movement of a cursor in a user interface based on gaze location ensures that a cursor quickly reaches an area of the user interface at which a user is looking, thereby reducing the time during which the cursor is located in a part of the user interface with which the user is not currently interacting and reducing errors in usage (e.g., by avoiding erroneous cursor interactions in regions of the user interface at which the user is not looking by biasing cursor movement towards the region at which the user is looking).

In some embodiments, moving the cursor in the user interface by the first amount in accordance with the determination that the cursor movement input includes input corresponding to movement of the cursor towards the gaze location is further in accordance with a determination that the cursor movement input is not part of a content creation input in the user interface (1204*a*), such as described with reference to cursor 1106*c* in FIGS. 11A—(e.g., the cursor is not being used as a virtual pen or marker tip (e.g., coupled with a finger or hand input corresponding to an activation input, such as a pinch hand shape performed by the hand of the user of the device) for entering (e.g., drawing) content into the user interface when the cursor movement input is detected (e.g., the cursor movement input does not result in corresponding line(s) or drawing manipulations being entered or performed in the user interface)).

In some embodiments, in response to detecting the cursor movement input (1204*b*), in accordance with a determination that the cursor movement input is part of the content creation input in the user interface (e.g., the cursor is being used as a virtual pen or marker tip (e.g., coupled with a finger or hand input corresponding to an activation input, such as a pinch hand shape performed by the hand of the user of the device) for entering (e.g., drawing) content into the user interface when the cursor movement input is detected (e.g., the cursor movement input does result in corresponding line(s) or drawing manipulations being entered or performed in the user interface)), the electronic device moves (1204*c*) the cursor in the user interface by a third amount (e.g., the same as or more than the second amount, but less than the first amount; or the same as, more than, or less than the first amount) in accordance with the cursor movement input irrespective of whether the cursor movement input includes input corresponding to movement of the cursor towards or away from the gaze location in the user interface, such as shown with cursor 1106*c* in FIG. 11B (e.g., movements of the cursor towards and away from the gaze location are optionally accelerated (or not) by the same amount when the cursor is being used for content creation). Thus, in some embodiments, the electronic device does not differentially accelerate cursor movements depending on whether the cursor movement is towards or away from the gaze location when the cursor movement is part of a content creation input. More generally, in some embodiments, the electronic device does not differentially accelerate cursor movements depending on whether the cursor movement is towards or away from the gaze location when the cursor is engaged in an input activity (other than simply cursor movement) to the device, and does differentially accelerate cursor movements depending on whether the cursor movement is towards or away from the gaze location when the cursor is not engaged in an input activity to the device, such as when the cursor is merely engaged in a cursor movement input. Forgoing differential acceleration when the cursor movement is part of a content creation input ensures predictable and deliberate cursor movement when user input is for content creation, thereby reducing errors in content creation input.

In some embodiments, moving the cursor in the user interface by the first amount in accordance with the determination that the cursor movement input includes input corresponding to movement of the cursor towards the gaze location is further in accordance with a determination that the cursor movement input is not part of a content selection input in the user interface (1206*a*), such as described with reference to cursor 1112*b* in FIGS. 11A—(e.g., the cursor is not being used to select/highlight content (e.g., text, images, etc.) when the cursor movement input is detected (e.g., the cursor movement input does not result in content selections/highlighting based on the cursor movement input in the user interface)).

In some embodiments, in response to detecting the cursor movement input (1206*b*), in accordance with a determination that the cursor movement input is part of the content selection input in the user interface (e.g., the cursor is being used to select/highlight content (e.g., text, images, etc.) when the cursor movement input is detected (e.g., the cursor movement input does result in content selections/highlighting based on the cursor movement input in the user interface)), the electronic device moves (1206*c*) the cursor in the user interface by a third amount (e.g., the same as or more than the second amount, but less than the first amount; or the same as, more than, or less than the first amount) in accordance with the cursor movement input irrespective of whether the cursor movement input includes input corresponding to movement of the cursor towards or away from the gaze location in the user interface, such as shown with cursor 1112*b* in FIG. 11B (e.g., movements of the cursor towards and away from the gaze location are optionally accelerated (or not) by the same amount when the cursor is being used for content selection). Thus, in some embodiments, the electronic device does not differentially accelerate cursor movements depending on whether the cursor movement is towards or away from the gaze location when the cursor movement is part of a content selection input. Forgoing differential acceleration when the cursor movement is part of a content selection input ensures predictable and deliberate cursor movement when user input is for content selection, thereby reducing errors in content selection input.

In some embodiments, such as in FIG. 11A, the user interface (e.g., 1104*c*) includes text content, and the content selection input in the user interface is a text selection input in the user interface (1207*a*). In some embodiments, while displaying text content and while the cursor is overlaid on the text content, the cursor is displayed as a text insertion marker. In some embodiments, in response to detecting selection of the cursor, the electronic device initiates selection of text using the cursor, such as setting one of the boundaries of the selected text at the location of the cursor when selection is received. In some embodiments, detecting selection of the cursor includes detecting the user make a pinch shape with their hand. In some embodiments, in response to detecting further movement of the cursor after selection is received, the computer system selects additional text in the direction of the movement of the cursor. In some embodiments, detecting the movement of the cursor includes detecting movement of the user's hand while the pinch shape is maintained. In some embodiments, the computer system ceases modifying the portion of the text content that is selected in response to detecting the user no longer making the pinch hand shape. In some embodiments, the computer system displays text that is not currently selected with a visual characteristic having a first value and displays text that is currently selected with a visual characteristic having a second value. For example, the computer system displays text not currently selected without highlighting and displays text that is currently selected with highlighting. As another example, the computer system displays text that is selected in a different color from text that is not selected. In some embodiments, while text is selected, the electronic device receives an input to perform an action with respect to the selected text, such as copying, cutting, deleting, or reformatting the text. Selecting text using the cursor enhances user interactions with the computer system by performing actions with respect to selected text quickly and efficiently with fewer inputs needed.

In some embodiments, moving the cursor in the user interface by the first amount in accordance with the determination that the cursor movement input includes input corresponding to movement of the cursor towards the gaze location is further in accordance with a determination that the cursor is a first distance from the gaze location in the user interface when the cursor movement input is detected (1208*a*) (e.g., the cursor is relatively far from the gaze location in the user interface when the cursor movement input is detected).

In some embodiments, in response to detecting the cursor movement input (1208*b*), in accordance with the determination that the cursor movement input includes input corresponding to movement of the cursor towards the gaze location in the user interface, and in accordance with a determination that the cursor is a second distance, less than the first distance, from the gaze location in the user interface when the cursor movement input is detected (e.g., the cursor is relatively close to the gaze location in the user interface when the cursor movement input is detected), the electronic device moves (1208*c*) the cursor in the user interface by a third amount, less than the first amount (e.g., but more than the second amount), in accordance with the cursor movement input, such as described with reference to cursors 1106*a* and 1106*b* in FIG. 11A. Thus, in some embodiments, the closer the cursor is to the gaze location, the less the cursor movement is accelerated towards the gaze location (e.g., the smaller the difference in cursor movement acceleration between movements towards and away from the gaze location), and the further the cursor is from the gaze location, the more the cursor movement is accelerated towards the gaze location (e.g., the greater the difference in cursor movement acceleration between movements towards and away from the gaze location). Adjusting cursor acceleration based on the distance of the cursor from the gaze location ensures more direct and predictable cursor movement when the cursor is relatively close to the location in the user interface at which a user is looking, thereby improving the user-device interaction.

In some embodiments, the gaze location is a first location in the user interface (e.g., a location in the lower-left portion of the user interface), and the cursor movement input is towards the first location and in a first direction in the user interface (1210*a*), such as movement towards gaze 1108*a* in FIGS. 11A—(e.g., the cursor is initially located in the upper-right portion of the user interface, and the cursor movement input is in the lower-left direction (e.g., towards the gaze location)).

In some embodiments, while the gaze location is the first location in the user interface (1210*b*) (e.g., the gaze location hasn't and does not change (or changes by less than an amount such that subsequent cursor movement input in the lower-left direction will continue to be movement towards the gaze location, unless the cursor has already passed the gaze location) during the cursor movement input and the subsequent cursor movement input described below), after detecting the cursor movement input in the first direction and moving the cursor in the user interface by the first amount, the electronic device detects (1210*c*), via the one or more input devices, additional cursor movement input in the first direction, such as additional movement of cursors 1106*a*' or 1106*b* in FIG. 11B (e.g., the cursor has moved towards the lower-left portion of the user interface in response to the cursor movement input, and additional cursor movement input in the lower-left direction is detected).

In some embodiments, in response to detecting the additional cursor movement in the first direction (1210*d*), in accordance with a determination that the additional cursor movement input in the first direction is towards the first location, such as cursors 1106*b* or 1106*a*' in FIG. 11B moving further towards gaze 1108*a* in FIG. 11B (e.g., the first lower-left movement of the cursor was not sufficient for the cursor to have passed the gaze location (e.g., the gaze location is still to the lower-left of the cursor), and thus the subsequent lower-left movement of the cursor is still towards the gaze location), the electronic device moves the cursor in the user interface by a third amount (e.g., the first amount; less than the first amount but more than the second amount, because the cursor is now closer to the gaze location than it was before; etc.) in accordance with the additional cursor movement input.

In some embodiments, in accordance with a determination that the additional cursor movement input in the first direction is away from the first location, such as if cursors 1106*b* or 1106*a*' had moved past gaze 1108*a* in FIG. 11B (e.g., the first lower-left movement of the cursor was sufficient for the cursor to have passed the gaze location (e.g., the gaze location is no longer to the lower-left of the cursor, but is now to the upper-right of the cursor), and thus the subsequent lower-left movement of the cursor is now away from the gaze location), the electronic device moves (12100 the cursor in the user interface by a fourth amount (e.g., the second amount; more or less than the second amount; etc.), less than the third amount, in accordance with the additional cursor movement input (e.g., the cursor movement input in the first direction results in less cursor movement acceleration (e.g., less acceleration, no acceleration, or deceleration) if the cursor has passed the gaze location, and more cursor movement acceleration if the cursor has not yet passed the gaze location). Thus, in some embodiments, once the cursor has passed the gaze location, further cursor movement input in the same direction is decelerated as compared with further cursor movement input if the cursor has not yet passed the gaze location. Adjusting cursor acceleration based on whether the cursor has or has not passed the gaze location ensures consistent cursor behavior as the location of the cursor changes in the user interface, thereby improving the user-device interaction.

In some embodiments, the gaze location is a first location in the user interface (e.g., a location in the lower-left portion of the user interface), and the cursor movement input is in a first direction in the user interface (1210*a*) (e.g., the cursor is initially located in the upper-right portion of the user interface, and the cursor movement input is in the lower-left direction (e.g., towards the gaze location)).

In some embodiments, while the gaze location is a second location, different from the first location, in the user interface (1210*b*), such as if gaze 1108*a* changed locations in object 1104*a* in FIG. 11B (e.g., the gaze location has changed since when the cursor movement input was detected such that the gaze location is now the center of the user interface), after detecting the cursor movement input in the first direction and moving the cursor in the user interface by the first amount, the electronic device detects (1210*c*), via the one or more input devices, additional cursor movement input in the first direction, such as additional cursor movement directed to cursors 1106*a*, 1106*a*' or 1106*b* in FIG. 11B (e.g., the cursor has moved towards the lower-left portion of the user interface in response to the cursor movement input, and additional cursor movement input in the lower-left direction is detected).

In some embodiments, in response to detecting the additional cursor movement in the first direction (1210*d*), in accordance with a determination that the additional cursor movement input in the first direction is towards the second location (e.g., irrespective of whether the additional cursor movement input is towards the first location), the electronic device moves (1210*e*) the cursor in the user interface by a third amount in accordance with the additional cursor movement input.

In some embodiments, in accordance with a determination that the additional cursor movement input in the first direction is away from the second location (e.g., irrespective of whether the additional cursor movement input is away from the first location), the electronic device moves (1210*f*) the cursor in the user interface by a fourth amount, less than the third amount, in accordance with the additional cursor movement input (e.g., the cursor movement input in the first direction results in less cursor movement acceleration (e.g., less acceleration, no acceleration, or deceleration) if the cursor movement input in the first direction is towards the new, updated gaze location, and more cursor movement acceleration if the cursor movement input in the first direction is towards the new, updated gaze location, irrespective of whether the cursor movement input is towards or away from the old, prior gaze location (e.g., the first location)). Thus, in some embodiments, is the gaze location changes in the user interface, further cursor movement input is evaluated with respect to the updated gaze location, and not the prior gaze location. Adjusting cursor acceleration to account for updated gaze location in the user interface ensures consistent cursor behavior as the location of the gaze changes in the user interface, thereby improving the user-device interaction.

In some embodiments, while displaying, via the display generation component, the user interface that includes the cursor, the electronic device detects (1212*a*), via the one or more input devices, a second cursor movement input (e.g., having one or more of the characteristics of the cursor movement input, and optionally the same input as the cursor movement input).

In some embodiments, while detecting the second cursor movement input (1212*b*), while detecting a first portion of the second cursor movement input that corresponds to a second movement value, wherein the gaze location is a first location in the user interface and the first portion of the second cursor movement input is towards the first location, the electronic device moves (1212*c*) the cursor in the user interface by a third amount in accordance with the first portion of the second cursor movement input, such as the cursor movement of cursor 1106*a*' in FIG. 11B (e.g., moving the cursor with a certain acceleration during the first portion of the second cursor movement input while the cursor movement is towards the gaze location).

In some embodiments, after detecting the first portion of the second cursor movement input, the electronic device detects (1212*d*) that the gaze location has changed to a second location in the user interface, such as if gaze 1108*a* were directed to a different portion of object 1104*a* in FIG. 11B (e.g., the gaze location is no longer the first location in the user interface).

In some embodiments, in response to detecting that the gaze location has changed to the second location in the user interface and while detecting a second portion of the second cursor movement input after the first portion of the second cursor movement input, wherein the second portion of the second cursor movement input corresponds to the second movement value (e.g., the first and second portions of the second cursor movement input have the same amount of movement, such as the same amount of hand movement of the user, or the same amount of finger-tip movement on a trackpad, etc.) and the second portion of the second cursor movement input is away from the second location (1212*e*) (e.g., the second portion of the second cursor movement is moving away from the new, updated gaze location in the user interface. Therefore, during the second cursor movement input (e.g., during continuous movement input for moving the cursor provided to the device), the gaze location has changed such that what was originally cursor movement towards the gaze location is now cursor movement away from the gaze location), during a first time after detecting that the gaze location has changed (e.g., during the first 0.1, 0.2, 0.5, 1, 2, or 5 seconds after detecting the updated gaze location, and thus during the first 0.1, 0.2, 0.5, 1, 2, or 5 seconds after detecting that the cursor movement changed from being towards the gaze location to being away from the gaze location), the electronic device moves (12120 the cursor in the user interface by a fourth amount, less than the third amount, in accordance with the second portion of the second cursor movement (e.g., the amount of acceleration of the cursor movement gradually decreases towards no acceleration or deceleration).

In some embodiments, during a second time, after the first time, after detecting that the gaze location has changed (e.g., during the next 0.1, 0.2, 0.5, 1, 2, or 5 seconds after the first time), the electronic device moves (1212*g*) the cursor in the user interface by a fifth amount, less than the fourth amount, in accordance with the second portion of the second cursor movement (e.g., the amount of acceleration of the cursor movement continues to gradually decreases towards no acceleration or deceleration). The fourth amount of movement is optionally more than the cursor would have moved in response to the same second portion of the second cursor movement input had the cursor movement at its current location been initiated while the gaze location was the second location, rather than the gaze location having switched from the first location to the second location after the cursor movement had already been initiated. The fifth amount of movement is optionally the same as the amount the cursor would have moved in response to the same second portion of the second cursor movement input had the cursor movement at its current location been initiated while the gaze location was the second location, rather than the gaze location having switched from the first location to the second location after the cursor movement had already been initiated. Thus, in some embodiments, when the cursor movement acceleration switches from being relatively accelerated to being relatively decelerated (or not accelerated)—or vice versa—in response to changes in gaze location during the cursor movement input, the electronic device gradually transitions, over time, from relative acceleration of the cursor to relative deceleration (or no acceleration)—or vice versa—of the cursor, rather than performing an abrupt transition between the two. Gradually adjusting cursor acceleration to account for updated gaze location in the user interface ensures predictable cursor behavior as the location of the gaze changes in the user interface, thereby improving the user-device interaction.

In some embodiments, while displaying, via the display generation component, the user interface that includes the cursor, the electronic device detects (1214*a*), via the one or more input devices, a second cursor movement input (e.g., having one or more of the characteristics of the cursor movement input, and optionally the same input as the cursor movement input).

In some embodiments, while detecting the second cursor movement input (1214*b*) (e.g., and while the gaze location does not change in the user interface), while detecting a first portion of the second cursor movement input that corresponds to a second movement value, wherein the cursor is moving towards the gaze location in the user interface during the first portion of the second cursor movement input, the electronic device moves (1214*c*) the cursor in the user interface by a third amount in accordance with the first portion of the second cursor movement input (e.g., moving the cursor with a certain acceleration during the first portion of the second cursor movement input while the cursor movement is towards the gaze location).

In some embodiments, after detecting the first portion of the second cursor movement input and while detecting a second portion of the second cursor movement input after the first portion of the second cursor movement input, wherein the second portion of the second cursor movement input corresponds to the second movement value (e.g., the first and second portions of the second cursor movement input have the same amount of movement, such as the same amount of hand movement of the user, or the same amount of finger-tip movement on a trackpad, etc.), and wherein the cursor is moving away from the gaze location in the user interface during the second portion of the second cursor movement input (1214*d*), such as if cursors 1106*a*' or 1106*b* started to move away from gaze 1108*a* in FIG. 11B (e.g., the second portion of the second cursor movement input has changed direction as compared with the first portion of the second cursor movement input (e.g., during continuous movement input for moving the cursor provided to the device)), during a first time after detecting a start of the second portion of the second cursor movement input (e.g., during the first 0.1, 0.2, 0.5, 1, 2, or 5 seconds after detecting the start of the second cursor movement input, and thus during the first 0.1, 0.2, 0.5, 1, 2, or 5 seconds after detecting that the cursor movement changed from being towards the gaze location to being away from the gaze location), the electronic device moves (1214*e*) the cursor in the user interface by a fourth amount, less than the third amount, in accordance with the second portion of the second cursor movement (e.g., the amount of acceleration of the cursor movement gradually decreases towards no acceleration or deceleration).

In some embodiments, during a second time, after the first time, after detecting the start of the second portion of the second cursor movement input (e.g., during the next 0.1, 0.2, 0.5, 1, 2, or 5 seconds after the first time), the electronic device moves (12140 the cursor in the user interface by a fifth amount, less than the fourth amount, in accordance with the second portion of the second cursor movement (e.g., the amount of acceleration of the cursor movement continues to gradually decreases towards no acceleration or deceleration). The fourth amount of movement is optionally more than the cursor would have moved in response to the same second portion of the second cursor movement input had the cursor movement been initiated at its current location, rather than the cursor movement having switched from being towards the gaze location to being away from the cursor location after the cursor movement had already been initiated. The fifth amount of movement is optionally the same as the amount the cursor would have moved in response to the same second portion of the second cursor movement input had the cursor movement been initiated at its current location, rather than the cursor movement having switched from being towards the gaze location to being away from the cursor location after the cursor movement had already been initiated. Thus, in some embodiments, when the cursor movement acceleration switches from being relatively accelerated to being relatively decelerated (or not accelerated)—or vice versa—in response to changes in the direction of the cursor movement during the cursor movement input, the electronic device gradually transitions, over time, from relative acceleration of the cursor to relative deceleration (or no acceleration)—or vice versa—of the cursor, rather than performing an abrupt transition between the two. Gradually adjusting cursor acceleration to account for updated cursor movement direction in the user interface ensures predictable cursor behavior as the direction of the cursor movement changes in the user interface, thereby improving the user-device interaction.

In some embodiments, such as in FIG. 11A, while displaying, via the display generation component, the user interface that includes the cursor (e.g., 1106*a*), the computer system (e.g., 101) detects (1216*a*), via the one or more input devices, a second cursor movement input corresponding to a second movement value. In some embodiments, the second cursor movement input has one or more characteristics of the cursor movement input described above with reference to one or more of 1202*a*, 1202*b*, 1202*c*, and/or 1202*d* and optionally has one or more of differences from the cursor movement input described below.

In some embodiments, in response to detecting the second cursor movement input (1216*b*), in accordance with a determination that the second cursor movement input includes input corresponding to movement of the cursor towards a respective location (e.g., 1108*a*) (e.g., and not away from the respective location) in the user interface (e.g., 1104*a*), associated with a location of a predefined portion of the user (e.g., 1103*a*) of the electronic device (e.g., 101) (e.g., if the cursor movement input corresponds to movement of the cursor towards the respective location. In some embodiments, the cursor movement input is towards the respective location if at least one component of the movement of the cursor is towards the respective location), such as in FIG. 11A, wherein the respective location (e.g., 1108*a*) is detected via the one or more input devices, the computer system (e.g., 101) moves (1216*c*) the cursor (e.g., 1106*a*') in the user interface (e.g., 1104*a*) by a third amount in accordance with the cursor movement input, such as in FIG. 11B. In some embodiments, the computer system detects the respective location using the one or more input devices, such as using one or more cameras and/or hand tracking devices included in the one or more input devices. In some embodiments, the respective location is a region of the user interface and/or three-dimensional environment in line with the elbow and hand of the user (e.g., is the intersection between a line or ray and the user interface, where the line or ray is extending from the elbow of the user's arm through the hand, wrist and/or tip of the index finger of the same arm). For example, the respective location is a region in the user interface at which the user's forearm and/or hand and/or finger(s) is pointing. In some embodiments, the computer system moves the cursor in accordance with the second cursor movement input within the respective location without moving the cursor outside of the respective location. In some embodiments, as the user moves their arm, wrist, and/or hands while to provide the second cursor movement input, the computer system updates the respective location to be the region to which the forearm, arm, wrist, and/or hand of the user is pointing. In some embodiments, the computer system identifies the respective location at the start of the second cursor movement input (e.g., when the user transitions from not making the pinch hand shape to making the pinch hand shape) and does not update the respective location until the second cursor movement input ends (e.g., when the hand transitions from the pinch hand shape to not the pinch hand shape) and a third cursor movement input begins. In some embodiments, detecting the second cursor movement input includes detecting the hand of the user in a predefined hand shape, such as a pinch hand shape. In some embodiments, the computer system performs one or more techniques described herein with respect to gaze location using respective location instead of (e.g., not based on gaze) or in addition to gaze location.

In some embodiments, in response to detecting the second cursor movement input (1216*b*), in accordance with a determination that the cursor movement input includes input corresponding to movement of the cursor (e.g., 1106*a*) away from the respective location (e.g., 1108*a*) in the user interface (e.g., 1104*a*) (e.g., and not towards the respective location) (e.g., if the cursor movement input corresponds to movement of the cursor not towards (e.g., away from) the respective location. In some embodiments, the cursor movement input is not towards the respective location if at least one component of the movement of the cursor is not towards the respective location), the computer system (e.g., 101) moves (1216*d*) the cursor (e.g., 1106*a*) in the user interface by a fourth amount in accordance with the cursor movement input, wherein the fourth amount is less than the third amount, such as in FIG. 11B (e.g., moving the cursor by a fourth amount, less than the third amount, in accordance with the cursor movement input, or not moving the cursor in the user interface). Therefore, in some embodiments, inputs for moving the cursor towards the respective location in the user interface are accelerated (e.g., relative to the movement value or metric of the input) as compared with inputs for moving the cursor away from—or neither towards nor away from—the respective location in the user interface. For example, a cursor movement input that would correspond to movement of the cursor 1 cm in the user interface if the cursor movement input were not toward or away from the respective location would optionally result in 1.5 or 2 cm of movement of the cursor in the user interface if the curser movement input were toward the respective location, and would optionally result in 1 (e.g., no acceleration), 0.5, or 0 cm of movement of the cursor in the user interface if the cursor movement input were away from the respective location. In some embodiments, the entirety of the movement of the cursor (e.g., all directional components of the movement of the cursor) are accelerated (or not) when the movement of the cursor is towards the respective location. In some embodiments, only the directional components of the movement of the cursor that are towards the respective location are accelerated when the movement of the cursor is towards the respective location (e.g., and other directional components of the movement of the cursor are not accelerated and/or are decelerated). Controlling the movement of a cursor in a user interface based on the respective location associated with the predefined portion of the user ensures that a cursor quickly reaches an area of the user interface to which a user is pointing, thereby reducing the time during which the cursor is located in a part of the user interface with which the user is not currently interacting and reducing errors in usage (e.g., by avoiding erroneous cursor interactions in regions of the user interface at which the user is not paying attention by biasing cursor movement towards the region to which the user is paying attention).

In some embodiments, such as in FIGS. 11A-11B, moving the cursor (e.g., 1106*a*) in the user interface by the first amount in response to detecting the cursor movement input in accordance with the determination that the cursor movement input includes input corresponding to movement of the cursor (e.g., 1106*a*) towards the gaze location (e.g., 1108*a*) includes moving the cursor (e.g., 1106*a*) relative to the gaze location (e.g., 1108*a*) with a simulated physical property (1218*a*). In some embodiments, the simulated physical property is simulated magnetic attraction, as described in more detail below with reference to step 1220*a*. In some embodiments, the simulated physical property controls a characteristic (e.g., speed, distance, or duration) of movement of the cursor relative to the gaze location in the user interface. In some embodiments, applying the simulated physical property to the movement of cursor causes a modification in the amount of cursor movement relative to the amount of cursor movement if the simulated physical property were not applied, resulting in the cursor moving by the first amount in accordance with the determination that the cursor movement input includes input corresponding to movement of the cursor towards the gaze location.

In some embodiments, such as in FIGS. 11A-11B, moving the cursor (e.g., 1106*a*) in the user interface (e.g., 1104*a*) by the second amount in response to detecting the cursor movement input in accordance with the determination that the cursor movement input includes input corresponding to movement of the cursor (e.g., 1106*a*) away from the gaze location (e.g., 1108*a*) includes moving the cursor (e.g., 1106*a*) relative to the gaze location with the simulated physical property (1218*b*). In some embodiments, applying the simulated physical property to the movement of cursor (e.g., 1106*a*) causes a modification in the amount of cursor movement, resulting in the cursor moving by the second amount in accordance with the determination that the cursor movement input includes input corresponding to movement of the cursor away from the gaze location (e.g., 1108*a*), such as in FIG. 11B. Example simulated physical properties include simulated magnetic attraction, simulated gravity, simulated potential energy, simulated mass, simulated momentum, simulated friction and/or simulated electrical charge. For example, one or more of these simulated physical properties cause acceleration of the cursor towards the gaze location to increase the closer the cursor is to the gaze location, and to decrease the further the cursor is from the gaze location. As another example, one or more of these simulated physical properties cause the responsiveness of the cursor to the cursor movement input to increase and/or decrease over time, such as simulated momentum and/or friction causing the responsiveness of the cursor to start out with a relatively low value that increases as the cursor movement input continues to be detected. As another example, simulated inertia causes cursor movement to gradually decelerate to a stop in response to detecting the end of the cursor movement input. Applying the simulated physical property to the cursor movement with respect to the gaze location enhances user interaction with the computer system by behaving in a predictable manner, which reduces user errors when interacting with the cursor.

In some embodiments, such as in FIGS. 11A-11G, the simulated physical property is simulated magnetic attraction (1220*a*). In some embodiments, the simulated magnetic attraction is between the cursor (e.g., 1106*a*) and the gaze location (e.g., 1108*a*), such as in FIG. 11A. In some embodiments, the simulated magnetic attraction causes the cursor (e.g., 1106*a*) to accelerate towards the gaze location (e.g., 1108*a*), such as in FIG. 11B, resulting in increased movement distance when the cursor (e.g., 1106*a*) is moved towards the gaze location (e.g., 1108*a*) and decreased movement distance when the cursor (e.g., 1106*a*) is moved away from the gaze location (e.g., 1108*a*). In some embodiments, the effects of the simulated magnetic attraction are increased the closer the cursor is to the gaze location and decreased the further the cursor is from the gaze location in a manner similar to how magnetic force is stronger when two magnets are close together than when the two magnets are further apart, such as being proportionate to the square of the distance between the cursor and the gaze location, similar to how magnetic force is proportionate to the distance between the square of the distance between two magnets. Applying the simulated magnetic attraction to the cursor movement with respect to the gaze location enhances user interaction with the computer system by behaving in a predictable manner, which reduces user errors when interacting with the cursor.

In some embodiments, while displaying, via the display generation component (e.g., 120), the user interface (e.g., 1104*a*) that includes the cursor (e.g., 1106*a*), the computer system (e.g., 101) detects (1222*a*), via the one or more input devices, a second cursor movement input corresponding to a second movement value greater than the first movement value, such as in FIG. 11C. In some embodiments, the second cursor movement input has one or more characteristics in common with the cursor movement input described above with reference to one or more of steps 1202*b*, 1202*c*, 1202*d*, 1216*a*, 1216*b*, 1216*c*, and/or 1216*d*. In some embodiments, the second cursor movement input is the same as the cursor movement input described above with reference to one or more of steps 1202*b*, 1202*c*, and/or 1202*d* except the magnitude of the movement value. In some embodiments, the second movement value of the second cursor movement input corresponds to an amount (e.g., of speed, distance, or duration) of movement of a predefined portion (e.g., finger(s), hand, and/or arm) of the user.

In some embodiments, in response to detecting the second cursor movement input (1222*b*), in accordance with a determination that the second cursor movement input includes input corresponding to movement of the cursor (e.g., 1106*a*) towards the gaze location (e.g., 1108*a*) in the user interface (e.g., 1104*a*), such as in FIG. 11C, the computer system (e.g., 101) moves (1222*c*) the cursor (e.g., 1106*a*") in the user interface (e.g., 1104*a*) by a third amount in accordance with the cursor movement input, wherein the third amount is greater than the first amount, such as in FIG. 11D. In some embodiments, the second movement value greater than the first movement value corresponds to more cursor movement than the amount of cursor movement that corresponds to the first movement value.

In some embodiments, in response to detecting the second cursor movement input (1222*b*), in accordance with a determination that the second cursor movement input includes input corresponding to movement of the cursor away from the gaze location in the user interface, such as an input similar to the input provided by hand 1103*b* in FIG. 11C, except with the movement being away from gaze location 1108*a*, the computer system (e.g., 101) moves (1222*d*) the cursor in the user interface by a fourth amount in accordance with the cursor movement input, wherein the fourth amount is greater than the second amount and less than the third amount, such as moving cursor 1106*a* by a larger amount than the amount of movement of cursor 1106*a* in FIG. 111B. In some embodiments, the amount of cursor movement corresponds to the movement value of a respective cursor movement input that causes the cursor movement. For example, in response to a respective cursor movement input that includes a relatively high movement value, the computer system moves the cursor by a greater amount than the amount of cursor movement in response to a respective cursor movement input that includes a relatively low movement value. Moving the cursor by an amount associated with the movement value of the cursor movement input enhances user interactions with the computer system by providing additional controls for controlling the amount of cursor movement without cluttering the user interface with additional displayed controls.

In some embodiments, such as in FIG. 11A, detecting the cursor movement input includes detecting, via the one or more input devices, movement of at least a portion of a hand (e.g., 1103*a*) of the user (1224*a*). In some embodiments, in response to detecting the cursor movement input, the computer system moves the cursor in a direction and/or by an amount that corresponds (at least in part) to the direction and amount of movement of the hand of the user, such as in FIG. 11B. For example, in response to detecting a cursor movement input that includes a first amount of movement of the hand (e.g., 1103*a*) in a first direction, such as in FIG. 11A, the computer system (e.g., 101) moves the cursor (e.g., 1106*a*') by a second amount corresponding to the first amount of movement of the hand (e.g., 1103*a*) in the first direction, such as in FIG. 11B. As another example, in response to detecting a cursor movement input that includes a third amount of movement of the hand in a second direction, the computer system moves the cursor by a fourth amount corresponding to the third amount of movement of the hand in the second direction. In some embodiments, the amount of movement of the cursor also corresponds to whether the movement of the cursor is towards or away from the gaze location in the user interface, as described above with reference to one or more of steps 1202*c* and/or 1202*d*. In some embodiments, the direction of movement of the cursor corresponds to the gaze location, such as the computer system moving the cursor in a direction that is a product of the vector of movement of the hand and the vector from the cursor location to the gaze location. In some embodiments, detecting the cursor movement input includes detecting the movement of the hand of the user while the hand is in a predefined hand shape, such as a pinch hand shape. In some embodiments, detecting movement of the hand while the hand is not in the predefined hand shape does not correspond to detecting the cursor movement input. Moving the cursor in response to detecting a cursor movement input that includes detecting movement of at least a portion of a hand of the user enhances user interactions with the computer system by enabling the user to control the cursor without manipulating a hardware input device, thereby reducing the time it takes to move the cursor accurately.

In some embodiments, such as in FIG. 11A, detecting the cursor movement input includes detecting, via the one or more input devices, movement of a finger of the hand (e.g., 1103*a*) of the user (1226*a*). In some embodiments, in response to detecting the cursor movement input, the computer system (e.g., 101) moves the cursor (e.g., 1106*a*) in a direction and by an amount that corresponds (at least in part) to the direction and amount of movement of the finger of the user, such as in FIG. 11B. For example, in response to detecting a cursor movement input that includes a first amount of movement of the finger in a first direction, the computer system moves the cursor by a second amount corresponding to the first amount of movement of the finger in the first direction. As another example, in response to detecting a cursor movement input that includes a third amount of movement of the finger in a second direction, the computer system moves the cursor by a fourth amount corresponding to the third amount of movement of the finger in the second direction. In some embodiments, the amount of movement of the cursor also corresponds to whether the movement of the cursor is towards or away from the gaze location in the user interface, as described above with reference to one or more of steps 1202*c* and/or 1202*d*. In some embodiments, the direction of movement of the cursor corresponds to the gaze location, such as the computer system moving the cursor in a direction that is a product of the vector of movement of the hand and the vector from the cursor location to the gaze location. In some embodiments, detecting the cursor movement input includes detecting the movement of the finger of the user while the hand is in a predefined hand shape, such as a pinch hand shape or a pointing hand shape with the finger extended and one or more other fingers curled towards the palm of the hand. In some embodiments, detecting movement of the finger while the hand is not in the predefined hand shape does not correspond to detecting the cursor movement input. Moving the cursor in response to detecting a cursor movement input that includes detecting movement of a finger of the user enhances user interactions with the computer system by enabling the user to control the cursor without manipulating a hardware input device, thereby reducing the time it takes to move the cursor accurately.

In some embodiments, such as in FIG. 11A, detecting the cursor movement input includes detecting, via the one or more input devices, movement of at least the portion of the hand (e.g., 1103*a*) of the user while the hand (e.g., 1103*a*) of the user is in a predefined hand shape (1228*a*). In some embodiments, the predefined hand shape is a pinch hand shape described above with reference to step 1202*a*. In some embodiments, the computer system forgoes moving the cursor in response to detecting movement of the hand while the hand is not in the predefined hand shape. In some embodiments, the user is able to control when the computer system moves the cursor by controlling when they make the predefined hand shape. For example, in response to detecting the user make the predefined hand shape, the computer system initiates movement of the cursor in response to detecting movement of the hand in the predefined hand shape and, in response to detecting the user cease to make the predefined hand shape, the computer system ceases to move the cursor in response to further movement of the hand. Moving the cursor in accordance with hand movement in response to detecting the hand in the predefined hand shape enhances user interactions with the computer system by enabling the user to control the cursor without manipulating a hardware input device, thereby reducing the time it takes to move the cursor accurately.

In some embodiments, such as in FIG. 11A, the cursor (e.g., 1106*a*) includes a visual indication of a location of an input focus in the user interface (e.g., 1104*a*) (1230*a*). In some embodiments, in response to receiving a selection input when the cursor is displayed, the computer system selects a user interface element at a location corresponding to the location of the cursor. In some embodiments, the computer system uses the cursor as a general-purpose cursor for manipulating user interface objects from a plurality of applications and/or system user interfaces. In some embodiments, in response to detecting a cursor movement input that corresponds to moving the cursor from a user interface associated with a first application to a user interface associated with a second application, the computer system transitions from directing inputs with the cursor to the first application to directing inputs with the cursor to the second application. Manipulating a general-purpose cursor in response to the cursor movement input enhances user interactions with the computer system by reducing the time and battery life needed to interact with a variety of user interfaces.

In some embodiments, such as in FIG. 11A, the cursor (e.g., 1112*b*) includes a visual indication of a location of a selection input focus in the user interface (1232*a*). As described above with reference to steps 1206*a*, 1206*b*, 1206*c*, and 1207, in some embodiments, the computer system selects content, such as text content or other content, using the cursor in response to the cursor movement input. In some embodiments, in response to detecting the cursor movement input before receiving an input corresponding to a request to initiate selection of content, the computer system moves the cursor without selecting content. In some embodiments, in response to receiving the input corresponding to the request to initiate selection of the content, such as detecting the user make a pinch hand shape with their hand, the computer system begins selection of a portion of the content at a location in the content at which the cursor is located when selection is received. In some embodiments, after receiving the input corresponding to the request to initiate selection of the content, in response to receiving a cursor movement input, such as detecting movement of the hand while the pinch hand shape is maintained, the computer system moves the cursor and selects a portion of the content between the location in the content at which selection was initiated and the current location of the cursor. In some embodiments, in response to detecting the end of the selection input, such as detecting the hand cease to make the pinch hand shape, the computer system ceases modifying the portion of the content that is selected in response to further movement of the hand while not in the pinch hand shape. In some embodiments, while the portion of the content is designated for selection, the computer system receives an input corresponding to a request to end the selection operation and is able to perform an action, such as copying, cutting, deleting, or modifying the selected portion of the content in response to further input. Manipulating the selection input focus in response to the cursor movement input enhances user interactions with the computer system by reducing the time and battery life needed to select content in the user interface.

In some embodiments, while displaying, via the display generation component (e.g., 120), the user interface (e.g.,

1104*b*) that includes the cursor (e.g., 1106*c*"), the computer system (e.g., 101) detects (1234*a*), via the one or more input devices (e.g., 120), a scrolling input that includes detecting movement of a predefined portion of the user (e.g., 1103*a*) while the predefined portion of the user (e.g., 1103*a*) is in a respective shape. In some embodiments, the scrolling input has one or more characteristics described below with reference to method 1800. In some embodiments, detecting the scrolling input includes detecting the user make a respective hand shape with their hand. For example, the predefined hand shape is a pinch hand shape described above with reference to step 1202*a*. In some embodiments, detecting the cursor movement input includes detecting the user make a pinch hand shape and move the hand while in the pinch hand shape with a first hand and detecting the scrolling input includes detecting the user make a pinch hand shape and move the hand while in the pinch hand shape with a second hand different from the first hand. In some embodiments, detecting the cursor movement input includes detecting the user make the pinch hand shape and move the hand while in the pinch hand shape while the computer system is in a mode of operation that includes displaying and moving the cursor and detecting the scrolling input includes detecting the user make the pinch hand shape and move the hand while in the pinch hand shape while the computer system is not in the mode of operation that include displaying and moving the cursor. In some embodiments, detecting the cursor movement input includes detecting movement of hand by at least a threshold amount (e.g., 0.05, 0.1, 0.2, 0.3, 0.5, 1, 2, or 3 centimeters in distance or 0.1, 0.2, 0.3, 0.5, 1, 2, 3, 5, 10, 15, or 30 centimeters per second in speed) within a threshold time (e.g., 0.01, 0.02, 0.03, 0.05, 0.1, 0.2, 0.3, 0.5, 1, 2 or 3 seconds) of making the pinch hand shape and detecting the scrolling cursor movement input includes detecting less than the threshold amount of movement of the hand during the threshold time from detecting the user make the pinch hand shape.

In some embodiments, such as in FIG. 11E, in response to detecting the scrolling input, the computer system (e.g., 101) scrolls (1234*b*) the user interface (e.g., 1104*b*) in accordance with the movement of the predefined portion of the user (e.g., 1103*a*) while the predefined portion of the user (e.g., 1103*a*) makes the respective shape (e.g., without moving the cursor in accordance with the movement of the predefined portion of the user). In some embodiments, the computer system scrolls the user interface in accordance with one or more steps of method 1800. In some embodiments, the computer system forgoes scrolling the user interface in response to detecting movement of the predefined portion of the user while the predefined portion of the user is not in the respective shape. In some embodiments, in response to detecting the user move the predefined portion of the user while the predefined portion of the user is in the respective shape, the computer system scrolls the user interface in accordance with the movement of the predefined portion of the user. In some embodiments, in response to detecting the user cease making the respective shape with the predefined portion of the user, the computer system ceases scrolling the user interface in accordance with further movement of the predefined portion of the user while the predefined portion of the user is not in the respective shape. In some embodiments, the computer system scrolls the user interface with a magnitude (e.g., speed, duration, or distance) and direction corresponding to the magnitude (e.g., speed, duration, or distance) and direction of movement of the predefined portion of the user in the respective shape. Scrolling the user interface in response to a scrolling input that includes the user making a respective shape with a predefined portion of the user enhances user interactions with the computer system by providing additional control options without cluttering the user interface with additional displayed controls.

In some embodiments, while displaying, via the display generation component (e.g., 120), the user interface (e.g., 1104*b*) that includes the cursor (e.g., 1106*c*"), the computer system (e.g., 101) detects (1236*a*), via the one or more input devices, a scrolling input. In some embodiments, the scrolling input has one or more of the characteristics described with reference to step 1234*a* and/or method 1800.

In some embodiments, in response to detecting the scrolling input (1236*b*), such as in FIG. 11D, the computer system (e.g., 101) displays (1236*c*) an animated transition of the cursor (e.g., 1106*c*") fading (e.g., being displayed less prominently or ceasing to be displayed). In some embodiments, the animation includes the opacity of the cursor gradually decreasing. In some embodiments, in response to detecting a continuation of the scrolling input while the cursor is not displayed, the computer system continues to scroll the user interface while continuing to forgo display of the cursor.

In some embodiments, in response to detecting the scrolling input (1236*b*), the computer system (e.g., 101) scrolls (1236*d*) the user interface (e.g., 1104*b*) in accordance with the scrolling input, such as in FIG. 11E. In some embodiments, the computer system scrolls the user interface in accordance with step 1234*b* and/or method 1800. In some embodiments, displaying the animated transition of the cursor fading from being displayed to ceasing to be displayed in response to the scrolling input enhances user interactions with the computer system by providing improved visual feedback to the user by making the user interface easier to view while scrolling.

In some embodiments, while scrolling the user interface in accordance with the scrolling input and while the cursor is not displayed in the user interface (e.g., 1104*b*), such as in FIG. 11E, the computer system (e.g., 101) detects (1238*a*), via the one or more input devices (e.g., 120), an end of the scrolling input. In some embodiments, the end of the scrolling input includes the user ceasing to make the respective shape, such as the respective shape described above with reference to step 1234*a*, with the predefined portion of the user. For example, detecting the end of the scrolling input includes detecting the user no longer making a pinch hand shape (e.g., detecting the user release the pinch hand shape corresponding to the tips of the thumb and index finger of the user moving away from each other, and thus no longer touching).

In some embodiments, in response to detecting the end of the scrolling input (1238*b*), such as in FIG. 11E, the computer system (e.g., 101) initiates (1238*c*) a process to cease the scrolling of the user interface (e.g., 1104*b*). In some embodiments, the computer system ceases scrolling the user interface with inertia, such as gradually decelerating the scrolling in response to detecting the end of the scrolling input and ultimately ceasing scrolling the user interface. In some embodiments, in response to detecting movement of the predefined portion of the user not in the respective shape, the computer system forgoes scrolling the user interface in accordance with movement of the predefined portion of the user.

In some embodiments, in response to detecting the end of the scrolling input (1238*b*), such as in FIG. 11E, the computer system (e.g., 101) initiates (1238*d*) display of the cursor (e.g., 1106*c*") in the user interface via the display generation component (e.g., 120), such as in FIG. 11D. In some embodiments, the computer system initiates display of the cursor by displaying an animation of the cursor fading in, such as the opacity of the cursor gradually increasing. In some embodiments, the computer system initiates display of the cursor at the location at which the cursor was displayed when the computer system initiated the animation of the cursor fading out. In some embodiments, the location is the location within the display area. In some embodiments, the location is the location in the user interface. In some embodiments, the location is the location in a three-dimensional environment in which the user interface is displayed. In some embodiments, the computer system initiates display of the cursor at a location different from the location at which the cursor was displayed when the computer system initiated the animation of the cursor fading out. Initiating display of the cursor in response to detecting the end of the scrolling input enhances user interactions with the computer system by providing improved visual feedback to users by displaying the cursor.

In some embodiments, such as in FIG. 11A, the movement towards the gaze location (e.g., 1108*a*) in the user interface is towards the gaze location in two dimensions (or three dimensions) in the user interface (e.g., 1104*a*) (1240*a*). In some embodiments, such as in FIG. 11A, the movement towards the gaze location (e.g., 1108*a*) is directly towards the gaze location (e.g., 1108*a*). In some embodiments, such as in FIG. 11A, the user interface (e.g., 1104*a*) includes a two-dimensional plane along which the cursor (e.g., 1106*a*) is able to move and the movement towards the gaze location (e.g., 1108*a*) is towards the gaze location (e.g., 1108*a*) in the two dimensions. In some embodiments, the user interface includes a three-dimensional space within which the cursor is able to move and the movement towards the gaze location is towards the gaze location in the three dimensions. In some embodiments, such as in FIG. 11A, the movement towards the gaze location (e.g., 1108*a*) is not away from the gaze location in any dimensions. For example, such as in FIG. 11A, the computer system (e.g., 101) detects movement of the user's hand (e.g., 1103*a*) in a direction that corresponds to moving the cursor (e.g., 1106*a*) directly towards the gaze location (e.g., 1108*a*). In this example, if the movement of the hand of the user would correspond to 10 cm of movement without accelerating the cursor towards the gaze location, the computer system would move the cursor by a larger amount, such as 15, 20, 30, or 100 centimeters when accelerating the cursor movement towards the gaze location. In some embodiments, the gaze location is an attention location in the user interface to which the attention of the user is directed. Increasing the amount of movement of the cursor in accordance with a determination that the movement of the cursor movement input is towards the gaze location in two dimensions ensures that a cursor quickly reaches an area of the user interface at which a user is looking, thereby reducing the time during which the cursor is located in a part of the user interface with which the user is not currently interacting and reducing errors in usage (e.g., by avoiding erroneous cursor interactions in regions of the user interface at which the user is not looking by biasing cursor movement towards the region at which the user is looking).

In some embodiments, such as in FIG. 11A, the movement away from the gaze location (e.g., 1108*a*) in the user interface is away from the gaze location (e.g., 1108*a*) in two dimensions (or three dimensions) in the user interface (e.g., 1104*a*) (1242*a*). In some embodiments, such as in FIG. 11A, the movement away from the gaze location (e.g., 1108*a*) is directly away from the gaze location (e.g., 1108*a*). In some embodiments, such as in FIG. 11A, the user interface (e.g., 1104*a*) includes a two-dimensional plane along which the cursor (e.g., 1106*a*) is able to move and the movement away from the gaze location (e.g., 1108*a*) is away from the gaze location (e.g., 1108*a*) in the two dimensions. In some embodiments, the user interface includes a three-dimensional space within which the cursor is able to move and the movement away from the gaze location is away from the gaze location in the three dimensions. In some embodiments, such as in FIG. 11A, the movement away from the gaze location (e.g., 1108*a*) is not towards the gaze location (e.g., 1108*a*) in any dimensions. For example, the computer system (e.g., 101) detects movement of the user's hand (e.g., 1103*b*) in a direction that corresponds to moving the cursor (e.g., 1106*a*) away from the gaze location (e.g., 1108*a*), such as in FIG. 11A. In this example, if the movement of the hand of the user would correspond to 100 cm of movement without accelerating the cursor towards the gaze location, the computer system would move the cursor by a smaller amount, such as 10, 15, 20, 30, or 50 centimeters when accelerating the cursor movement towards the gaze location (and attenuating cursor movement away from the gaze location). In some embodiments, the gaze location is an attention location in the user interface to which the attention of the user is directed. Decreasing the amount of movement of the cursor in accordance with a determination that the movement of the cursor movement input is away from the gaze location in two dimensions ensures that a cursor quickly reaches an area of the user interface at which a user is looking, thereby reducing the time during which the cursor is located in a part of the user interface with which the user is not currently interacting and reducing errors in usage (e.g., by avoiding erroneous cursor interactions in regions of the user interface at which the user is not looking by biasing cursor movement towards the region at which the user is looking).

In some embodiments, in response to detecting the cursor movement input (1244*a*), in accordance with a determination that the cursor movement input includes input corresponding to movement of the cursor (e.g., 1106*a*) towards the gaze location (e.g., 1108*a*) in a first dimension and away from the gaze location (e.g., 1108*a*) in a second dimension, such as in FIG. 11F, the computer system (e.g., 101) moves (1244*b*) the cursor (e.g., 1106*a*) in the user interface (e.g., 1104*a*) towards the gaze location (e.g., 1108*a*) in the first dimension by a third amount (e.g., that is scaled up from an amount of movement of the cursor in the first dimension corresponding to the movement input), and away from the gaze location (e.g., 1108*a*) in the second dimension by a fourth amount, such as in FIG. 11G (e.g., that is scaled down from an amount of movement of the cursor in the second dimension corresponding to the movement input). For example, in response to detecting movement of the hand while providing the cursor movement input that would corresponds to movement of the cursor by 10 centimeters towards the gaze location in the first dimension and 10 centimeters away from the gaze location in the second dimension without accelerating the cursor towards the gaze location, the computer system moves the cursor by 11, 12, 15, 20, 30, 40, 50, 100, 200, 300, 500, or 1000 centimeters towards the gaze location in the first dimension and by 1, 2, 3, 5, 6, 8, or 9 centimeters away from the gaze location in the second dimension. In this example, movement of the cursor would be straight if acceleration towards the gaze location were not applied, but the resulting movement of the cursor is curved towards the gaze location because cursor movement is accelerated towards the gaze location.

In some embodiments, in response to detecting the cursor movement input (1244*a*), in accordance with a determination that the cursor movement input includes input corresponding to movement of the cursor (e.g., 1106*a*) away from the gaze location (e.g., 1108*a*) in the first dimension and towards the gaze location (e.g., 1108*a*) in the second dimension, such as in FIG. 11F, the computer system (e.g., 101) moves (1244*c*) the cursor (e.g., 1106*a*) in the user interface (e.g., 1104*a*) away from the gaze location (e.g., 1108*a*) in the first dimension by a fifth amount (e.g., that is scaled down from the amount of movement of the cursor in the first dimension corresponding to the movement input) that is less than the third amount, and towards the gaze location (e.g., 1108*a*) in the second dimension by a sixth amount (e.g., that is scaled up from an amount of movement of the cursor in the second dimension corresponding to the movement input) that is greater than the fourth amount, such as in FIG. 11G. In some embodiments, the direction of movement of the cursor is adjusted to be more towards the gaze location than the direction of movement of the cursor movement input. In some embodiments, the amount of movement of the cursor in a respective dimension corresponding to the movement input is an amount independent from the gaze location relative to the movement. In some embodiments, the computer system scales the amount of movement of the cursor in a respective dimension depending on whether the movement is towards or away from the cursor in that dimension. In some embodiments, the computer system scales the movement of the cursor in two (or three) dimensions independently depending on whether the movement is towards or away from the gaze location in the respective dimensions. For example, in response to detecting movement of the hand while providing the cursor movement input that would corresponds to movement of the cursor by 10 centimeters away from the gaze location in the first dimension and 10 centimeters towards the gaze location in the second dimension without accelerating the cursor towards the gaze location, the computer system moves the cursor by 1, 2, 3, 5, 6, 8, or 9 centimeters away from the gaze location in the first dimension and by 11, 12, 15, 20, 30, 40, 50, 100, 200, 300, 500, or 1000 centimeters towards the gaze location in the second dimension. In this example, movement of the cursor would be straight if acceleration towards the gaze location were not applied, but the resulting movement of the cursor is curved towards the gaze location because cursor movement is accelerated towards the gaze location. In some embodiments, the computer system accelerates the cursor towards an attention location in the user interface towards which the users' attention is directed instead of accelerating the cursor towards the gaze location. Adjusting the amount of cursor movement in the first dimension and second dimension independently from each other ensures that a cursor quickly reaches an area of the user interface at which a user is looking, thereby reducing the time during which the cursor is located in a part of the user interface with which the user is not currently interacting and reducing errors in usage (e.g., by avoiding erroneous cursor interactions in regions of the user interface at which the user is not looking by biasing cursor movement towards the region at which the user is looking).

FIGS. 13A-13E illustrate examples of an electronic device facilitating interaction with multiple input devices in accordance with some embodiments.

Figure 13A:
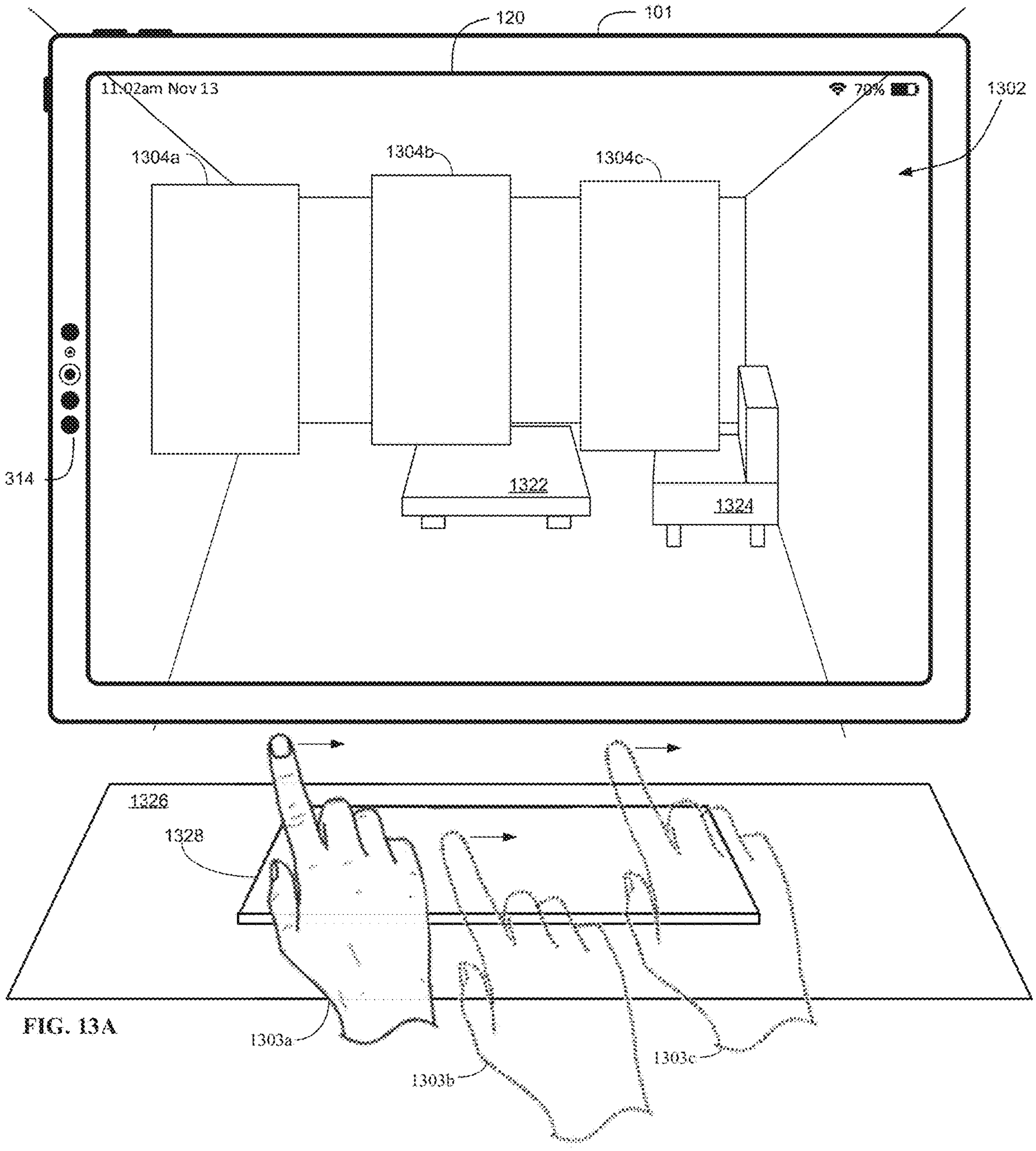
FIGS. 13A-13E illustrate examples of an electronic device facilitating interaction with multiple input devices in accordance with some embodiments.

FIG. 13A illustrates an electronic device 101 displaying, via a display generation component (e.g., display generation component 120 of FIG. 1), a three-dimensional environment 1302 from a viewpoint of a user of the electronic device 101. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user (e.g., one or more hands of the user) while the user interacts with the electronic device 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 13A, device 101 captures one or more images of the physical environment around device 101 (e.g., operating environment 100), including one or more objects in the physical environment around device 101. In some embodiments, device 101 displays representations of the physical environment in three-dimensional environment 1302. For example, three-dimensional environment 1302 includes a representation 1324 of a sofa, which is optionally a representation of a physical sofa in the physical environment; three-dimensional environment 1302 also includes a representation 1322 of a table, which is optionally a representation of a physical table in the physical environment. Three-dimensional environment 1302 also includes representations of the physical floor, ceiling and back and side walls of the room in which device 101 is located.

In FIG. 13A, three-dimensional environment 1302 also includes virtual objects 1304*a*, 1304*b* and 1304*c*. Virtual objects 1304*a*, 1304*b* and 1304*c* are optionally one or more of user interfaces of applications (e.g., messaging user interfaces, content browsing user interfaces, etc.), three-dimensional objects (e.g., virtual clocks, virtual balls, virtual cars, etc.), representations of content (e.g., representations of photographs, videos, movies, music, etc.) or any other element displayed by device 101 that is not included in the physical environment of device 101. In FIG. 13A, virtual objects 1304*a*, 1304*b* and 1304*c* are two-dimensional objects, but the examples described herein could apply analogously to three-dimensional objects. Further, in some embodiments, device 101 does not display objects 1304*a*, 1304*b* and 1304*c* concurrently; in such embodiments, the below-described interactions with objects 1304*a*, 1304*b* and 1304*c* optionally occur independently.

Device 101 is optionally interactable via multiple different input devices, two or more of which are currently active. For example, as previously described, device 101 is optionally able to detect poses, shapes, gestures and/or movements performed by hands 1303*a*, 1303*b* and/or 1303*c* of a user in empty space (e.g., using sensors 314). It should be understood that while multiple hands and corresponding inputs are illustrated in FIGS. 13A-13D, such hands and inputs need not be detected by device 101 concurrently; rather, in some embodiments, device 101 independently responds to the hands and/or inputs illustrated and described in response to detecting such hands and/or inputs independently. Such detection optionally includes detecting one or more of hands 1303*a*, 1303*b* and/or 1303*c* performing a pinching gesture (e.g., in which the thumb and tip of the index finger of the hand come together and touch), followed by movement of the hand(s) while maintaining the pinch hand shape (e.g., in which the thumb and the tip of the index finger of the hand remain in contact) in empty space in the physical environment, which optionally corresponds to a movement input to device 101 provided by hands 1303*a*, 1303*b* and/or 1303*c* (e.g., to cause a cursor displayed by device 101 to move in three-dimensional environment 1302 in accordance with such inputs, to cause an object displayed by device 101 to move in three-dimensional environment 1302 in accordance with such inputs, etc.). Other types of inputs provided by hands 1303*a*, 1303*b* and/or 1303*c* to device 101 and detected by sensors 314 in empty space in the physical environment are also contemplated, such as selection inputs—additional details of such inputs are described with reference to method 1400.

Device 101 is optionally also interactable via a physical trackpad or touch-sensitive surface. For example, device 101 is optionally in communication with a physical trackpad or touch-sensitive surface 1328 in the physical environment of device 101. Trackpad 1328 is optionally on surface 1326 (e.g., a table top) in the physical environment of device 101. Contacts (e.g., from one or more fingers of hands 1303*a*, 1303*b* and/or 1303*c*) detected on trackpad 1328 and movements of those contacts on trackpad 1328 optionally correspond to movement input to device 101 provided by hands 1303*a*, 1303*b* and/or 1303*c* (e.g., to cause a cursor displayed by device 101 to move in three-dimensional environment 1302 in accordance with such inputs, to cause an object displayed by device 101 to move in three-dimensional environment 1302 in accordance with such inputs, etc.). Other types of inputs provided by hands 1303*a*, 1303*b* and/or 1303*c* to device 101 and detected by trackpad 1328 are also contemplated, such as selection inputs—additional details of such inputs are described with reference to method 1400.

Figure 13B:
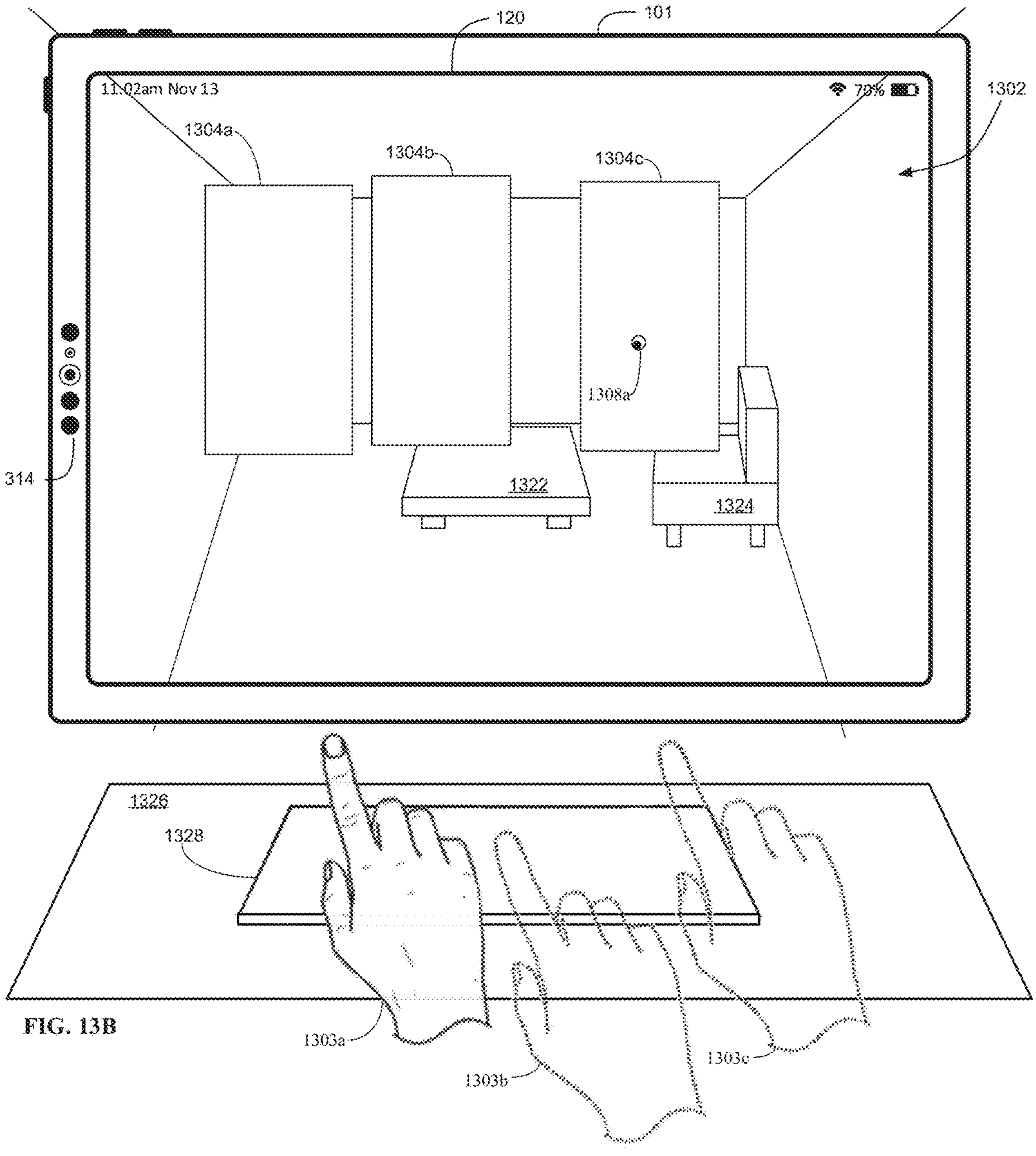

To avoid conflicting inputs that are or could be detected by different input devices concurrently (e.g., two or more input devices detect the same hand's movement, gesture, shape, and/or pose, etc., resulting in concurrent and/or conflicting inputs to be provided to device 101 from the same hand via two or more input devices), device 101 optionally requires that a hand of the user be more than a threshold distance (e.g., 0.5, 1, 2, 5, 10, 20, 50, 100, or 500 cm) from trackpad 1328 for input from that hand to be responded to as an input detected via sensors 314. For example, in FIG. 13A, hand 1303*a* is more than the threshold distance from trackpad 1328, and is performing a gesture, pose, movement, and/or shape corresponding to a movement input. For example, hand 1303*a* is in the pinch hand shape, and is moving rightward in empty space in the physical environment of device 101. The input from hand 1303*a* is optionally directed to object 1304*a* (e.g., because a gaze of the user is directed to object 1304*a* while the input from hand 1303*a* is detected), and is optionally an input to move object 1304*a* in three-dimensional environment 1302 in accordance with the movement of hand 1303*a*. Because the gesture, pose, movement, and/or shape of hand 1303*a* is a valid input to device 101 via sensors 314, and because hand 1303*a* is further than the threshold distance from trackpad 1328 while providing the input, device 101 moves object 1304*a* rightward in three-dimensional environment 1302 in accordance with the movement of hand 1303*a*, as shown in FIG. 13B.

Returning to FIG. 13A, hand 1303*b* is less than the threshold distance from trackpad 1328, though is not in contact with trackpad 1328, and is performing a gesture, pose, movement, and/or shape corresponding to a movement input. For example, hand 1303*b* is in the pinch hand shape, and is moving rightward in empty space in the physical environment of device 101. The input from hand 1303*b* is optionally directed to object 1304*b* (e.g., because a gaze of the user is directed to object 1304*b* while the input from hand 1303*b* is detected), and is optionally an input to move object 1304*b* in three-dimensional environment 1302 in accordance with the movement of hand 1303*b*. While the gesture, pose, movement, and/or shape of hand 1303*b* is a valid input to device 101 via sensors 314 (e.g., and is optionally the same gesture, pose, movement, and/or shape of hand 1303*a*), because hand 1303*b* is closer than the threshold distance to trackpad 1328 while providing the input, device 101 does not move object 1304*b* rightward in three-dimensional environment 1302 in accordance with the movement of hand 1303*b*, as shown in FIG. 13B.

Returning to FIG. 13A, hand 1303*c* is more than the threshold distance from trackpad 1328, and is performing a gesture, pose, movement, and/or shape that do not correspond to a valid input to device 101 via sensors 314. For example, hand 1303*c* is optionally in a first hand shape (e.g., with all of the fingers of hand 1303*c* curled in toward the palm of hand 1303*c*) and moving rightward, which optionally does not correspond to a recognized input via sensors 314 to device 101. The input from hand 1303*c* is optionally directed to object 1304*c* (e.g., because a gaze of the user is directed to object 1304*c* while the input from hand 1303*c* is detected). Because the gesture, pose, movement, and/or shape of hand 1303*c* is not a valid input to device 101 via sensors 314, despite hand 1303*c* being further than the threshold distance from trackpad 1328 while providing the input, device 101 does not move object 1304*c* rightward in three-dimensional environment 1302 in accordance with the movement of hand 1303*c*, as shown in FIG. 13B.

Figure 13C:
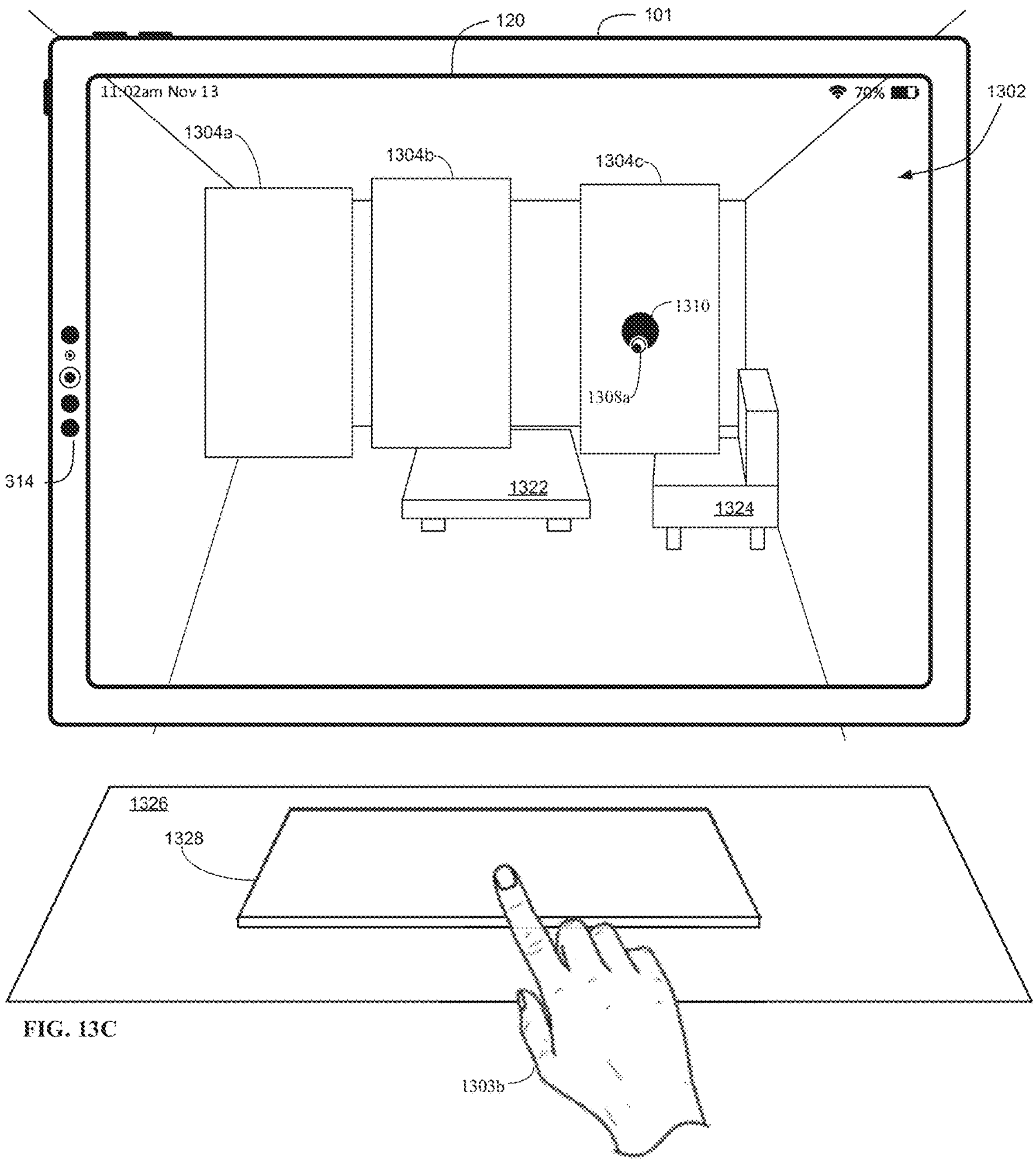

In some embodiments, in response to detecting one or more fingers of a hand of the user making contact with trackpad 1328, device 101 displays a cursor in three-dimensional environment 1302 based on a location of the gaze of the user when the contact is detected. For example, in FIG. 13B, gaze 1308 of the user is directed to object 1304*c* while hand 1303*b* (or a finger of hand 1303*b*) is not in contact with trackpad 1328. In FIG. 13C, device 101 detects that hand 1303*b* (or a finger of hand 1303*b*) has made contact with trackpad 1328. In response, as shown in FIG. 13C, device 101 displays cursor 1310 in object 1304*c*, because gaze 1308*a* was directed to object 1304*c* when hand 1303*b* made contact with trackpad 1328. Further, in some embodiments, device 101 displays cursor 1310 at the location within object 1304*c* to which gaze 1308*a* is directed, as shown in FIG. 13C.

In some embodiments, when device 101 is displaying a cursor and a menu concurrently, whether the cursor moves or focus within the menu moves in response to a movement input detected on trackpad 1328 depends on whether the gaze of the user is directed to the menu or the region that includes the cursor. For example, in FIG. 13D, device 101 is displaying menu 1314 in object 1304*c*. Menu 1314 is optionally a contextual menu including one or more selectable options for performing corresponding operations on content in object 1304*c*. The option within menu 1314 that is selected in response to detecting a selection input at trackpad 1328 (e.g., a tap, a click, etc.) is optionally the option that has the current focus 1316 when the selection input is detected.

Figure 13D:
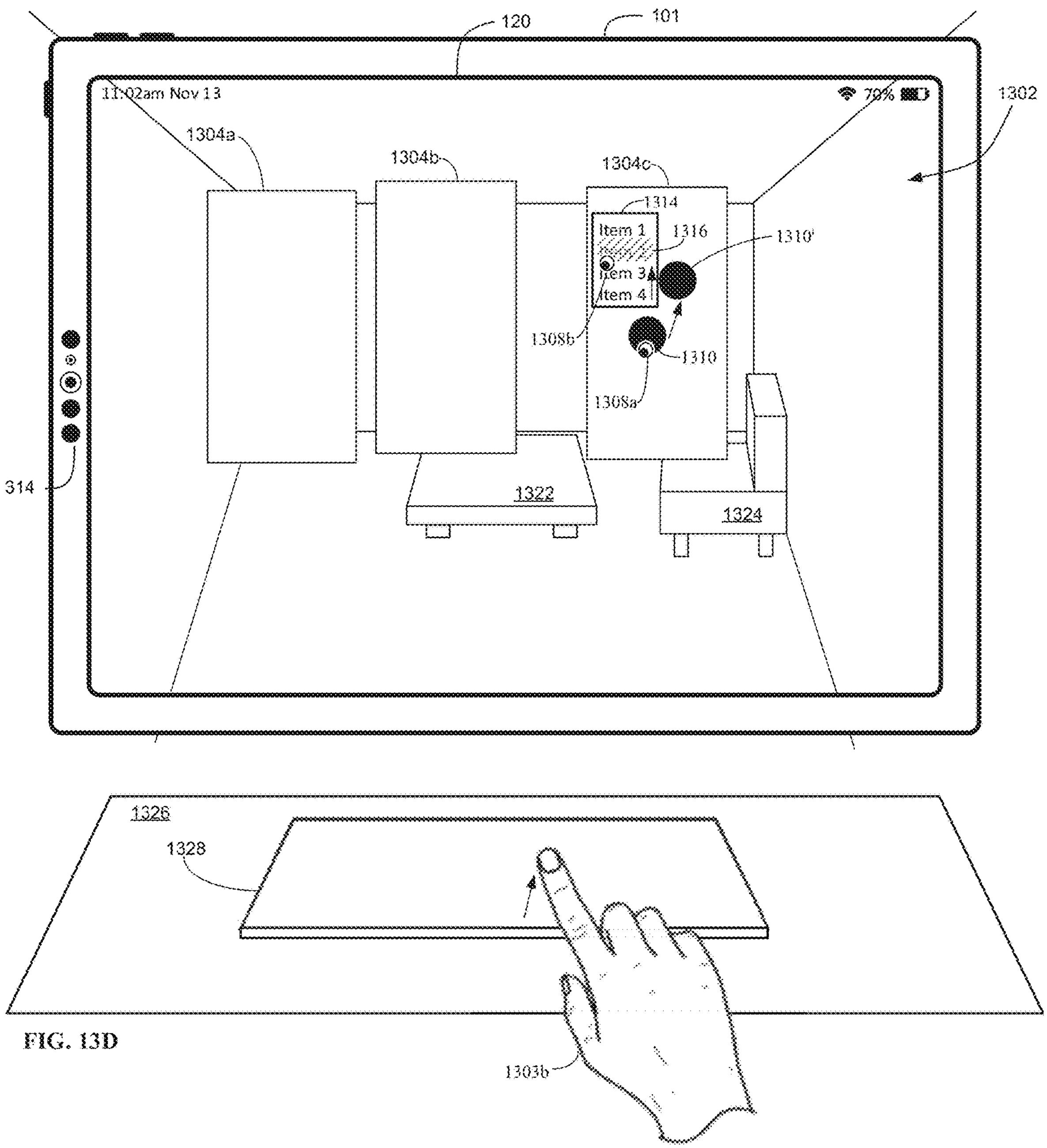

In FIG. 13D, device 101 detects hand 1303*b*, which is in contact with trackpad 1328, performing an upward and rightward movement input on trackpad 1328. If the gaze of the user is directed to a region of object 1304*c* that includes cursor 1310 (e.g., indicated by gaze 1308*a*) when the movement input is detected, in response to the movement input from hand 1303*b*, device moves cursor 1310 in an upward and rightward direction in object 1304*c* (e.g., indicated by cursor 1310') in accordance with the movement of hand 1303*b*. Device 101 optionally does not move current focus 1316 in menu 1314. However, if the gaze of the user is directed to menu 1314 (e.g., indicated by gaze 1308*b*) when the movement input is detected, in response to the movement input from hand 1303*b*, device moves current focus 1316 in menu 1314 from one option to another in an upward direction in accordance with movement of hand 1303*b*. Device optionally does not move cursor 1310.

Figure 13E:
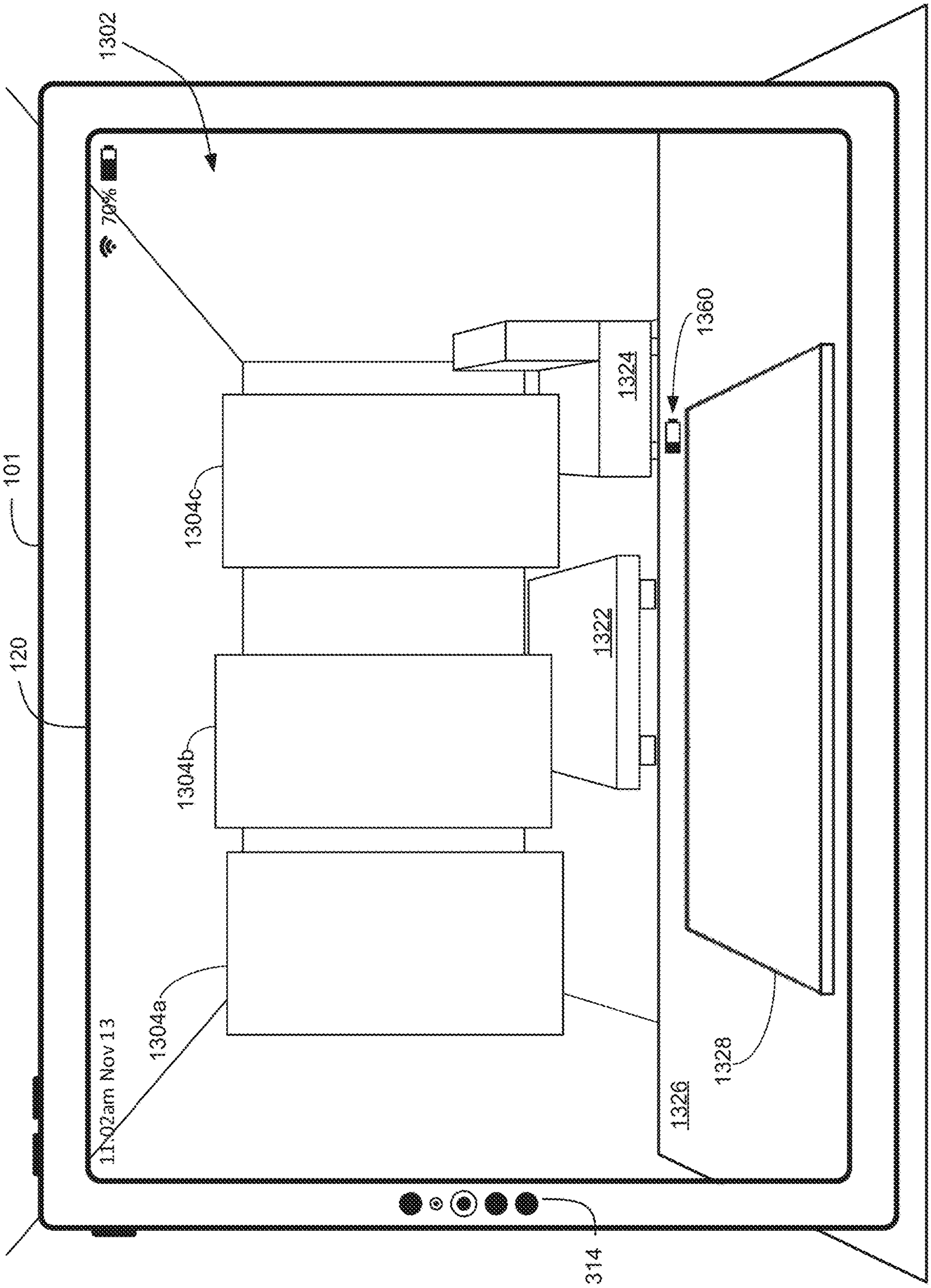
Figure 14A:
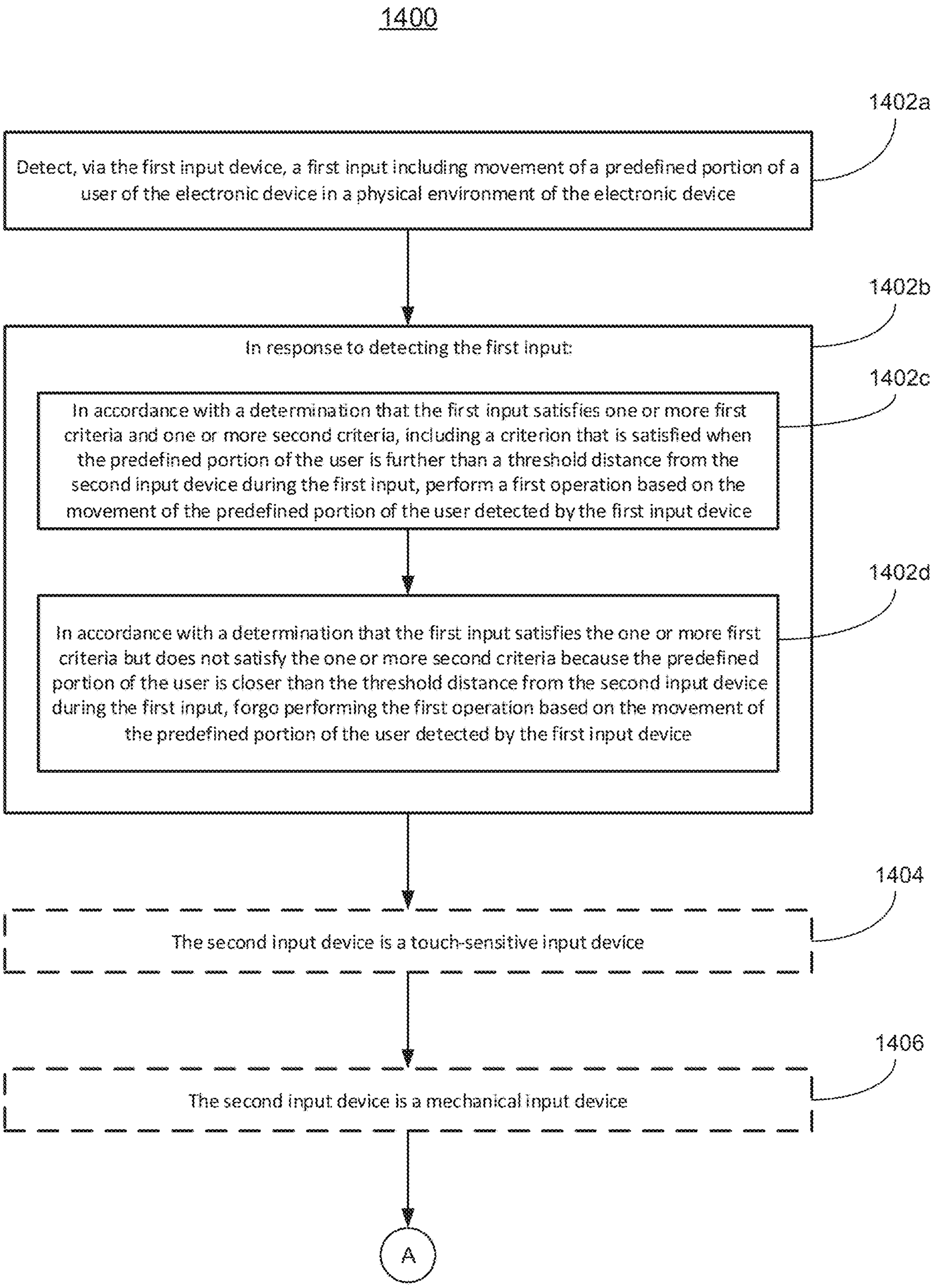
Figure 14B:
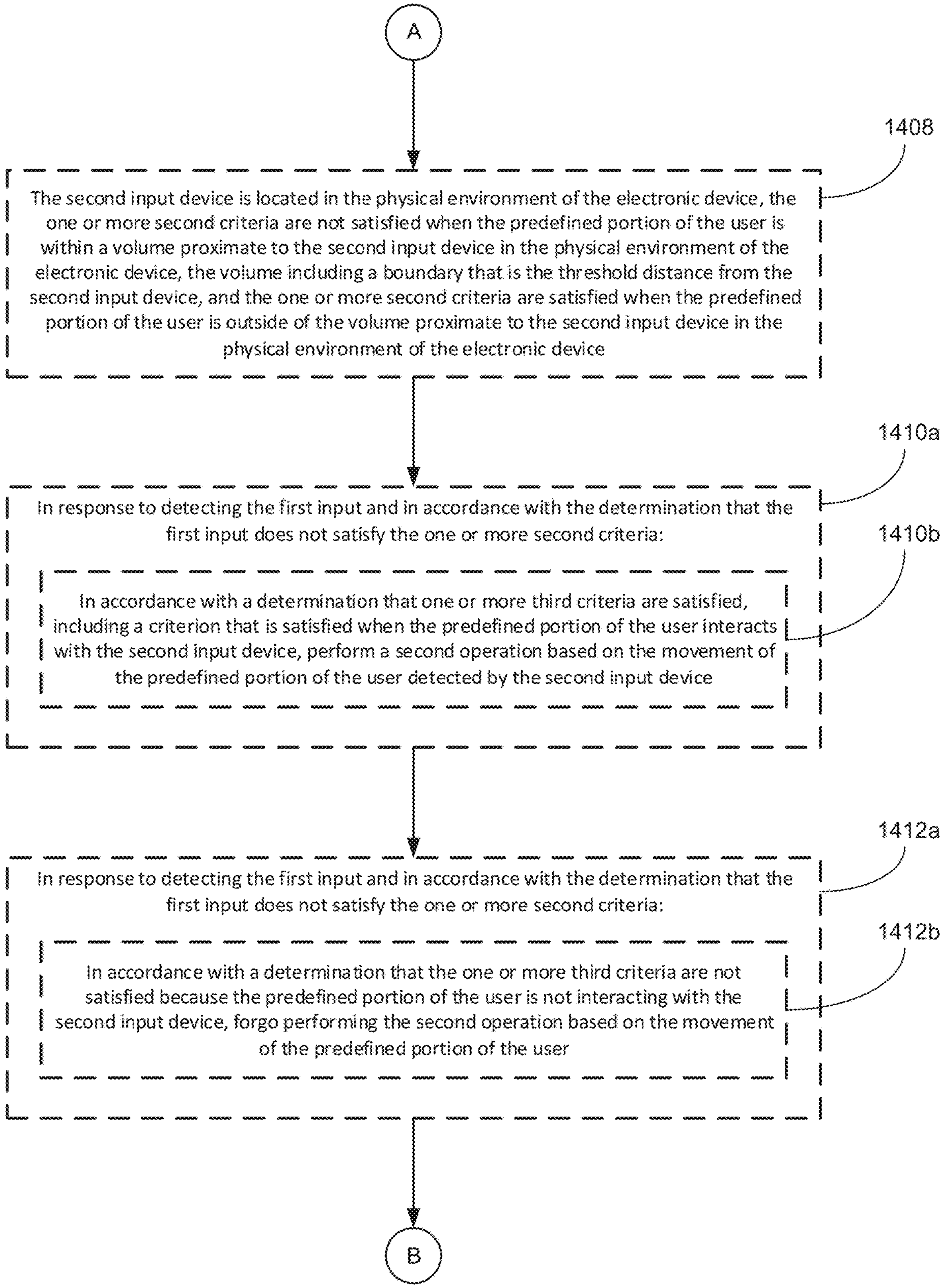
Figure 14C:
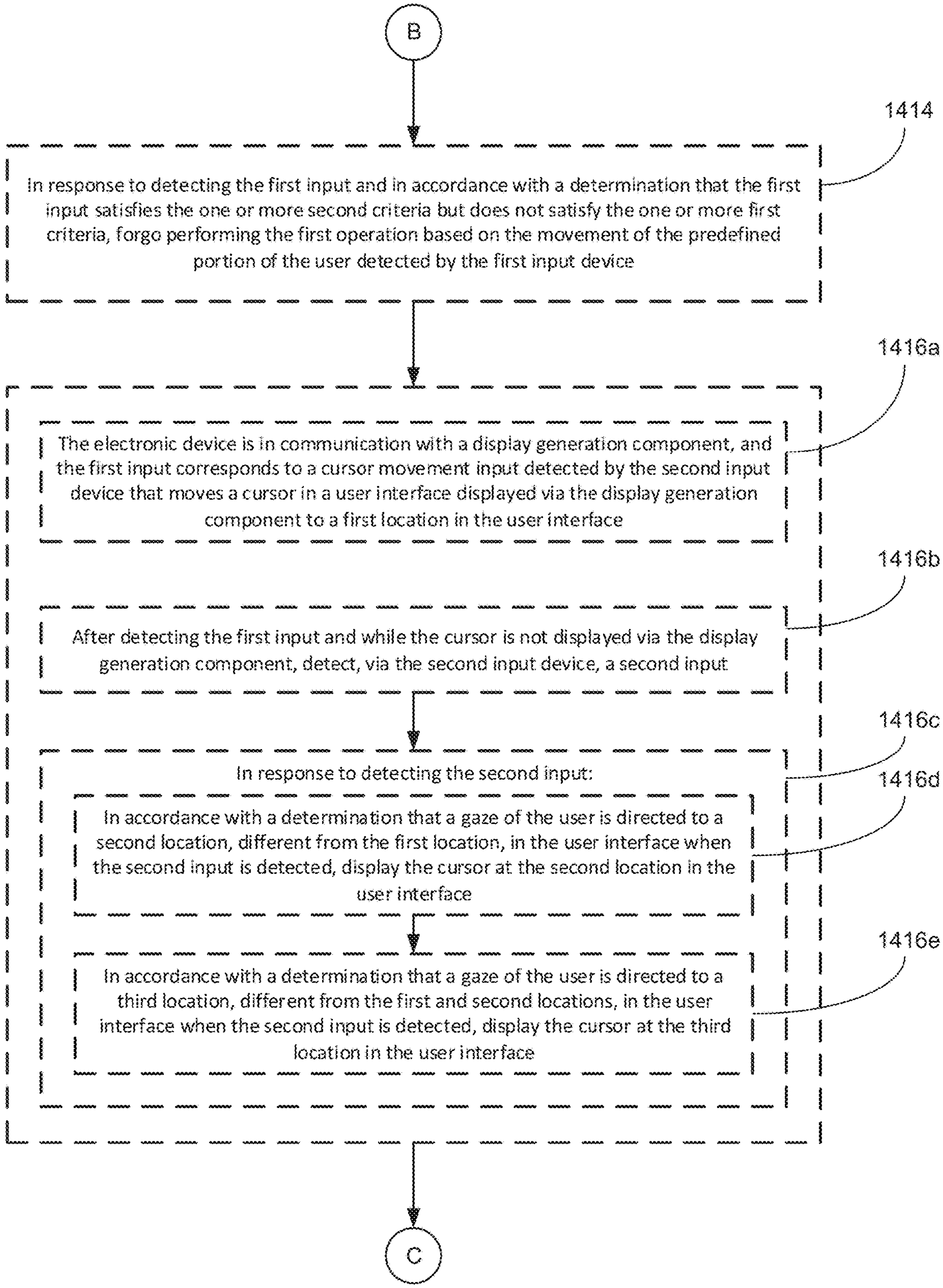
Figure 14D:
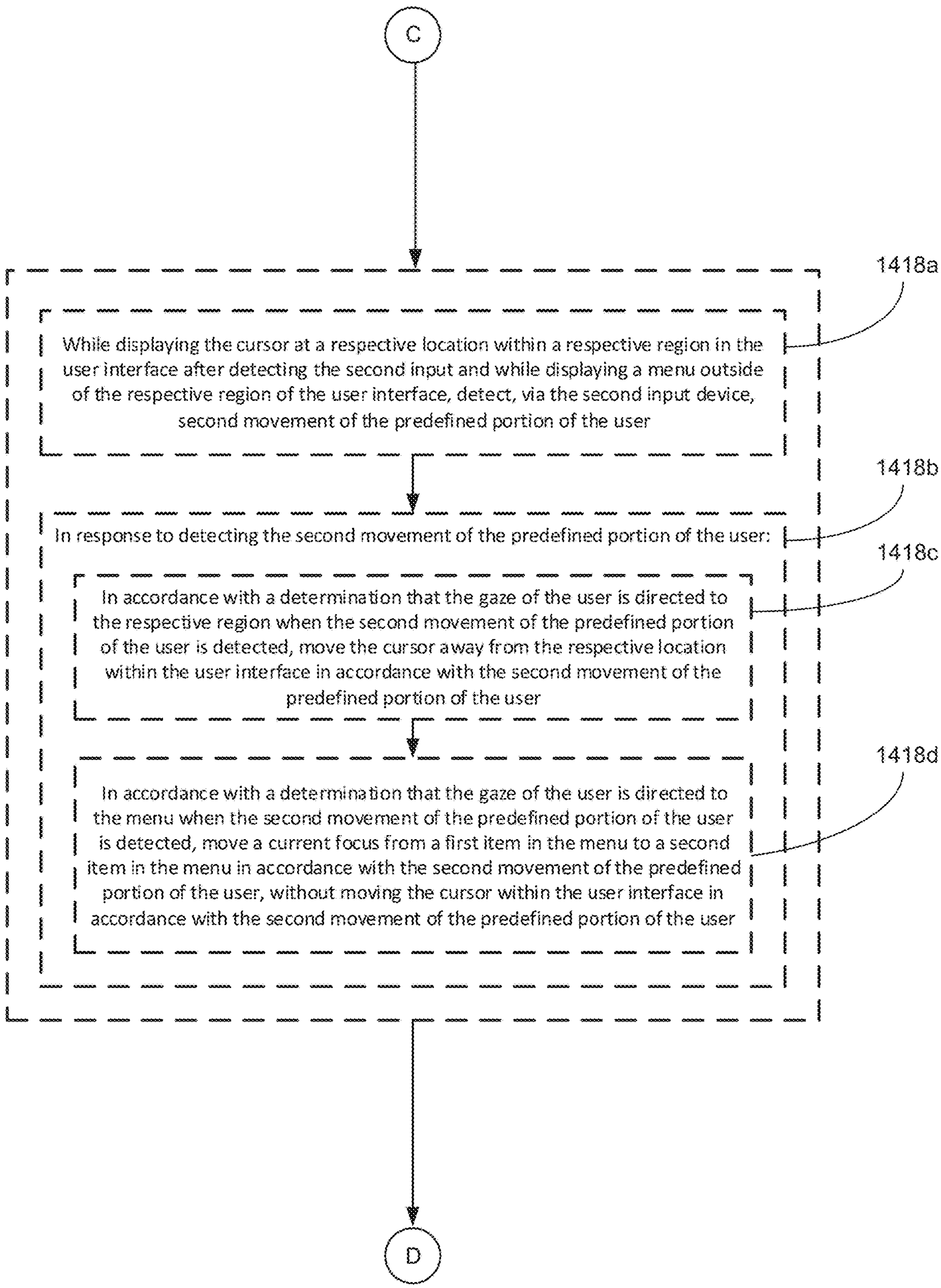

In some embodiments, trackpad 1328 and/or surface 1326 are in the field of view of the viewpoint of three-dimensional environment 1302 displayed by device 101. In such embodiments, device 101 displays, in three-dimensional environment, a representation of surface 1326 and/or a representation of trackpad 1328, as shown in FIG. 13E. In some embodiments, device 101 displays an indication 1360 of status of trackpad 1328 in association with the representation of trackpad 1328 in three-dimensional environment 1302. Indication 1360 optionally indicates one or more states of status of trackpad 1328, such as battery level, connectivity status with device 101, etc. The location of indication 1360 in three-dimensional environment 1302 optionally changes based on the location of trackpad 1328 (and thus the location of the representation of trackpad 1328 displayed in three-dimensional environment 1302), because device 101 optionally displays indication 1360 at a respective arrangement and/or orientation relative to the representation of trackpad 1328 wherever the representation of trackpad 1328 is displayed in three-dimensional environment 1302. For example, indication 1360 is optionally displayed above and to the right of the representation of trackpad 1328 in three-dimensional environment 1302.

FIGS. 14A-14E is a flowchart illustrating a method 1400 of facilitating interaction with multiple input devices in accordance with some embodiments. In some embodiments, the method 1400 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1400 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1400 are, optionally, combined and/or the order of some operations is, optionally, changed.

In some embodiments, method 1400 is performed at an electronic device (e.g., 101) in communication with a display generation component (e.g., 120) and one or more input devices (e.g., 314). For example, a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, the electronic device detects (1402*a*), via the first input device, a first input including movement of a predefined portion of a user of the electronic device in a physical environment of the electronic device, such as from hands 1303*a* or 1303*b* in FIG. 13A (e.g., movement of a hand of the user in space, such as a movement while the hand is holding a pinch hand shape (e.g., the tips of the thumb and index finger remain touching), or a movement while the hand is holding a pre-pinch hand shape (e.g., the tips of the thumb and index finger remain within a threshold distance—such as 0.1, 0.2, 0.5, 1, 2, 5, or 10 cm) of one another, but are not touching), or a movement while the hand is not holding the pre-pinch hand shape (e.g., because the tips of the thumb and index finger are more than the threshold distance apart), or a movement of the hand while the hand is holding an index finger pointer hand shape in which the index finger is extended and the remaining fingers are not extended, etc.). In some embodiments, the first input and/or one or more inputs described with reference to method 1400 are air gesture inputs, such as described with reference to method 800.

In some embodiments, in response to detecting the first input (1402*b*), in accordance with a determination that the first input satisfies one or more first criteria, such as with respect to hand 1303*a* in FIG. 13A (e.g., the movement of the hand of the user, optionally in conjunction with the hand shape and/or hand gestures performed by the hand, corresponds to an input to perform an operation at the device. For example, a pinch hand gesture (e.g., index finger touching the thumb of the user) detected while a gaze of the user is directed to a user interface object in a user interface displayed by the electronic device (e.g., when the hand is further than a threshold distance (e.g., 0.5, 1, 2, 3, 6, 12, 24, 36, 48, 96, 192 or 384 cm) from the object when the input is detected), followed by movement of the hand while maintaining the pinch hand shape, optionally corresponds to an input to move that user interface object in the user interface in accordance with the movement of the hand. In some embodiments, the above hand gesture satisfies the one or more first criteria irrespective of whether the gaze is directed to the object when the hand is closer than the threshold distance from the object when the input is detected. In some embodiments, the first input satisfies the one or more first criteria when the first input is a pinch gesture performed by a hand of the user while a gaze of the user is directed to an object (e.g., a selectable object, such as a button), when the hand is further than the threshold distance from the object when the input is detected, followed by release of the pinch hand shape within a time threshold (e.g., 0.1, 0.2, 0.5, 1, 2, 3, 5, or 10 seconds) of the pinch gesture—such an input is optionally a selection input that selects the object to which the gaze of the user was directed, such as selecting the button. In some embodiments, the above pinch and release input satisfies the one or more first criteria irrespective of whether the gaze is directed to the object when the hand is closer than the threshold distance from the object when the input is detected. In some embodiments, the first input satisfies the one or more first criteria when the first input is a tap or press gesture performed by a hand of the user (e.g., the tip of the index finger of the hand of the user moving towards and subsequently away from an object (e.g., a selectable object, such as a button) while the index finger is further extended from the palm of the user than one or more of the other fingers of the hand of the user). In some embodiments, if the hand of the user is more than a threshold distance (e.g., 0.5, 1, 2, 3, 6, 12, 24, 36, 48, 96, 192 or 384 cm) from the object when the input is detected, the input satisfies the one or more first criteria if the gaze of the user is directed to the object during the input (e.g., and not satisfied if the gaze of the user is not directed to the object when the input is detected). In some embodiments, if the hand of the user is less than the threshold distance from the object when the input is detected, the input satisfies the one or more first criteria irrespective of whether the gaze of the user is directed to the object when the input is detected. The above tap or press inputs are optionally selection inputs that select the object, such as selecting the button) and one or more second criteria, including a criterion that is satisfied when the predefined portion of the user is further than a threshold distance (e.g., 0.5, 1, 2, 5, 10, 20, 50, 100, or 500 cm) from the second input device during the first input, such as with respect to hand 1303*a* in FIG. 13A (e.g., the hand of the user is further than the threshold distance from the touch-detecting surface of the trackpad during the first input. In some embodiments, the hand must remain further than the threshold distance from the second input device for the entirety of the first input for the one or more second criteria to be satisfied. In some embodiments, the hand must be further than the threshold distance from the second input device for at least part of (e.g., but not necessarily the entirety of) the first input for the one or more second criteria to be satisfied. In some embodiments, the hand must be further than the threshold distance from the second input device at least at the beginning of (e.g., but not necessarily other portions of) the first input for the one or more second criteria to be satisfied), the electronic device performs (1402*c*) a first operation based on the movement of the predefined portion of the user detected by the first input device, such as movement of object 1304*a* in FIG. 13B (e.g., performing the operation at the electronic device to which the first input corresponds. For example, moving the user interface object in the user interface, as previously described. In some embodiments, user interface is or is displayed in a three-dimensional environment that is generated, displayed, or otherwise caused to be viewable by the device (e.g., a computer-generated reality (CGR) environment such as a virtual reality (VR) environment, a mixed reality (MR) environment, or an augmented reality (AR) environment, etc.).

In some embodiments, in accordance with a determination that the first input satisfies the one or more first criteria, such as with respect to hand 1303*b* in FIG. 13A (e.g., the movement of the hand of the user, optionally in conjunction with the hand shape and/or hand gestures performed by the hand, corresponds to the previously described input to perform the previously described operation at the device) but does not satisfy the one or more second criteria because the predefined portion of the user is closer than the threshold distance (e.g., 0.5, 1, 2, 5, 10, 20, 50, 100, or 500 cm) from the second input device during the first input, such as with respect to hand 1303*b* in FIG. 13A (e.g., the hand of the user is not further than the threshold distance from the touch-detecting surface of the trackpad during the first input), the electronic device forgoes (1402*d*) performing the first operation based on the movement of the predefined portion of the user detected by the first input device, such as shown with object 1304*b* in FIG. 13B (e.g., performing a different operation based on input detected by the second input device (e.g., the trackpad surface) corresponding to the movement of the hand of the user, or not performing any operation in response to the first input). Controlling whether an input provided by the predefined portion of the user results in a corresponding operation at the device based on distance from an input device when multiple mechanisms of input are available for providing input to the electronic device provides an efficient way of avoiding conflicting inputs to and/or resulting operations from two different input mechanisms that could concurrently detect the same movements/gestures/characteristics of the predefined portion of the user, thereby enhancing the user-device interaction while reducing errors in usage.

In some embodiments, the second input device is a touch-sensitive input device (1404), such as trackpad 1328. For example, the second input device is a physical trackpad input device that includes a touch-sensitive surface, and the physical trackpad input device is in communication with (e.g., wired or wireless) the electronic device. In some embodiments, touch and/or hover interactions with the touch-sensitive surface of the second input device cause corresponding inputs to be transmitted to the electronic device, which optionally results in the electronic device responding accordingly (e.g., moving a cursor or a focus element indicating what displayed user interface element has focus that are displayed via a display generation component in communication with the electronic device in accordance with movement of a finger touching and/or hovering over the touch-sensitive surface of the second input device). Controlling whether an input provided by the predefined portion of the user results in a corresponding operation at the device based on distance from a touch-sensitive input device when the touch-sensitive input device and a hand tracking input device are available for providing input to the electronic device provides an efficient way of avoiding conflicting inputs to and/or resulting operations from two different input mechanisms that could concurrently detect the same movements/gestures/characteristics of the predefined portion of the user, thereby enhancing the user-device interaction while reducing errors in usage.

In some embodiments, the second input device is a mechanical input device (1406), such as trackpad 1328. For example, the second input device is a trackpad input device in communication with the electronic device that includes a touch-sensitive surface that is clickable (e.g., with sufficient pressure from a finger of the user applied to the touch-sensitive surface) to provide a (e.g., selection) input to the electronic device, or the second input device is a mouse in communication with the electronic device that includes one or more buttons that are clickable to provide a (e.g., selection) input to the electronic device. In some embodiments, in response to detecting input from the mechanical input device (e.g., a click of a button on the mechanical input device), the electronic device selects a user interface element displayed via a display generation component in communication with the electronic device (e.g., to display and/or launch an application corresponding to the selected user interface element). In some embodiments, the user interface element that is selected is the user interface element with which a cursor is coincident when the selection input is detected, or is the user interface element that has a current focus when the selection input is detected. Controlling whether an input provided by the predefined portion of the user results in a corresponding operation at the device based on distance from a mechanical input device when the mechanical input device and a hand tracking input device are available for providing input to the electronic device provides an efficient way of avoiding conflicting inputs to and/or resulting operations from two different input mechanisms that could concurrently detect the same movements/gestures/characteristics of the predefined portion of the user, thereby enhancing the user-device interaction while reducing errors in usage.

In some embodiments, the second input device is located in the physical environment of the electronic device, such as with respect to trackpad 1328 (e.g., the second input device is a separate device than the electronic device and in wired or wireless communication with the electronic device, and is in the physical environment of the electronic device), the one or more second criteria are not satisfied when the predefined portion of the user is within a volume proximate to (e.g., starting at or within a threshold distance, such as 0.5, 1, 2, 5, 10, 20, 50, 100, or 500 cm, of a surface of and/or including at least a portion of or all of) the second input device in the physical environment of the electronic device (e.g., the one or more second criteria are not satisfied when any part of the hand of the user is within or intersects with the volume that encapsulates or surrounds the second input device in the physical environment of the electronic device), the volume including a boundary that is the threshold distance (e.g., 0.5, 1, 2, 5, 10, 20, 50, 100, or 500 cm) from the second input device, such as a volume surrounding trackpad 1328 (e.g., the volume is spherical, a cube, a rectangular prism, etc. that surrounds the second input device by the threshold distance), and the one or more second criteria are satisfied when the predefined portion of the user is outside of the volume proximate to the second input device in the physical environment of the electronic device (1408). In some embodiments, the second input device is at the center of the volume that surrounds the second input device. In some embodiments, an indication of the volume is not displayed by the electronic device. In some embodiments, an indication of the volume (e.g., an outline of the volume, a glowing region corresponding to the volume, etc.) is displayed by the electronic device. Utilizing a volume surrounding the second input device to control whether input provided by the predefined portion of the user results in input being provided to the electronic device and/or how the electronic device responds to input provided by the predefined portion of the user provides a robust manner of testing such inputs in a three-dimensional environment, thereby enhancing the user-device interaction while reducing errors in device response.

In some embodiments, in response to detecting the first input and in accordance with the determination that the first input does not satisfy the one or more second criteria (1410*a*) (e.g., the hand of the user is not further than the threshold distance (e.g., 0.5, 1, 2, 5, 10, 20, 50, 100, or 500 cm) from the touch-detecting surface of the trackpad during the first input), in accordance with a determination that one or more third criteria are satisfied, including a criterion that is satisfied when the predefined portion of the user interacts with the second input device, such as with hand 1303*b* in FIGS. 13C-13D (e.g., the finger of the hand of the user is sufficiently close to the touch-detecting surface of the trackpad input device to be detected by the trackpad input device as an input; for example, the finger is touching the touch-detecting surface of the trackpad input device. In some embodiments, the one or more third criteria additionally or alternatively include a criterion that is satisfied when the input provided by the hand of the user to the trackpad input device is a valid trackpad input, such as a tap input from a finger or a touchdown and swipe input provided by the finger, and is not satisfied when the input provided by the hand to the trackpad input device is not a valid trackpad input, such as the palm of the hand touching down and moving on the touch-detecting surface of the trackpad), the electronic device performs (1410*b*) a second operation based on the movement of the predefined portion of the user detected by the second input device, such as shown in FIG. 13D. For example, performing an operation associated with physical interaction with the physical input device (e.g., the second input device), such as moving a cursor in a user interface displayed by the electronic device in accordance with the (e.g., movement) interaction with the physical input device. In some embodiments, the second operation associated with the second input device is different from the first operation associated with the first input device (e.g., for the same hand movement in physical space). For example, the second operation is moving a cursor displayed by the electronic device in accordance with movement of a finger touching a touch-sensitive surface of the second input device, and the first operation is selection of a button displayed by the electronic device in response to the finger of the user moving and touching/colliding with the button in response to the movement. Responding to interaction with the second input device in a manner consistent with physical input device interaction provides a predictable response to physical input device interactions, thereby enhancing user-device interactions and reducing errors in device usage.

In some embodiments, in response to detecting the first input and in accordance with the determination that the first input does not satisfy the one or more second criteria (1412*a*) (e.g., the hand of the user is not further than the threshold distance (e.g., 0.5, 1, 2, 5, 10, 20, 50, 100, or 500 cm) from the touch-detecting surface of the trackpad during the first input), in accordance with a determination that the one or more third criteria are not satisfied because the predefined portion of the user is not interacting with the second input device, such as with respect to hand 1303*b* in FIG. 13A (e.g., the finger of the hand of the user is not sufficiently close to the touch-detecting surface of the trackpad input device to be detected by the trackpad input device as an input; for example, the finger is not touching the touch-detecting surface of the trackpad input device. In some embodiments, the one or more third criteria additionally or alternatively include a criterion that is satisfied when the input provided by the hand of the user to the trackpad input device is a valid trackpad input, such as a tap input from a finger or a touchdown and swipe input provided by the finger, and is not satisfied when the input provided by the hand to the trackpad input device is not a valid trackpad input, such as the palm of the hand touching down and moving on the touch-detecting surface of the trackpad), the electronic device forgoes (1412*b*) performing the second operation based on the movement of the predefined portion of the user, such as shown in FIG. 13B with respect to hand 1303*b*. For example, when the hand of the user does not interact with the second input device, the electronic device does not respond to movements of the hand even when the one or more second criteria are not satisfied. Not responding to non-interaction with the second input device in a manner consistent with physical input device interaction provides a predictable response to physical input device interactions, thereby enhancing user-device interactions and reducing errors in device usage.

In some embodiments, in response to detecting the first input and in accordance with a determination that the first input satisfies the one or more second criteria but does not satisfy the one or more first criteria, such as with hand 1303*c* in FIG. 13A (e.g., because the finger and/or hand movements detected by the device from the hand of the user are not valid air gesture input movements to the electronic device (e.g., correspond to none of the example air gesture inputs described previously)); for example, movement of a hand in a first hand shape (e.g., with all fingers curled into the palm of the hand), even when the one or more second criteria are satisfied, is optionally not a valid air gesture input to the electronic device), the electronic device forgoes (1414) performing the first operation based on the movement of the predefined portion of the user detected by the first input device, such as shown with respect to hand 1303*c* in FIG. 13B (e.g., performing no operation in response to detecting movement of the hand of the user in the first hand shape). Not responding to inputs detected via the first input device that are not valid inputs to the device provides a predictable response to input device interactions, thereby enhancing user-device interactions and reducing errors in device usage.

In some embodiments, the electronic device is in communication with a display generation component, and the first input corresponds to a cursor movement input detected by the second input device that moves a cursor in a user interface displayed via the display generation component to a first location in the user interface (1416*a*), such as shown with cursor 1310' in FIG. 13D (e.g., the first input is a cursor movement input for moving a cursor within a region of a three-dimensional environment and/or user interface, such as described with reference to methods 800 and/or 1200).

In some embodiments, after detecting the first input and while the cursor is not displayed via the display generation component (e.g., the cursor ceases being displayed after the first input in response to detecting a gaze of the user being directed to a region outside of the user interface in which the cursor was displayed and/or for any of the reasons described with reference to methods 800 and/or 1200), the electronic device detects (1416*b*), via the second input device, a second input (e.g., detecting an input from the hand of the user that is directed to a physical trackpad that is in communication with the electronic device, such as a finger of the user touching down on the touch-sensitive surface of the trackpad or coming to within a threshold distance, such as 0.1, 0.2, 0.3, 0.5, 1, 2, 3, 5, or 10 mm, of the touch-sensitive surface of the trackpad).

In some embodiments, in response to detecting the second input (1416*c*), in accordance with a determination that a gaze of the user is directed to a second location, different from the first location, in the user interface when the second input is detected, the electronic device displays (1416*d*) the cursor at the second location in the user interface, such as cursor 1310 in FIG. 13C being displayed at the location of gaze 1308*a* (e.g., and controlling the cursor from the second location in the user interface in accordance with movement of the hand of the user included the second input). For example, when the cursor is redisplayed in the user interface in response to detecting input at the second input device, the cursor is optionally displayed/spawned, not at the location at which the cursor was last displayed when it was last controlled via the first input device, but at the location of the gaze of the user when the second input is first detected by the second input device (e.g., upon touchdown of the finger of the user on the touch-sensitive surface of the second input device). If the second input includes movement of the hand/finger of the user on the touch-sensitive surface of the second input device after touchdown on the touch-sensitive surface of the second input device, the cursor is optionally moved away from the second location in the user interface in accordance with the movement of the hand/finger of the user.

In some embodiments, in accordance with a determination that a gaze of the user is directed to a third location, different from the first and second locations, in the user interface when the second input is detected, the electronic device displays (1416*e*) the cursor at the third location in the user interface, such if gaze 1308*a* in FIG. 13C had been directed to another location in object 1304*c* (e.g., and controlling the cursor from the third location in the user interface in accordance with the second input). If the second input includes movement of the hand/finger of the user on the touch-sensitive surface of the second input device after touchdown on the touch-sensitive surface of the second input device, the cursor is optionally moved away from the third location in the user interface in accordance with the movement of the hand/finger of the user. Displaying the cursor at the location of the gaze of the user ensures the cursor is displayed at or near the area of interest to the user, thereby enhancing user-device interactions and reducing the need for input to move the cursor to the area of interest.

In some embodiments, while displaying the cursor at a respective location within a respective region in the user interface (e.g., the respective region is an area or volume surrounding the cursor defined as including areas or volumes within a threshold distance, such as 1, 2, 5, 10, 20, 40, 50, 100, 200, 400, or 500 mm, of the cursor, and does not include areas or volumes that are outside of the threshold distance of the cursor) after detecting the second input and while displaying a menu outside of the respective region of the user interface, such as menu 1314 in FIG. 13D (e.g., the user interface is displaying the cursor and a menu that includes a plurality of selectable options. For example, the menu is a contextual menu associated with respective content (e.g., text, image, etc.) included in the user interface, and includes options that are selectable to copy, cut, paste, etc. content at the location of the cursor within the respective content. In some embodiments, the menu was displayed in response to an input detecting after the second input, such as a two-finger touchdown/liftoff on the touch-sensitive surface of the second input device), the electronic device detects (1418*a*), via the second input device, second movement of the predefined portion of the user, such as the movement of hand 1303*b* in FIG. 13D (e.g., movement of a finger of the user on the touch-sensitive surface of the second input device while the finger remains in contact with or within a threshold distance, such as 0.1, 0.2, 0.3, 0.5, 1, 2, 3, 5, or 10 mm, of the touch-sensitive surface).

In some embodiments, in response to detecting the second movement of the predefined portion of the user (1418*b*), in accordance with a determination that the gaze of the user is directed to the respective region when the second movement of the predefined portion of the user is detected (e.g., when the beginning of the second movement is detected), the electronic device moves (1418*c*) the cursor away from the respective location within the user interface in accordance with the second movement of the predefined portion of the user, such as shown with cursor 1310' in FIG. 13D (e.g., rightward movement of the finger on the touch-sensitive surface of the second input device causes corresponding rightward movement of the cursor in the user interface, upward movement of the finger on the touch-sensitive surface of the second input device causes corresponding upward movement of the cursor in the user interface, etc.).

In some embodiments, in accordance with a determination that the gaze of the user is directed to the menu when the second movement of the predefined portion of the user is detected (e.g., when the beginning of the second movement is detected), the electronic device moves (1418*d*) a current focus from a first item in the menu to a second item in the menu in accordance with the second movement of the predefined portion of the user, such as shown with focus indicator 1316 in FIG. 13D (e.g., rightward movement of the finger on the touch-sensitive surface of the second input device causes corresponding rightward movement of the current focus in the menu, upward movement of the finger on the touch-sensitive surface of the second input device causes corresponding upward movement of the current focus in the menu, etc.), without moving the cursor within the user interface in accordance with the second movement of the predefined portion of the user (e.g., while the cursor remains displayed at the respective location while the current focus moves from the first item to the second item in the menu). For example, in some embodiments, movement of a finger of the user on the touch-sensitive surface of the second input device causes either the cursor to move in the user interface (e.g., without moving a current focus in the menu, which optionally remains on the menu item with the current focus) if the gaze of the user is directed to the cursor, or causes the current focus to move (e.g., without moving the cursor) from one menu item to another if the gaze of the user is directed to the menu. In some embodiments, detecting a selection input (e.g., such as a finger tap or click on the touch-sensitive surface of the second input device) while a given menu item in the menu has the current focus causes the electronic device to perform an operation corresponding to the given menu item (e.g., a copy function, a paste function, a cut function, etc.). Selectively moving the cursor based on gaze ensures the cursor is not moved away from its last location when user attention is directed to another area of the user interface, which allows for cursor interactions to resume from the same location when user attention returns to the cursor location, thereby enhancing user-device interactions and reducing the need for input to return the cursor to an area of interest.

In some embodiments, the electronic device is in communication with a display generation component (1420*a*). In some embodiments, the electronic device displays (1420*b*), via the display generation component, a representation of a portion of the physical environment of the display generation component (and/or the electronic device. In some embodiments, the representation of the portion of the physical environment is displayed in a three-dimensional environment displayed via the display generation component (e.g., virtual or video passthrough). In some embodiments, the representation of the portion of the physical environment is a view of the portion of the physical environment visible through a transparent portion of the display generation component (e.g., true or real passthrough), including, in accordance with a determination that the portion of the physical environment of the display generation component includes the second input device (e.g., the electronic device is displaying a viewpoint of a three-dimensional environment that includes the second input device), displaying, in the representation of the portion of the physical environment, a visual indication of status associated with the second input device in association with a representation of the second input device displayed in the representation of the portion of the physical environment (1420*c*), such as indication 1360 shown in FIG. 13E. For example, displaying adjacent to (e.g., 0.1, 0.5, 1, 2, 4, 5, 10, or 20 cm separated from) or overlapping with the representation of the second input device, the visual indication of status. In some embodiments, the visual indication of status indicates one or more states of status of the second input device, such as battery level, connectivity status with the electronic device, etc. The location in the field of view displayed by the display generation component at which the electronic device displays the visual indication of status is optionally based on the location of the second input device. For example, if the second input device is in the lower-right portion of the currently displayed field of view, the visual indication of status is optionally displayed in the lower-right portion of the currently-displayed field of view, and if the second input device is in the upper-left portion of the currently-displayed field of view, the visual indication of status is optionally displayed in the upper-left portion of the currently-displayed field of view.

In some embodiments, in accordance with a determination that the portion of the physical environment of the electronic device does not include the second input device, such as in FIG. 13D (e.g., the electronic device is displaying a viewpoint of a three-dimensional environment that does not include the second input device), the electronic device forgoes (1420*d*) displaying the visual indication of the status associated with the second input device, such as indication 1360 not being displayed in FIG. 13D (e.g., the electronic device does not display the representation of the second input device and, therefore, also does not display the visual indication of the status of the second input device). Displaying status for a physical device when a representation of the device is being displayed by the electronic device provides an efficient way of conveying the status of the device to the user, thereby enhancing user-device interactions.

FIGS. 15A-15H illustrate examples of a computer system facilitating cursor movement in accordance with some embodiments.

Figure 15A:
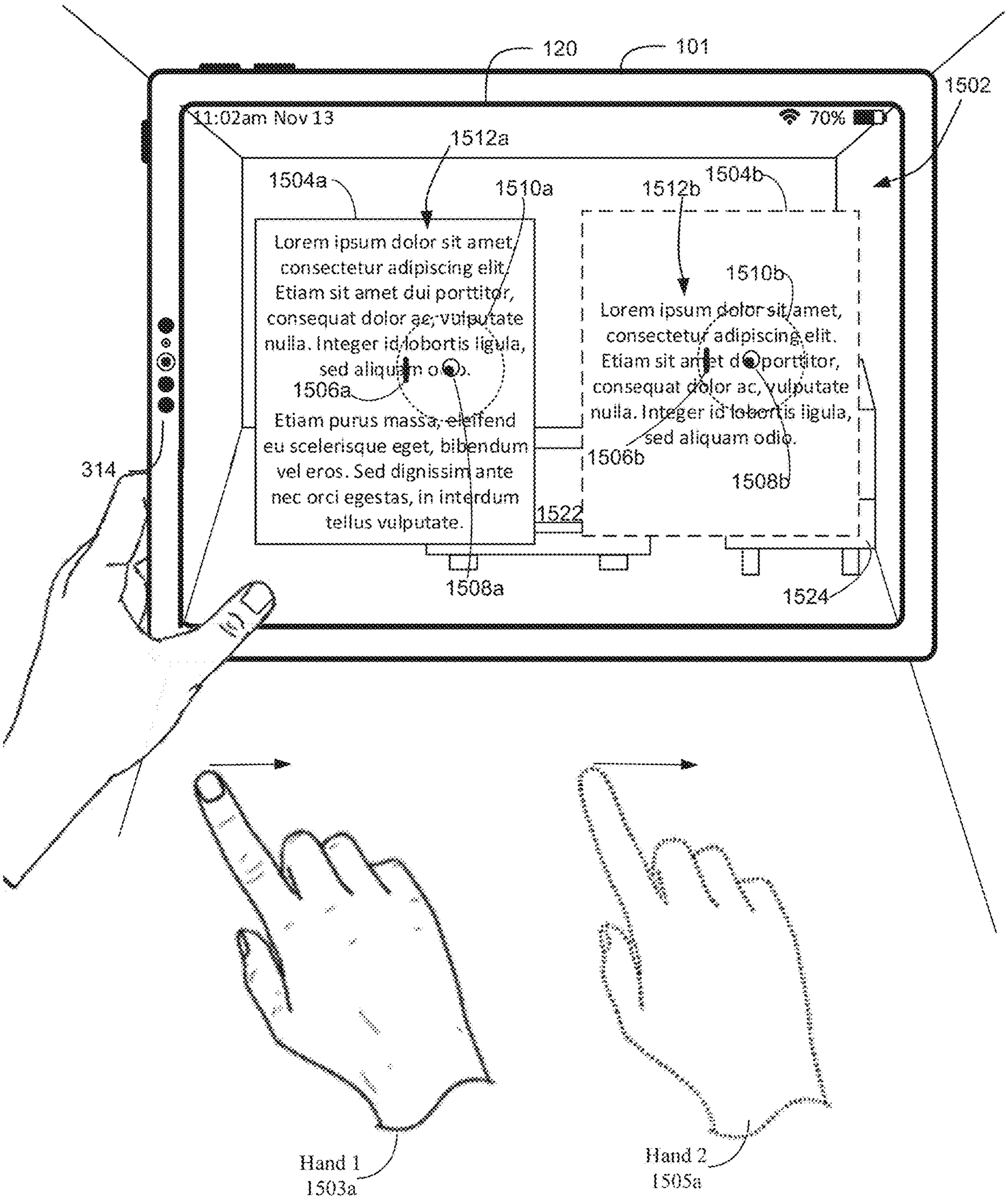
FIGS. 15A-15H illustrate examples of a computer system facilitating cursor movement in accordance with some embodiments.

FIG. 15A illustrates a computer system (e.g., an electronic device) 101 displaying, via a display generation component (e.g., display generation component 120 of FIG. 1), a three-dimensional environment 1502 from a viewpoint of a user of the computer system 101. As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 15A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 1502; in some embodiments, the physical environment is visible via passive passthrough, such as through a transparent or translucent portion of display generation component 120. For example, three-dimensional environment 1502 includes a representation 1524 of a sofa (partially occluded by object 1504*b*), which is optionally a representation of a physical sofa in the physical environment; three-dimensional environment 1502 also includes a representation 1522 of a table (e.g., partially occluded by objects 1504*a* and 1504*b*), which is optionally a representation of a physical table in the physical environment. Three-dimensional environment 1502 also includes representations of the physical floor, ceiling and back and side walls of the room in which computer system 101 is located.

In FIG. 15A, three-dimensional environment 1502 also includes virtual objects 1504*a* and 1504*b*. Virtual objects 1504*a* and 1504*b* are optionally one or more of user interfaces of applications (e.g., messaging user interfaces, content browsing user interfaces, etc.), three-dimensional objects (e.g., virtual clocks, virtual balls, virtual cars, etc.), representations of content (e.g., representations of photographs, videos, movies, music, etc.) or any other element displayed by computer system 101 that is not included in the physical environment of computer system 101. In FIG. 15A, virtual objects 1504*a* and 1504*b* are two-dimensional objects, but the examples described herein could apply analogously to three-dimensional objects. Additionally, in FIG. 15A, virtual objects 1504*a* and 1504*b* are optionally displaying text content (e.g., "Lorem ipsum dolor . . . ") 1512*a* and 1512*b*, respectively, in three-dimensional environment 1502. Further, in some embodiments, computer system 101 does not display objects 1504*a* and 1504*b* concurrently; in such embodiments, the below-described interactions with objects 1504*a* and 1504*b* optionally occur independently.

In FIG. 15A, objects 1504*a* and 1504*b* include cursors 1506*a* and 1506*b*, respectively (e.g., which are optionally operating as text insertion cursors, as will be described in more detail below and which are also described in the FIG. 9 series of figures and method 1000), in three-dimensional environment 1502. For example, the cursors 1506*a* and 1506*b* indicate where new text/content will be inserted in response to receiving an input corresponding to an insert request (e.g., such as a typing or a paste or insert operation). In FIG. 15A, the cursor 1506*a* is displayed at a location within the text content 1512*a* (e.g., toward the end of the word "aliquam") and the cursor 1506*b* is displayed at a location within the text content 1512*b* (e.g., in the middle of the word "amet"). Just as objects 1504*a* and 1504*b* are not necessarily concurrently displayed by computer system 101, cursors 1506*a* and 1506*b* are also optionally not concurrently displayed by computer system 101. In such embodiments, computer system 101 optionally performs the cursor operations described below independently.

Additionally, in FIG. 15A, attention (e.g., a gaze) of the user of the computer system 101 is directed to the virtual objects 1504*a* and 1504*b*, respectively. For example, as shown, a first gaze 1508*a* is directed to virtual object 1504*a*, and a second gaze 1508*b* is directed to virtual object 1504*b*. It should be understood that while multiple gaze points are illustrated in FIGS. 15A-15H, such gaze points need not be detected by computer system 101 concurrently; rather, in some embodiments, computer system 101 independently responds to the gaze points illustrated and described in response to detecting such gaze points independently.

In some embodiments, computer system 101 confines a movement of a respective cursor in three-dimensional environment 1502 to a region that is based on the gaze of the user of the computer system 101. For example, in FIG. 15A, computer system 101 defines a first region 1510*a* that is based on the gaze 1508*a* in virtual object 1504*a* and defines a second region 1510*b* that is based on the gaze 1508*b* in virtual object 1504*b* in three-dimensional environment 1502. In some embodiments, the gaze points 1508*a* and 1508*b* define a center of the regions 1510*a* and 1510*b*, respectively, in three-dimensional environment 1502. In some embodiments, the regions 1510*a* and 1510*b* are defined by computer system 101 as circular regions (e.g., a 5.5-degree circle, measured as between the viewpoint of the user and the gaze point, and the viewpoint of the user and a point on a boundary on the region). In some embodiments, the angular size of the region defined by the gaze of the user is independent of the distance of the cursor from the viewpoint of the user. For example, with reference to FIG. 15A, if the cursor 1506*a* were located a first distance away from the viewpoint of the user, and if the cursor 1506*b* were located a second distance, different from the first difference away from the viewpoint of the user, the angular sizes of the first region 1510*a* and the second region 1510*b* would optionally be the same in three-dimensional environment 1502, as shown. In some embodiments, when the angular size of the region defined by the gaze of the user remains constant, the size of the region in the three-dimensional environment 1502 increases as the distance between the cursor and the viewpoint of the user increases, and decreases as the distance between the cursor and the viewpoint of the user decreases. Alternatively, in some embodiments, the size of the region remains constant in the three-dimensional environment, in which case, the angular size of the region defined by the gaze of the user increases as the distance between the cursor and the viewpoint of the user decreases, and decreases as the distance between the cursor and the viewpoint of the user increases. It should be understood that, while the regions 1510*a* and 1510*b* are displayed in FIGS. 15A-15H for illustrative purposes, in some embodiments, computer system 101 does not display indications and/or boundaries of the regions 1510*a* and 1510*b* in three-dimensional environment 1502.

As mentioned above, computer system 101 optionally constrains movement of cursors in three-dimensional environment 1502 to the regions defined by the gaze point of the user of computer system 101 and/or depending on the operation being controlled and/or performed by the cursors during the movement. Such examples will now be described. In FIG. 15A, computer system 101 is detecting a first cursor movement input from hand 1503*a* ("Hand 1"), and a second cursor movement input from hand 1505*a* ("Hand 2"). The cursor movement input from hand 1503*a* optionally includes detecting hand 1503*a* in a relaxed hand shape (e.g., with the thumb and the tip of the index finger of hand 1503*a* not touching) and/or ready state, and movement of hand 1503*a* in a rightward direction while maintaining the relaxed hand shape. The cursor movement input from hand 1505*a* optionally includes detecting hand 1505*a* in a relaxed hand shape (e.g., with the thumb and the tip of the index finger of hand 1505*a* not touching) and/or ready state, and movement of hand 1505*a* in a rightward direction while maintaining the relaxed hand shape. The magnitude of the movement of hand 1505*a* is optionally greater than the magnitude of the movement of hand 1503*a*. For example, the cursor 1506*a* and the cursor 1506*b* are located at the same relative location in virtual object 1504*a* and virtual object 1504*b*, respectively, when the movement inputs are provided. It should be understood that while multiple hands and corresponding inputs are illustrated in FIGS. 15A-15H, such hands and inputs need not be detected by computer system 101 concurrently; rather, in some embodiments, computer system 101 independently responds to the hands and/or inputs illustrated and described in response to detecting such hands and/or inputs independently.

Figure 15B:
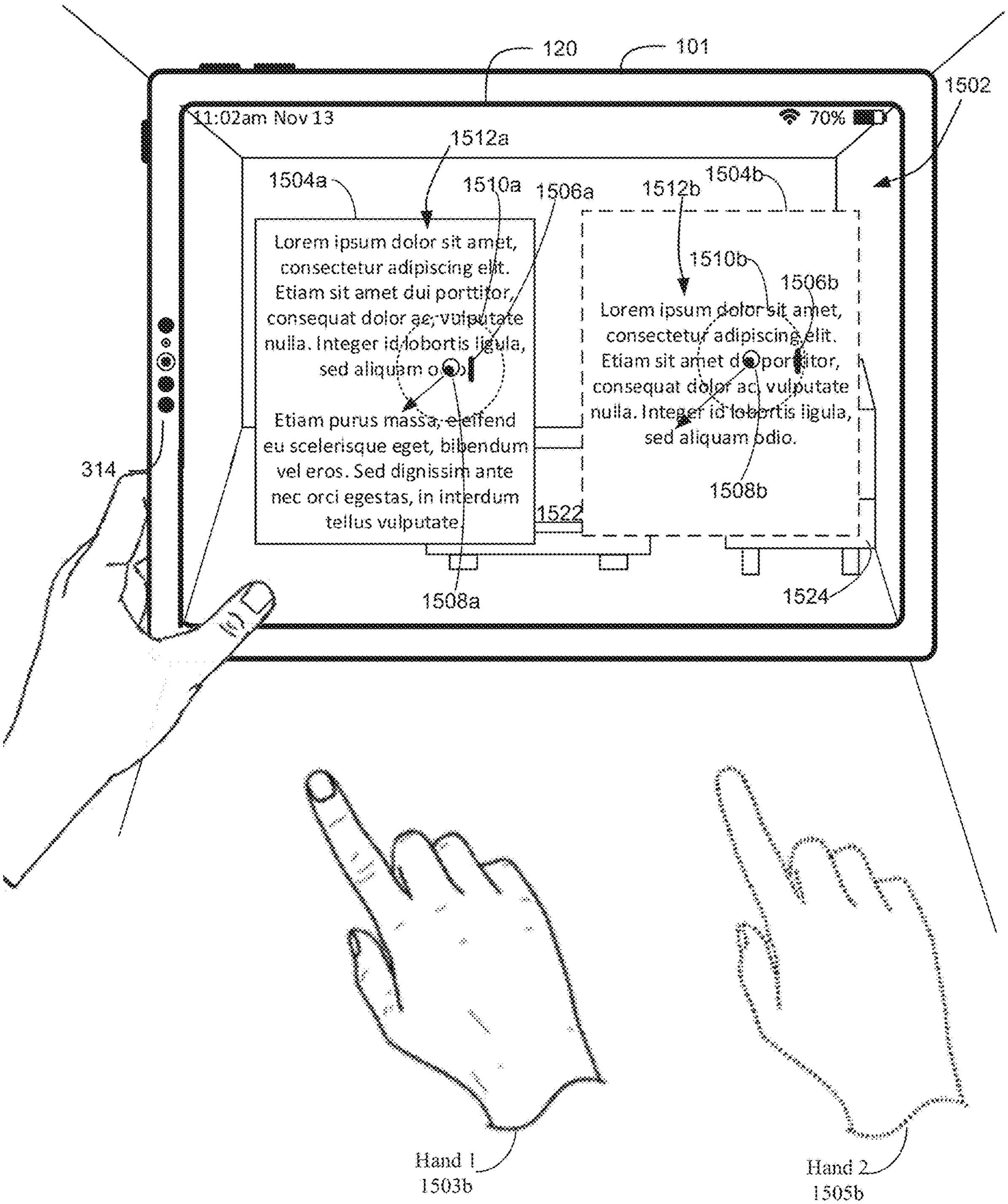

The response of computer system 101 to the inputs from hands 1503*a* and/or 1505*a* optionally varies, as mentioned previously. For ease of illustration of such concepts, it should be understood that the gaze of the user optionally does not move while the hands 1503*a* and/or 1505*a* move. For example, in FIG. 15A, the movement of the hand 1503*a* corresponds to movement of the cursor 1506*a* to a location in virtual object 1504*a* that is within the region 1510*a* defined by the gaze 1508*a*. The movement of the hand 1505*a* optionally corresponds to movement of the cursor 1506*b* to a location in virtual object 1504*b* that is outside the region 1510*b* defined by the gaze 1508*b*. Therefore, in FIG. 15B, in response to detecting the cursor movement input from hands 1503*a* and/or 1505*a*, computer system 101 optionally moves cursors 1506*a* and/or 1506*b* within objects 1504*a* and/or 1504*b* to a location that is within the regions 1510*a* and/or 1510*b*, respectively. For example, as shown in FIG. 15B, the cursor 1506*a* is moved to a location within the region 1510*a* in accordance with the movement of hand 1503*a* detected in FIG. 15A. Additionally, in FIG. 15B, the cursor 1506*b* is also moved to a location within the region 1510*b* despite the movement of hand 1505*a* detected in FIG. 15A corresponding to movement of the cursor 1506*b* beyond the region 1510*b*. As mentioned above, computer system 101 optionally constrains the movement of the cursor to a location based on the gaze of the user in three-dimensional environment 1502. Accordingly, even though the magnitude of the movement of hand 1505*a* had corresponded to movement of the cursor 1506*b* beyond the region 1510*b* (e.g., to the end of the word "porttitor"), computer system 101 optionally moves the cursor 1506*b* to a location that is still within the region 1510*b* (e.g., to the middle of the word "porttitor"). For example, the cursor 1506*b* is moved to a location that is at or near a boundary of the region 1510*b* that is in the direction of the movement of the hand 1505*a*, but does not correspond to the full movement as defined by the magnitude of the movement of the hand 1505*a*. In other words, the movement of the cursor 1506*b* in accordance with the movement of the hand 1505*a* is optionally limited to the boundary of the region 1510*b* defined by the gaze 1508*b*.

In some embodiments, while the hand of the user moves in the relaxed hand state and/or ready state, the computer system 101 updates display of the cursor in three-dimensional environment 1502 in accordance with the movement of the hand. For example, the movements of the cursors 1506*a* and/or 1506*b* are animated in three-dimensional environment 1502 to follow the movements of the hands 1503*a* and/or 1503*b*. In some embodiments, the cursor is moved in three-dimensional environment 1502 at a respective speed. In some such embodiments, the respective speed of the movement of the cursor in three-dimensional environment 1502 corresponds to a speed of the movement of the hand of the user. For example, if hand 1503*a* were to move at a first respective speed, computer system 101 would move the cursor 1506*a* in virtual object 1504*a* at a first speed that corresponds to the first respective speed. In some embodiments, the speed of the movement of the cursor is equal to (e.g., or substantially equal to, such as within 0.5, 1, 1.5, 2, or 3 m/s of) the respective speed of the movement of the hand of the user. In some embodiments, the speed of the movement of the cursor is proportional to the respective speed of the movement of the hand of the user.

In some embodiments, the computer system 101 smooths the region determined based on the gaze of the user to account for quick and/or random deviations in the user's eye movement. For example, as the hand of the user moves to cause a movement of the cursor, the computer system 101 actively updates the region defined by the gaze (e.g., by applying a filter, performing an averaging, and/or delaying a response to detected movement of one or more of the user's eyes) to account for jitters and/or darts in the user's eye movements. Accordingly, when the user provides hand input, as discussed above, for moving the cursor in three-dimensional environment 1502, quick and/or random movements of the user's eyes (and thus the user's gaze) are prevented from significantly altering a location of the cursor-constraining region, and therefore a location to which the cursor is moved in accordance with the hand movement.

In some embodiments, movement of the cursor in three-dimensional environment 1502 is additionally or alternatively based on a movement of the gaze of the user of computer system 101 (e.g., without detecting movement of a hand of the user). For example, in FIG. 15B, the gaze 1508*a* is moving to a new location in virtual object 1504*a*, and the gaze 1508*b* is moving to a new location in virtual object 1504*b* in three-dimensional environment 1502. The gaze 1508*a* is optionally moving in a leftward and downward direction within virtual object 1504*a* (e.g., toward the word "massa" in text content 1512*a*), and gaze 1508*b* is optionally moving in a leftward and downward direction within virtual object 1504*b* (e.g., toward the word "sed" in text content 1512*b*). In FIG. 15B, as the gaze points 1508*a* and/or 1508*b* are moved in three-dimensional environment 1502, the hands 1503*b* and/or 1505*b* optionally remain stationary (e.g., are not detected by computer system 101 as performing a cursor movement input). The speed of the movement of the gaze 1508*b* is optionally greater than the speed of the movement of the gaze 1508*a*. In some embodiments, the computer system 101 changes the region defined by the gaze of the user in accordance with the detected movement of the gaze in three-dimensional environment 1502, as described in detail below.

Figure 15C:
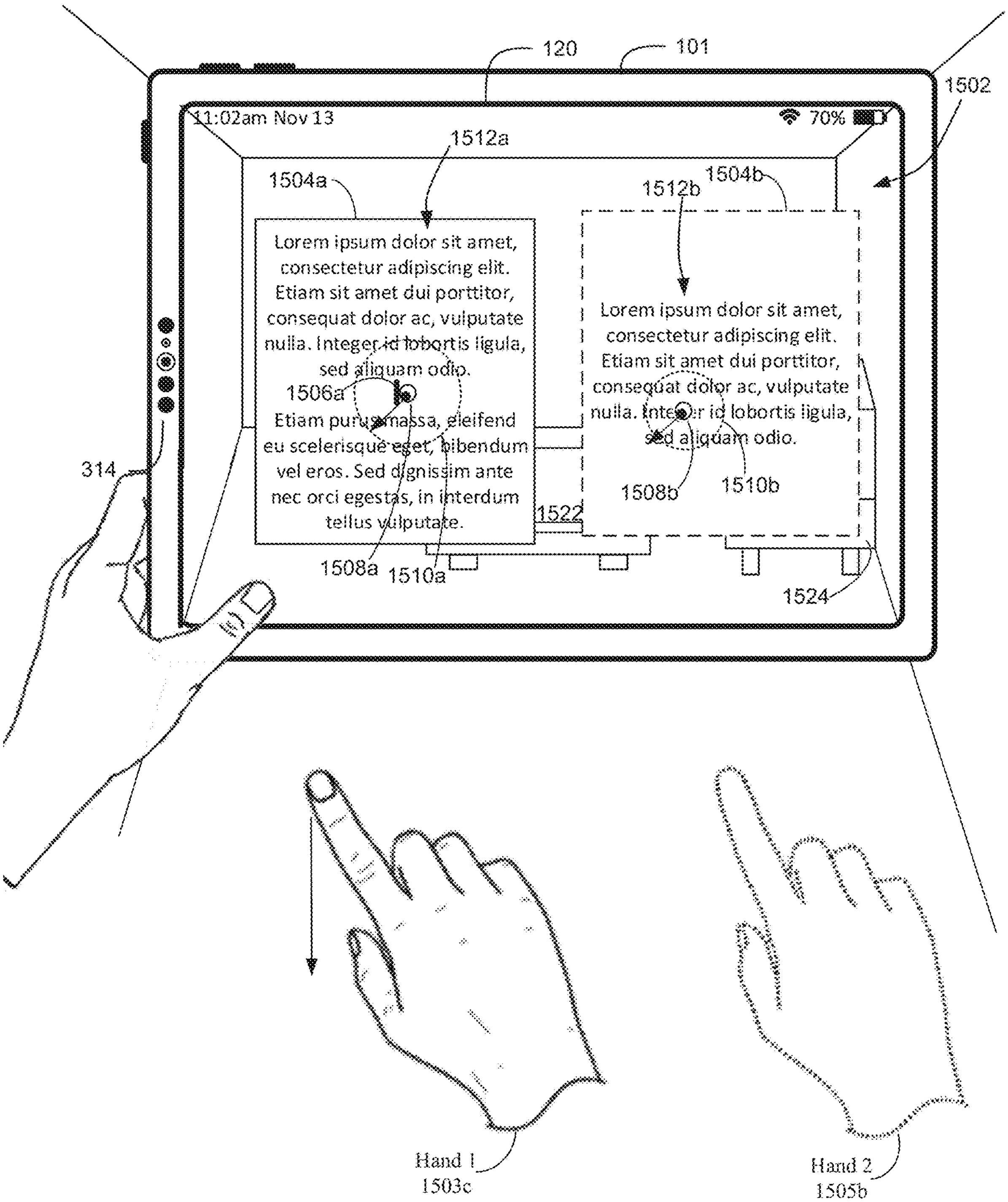

In FIG. 15C, in response to detecting the movement of the gaze points 1508*a* and/or 1508*b* in three-dimensional environment 1502, computer system 101 changes the regions 1510*a* and/or 1510*b*, respectively. For example, as shown in FIG. 15C, in response to detecting the movement of the gaze 1508*a* in virtual object 1504*a*, computer system 101 redefines the region 1510*a* to correspond to (e.g., be centered around) the current location of the gaze 1508*a*. Likewise, in response to detecting the movement of the gaze 1508*b* in virtual object 1504*b*, computer system 101 redefines the region 1510*b* to correspond to (e.g., be centered around) the current location of the gaze 1508*b* in FIG. 15C.

Additionally, in some embodiments, computer system 101 alters the bounds (e.g., a size of) the region defined by the gaze depending on the detected speed of the movement of the gaze in three-dimensional environment 1502. For example, as mentioned above, the speed of the movement of the gaze 1508*b* detected in FIG. 15B is optionally greater than the detected speed of the movement of the gaze 1508*a*.

In some embodiments, if the speed of the movement of the gaze detected by computer system 101 is at or below a threshold speed (e.g., 5, 10, 12, 15, 17, or 20 m/s), computer system 101 forgoes altering a size of the region defined by the gaze in three-dimensional environment 1502. For example, as shown in FIG. 15C, the size of the region 1510*a* in virtual object 1504*a* is the same as the size of the region 1510*a* in virtual object 1504*a* in FIG. 15B. In some embodiments, if the speed of the movement of the gaze detected by computer system 101 is above the threshold speed, computer system 101 alters the size of the region defined by the gaze in three-dimensional environment 1502. For example, as shown in FIG. 15C, the size of the region 1510*b* in virtual object 1504*b* is smaller than the size of the region 1510*b* in virtual object 1504*b* in FIG. 15B. In some embodiments, the faster the movement of the gaze, the smaller the size of the region 1510*b* is defined in three-dimensional environment 1502.

Further, in some embodiments, computer system 101 alters the display of the cursor depending on the detected speed of the movement of the gaze in three-dimensional environment 1502. For example, as mentioned above, the speed of the movement of the gaze 1508*b* detected in FIG. 15B is optionally greater than the detected speed of the movement of the gaze 1508*a*. In some embodiments, if the speed of the movement of the gaze detected by computer system 101 is at or below a threshold speed (e.g., 5, 10, 12, 15, 17, or 20 m/s), computer system 101 maintains display of the cursor in three-dimensional environment 1502 as the gaze moves. For example, as shown in FIG. 15C, the cursor 1506*a* is displayed at a current location of the gaze 1508*a* in virtual object 1504*a* as the gaze 1508*a* moves. In some embodiments, if the speed of the movement of the gaze detected by computer system 101 is above the threshold speed, computer system 101 ceases display of the cursor in three-dimensional environment 1502 as the gaze moves. For example, as shown in FIG. 15C, the cursor 1506*b* ceases to be displayed in virtual object 1504*b* in three-dimensional environment 1502 as the gaze 1508*b* moves.

In some embodiments, the gaze of the user changes while the hand of the user moves in the relaxed hand state and/or ready state. For example, with reference to FIG. 15B, if the computer system 101 were to detect hand 1503*b* move, in the manner described above, at a respective magnitude and/or in a respective direction (e.g., as shown in FIG. 15A) while also detecting the gaze 1508*a* moving, the computer system 101 would optionally move the cursor 1506*a* based on the movement of the hand 1503*b*, but constrain the movement to the current location of region 1510*a* based on the current location of the gaze (e.g., when the movement of the hand was detected). Accordingly, if the computer system 101 were to detect the hand 1503*b* move in an upward and rightward direction (e.g., while in the relaxed hand state and/or ready state), while the gaze 1508*a* is moving in the downward and leftward direction, as shown in FIG. 15B, the computer system 101 would move the cursor 1506*a* to a location that is within the region 1510*a* in FIG. 15C. Specifically, in some examples, because the movement of the hand was in an upward and rightward direction, the computer system 101 would display the cursor 1506*a* near a boundary of the region 1510*a* (e.g., at or near the word "odio" in the text content 1512*a*) in object 1504*a*, and not beyond that boundary in an upward and rightward direction, even if the movement of the hand 1503*b* were sufficient to otherwise move the cursor to such a location.

In FIG. 15C, the gazes 1508*a* and/or 1508*b* continue moving to their respective new locations in virtual objects 1504*a* and/or 1504*b*, respectively, in three-dimensional environment 1502. Additionally, in FIG. 15D, hand 1503*c* disengages. For example, the hand 1503*c* is lowered and/or rested at the user's side, such that the hand 1503*c* ceases to be detectable by sensors 314 of computer system 101.

Figure 15D:
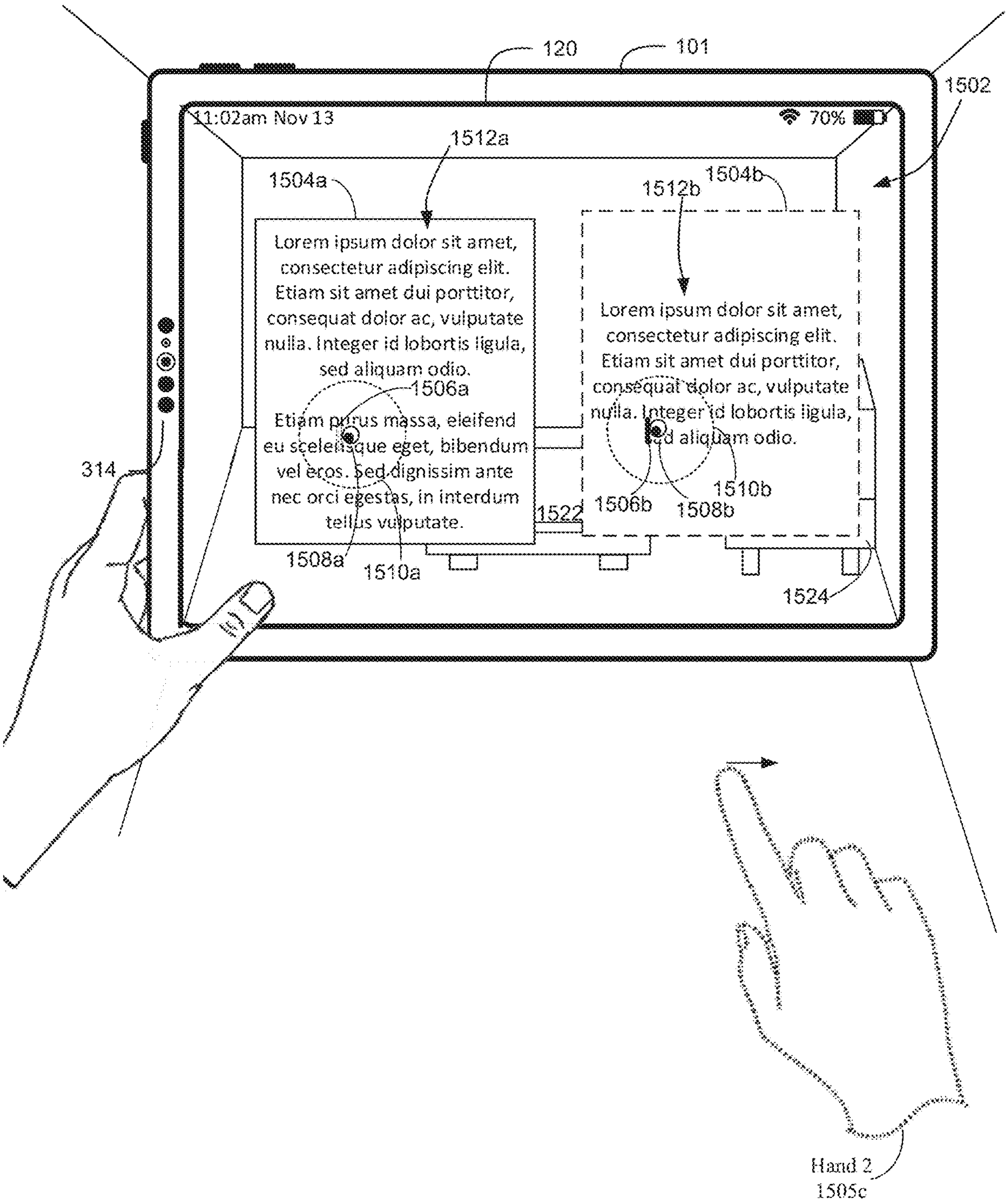

In response to detecting the ends of the movements of the gazes 1508*a* and/or 1508*b*, computer system 101 displays the cursors 1506*a* and/or 1506*b* at the current locations of the gazes 1508*a* and/or 1508*b*, respectively, in three-dimensional environment 1502, as shown in FIG. 15D. For example, in FIG. 15D, the cursor 1506*a* is displayed at a current location of the gaze point 1508*a* in virtual object 1504*a*, and/or the cursor 1506*b* is displayed at a current location of the gaze point 1508*b* in virtual object 1504*b* in three-dimensional environment 1502. Additionally, in response to detecting finality of the movement of the gaze, computer system 101 optionally redefines the region defined by the gaze to correspond to the current location of the gaze in three-dimensional environment 1502. For example, in FIG. 15D, the region 1510*a* is centered around the gaze point 1508*a* in virtual object 1504*a*, and the region 1510*b* is centered around the gaze point 1508*b* in virtual object 1504*b* in three-dimensional environment 1502. Further, because the gaze 1508*b* is no longer moving at a respective speed that is above the threshold speed (e.g., 5, 10, 12, 15, 17, or 20 m/s), the region 1510*b* is redefined to have the size of region 1510*b* before the movement of gaze 1508*b* was detected (e.g., the size of region 1510*b* in FIG. 15B).

Additionally, in some embodiments, in response to detecting that the hand of the user is disengaged (e.g., is no longer detectable by sensors 314), computer system 101 ceases display of the cursor in three-dimensional environment 1502. For example, in FIG. 15D, in response to detecting that the hand 1503*c* is in a disengaged state—or alternatively in response to not detecting hand 1503*c* in an engaged state—the computer system 101 ceases display of the cursor 1506*a* (e.g., represented by the dashed cursor in FIG. 15D). In some embodiments, in response to detecting the gaze is no longer directed to the text content in the virtual object in three-dimensional environment 1502, computer system 101 ceases display of the cursor in the virtual object. For example, if the computer system 101 were to detect that the gaze 1508*a* of the user is no longer directed to the text content 1512*a* in virtual object 1504*a* for a threshold period of time (e.g., 1, 2, 2.5, 3, 4, 4.5, 5, or 10 s), the computer system 101 would cease displaying the cursor 1506*a* in virtual object 1504*a*, as similarly indicated in FIG. 15D, even if the hand 1503*c* of the user were in the engaged state.

In some embodiments, a pinch and drag movement directed to a portion of the content in three-dimensional environment 1502 performs a content selection operation in accordance with the pinch and drag movement. In FIG. 15D, computer system 101 detects hand 1505*c* perform an air pinch gesture (e.g., with the thumb and the tip of the index finger of hand 1505*c* touching) while the gaze 1508*b* is directed to text content 1512*b*, followed by movement of hand 1505*c* in a rightward direction while maintaining the pinch hand shape. Additionally, in FIG. 15D, computer system 101 detects Hand 1 (e.g., hand 1503*c* in FIG. 15C) reengage. For example, the hand of the user is raised again such that the sensors 314 of the computer system 101 can detect the hand.

Figure 15E:
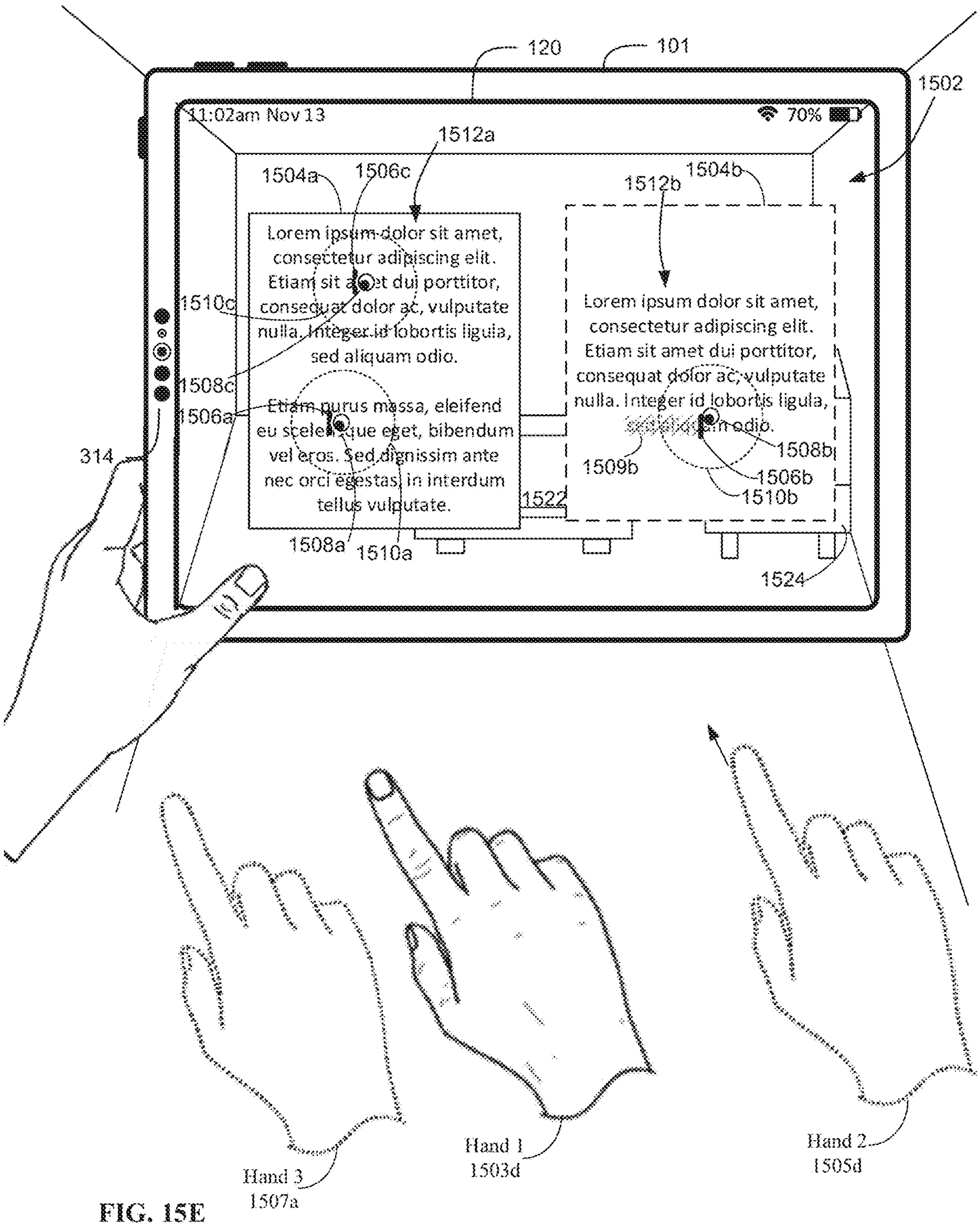

In FIG. 15E, in response to detecting the air pinch gesture followed by the movement of the hand 1505*c*, computer system 101 optionally performs a content selection operation in accordance with the movement of hand 1505*c* while remaining in the pinch hand shape. For example, in response to such an input from hand 1505*c*, computer system 101 has highlighted/selected text within text content 1512*b* in virtual object 1504*b* in three-dimensional environment 1502, as shown in FIG. 15E. In FIG. 15E, a portion of the words "sed aliquam" of the text content 1512*b* has been highlighted/selected in virtual object 1504*b*, indicated by highlighting 1509*b*, in accordance with the direction and magnitude of the movement of the hand 1505*c* (e.g., movement in a rightward direction with a respective magnitude corresponding to the selection of the portion of the words "sed aliquam"). As shown in FIG. 15E, the cursor 1506*b* optionally moves with the movement of the hand 1505*c* as the portion of the text content 1512*b* is highlighted/selected in three-dimensional environment 1502. In some embodiments, because a movement of the cursor 1506*b* is constrained by the region 1510*b* defined by the gaze 1508*b*, an amount of the portion of the text content 1512*b* that is highlighted in response to the movement of the hand 1505*c* while in the pinch hand shape is optionally also constrained by the region 1510*b* defined by the gaze 1508*b* in three-dimensional environment 1502.

Additionally, in response to detecting the reengagement of Hand 1, computer system 101 optionally redisplays the cursor 1506*a* at the location of the gaze 1508*a* in three-dimensional environment 1502. For example, the cursor 1506*a* is redisplayed at the current location of gaze point 1508*a* in virtual object 1504*a* in three-dimensional environment 1502. In some embodiments, the user of computer system 101 may provide a series of air pinch inputs directed to the content of virtual objects 1504*a* and/or 1504*b* in three-dimensional environment 1502 to cause the computer system 101 to perform one or more selection/highlighting actions in the content. In FIG. 15E, hand 1503*d* is providing a double air pinch gesture while the gaze 1508*a* is directed to a first portion of the text content 1512*a* in virtual object 1504*a*. For example, computer system 101 detects the index finger contact the thumb of hand 1503*d* a first time, followed by a separation of the index finger and the thumb of hand 1503*d*, and followed by a second contact between the index finger and the thumb of hand 1503*d*, optionally all within a time threshold of one another (e.g., 0.1, 0.3, 0.5, 1, 3, 5, or 10 seconds). Additionally, in FIG. 15E, hand 1505*d* is providing a second air pinch gesture followed by an upward and leftward movement of the hand 1505*d* while the gaze 1508*b* is directed to the already selected/highlighted portion of the text content 1512*b* in virtual object 1504*b*. In FIG. 15E, hand 1507*a* is optionally providing a triple air pinch gesture while gaze 1508*c* of the user is directed to a second portion of the text content 1512*a* in virtual object 1504*a*. For example, computer system 101 detects the index finger make contact with the thumb of the hand 1507*a* three subsequent times, optionally all within the above-described time threshold of one another.

Figure 15F:
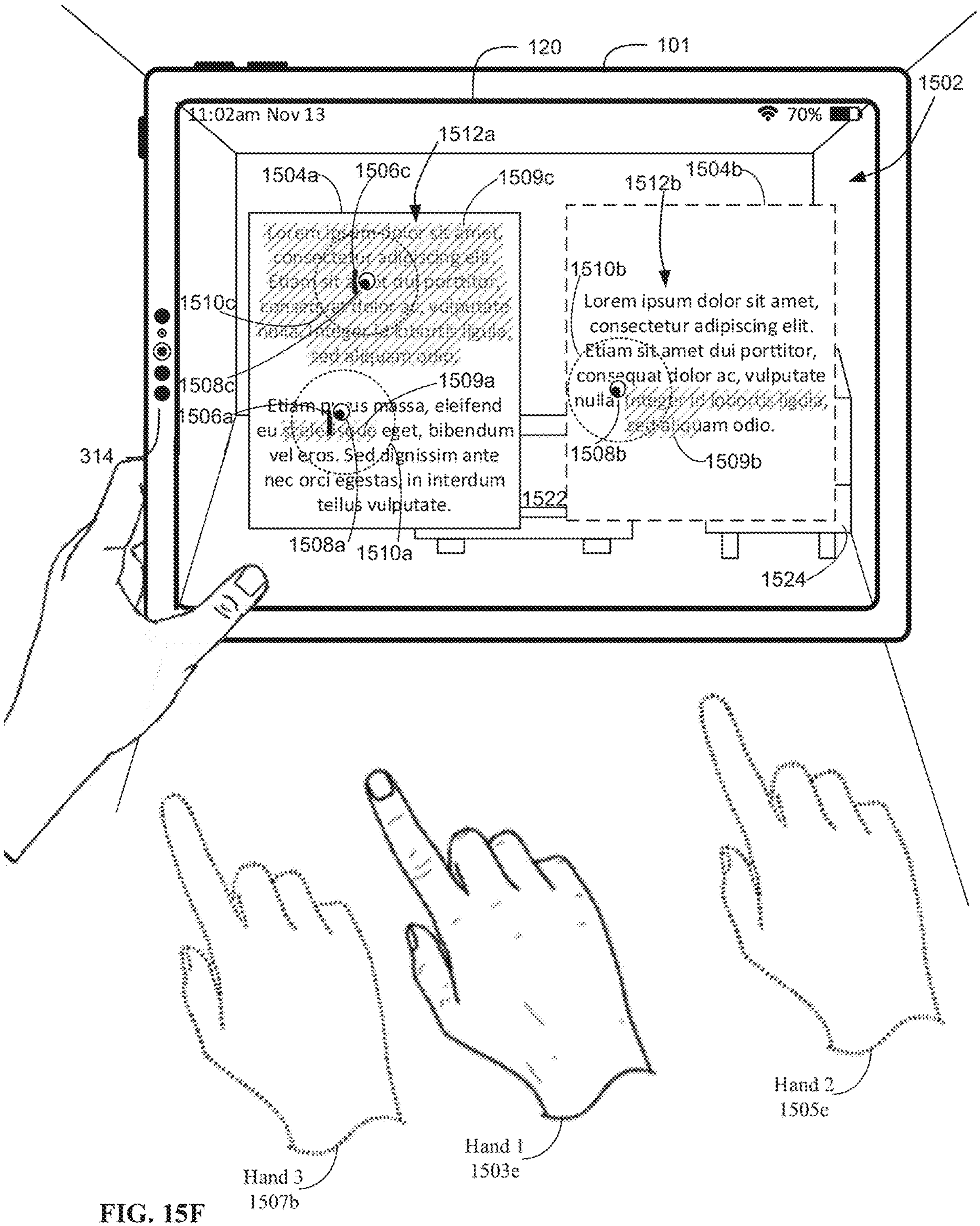

In FIG. 15F, in response to detecting the double air pinch gesture directed to the first portion of the text content 1512*a* in virtual object 1504*a*, computer system 101 optionally selects/highlights a word within the first portion of the text content 1512*a*. For example, because the computer system 101 detected the gaze 1508*a* directed to the word "scelerisque" in text content 1512*a*, in response to detecting the double air pinch gesture, the word "scelerisque"— and not text outside of that word—has been highlighted/selected in virtual object 1504*a* in three-dimensional environment 1502, as indicated by highlighting 1509*a*. Additionally, in response to detecting the triple air pinch gesture directed to the second portion of the text content 1512*a* in virtual object 1504*a*, computer system 101 optionally selects/highlights a paragraph within the text content 1512*a*. For example, as shown in FIG. 15F, because the computer system 101 detected the gaze 1508*c* directed to the word "amet" in text content 1512*a*, in response to detecting the triple air pinch gesture, the paragraph of which the word "amet" is a part—and not text outside of that word—has been highlighted/selected in virtual object 1504*a* in three-dimensional environment 1502, as indicated by highlighting 1509*c*.

Additionally, in FIG. 15F, in response to detecting the second air pinch gesture followed by the movement of the hand 1505*d* in the pinch hand shape, computer system 101 optionally performs an additional content selection operation in accordance with the movement of hand 1505*d* while remaining in the pinch hand shape. For example, as mentioned above, in FIG. 15E, a portion of the words "sed aliquam" had been selected/highlighted when the second air pinch gesture and drag movement provided by the hand 1505*d* was detected by computer system 101. In FIG. 15F, an additional portion of the text content 1512*b* in virtual object 1504*b* has been selected in accordance with the movement of the hand 1505*d* while remaining in the pinch hand shape. For example, the selected/highlighted portion of the text content 1512*b*, indicated by highlighting 1509*b*, includes the portion of the word "aliquam", and extends to the left and upwards (e.g., corresponding to the leftward and upward movement of hand 1505*d*) through the word "Integer". In some embodiments, the gaze (e.g., gaze 1508*b*) of the user is directed to the portion of the text content 1512*b* that was already selected/highlighted when the second air pinch gesture was detected. In some embodiments, the gaze of the user is required to be directed to the portion of the text content 1512*b* that was already selected/highlighted when the second air pinch gesture was detected to cause the computer system 101 to perform the additional content selection operation in accordance with the movement of the hand of the user. Further, in some embodiments, in response to detecting the pinch and drag input extending the selected/highlighted portion of the text content, computer system 101 ceases display of the cursor in three-dimensional environment 1502 during the movement of the hand of the user. For example, as shown in FIG. 15F, computer system 101 has ceased display of the cursor (e.g., 1506*b*) in virtual object 1504*b* in response to detecting the movement of the hand 1505*d* while remaining in the pinch hand shape. In some embodiments, the cursor reappears at the location of the gaze of the user when the air pinch gesture is released. For example, in response to detecting that the hand 1505*e* is no longer in the pinch hand shape (e.g., and remains in the engaged state and/or ready state), the computer system would redisplay the cursor 1506*b* at the current location of the gaze 1508*b* in the object 1504*b* in the three-dimensional environment 1502.

In some embodiments, an air pinch gesture detected outside of a selected/highlighted portion of the text content causes computer system 101 to cancel the selection/highlighting of the portion of the text content in three-dimensional environment 1502. In FIG. 15F, hands 1503*e* and/or 1505*e* are optionally providing an air pinch gesture outside of the selected/highlighted portions of text content 1512*a* and/or 1512*b*, respectively, in three-dimensional environment 1502. For example, in FIG. 15F, hand 1503*e* is providing an air pinch gesture while gaze 1508*a* is directed to a portion of text content 1512*a* that is outside of the highlighted portion indicated by highlighting 1509*a*, and hand 1505*e* is providing an air pinch gesture while gaze

1508*b* is directed to a portion of text content 1512*b* that is outside of the highlighted portion indicated by highlighting 1509*b*.

Figure 15G:
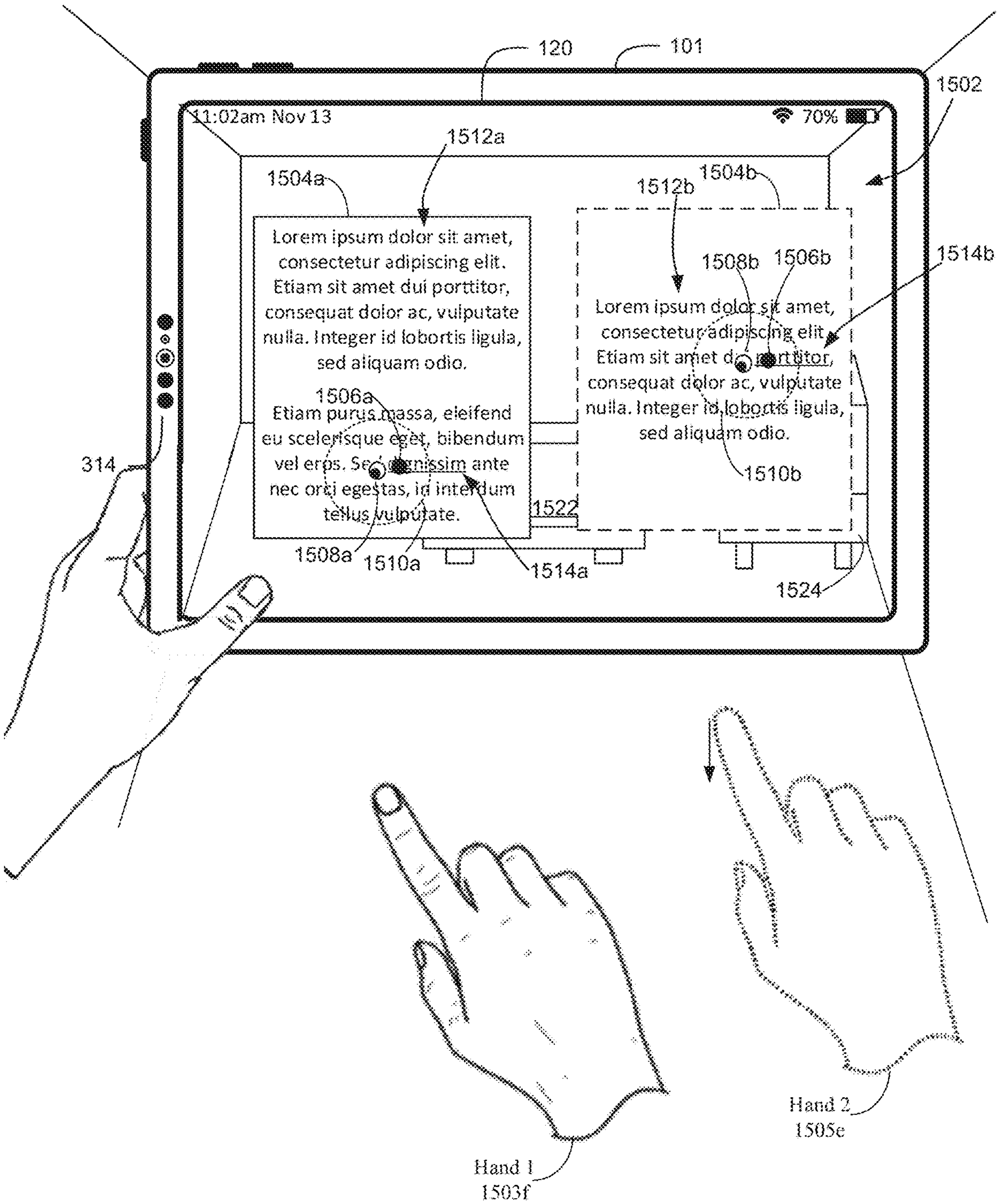

In FIG. 15G, in response to detecting the pinch inputs provided by hands 1503*e* and/or 1505*e*, computer system 101 deselects/unhighlights the previously selected/highlighted portions of the text content in virtual objects 1504*a* and/or 1504*b* in three-dimensional environment 1502. For example, as shown in FIG. 15G, in response to detecting the pinch input provided by hand 1503*e*, computer system 101 has deselected the word "scelerisque" in text content 1512*a* in virtual object 1504*a*. Similarly, in response to detecting the pinch input provided by hand 1505*e*, computer system 101 optionally deselects the portions of text content 1512*b* starting with the word "Integer" and ending with the word "aliquam" in virtual object 1504*b*.

In some embodiments, computer system 101 alters an appearance of the cursor in three-dimensional environment 1502 in response to detecting that the cursor is located over selectable content in three-dimensional environment 1502. In some embodiments, the content displayed in virtual objects 1504*a* and/or 1504*b* includes selectable content such as a hyperlink (e.g., a hyperlink associated with a web page in a web browsing application). For example, in FIG. 15G, text content 1512*a* in virtual object 1504*a* includes a hyperlink 1514*a* embedded in the word "dignissim", and text content 1512*b* in virtual object 1504*b* includes a hyperlink 1514*b* embedded in the word "porttitor" in three-dimensional environment 1502. As shown in FIG. 15G, the gaze 1508*a* of the user and/or the hand (e.g., hand 15030 of the user has been moved in virtual object 1504*a* which has optionally caused the cursor 1506*a* to be moved over the hyperlink 1514*a* in the text content 1512*a* in virtual object 1504*a*. In response to detecting the movement of the cursor 1506*a* over the hyperlink 1514*a*, computer system 101 optionally changes the appearance of the cursor 1506*a*. For example, in FIG. 15G, computer system 101 has changed the cursor 1506*a* from a linear cursor to a circular cursor in virtual object 1504*a*. Similarly, in FIG. 15G, the gaze 1508*b* of the user and/or the hand (e.g., hand 1505*e*) of the user has been moved in virtual object 1504*b* which has optionally caused the cursor 1506*b* to be moved over the hyperlink 1514*b* in the text content 1512*b* in virtual object 1504*b*. In response to detecting the movement of the cursor 1506*b* over the hyperlink 1514*b*, computer system 101 has optionally changed the appearance of the cursor 1506*b* from a linear cursor to a circular cursor in virtual object 1504*b*.

In some embodiments, a respective air pinch gesture detected while the cursor is located over a hyperlink in the content in three-dimensional environment 1502 causes computer system 101 to perform a respective action involving the content in three-dimensional environment 1502. In FIG. 15G, hand 1503*f* is providing a pinch and hold air gesture while the cursor 1506*a* is located over the hyperlink 1514*a* in virtual object 1504*a*, and hand 1505*e* is providing a quick pinch and drag air gesture while the cursor 1506*b* is located over the hyperlink 1514*b* in virtual object 1504*b*. For example, the hand 1503*f* is providing a long air pinch gesture (e.g., one in which the thumb and the tip of the index finger of the user come together and contact each other, and remain in contact for longer than a time threshold such as 0.1, 0.2, 0.3, 0.5, 1, 1.5, 2, 3, or 5 seconds while the hand moves less than a threshold amount, such as 0.1, 0.3, 0.5, 1, 3, 5 or 10 cm) while the gaze 1508*a* is directed at or near the hyperlink 1514*a* in virtual object 1504*a*. The hand 1505*e* is providing a quick pinch air and drag gesture (e.g., one in which the thumb and the tip of the index finger of the user come together and contact each other, followed by, within a time threshold such as 0.1, 0.2, 0.3, 0.5, 1, 1.5, 2, 3, or 5 seconds, movement of the hand 1505*e* more than a threshold amount, such as 0.1, 0.3, 1, 3, 5 or 10 cm, in a downward direction) while the gaze is directed at or near the hyperlink 1514*b* in virtual object 1504*b*.

Figure 15H:
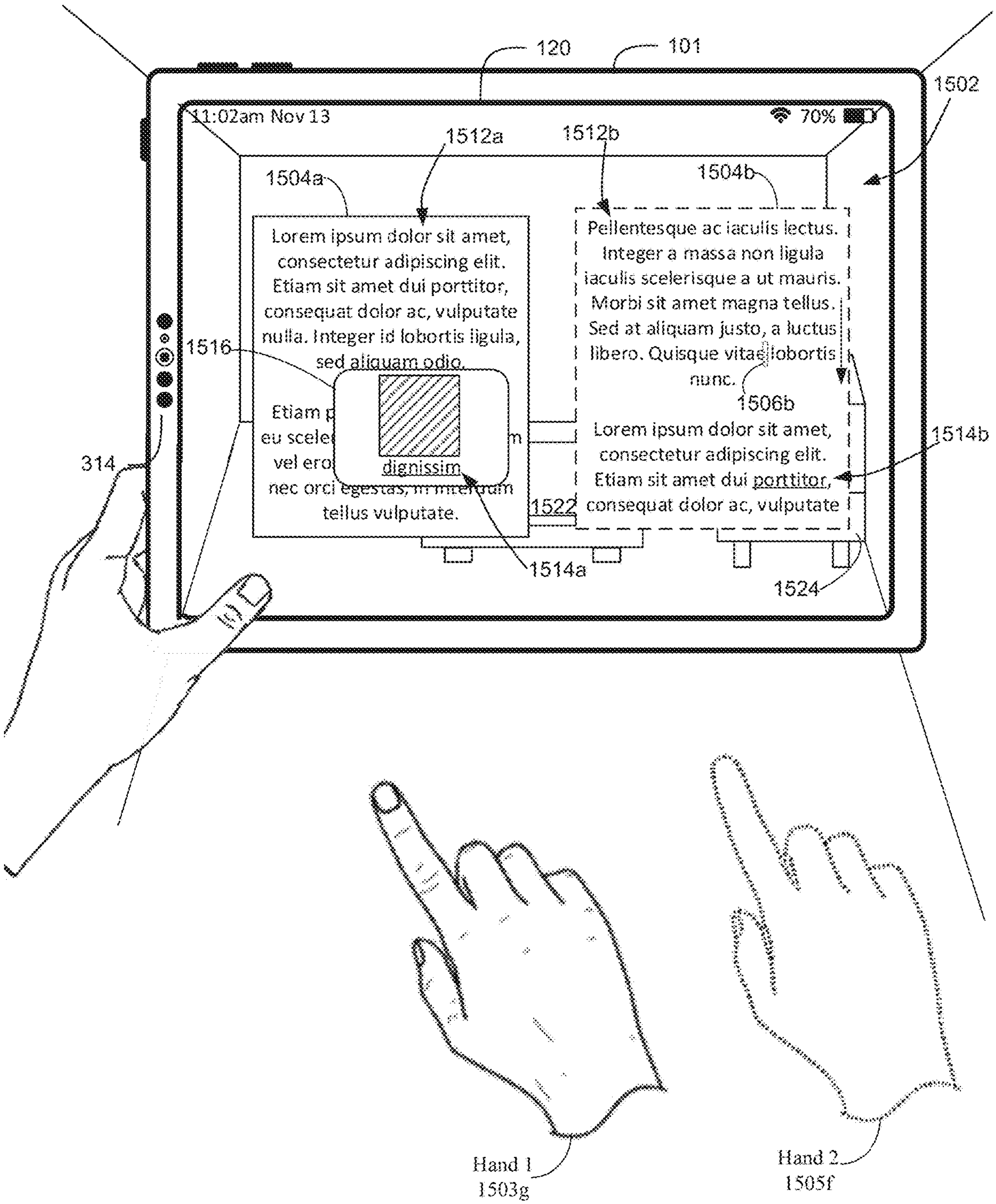
Figure 16A:
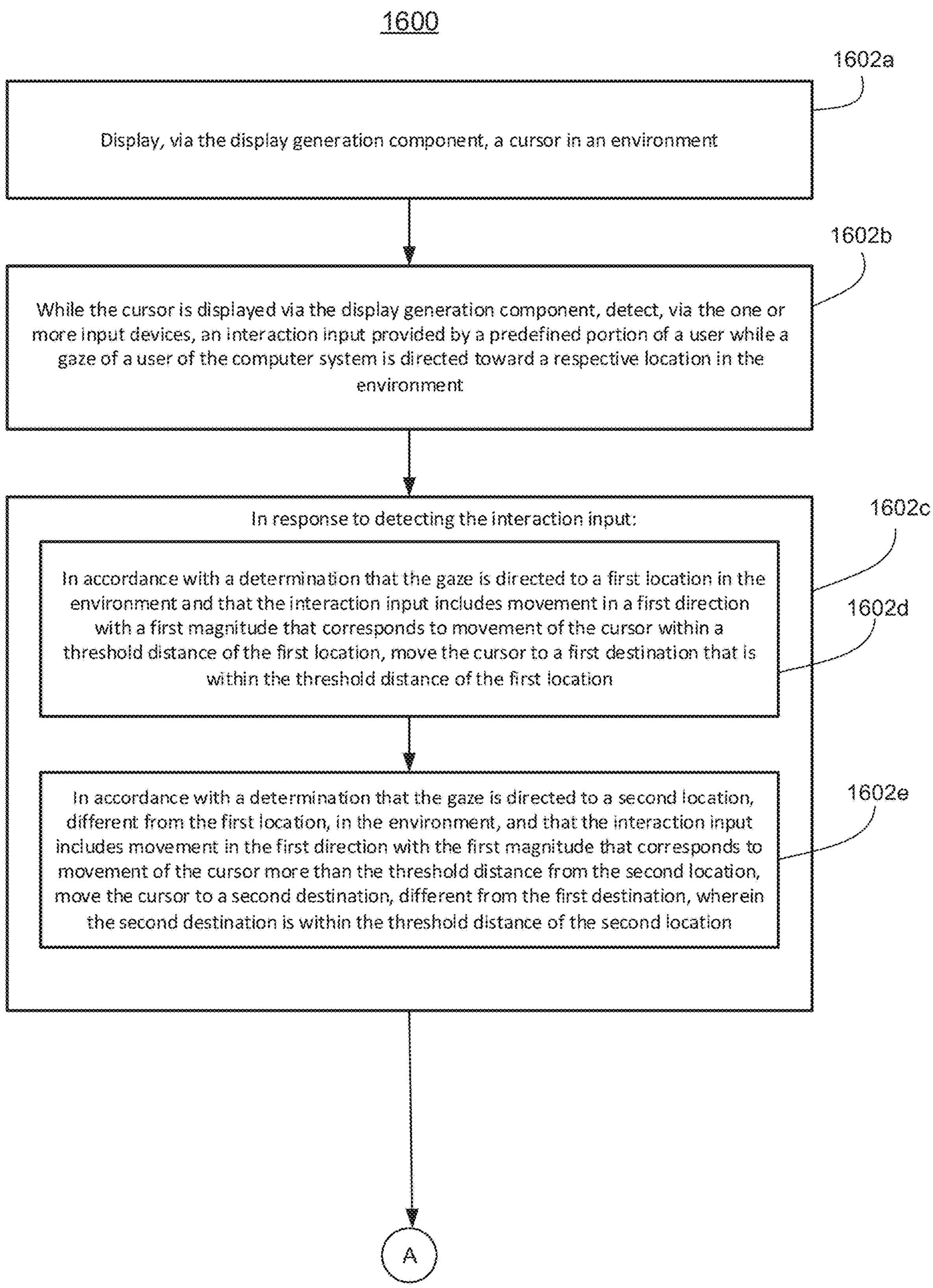
FIGS. 16A-16L is a flowchart illustrating a method of facilitating interaction with multiple input devices in accordance with some embodiments.
Figure 16B:
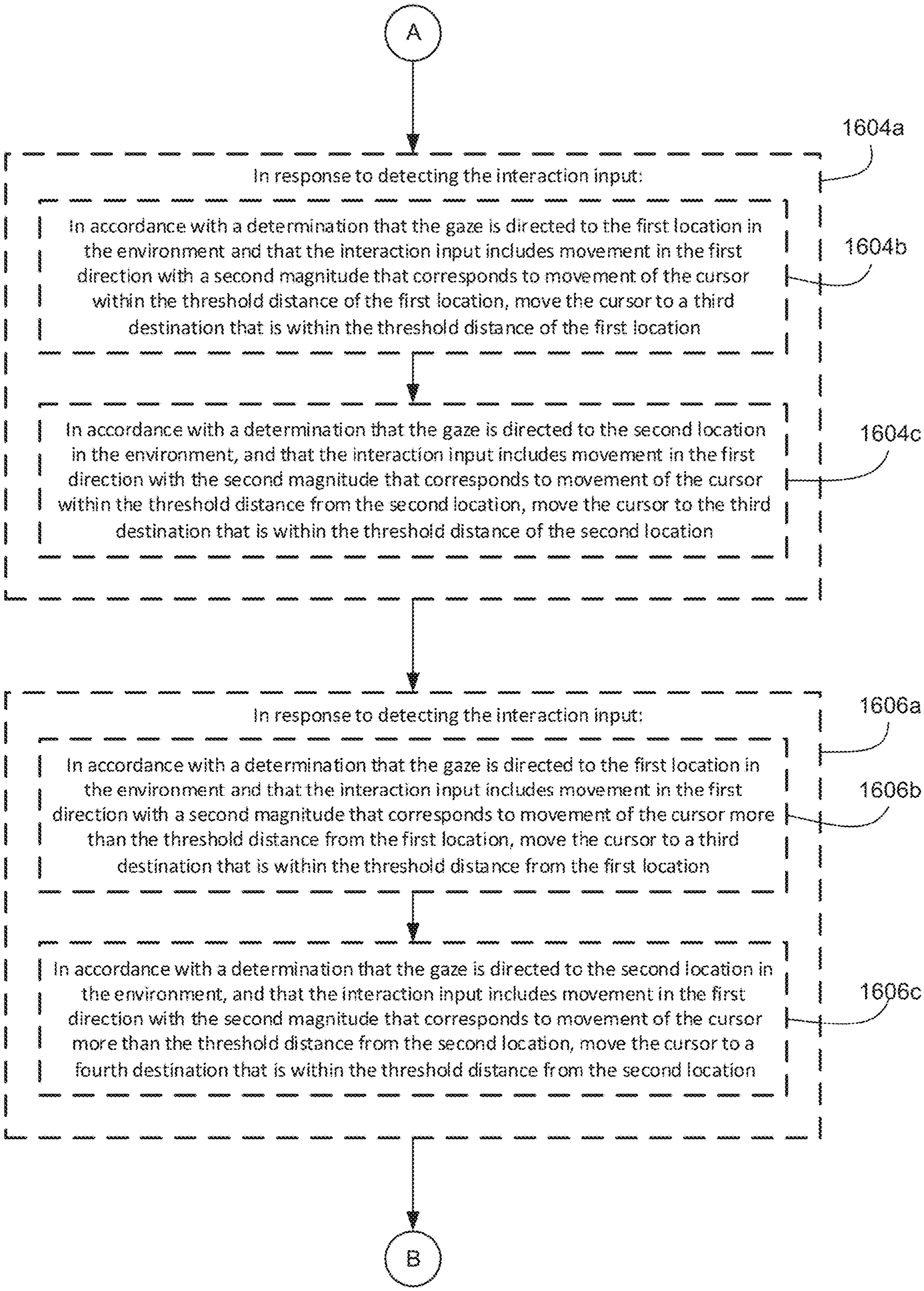
Figure 16C:
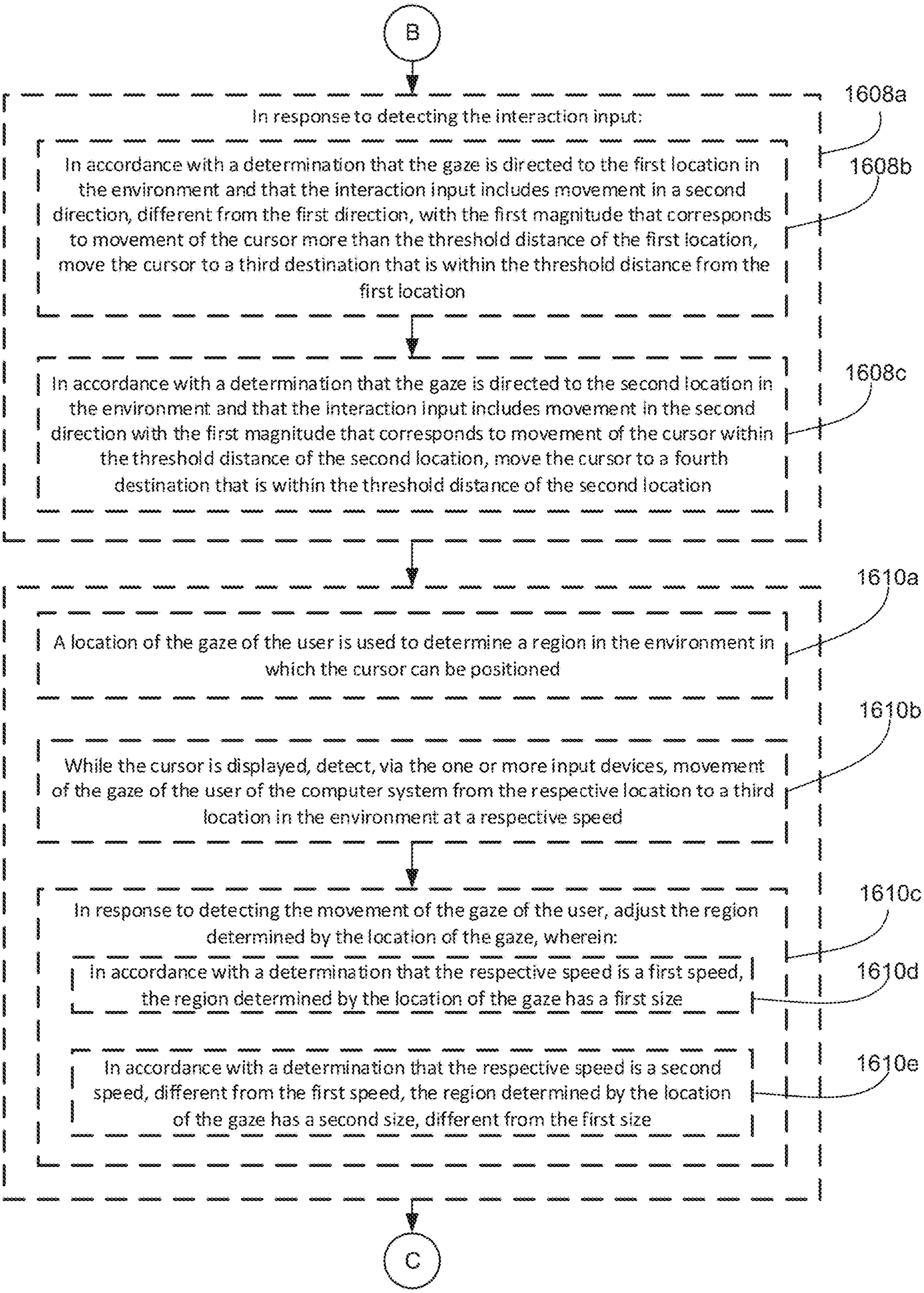
Figure 16D:
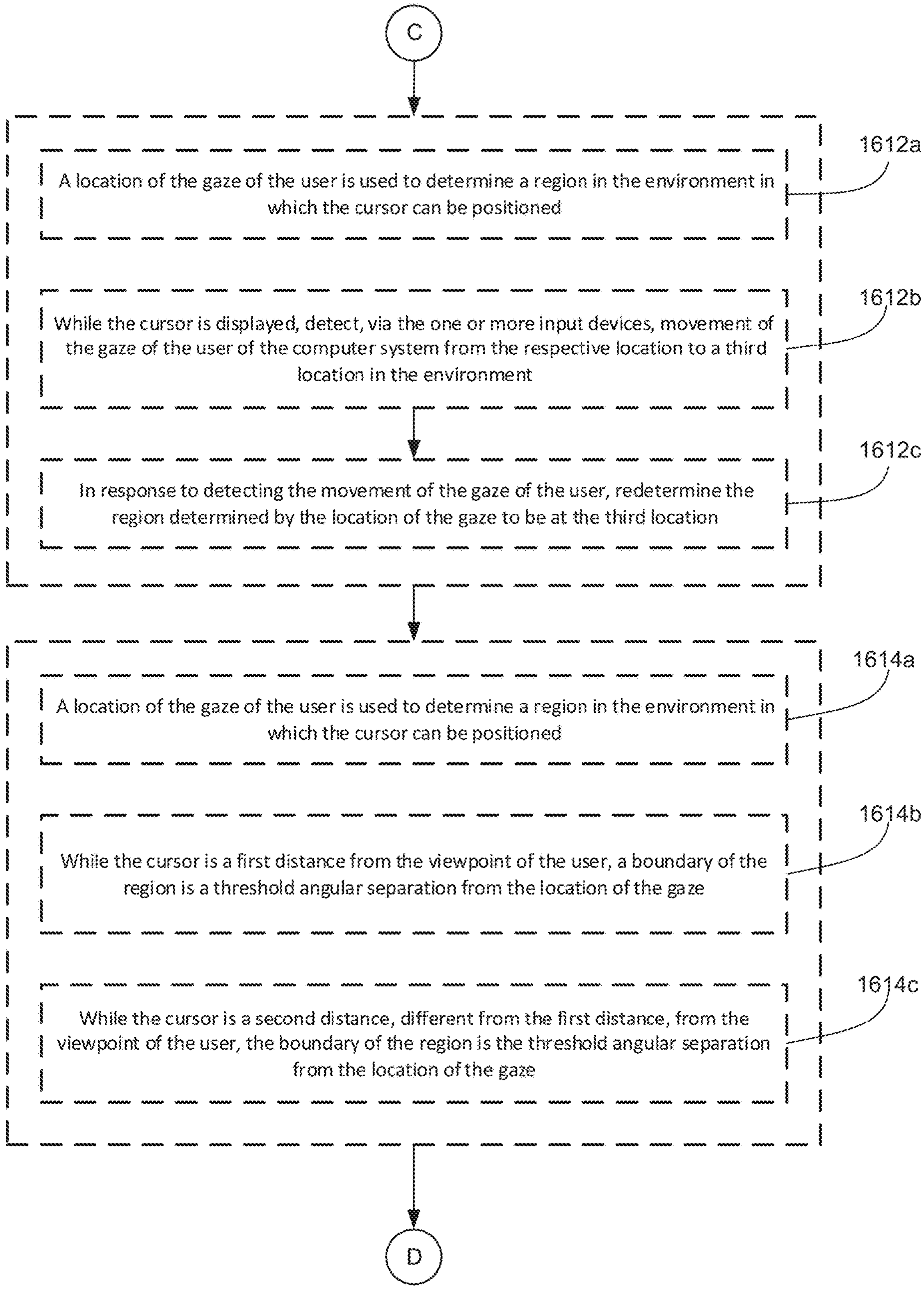
Figure 16E:
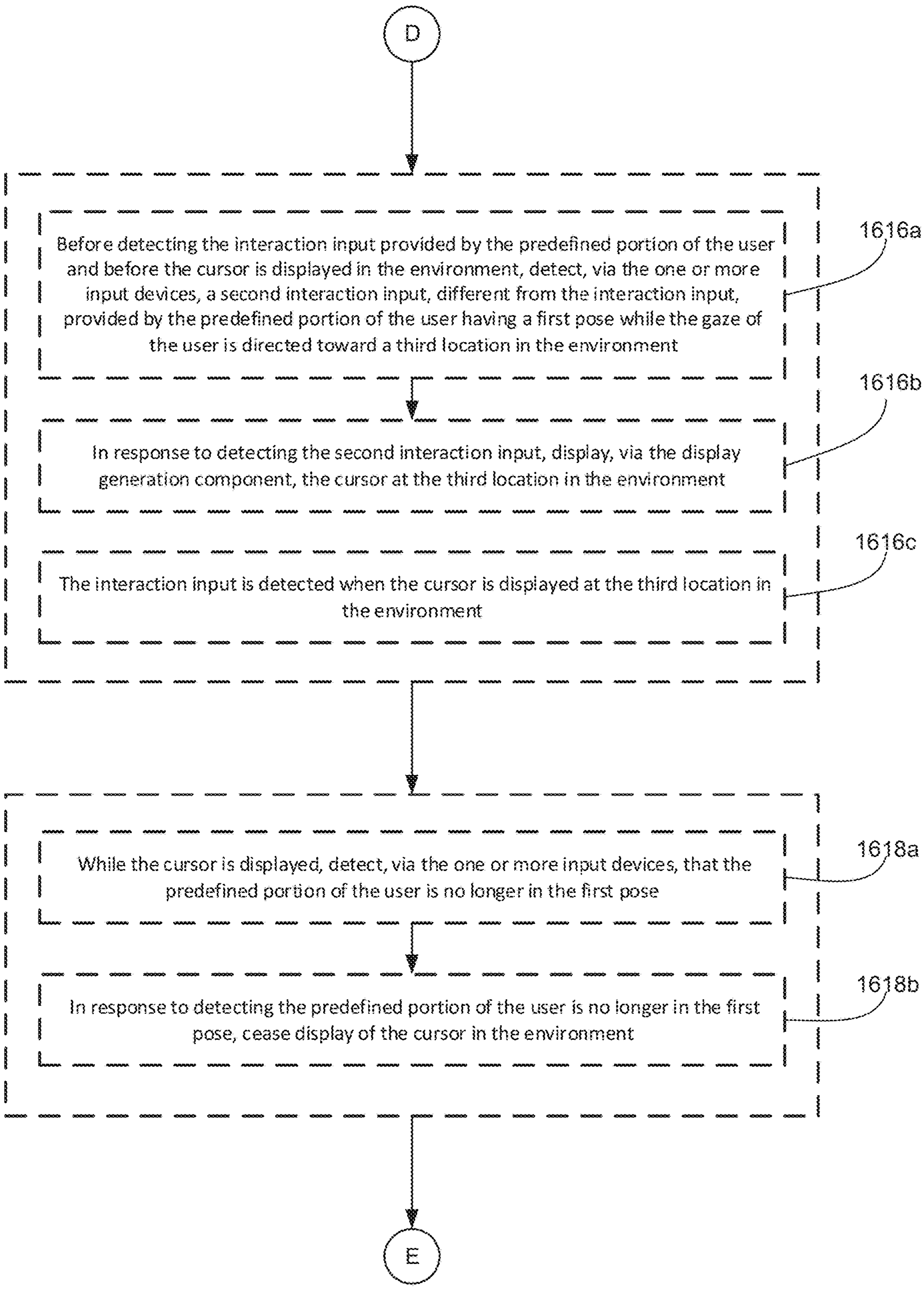
Figure 16F:
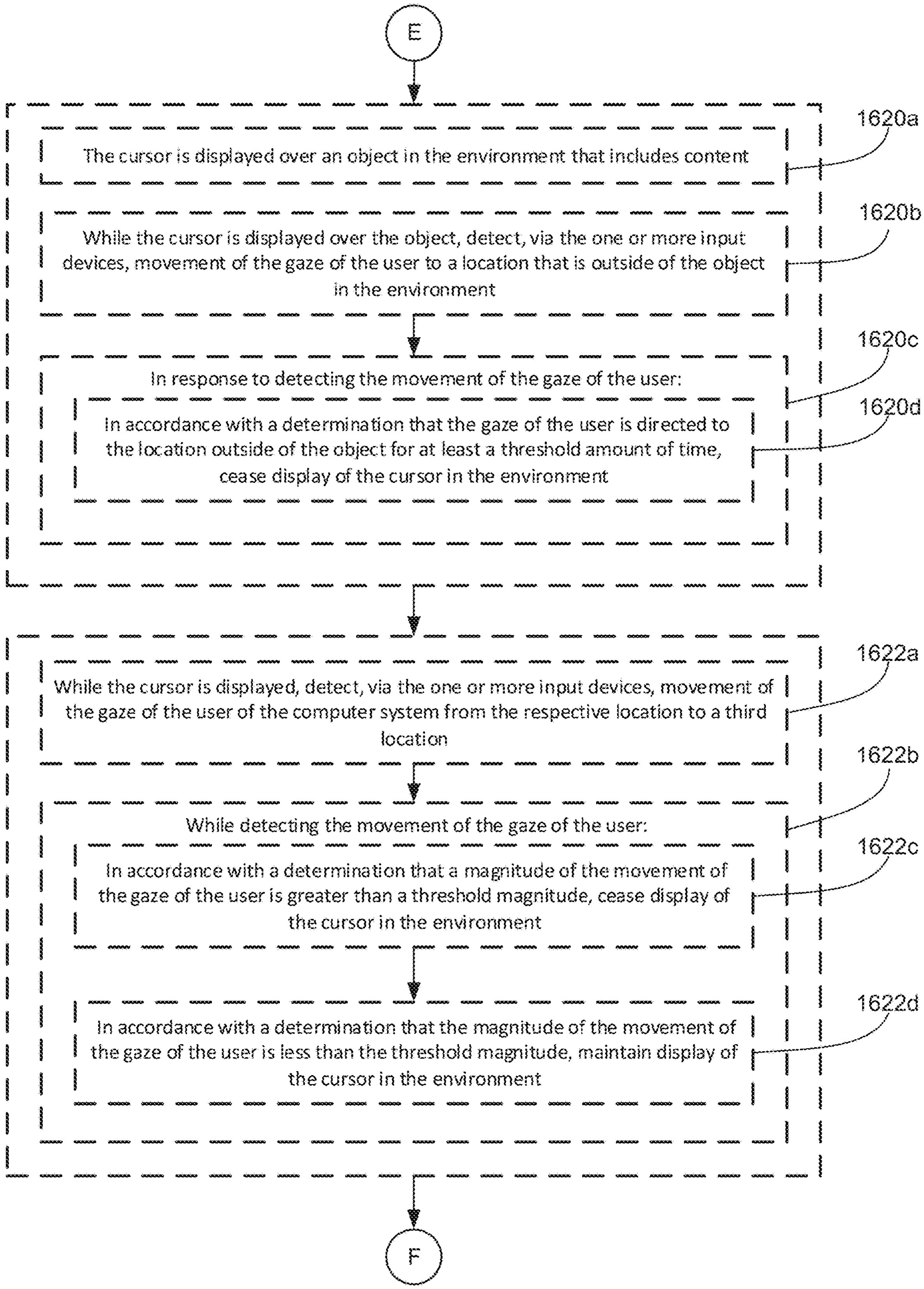
Figure 16G:
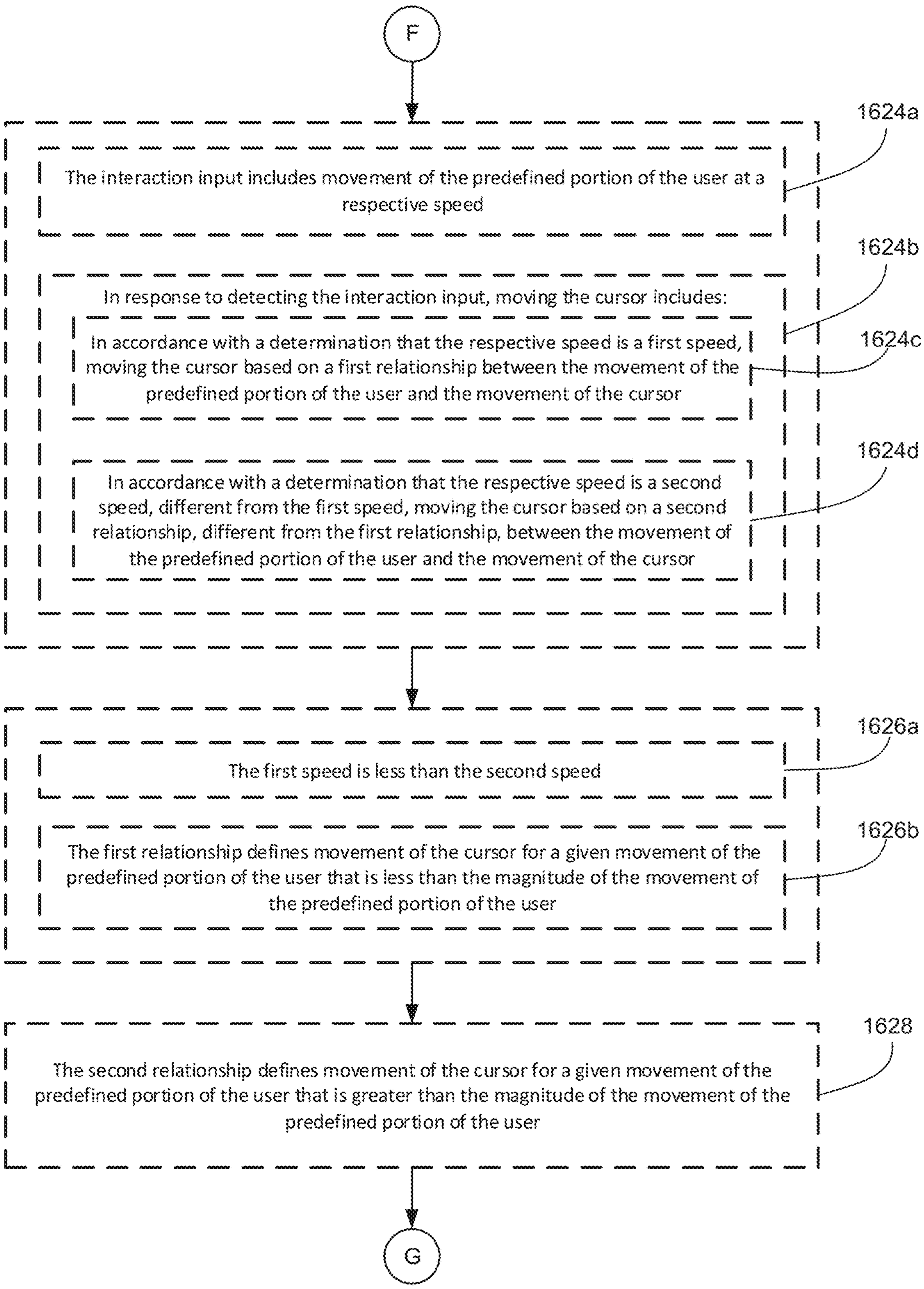
Figure 16H:
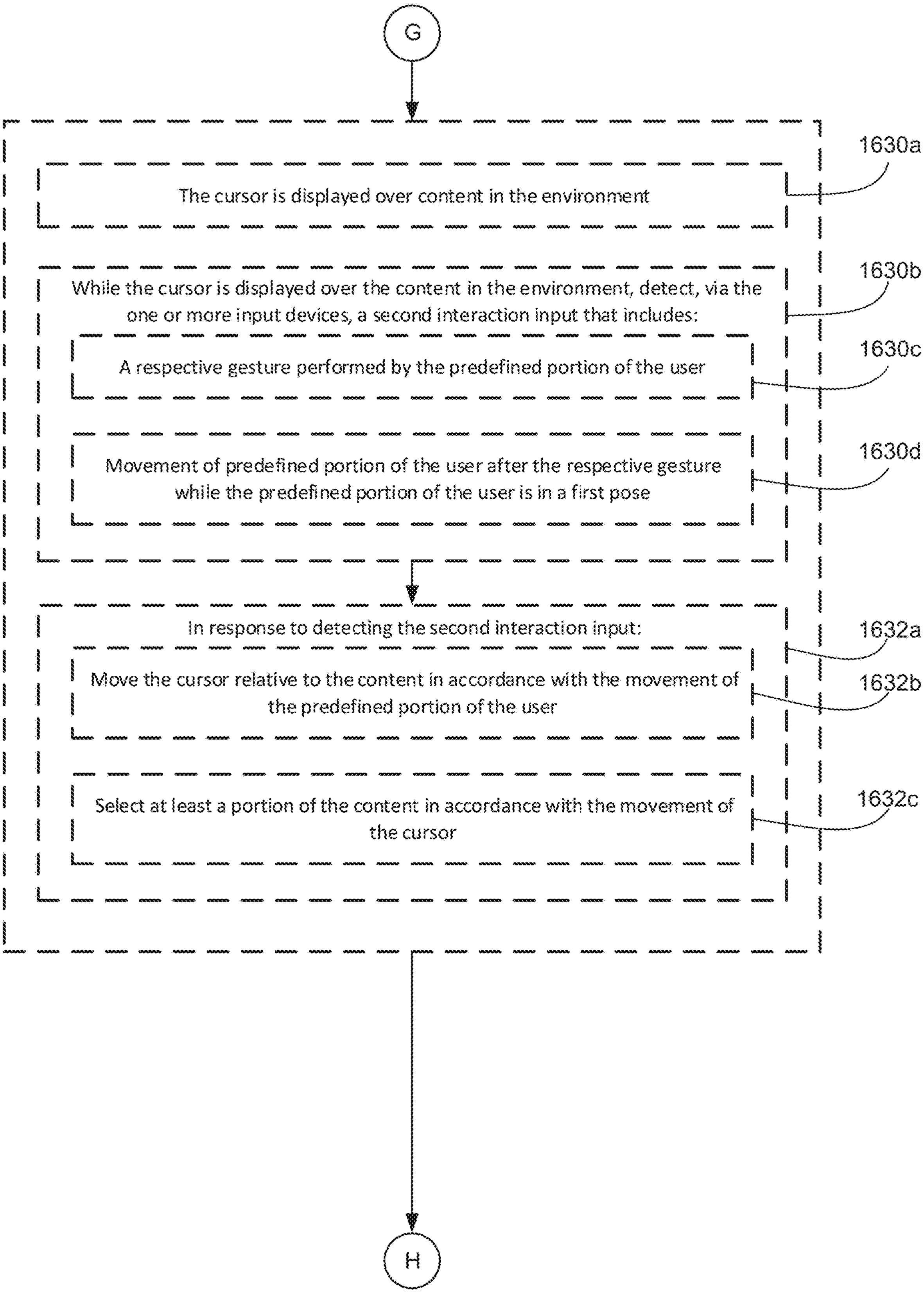
Figure 16I:
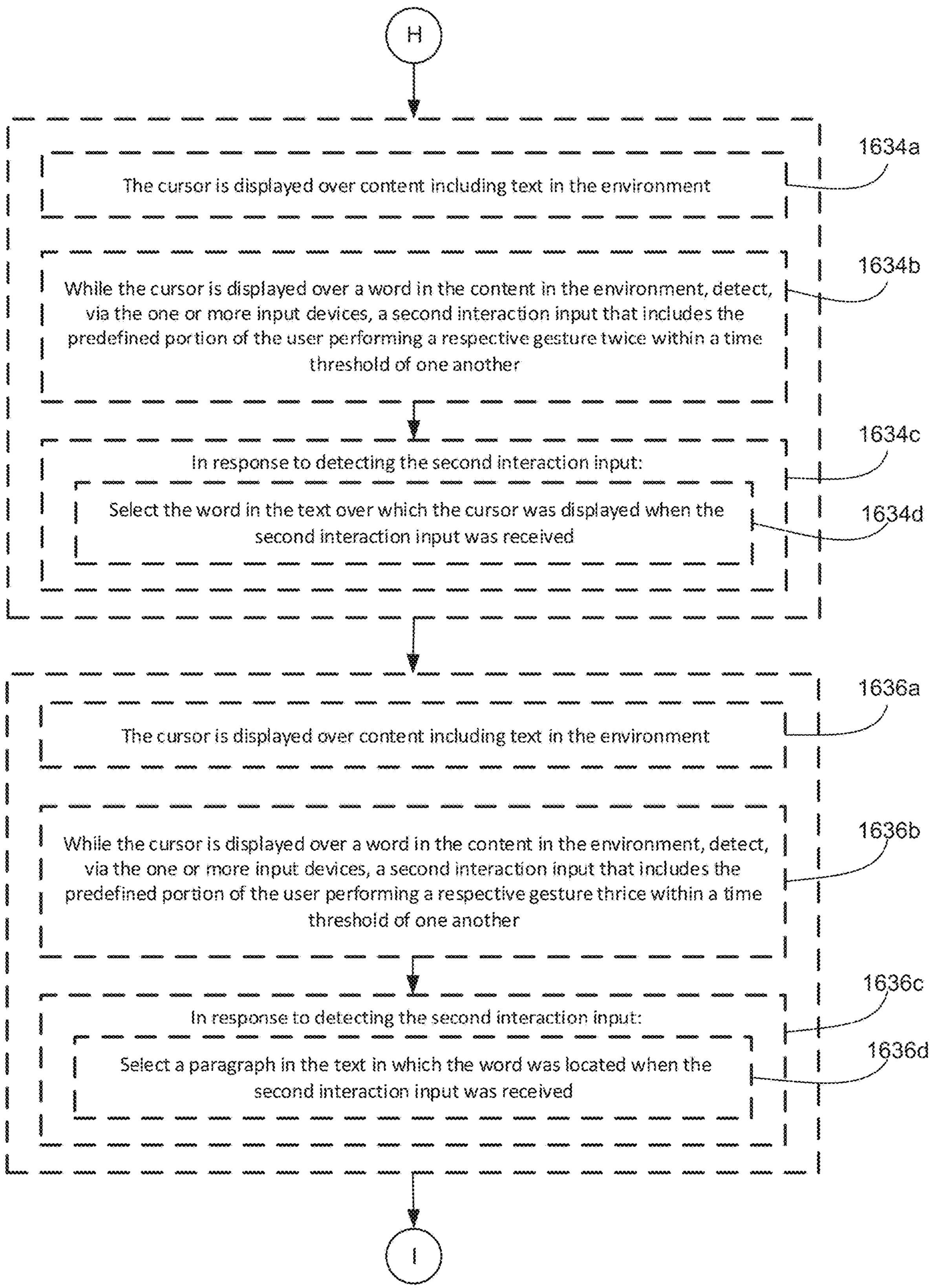
Figure 16J:
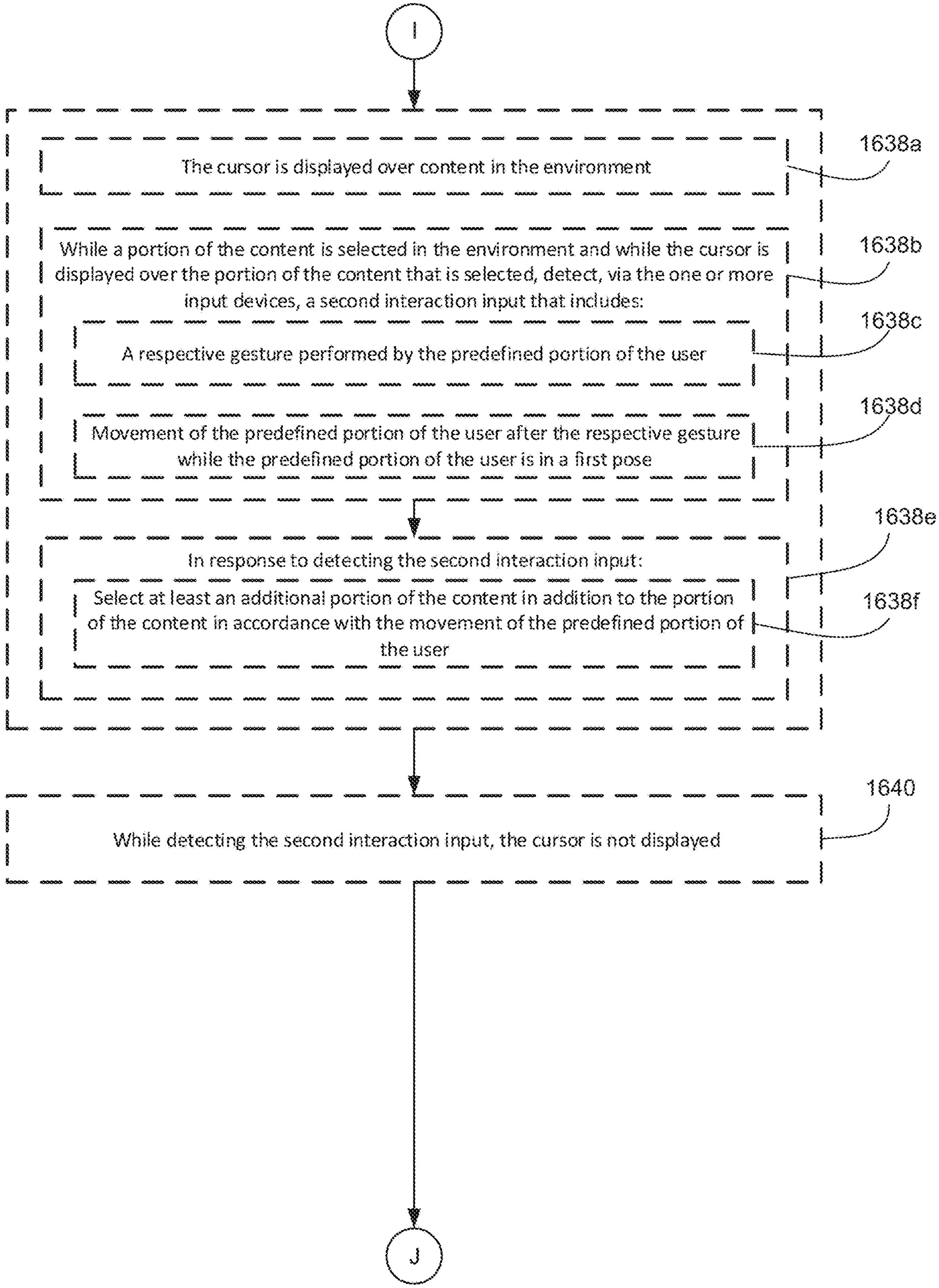
Figure 16K:
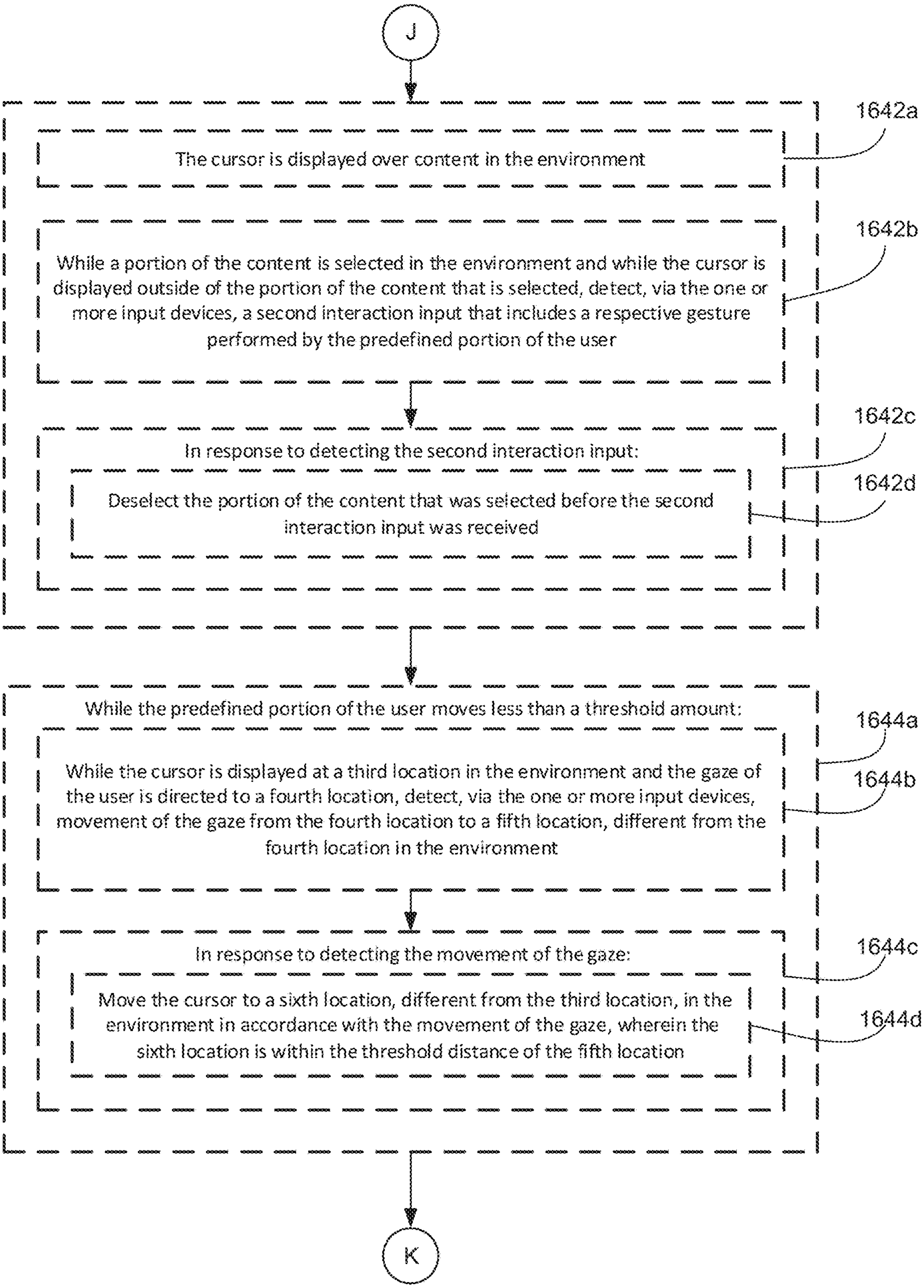
Figure 16L:
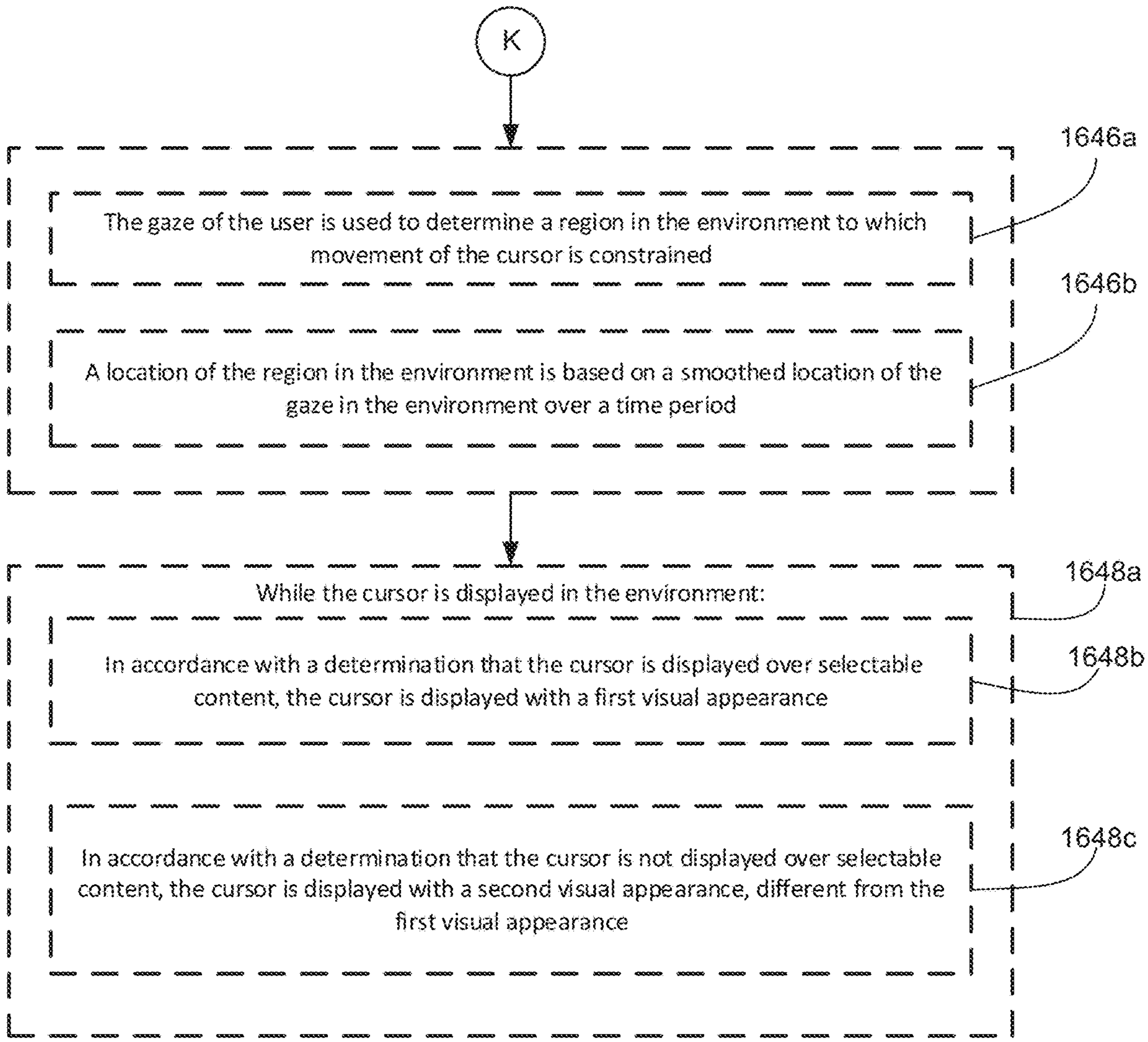

In FIG. 15H, in response to detecting the long pinch air gesture provided by the hand 1503*f*, computer system 101 optionally displays a preview 1516 corresponding to the hyperlink 1514*a* in virtual object 1504*a* in three-dimensional environment 1502. For example, as shown in FIG. 15H, the hyperlink 1514*a* is associated with a web page containing an image (e.g., a photograph or a frame of a video). Accordingly, as shown, the preview 1516 corresponding to the hyperlink 1514*a* optionally includes a representation of (e.g., a portion of) the image at and/or the content of the web page in virtual object 1504*a*. Further, while the preview 516 is displayed in virtual object 1504*a*, the computer system 101 optionally ceases display of the cursor (e.g., 1506*a*) in virtual object 1504*a*, as shown in FIG. 15H. Additionally, in FIG. 15H, in response to detecting the quick pinch and drag movement provided by the hand 1505*e*, computer system 101 optionally scrolls through the text content 1512*b* in virtual object 1504*b* in accordance with the movement of the hand 1505*e*. For example, the text content 1512*b* is scrolled in a downward direction in virtual object 1504*b* in accordance with the downward movement of the hand 1505*e* while remaining in the pinch hand shape. In some embodiments, as the text content 1512*b* is scrolled in virtual object 1504*b*, the cursor 1506*b* remains displayed in virtual object 1504*b* (e.g., without moving the cursor 1506*b* within the text content as the hand of the user moves). Alternatively, in some embodiments, as the text content 1512*b* is scrolled in virtual object 1504*b*, the cursor 1506*b* ceases to be displayed (e.g., as indicated by the dashed cursor) in virtual object 1504*b*.

In some embodiments, a quick pinch air gesture detected while the cursor is located over the selectable content causes computer system 101 to navigate to (e.g., display) the content associated with the selectable content. For example, with reference to FIG. 15G, if a quick pinch air gesture (e.g., in which the index finger and the thumb of the hand of the user are touching to form a pinch hand shape) were detected followed by a release of the pinch hand shape within a time threshold (e.g., 0.1, 0.3, 0.5, 1, 3, 5, or 10 seconds) of the fingers of the hand initially touching while the cursor 1506*a* is located over the hyperlink 1514*a*, the computer system 101 would display the content associated with the hyperlink 1514*a* in three-dimensional environment 1502. For example, the computer system 101 would open a new virtual object (e.g., corresponding to a web browsing application) in three-dimensional environment 1502 and display the content (e.g., the web page containing the image) associated with the hyperlink 1514*a* in the new virtual object. Additionally or alternatively, in some embodiments, the computer system 101 would replace display of the text content 1512*a* in virtual object 1504*a* with the content (e.g., the webpage containing the image) associated with the hyperlink 1514*a* in response to detecting the pinch air gesture while the cursor 1506*a* is located over the hyperlink 1514*a*.

FIGS. 16A-16L is a flowchart illustrating a method 1600 of facilitating interaction with multiple input devices in accordance with some embodiments. In some embodiments, the method 1600 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1600 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1600 are, optionally, combined and/or the order of some operations is, optionally, changed.

In some embodiments, method 1600 is performed at a computer system (e.g., electronic device 101) in communication with a display generation component (e.g., 120), one or more input devices (e.g., 314). In some embodiments, the computer system is or includes an electronic device. In some embodiments, the electronic device has one or more of the characteristics of the electronic device in methods 800, 1000, and/or 1200. In some embodiments, the display generation component has one or more of the characteristics of the display generation component in methods 800, 1000, and/or 1200. In some embodiments, the one or more input devices have one or more of the characteristics of the one or more input devices in methods 800, 1000, and/or 1200.

In some embodiments, the computer system displays (1602), via the display generation component, a cursor, such as cursor 1506*a* and/or cursor 1506*b*, in an environment, such as three-dimensional environment 1502 (e.g., a three-dimensional environment, such as an environment that corresponds to a physical environment surrounding the display generation component and/or the computer system (e.g., the electronic device) or a virtual environment. In some embodiments, the physical environment is visible through a transparent portion of the display generation component (e.g., true or real passthrough)). In some embodiments, a representation of the physical environment is displayed in the three-dimensional environment via the display generation component (e.g., virtual or video passthrough). In some embodiments, the three-dimensional environment has one or more of the characteristics of the three-dimensional environment in methods 800, 1000, 1200, 1400 and/or 1800. In some embodiments, the environment includes or corresponds to a user interface of an application displayed via the display generation component of the computer system (e.g., on a tablet, mobile device, laptop device, or smart television). For example, the cursor is displayed in a text editing user interface, a web browsing user interface, or a document viewing application displayed via the display generation component of the computer system. In some embodiments, the cursor has one or more of the characteristics of the cursor in methods 800, 1000, 1200 and/or 1800. In some embodiments, the cursor is a pointer or other visual indicator that is controlled via user input. In some embodiments, a selection input detected while the cursor is over an object or content causes the object or content to be selected. In some embodiments, the cursor can be moved in the three-dimensional environment in response to movement-based inputs provided to the computer system, as described below. In some embodiments, the cursor is located within content (e.g., text content), such as described with reference to method 1000.

In some embodiments, while the cursor is displayed via the display generation component, the computer system detects (1602*b*), via the one or more input devices, an interaction input (e.g., an air gesture) provided by a predefined portion of a user, such as movement of hand 1503*a* and/or hand 1505*a* as shown in FIG. 15A (e.g., the hand of the user. In some embodiments, the computer system detects an input that includes movement of the hand of the user of the computer system corresponding to movement of the cursor toward a location in the three-dimensional environment. In some embodiments, the magnitude and/or direction of the movement of the hand of the user is sufficient to move the cursor in the three-dimensional environment. In some embodiments, the hand of the user is in a ready state or relaxed state configuration (e.g., the thumb and index finger of the hand of the user are not in contact) when the interaction input is detected. In some embodiments, the hand of the user remains in the ready state or relaxed state configuration while the hand is moved during the interaction input. In some embodiments, the interaction input has one or more of the characteristics of similar cursor movement inputs described in methods 800, 1000, 1200, 1400 and/or 1800. In some embodiments, the interaction input includes or is a pinch air gesture input) while a gaze of a user of the computer system is directed toward a respective location in the environment, such as gaze 1508*a* directed toward object 1504*a* and/or gaze 1508*b* directed toward object 1504*b* as shown in FIG. 15A (e.g., the computer system detects that the user is looking at the first respective location in the three-dimensional environment). In some embodiments, before the interaction input was detected, the user of the computer system was looking at the respective location (e.g., a location different from the current location of the cursor) in the three-dimensional environment. In some embodiments, the gaze defines a region or bound (e.g., a circular or spherical region) within the three-dimensional environment. In some embodiments, the gaze defines a center of the region or bound. In some embodiments, movement of the cursor is constrained to the region defined by the gaze, as described below.

In some embodiments, in response to detecting the interaction input (1602*c*), in accordance with a determination that the gaze is directed to a first location in the environment, such as the location of gaze 1508*a* in FIG. 15B, and that the interaction input includes movement in a first direction with a first magnitude that corresponds to movement of the cursor within a threshold distance (e.g., defined by a size of the region 1510*a* determined based on the location of gaze 1508*a*) of the first location, the computer system moves (1602*d*) the cursor to a first destination that is within the threshold distance of the first location, such as movement of the cursor 1506*a* as shown in FIG. 15B (e.g., the starting location of the cursor is a first distance and/or orientation relative to the first location). In some embodiments, a first set of criteria is satisfied when the first magnitude and/or the first respective direction of the movement of the hand of the user causes the cursor to be moved to a location (i.e., the first destination) within the threshold distance (e.g., 0.5, 1, 2, 2.5, 3.5, 4, 5, 8, or 10 cm) of the gaze of the user (e.g., to be within the region or bound defined by the gaze of the user). In some embodiments, the first set of criteria is not satisfied when the first magnitude and/or the first direction of the movement of the hand of the user causes the cursor to not be moved to a location within the threshold distance of the gaze of the user (e.g., to be outside of the region or bound defined by the gaze of the user). In some embodiments, a respective starting position of the cursor in the three-dimensional environment has no effect on the satisfaction of the first set of criteria. For example, the computer system evaluates the end location of the cursor (e.g., as determined by the movement of the hand of the user, as discussed above) relative to the location of the gaze (e.g., rather than the starting location of the cursor) to determine whether the first set of criteria is satisfied (e.g., whether the end location of the cursor is within the region or bound defined by the gaze of the user). In some embodiments, the cursor is displayed at the first destination in the three-dimensional environment. In some embodiments, the cursor remains displayed in the three-dimensional environment while the interaction input is detected by the computer system. For example, the cursor is animated to move to the first destination within the three-dimensional environment as the hand of the user moves. In some embodiments, the cursor is not displayed in the three-dimensional environment while the interaction input is detected by the computer system, as described below.

In some embodiments, in accordance with a determination that the gaze is directed to a second location, different from the first location, such as the location of gaze 1508*a* in FIG. 15C, in the environment, and that the interaction input includes movement in the first direction with the first magnitude that corresponds to movement of the cursor more than the threshold distance from the second location, the computer system moves (1602*e*) the cursor to a second destination, different from the first destination, as described herein with reference to FIGS. 15B-15C, wherein the second destination is within the threshold distance of the second location. In some embodiments, the starting location of the cursor is a second distance and/or orientation relative to the second location. For example, the second destination is within the threshold distance of the gaze of the user (e.g., is within the region or bound defined by the gaze of the user). In some embodiments, the second destination is selected by the computer system to specifically satisfy the first set of criteria described above. In some embodiments, the second destination is a location at or near an edge of the region or bound defined by the gaze of the user that corresponds to the first direction and/or the first magnitude of movement of the hand of the user. Thus, as described above, the computer system optionally moves the cursor within the three-dimensional environment based on the movement of the hand of the user, but constrains the movement of the cursor to the region or bound defined by the gaze of the user. Moving a cursor in the three-dimensional environment based on movement of a hand of a user and a location of a gaze of the user reduces the number of inputs needed to move the cursor within the three-dimensional environment, thereby improving user-device interaction.

In some embodiments, in response to detecting the interaction input (1604*a*), in accordance with a determination that the gaze is directed to the first location in the environment, such as the location of the gaze 1508*a* in FIG. 15B, and that the interaction input (e.g., movement of the hand 1503*a* in FIG. 15A) includes movement in the first direction with a second magnitude (e.g., smaller than the first magnitude) that corresponds to movement of the cursor within the threshold distance of the first location, the computer system moves (1604*b*) the cursor to a third destination that is within the threshold distance of the first location, such as within the region 1510*a* as shown in FIG. 15B (e.g., the second magnitude and/or the first direction of the movement of the hand of the user causes the cursor to be moved to a location (e.g., the third destination) within the threshold distance (e.g., 0.5, 1, 2, 2.5, 3.5, 4, 5, 8, or 10 cm) of the gaze of the user (e.g., to be within the region or bound defined by the gaze of the user at the first location)). In some embodiments, in accordance with a determination that the gaze is directed to the second location in the environment, such as the location of gaze 1508*a* in FIG. 15C, and that the interaction input includes movement in the first direction with the second magnitude that corresponds to movement of the cursor within the threshold distance from the second location, the computer system moves (1604*c*) the cursor to the third destination that is within the threshold distance of the second location, such as within the region 1510*a* in FIG. 15C. For example, the second magnitude and/or the first direction of the movement of the hand of the user causes the cursor to be moved to a location (e.g., the third destination) within the threshold distance (e.g., 0.5, 1, 2, 2.5, 3.5, 4, 5, 8, or 10 cm) of the gaze of the user (e.g., to be within the region or bound defined by the gaze of the user at the second location). Thus, a smaller magnitude (e.g., smaller than the first magnitude described above) of movement of the hand of the user optionally causes the cursor to be moved to the same location in the three-dimensional environment (i.e., the third location) when the gaze is directed toward the first location or the second location. Moving a cursor in the three-dimensional environment to particular locations based on the movement of a hand of the user when the movement of the hand is within a threshold distance of a gaze of the user facilitates precise movement of the cursor in the three-dimensional environment, thereby improving user-device interaction.

In some embodiments, in response to detecting the interaction input (1606*a*), in accordance with a determination that the gaze is directed to the first location in the environment, such as the location of the gaze 1508*a* in FIG. 15A, and that the interaction input (e.g., movement of the hand 1505*a* as shown in FIG. 15A) includes movement in the first direction with a second magnitude (e.g., larger than the first magnitude) that corresponds to movement of the cursor more than the threshold distance from the first location (e.g., outside of the region 1510*a* in FIG. 15A), the computer system moves (1606*b*) the cursor to a third destination that is within the threshold distance from the first location, such as the display of cursor 1506*a* within the region 1510*a* as shown in FIG. 15B (e.g., the second magnitude and/or the first direction of the movement of the hand of the user corresponds to movement of the cursor to a location that is not within the threshold distance (e.g., 0.5, 1, 2, 2.5, 3.5, 4, 5, 8, or 10 cm) of the gaze of the user (e.g., is outside of the region or bound defined by the gaze of the user at the first location)). In some embodiments, the third destination is within the threshold distance of the location of the gaze of the user (e.g., is within the region or bound defined by the gaze of the user). In some embodiments, the third destination is selected by the computer system to specifically satisfy the first set of criteria described above. In some embodiments, the third destination is a location at or near an edge of the region or bound defined by the gaze of the user that corresponds to the first direction and/or the second magnitude of movement of the hand of the user.

In some embodiments, in accordance with a determination that the gaze is directed to the second location in the environment, such as the location of the gaze 1508*b* in FIG. 15A, and that the interaction input includes movement in the first direction with the second magnitude that corresponds to movement of the cursor more than the threshold distance from the second location (e.g., outside of the region 1510*b* in FIG. 15A), the computer system moves (1606*c*) the cursor to a fourth destination that is within the threshold distance from the second location, such as the display of cursor 1506*b* within the region 1510*b* as shown in FIG. 15B. For example, the second magnitude and/or the first direction of the movement of the hand of the user corresponds to movement of the cursor to a location that is not within the threshold distance (e.g., 0.5, 1, 2, 2.5, 3.5, 4, 5, 8, or 10 cm)

of the gaze of the user (e.g., is outside of the region or bound defined by the gaze of the user). In some embodiments, the fourth destination is within the threshold distance of the location of the gaze of the user (e.g., is within the region or bound defined by the gaze of the user at the second location). In some embodiments, the fourth destination is selected by the computer system to specifically satisfy the first set of criteria described above. In some embodiments, the fourth destination is a location at or near an edge of the region or bound defined by the gaze of the user that corresponds to the first direction and/or the second magnitude of movement of the hand of the user. Thus, a larger magnitude (e.g., larger than the first magnitude described above) of movement of the hand of the user optionally causes the computer system to constrain the movement of the cursor based on the location of the gaze of the user in the three-dimensional environment (e.g., when the gaze is directed toward the first location or the second location). Constraining movement of a cursor in the three-dimensional environment to a region defined by the gaze of the user when the movement of the hand of the user is outside of the region avoids unintentional large movements of the cursor within the three-dimensional environment, thereby improving user-device interaction.

In some embodiments, in response to detecting the interaction input (1608*a*), in accordance with a determination that the gaze is directed to the first location in the environment, such as the location of the gaze 1508*b* in FIG. 15A, and that the interaction input (e.g., movement of the hand 1505*a* as shown in FIG. 15A) includes movement in a second direction, different from the first direction, with the first magnitude that corresponds to movement of the cursor more than the threshold distance of the first location, such as outside of the region 1510*b* in FIG. 15A, the computer system moves (1608*b*) the cursor to a third destination that is within the threshold distance from the first location, such as movement of the cursor 1506*b* to a boundary of the region 1510*b* as shown in FIG. 15B (e.g., the first magnitude and/or the second direction of the movement of the hand of the user corresponds to movement of the cursor to a location that is not within the threshold distance (e.g., 0.5, 1, 2, 2.5, 3.5, 4, 5, 8, or 10 cm) of the gaze of the user (e.g., is outside of the region or bound defined by the gaze of the user at the first location)). In some embodiments, the third destination is within the threshold distance of the location of the gaze of the user (e.g., is within the region or bound defined by the gaze of the user). In some embodiments, the third destination is selected by the computer system to specifically satisfy the first set of criteria described above. In some embodiments, the third destination is a location at or near an edge of the region or bound defined by the gaze of the user that corresponds to the second direction and/or the first magnitude of movement of the hand of the user, such that the third destination is the threshold distance from the first location.

In some embodiments, in accordance with a determination that the gaze is directed to the second location in the environment, such as the location of the gaze 1508*a* in FIG. 15A, and that the interaction input (e.g., movement of the hand 1503*a* as shown in FIG. 15A) includes movement in the second direction with the first magnitude that corresponds to movement of the cursor within the threshold distance of the second location, the computer system moves (1608*c*) the cursor to a fourth destination that is within the threshold distance of the second location, such as movement of the cursor within the region 1510*a* as shown in FIG. 15B. For example, the first magnitude and/or the second direction of the movement of the hand of the user causes the cursor to be moved to a location (e.g., the fourth destination) within the threshold distance (e.g., 0.5, 1, 2, 2.5, 3.5, 4, 5, 8, or 10 cm) of the gaze of the user (e.g., to be within the region or bound defined by the gaze of the user at the second location). Thus, a different direction (e.g., different from the first direction described above) of movement of the hand of the user causes the computer system to selectively constrain the movement of the cursor based on the location of the gaze of the user in the three-dimensional environment (e.g., when the gaze is directed toward the first location, but not when the gaze is directed toward the second location). Moving a cursor in the three-dimensional environment based on a direction of movement of a hand of the user and a location of a gaze of the user reduces the number of inputs needed to move the cursor within the three-dimensional environment, thereby improving user-device interaction.

In some embodiments, a location of the gaze of the user is used to determine a region in the environment in which the cursor can be positioned (1610*a*), such as the region 1510*a* and/or region 1510*b* shown in FIG. 15A (e.g., a circular or spherical region within the three-dimensional environment). In some embodiments, the gaze of the user defines a center of the region or bound. In some embodiments, for the circular or spherical region, a boundary of the region is the threshold distance from the location of the gaze, such that the threshold distance is a radius of the region. In some embodiments, the region determined by the location of the gaze is a square-shaped region, a rectangular-shaped region, an oval-shaped region, or a triangular-shaped region. In some such embodiments, the gaze of the user defines a center of the region or bound.

In some embodiments, while the cursor is displayed, the computer system detects (1610*b*), via the one or more input devices, movement of the gaze of the user of the computer system from the respective location to a third location in the environment at a respective speed, such as movement of the gaze 1508*a* and/or gaze 1508*b* as shown in FIG. 15B (e.g., the computer system detects the gaze of the user move in the three-dimensional environment at 1, 5, 10, 12, 15, 20, 25, 30, or 40 m/s). In some embodiments, in response to detecting the movement of the gaze of the user, the computer system adjusts (1610*c*) the region determined by the location of the gaze. In some embodiments, in accordance with a determination that the respective speed is a first speed (e.g., a speed that is above a speed threshold, such as greater than 5, 10, 12, 15, 20, 25, or 30 m/s), the region determined by the location of the gaze has a first size (1610*d*), such as the size of the region 1510*a* shown in FIG. 15C (e.g., the region or bound defined by the gaze of the user to which the cursor is constrained changes size). In some embodiments, a size of the region or bound becomes smaller in the three-dimensional environment than the size of the region or bound prior to the movement of the gaze. For example, the threshold distance (e.g., the radius) of the (e.g., circular or spherical) region becomes smaller in the three-dimensional environment due to the decreased size of the region when the gaze moves above the speed threshold. In some embodiments, the size of the region or bound becomes larger in the three-dimensional environment than the size of the region or bound prior to the movement of the gaze. For example, the threshold distance (e.g., the radius) of the (e.g., circular or spherical) region becomes larger in the three-dimensional environment due to the increased size of the region when the gaze moves above the speed threshold. In some embodiments, in accordance with a determination that the respective speed of the movement of the gaze is below the speed threshold, such as less than 5, 10, 12, 15, 20, 25, or 30 m/s, the region or bound defined by the gaze of the user does not change size in the three-dimensional environment.

In some embodiments, in accordance with a determination that the respective speed is a second speed, different from the first speed, the region determined by the location of the gaze has a second size, different from the first size (1610*e*), such as the size of the region 1510*b* shown in FIG. 15C. For example, the region or bound defined by the gaze of the user changes size based on the speed of the movement of the gaze. In some embodiments, the second speed is greater than the first speed, such that the second speed exceeds the speed threshold by a greater degree than the first speed. In some embodiments, the size of the region or bound is decreased by an amount that is greater than an amount that the size of the region or bound was decreased for the gaze movement at the first speed. For example, the threshold distance (e.g., the radius) of the (e.g., circular or spherical) region becomes even smaller in the three-dimensional environment due to the even smaller size of the region when the gaze moves a greater level (e.g., by 1, 2, 4, 5, 10, 12, or 15 m/s) above the speed threshold. In some embodiments, the size of the region or bound is increased by an amount that is greater than an amount that the size of the region or bound was increased for the gaze movement at the first speed. For example, the threshold distance (e.g., the radius) of the (e.g., circular or spherical) region becomes even larger in the three-dimensional environment due to the even larger size of the region when the gaze moves a greater level (e.g., by 1, 2, 4, 5, 10, 12, or 15 m/s) above the speed threshold. In some embodiments, the change of the size of the region or bound occurs during the movement of the gaze, and when the gaze is no longer moving, the size of the region or bound reverts to the size that the region or bound had before the movement of the gaze was detected. Adjusting the region defined by a gaze of the user in the three-dimensional environment based on a speed movement of the gaze of the user prevents errors associated with moving a cursor within the three-dimensional environment, which is constrained to the region defined by the gaze, thereby improving user-device interaction.

In some embodiments, a location of the gaze of the user is used to determine a region in the environment in which the cursor can be positioned (1612*a*), such as the region 1510*a* and/or region 1510*b* in FIG. 15A (e.g., a circular or spherical region, a square-shaped region, a rectangular-shaped region, an oval-shaped region, or a triangular-shaped region within the three-dimensional environment, as described above). In some embodiments, the gaze of the user defines a center of the region or bound. In some embodiments, while the cursor is displayed, the computer system detects (1612*b*), via the one or more input devices, movement of the gaze of the user of the computer system from the respective location to a third location in the environment, such as movement of the gaze 1508*a* and/or gaze 1508*b* as shown in FIG. 15B.

In some embodiments, in response to detecting the movement of the gaze of the user, redetermines (1612*c*) the region determined by the location of the gaze to be at the third location, such as the display of region 1510*a* and/or region 1510*b* as shown in FIG. 15C. For example, the region or bound defined by the gaze of the user moves in the three-dimensional environment as the gaze moves. In some embodiments, the center of the region or bound is at or near the third location in the three-dimensional environment. Moving the region defined by a gaze of the user in the three-dimensional environment based on movement of the gaze of the user reduces the number of inputs needed to move a cursor within the three-dimensional environment, which is based on the region defined by the gaze, thereby improving user-device interaction.

In some embodiments, a location of the gaze of the user is used to determine a region in the environment in which the cursor can be positioned (1614*a*), such as the region 1510*a* and/or region 1510*b* in FIG. 15A (e.g., a circular or spherical region, a square-shaped region, a rectangular-shaped region, an oval-shaped region, or a triangular-shaped region within the three-dimensional environment, as described above). In some embodiments, the gaze of the user defines a center of the region or bound. In some embodiments, while the cursor is a first distance from the viewpoint of the user, a boundary of the region is a threshold angular separation from the location of the gaze (1614*b*), as described herein with reference to FIG. 15A (e.g., for a circular or spherical region, the boundary of the region is a threshold angular distance between the center of the region and a point on the boundary of the region, such as 5, 10, 15, 20, 25, 30, 45, 90, 105, 120, or 145 degrees, which optionally corresponds to the radius for a circular or spherical region).

In some embodiments, while the cursor is a second distance, different from the first distance, from the viewpoint of the user (e.g., a smaller or larger distance), the boundary of the region is the threshold angular separation from the location of the gaze (1614*c*), as described with reference to FIG. 15A. For example, the point on the boundary of the region is the same distance from the center of the region. Thus, the angular size of the region or bound defined by the gaze of the user is optionally independent of the distance of the cursor from the viewpoint of the user. In some embodiments, the distance of the cursor from the viewpoint of the user is based on and/or corresponds to the distance of the content within which the cursor is displayed from the viewpoint of the user, such that if the cursor is displayed in content that is further from the viewpoint of the user, the cursor will be displayed further from the viewpoint of the user, and if the cursor is displayed in content that is closer to the user, the cursor will be displayed closer to the user. Maintaining an angular size of the region defined by a gaze of the user irrespective of a distance of a cursor within the three-dimensional environment from a viewpoint of the user maintains consistent user control of the cursor, which is constrained to the region defined by the gaze, thereby improving user-device interaction.

In some embodiments, before detecting the interaction input provided by the predefined portion of the user and before the cursor is displayed in the environment (e.g., as shown by dashed cursor 1506*a* in FIG. 15D), the computer system detects (1616*a*), via the one or more input devices, a second interaction input, different from the interaction input, provided by the predefined portion of the user having a first pose, such as the reengagement of hand 1503*d* described with reference to FIG. 15D, while the gaze of the user is directed toward a third location in the environment, such as the location of gaze 1508*a* shown in FIG. 15D (e.g., while the cursor is not displayed in the three-dimensional environment, the computer system detects the hand of the user engage while the gaze is directed toward the third location in the three-dimensional environment). In some embodiments, the computer system detects an air pinch gesture (e.g., in which the tip of the index finger and thumb of the user come into contact, and then separate after a period of time, such as 0.01, 0.02, 0.05, 0.1, 0.2, 0.3, 0.5, or 1 seconds of coming into contact) while the hand of the user is in the first pose (e.g., while the hand is in a raised or elevated state with respect to a surface on which the user is positioned). In some embodiments, the first pose includes the hand of the user in a ready state configuration before and/or after the air pinch gesture is detected.

In some embodiments, in response to detecting the second interaction input, the computer system displays (1616*b*), via the display generation component, the cursor at the third location in the environment, such as the display of the cursor 1506*a* at the location of the gaze 1508*a* as shown in FIG. 15E (e.g., the cursor is displayed at the location to which the gaze of the user was directed when the second interaction input was received). In some embodiments, the interaction input (e.g., movement of hand 1503*a* in FIG. 15A) is detected when the cursor is displayed at the third location in the environment (1616*c*). For example, the interaction input discussed above that was provided for moving the cursor within the three-dimensional environment was received following the display of the cursor at the third location in the three-dimensional environment. Displaying a cursor at the location of a gaze of the user within the three-dimensional environment when a hand of the user engages enables display of the cursor to be performed without displaying additional controls, thereby improving user-device interaction.

In some embodiments, while the cursor is displayed, the computer system detects (1618*a*), via the one or more input devices, that the predefined portion of the user is no longer in the first pose, such as disengagement of the hand 1503*c* as shown in FIG. 15C (e.g., while the cursor is displayed in the three-dimensional environment, the computer system detects the hand of the user disengage, irrespective of a location of the gaze in the three-dimensional environment). In some embodiments, the computer system detects the hand of the user lower or relax with respect to the surface on which the user is positioned (e.g., the hand of the user is placed/rested at a side of the user's torso and/or is no longer in the ready state configuration).

In some embodiments, in response to detecting the predefined portion of the user is no longer in the first pose, the computer system ceases (1618*b*) display of the cursor in the environment, such as ceasing display of the cursor 1506*a* as shown in FIG. 15D. For example, the cursor is no longer displayed in the three-dimensional environment when the hand of the user disengages. In some embodiments, the cursor is redisplayed in the three-dimensional environment at a current location of the gaze of the user when the hand of the user is engaged, as discussed above. Ceasing display of a cursor within the three-dimensional environment when a hand of the user disengages enables ceasing of display of the cursor to be performed without displaying additional controls, thereby improving user-device interaction.

In some embodiments, the cursor is displayed over an object (e.g., object 1504*a* and/or object 1504*b* in FIG. 15A) in the environment that includes content (1620*a*), such as text content 1512*a* and/or text content 1512*b* in FIG. 15A (e.g., an application window of an application, wherein the cursor is displayed overlaying (e.g., from the viewpoint of the user) a user interface containing text content in the application window, such as a user interface in a web-browsing application, a text-editing application, a document reader application, or a messaging application). In some embodiments, while the cursor is displayed over the object, the computer system detects (1620*b*), via the one or more input devices, movement of the gaze of the user to a location that is outside of the object in the environment, such as movement of gaze 1508*a* and/or gaze 1508*b* (e.g., the computer system detects the gaze of the user move in the three-dimensional environment to a location that is outside (e.g., different from) the application window over which the cursor is displayed). In some embodiments, in response to detecting the movement of the gaze of the user (1620*c*), in accordance with a determination that the gaze of the user is directed to the location outside of the object for at least a threshold amount of time, the computer system ceases (1620*d*) display of the cursor in the environment, such as ceasing display of the cursor 1506*a* and/or cursor 1506*b* as described herein with reference to FIG. 15D. For example, the cursor is no longer displayed after 0.05, 0.01, 0.2, 0.5, 1, 2, 3, 3.5, 4, 5, 6, 10, 12, or 15 seconds have elapsed since the gaze of the user was detected as being directed to the location outside the application window. In some embodiments, the cursor remains displayed in the environment (e.g., over the object, or at the location of the gaze) until the threshold amount of time is reached. In some embodiments, if the gaze of the user is moved back to a location within the object within the threshold amount of time, the cursor remains displayed over the content without the cursor being hidden due to the movement of the gaze to a location outside of the object, as described above. Ceasing display of a cursor within the three-dimensional environment when a gaze of the user is directed away from an object containing the cursor for more than a threshold amount of time enables ceasing of display of the cursor to be performed without displaying additional controls, thereby improving user-device interaction.

In some embodiments, while the cursor is displayed, the computer system detects (1622*a*), via the one or more input devices, movement of the gaze of the user of the computer system from the respective location to a third location, such as movement of the gaze 1508*a* and/or gaze 1508*b* as shown in FIG. 15B (e.g., the computer system detects the gaze of the user move away from the current location of the cursor in the three-dimensional environment). In some embodiments, while detecting the movement of the gaze of the user (1622*b*), in accordance with a determination that a magnitude of the movement of the gaze of the user is greater than a threshold magnitude, such as the movement of gaze 1508*b* as shown in FIG. 15C, the computer system ceases (1622*c*) display of the cursor in the environment, such as ceasing display of the cursor (e.g., 1506*b*) as shown in FIG. 15C (e.g., the cursor is no longer displayed in the three-dimensional environment if a magnitude (e.g., a speed) of movement of the gaze of the user is greater than a predefined threshold (e.g., such as 5, 10, 12, 15, 20, 25, or 30 m/s)). In some embodiments, the cursor is no longer displayed in the three-dimensional environment if a distance of movement of the gaze of the user is greater than a predefined distance threshold, such as 1, 2, 5, 8, 10, 12, 15, or 20 cm. In some embodiments, after detecting an end of the movement of the gaze of the user, the computer system redisplays the cursor at the third location (e.g., the current location of the gaze of the user in the three-dimensional environment).

In some embodiments, in accordance with a determination that the magnitude of the movement of the gaze of the user is less than the threshold magnitude, such as the movement of gaze 1508*a* as shown in FIG. 15C, the computer system maintains (1622*d*) display of the cursor in the environment, such as maintaining display of cursor 1506*a* shown in FIG. 15C. For example, because the speed of the movement of the gaze of the user is less than the predefined threshold (5, 10, 12, 15, 20, 25, or 30 m/s), the cursor remains displayed in the three-dimensional environment as the gaze moves. In some embodiments, display of the cursor is continuously updated such that a current location of the cursor is based on the current location of the gaze as the gaze moves. For example, as the gaze of the user moves in the three-dimensional environment, the cursor is moved along with/at the center of the region or bound defined by the gaze of the user. In some embodiments, as the gaze of the user moves in the three-dimensional environment, the cursor is moved along with/at a boundary of the region or bound defined by the gaze of the user. Selectively displaying a cursor within the three-dimensional environment based on a magnitude of movement of a gaze of the user avoids accidental cursor interaction or movement when the magnitude of the gaze movement is relatively large, thereby improving user-device interaction.

In some embodiments, the interaction input includes movement of the predefined portion of the user at a respective speed (1624_a_), such as movement of hand 1503_a_ and/or hand 1505_a_ as shown in FIG. 15A (e.g., the computer system detects the hand of the user move in the first direction with the first magnitude at 1, 5, 10, 12, 15, 20, 25, 30, or 40 m/s). In some embodiments, in response to detecting the interaction input, moving the cursor includes (1624_b_), in accordance with a determination that the respective speed is a first speed, moving the cursor based on a first relationship between the movement of the predefined portion of the user and the movement of the cursor (1624_c_), such as movement of the cursor 1506_a_ and/or cursor 1506_b_ as shown in FIG. 15B (e.g., the cursor is moved within the three-dimensional environment with a first acceleration that is based on the speed of the movement of the hand of the user, which is optionally the first speed). In some embodiments, the acceleration of the movement of the cursor changes in accordance with a change in the speed of the movement of the hand of the user. For example, if the movement of the predefined portion of the user is movement at 1 m/s, the computer system moves the cursor by 2 cm for a 1 cm movement of the predefined portion of the user.

In some embodiments, in accordance with a determination that the respective speed is a second speed, different from the first speed (e.g., greater than the first speed or less than the first speed), the cursor is moved based on a second relationship, different from the first relationship, between the movement of the predefined portion of the user and the movement of the cursor (1624_d_), as described herein with reference to FIG. 15B. For example, the cursor is moved within the three-dimensional environment with a second acceleration, different from the first acceleration, that is based on the speed of the movement of the hand of the user, which is optionally the second speed. For example, if the movement of the predefined portion of the user is movement at 2 m/s, the computer system moves the cursor by 4 cm for a 1 cm movement of the predefined portion of the user. Adjusting an acceleration of the movement of the cursor in the three-dimensional environment based on a speed of the movement of a hand of the user provides feedback about the movement of the cursor, thereby improving user-device interaction.

In some embodiments, the first speed is less than the second speed (1626_a_). In some embodiments, the first relationship defines movement of the cursor for a given movement of the predefined portion of the user that is less than the magnitude of the movement of the predefined portion of the user (1626_b_), as described herein with reference to FIG. 15B. For example, as the hand of the user is moved slowly, an acceleration of the movement of the cursor in the three-dimensional environment decreases accordingly. In some embodiments, for a given amount of movement of the hand of the user at the first speed, the cursor is moved within the three-dimensional environment an amount that is less than the given amount of the movement of the hand of the user. For example, the hand movement-to-cursor movement relationship that controls the cursor movement in the three-dimensional environment is less than the hand movement-to-cursor movement relationship described below. Decreasing an acceleration of the movement of the cursor in the three-dimensional environment based on a decrease in a speed of the movement of a hand of the user provides precise control of the cursor when appropriate, thereby improving user-device interaction.

In some embodiments, the second relationship defines movement of the cursor for a given movement of the predefined portion of the user that is greater than the magnitude of the movement of the predefined portion of the user (1628), as described herein with reference to FIG. 15B. For example, as the hand of the user is moved quickly, an acceleration of the movement of the cursor in the three-dimensional environment increases accordingly. In some embodiments, for a given amount of movement of the hand of the user at the second speed, the cursor is moved within the three-dimensional environment an amount that is greater than the given amount of the movement of the hand of the user. For example, the hand movement-to-cursor movement relationship that controls the cursor movement in the three-dimensional environment is greater than the hand movement-to-cursor movement relationship described above. Increasing an acceleration of the movement of the cursor in the three-dimensional environment based on an increase in a speed of the movement of a hand of the user facilitates greater movements of the cursor in the environment, thereby improving user-device interaction.

In some embodiments, the cursor is displayed over content in the environment (1630_a_), such as text content 1512_a_ and/or text content 1512_b_ in FIG. 15A (e.g., the cursor is displayed over text content in the three-dimensional environment). In some embodiments, while the cursor is displayed over the content in the environment, the computer system detects (1630_b_), via the one or more input devices, a second interaction input that includes a respective gesture performed by the predefined portion of the user (1630_c_), such as pinch input provided by hand 1505_c_ as shown in FIG. 15D (e.g., an air pinch gesture performed by the hand of the user (e.g., in which the tip of the index finger and thumb of the hand of the user come into contact), as discussed above. In some embodiments, the respective gesture has one or more of the characteristics of pinch gestures described in methods 800, 1000, 1200 and/or 1800), and movement of predefined portion of the user after the respective gesture while the predefined portion of the user is in a first pose (1630_d_), such as movement of the hand 1505_c_ as shown in FIG. 15D (e.g., movement of the hand of the user in a respective direction with a respective magnitude while the hand of the user remains in the pinch hand shape).

In some embodiments, in response to detecting the second interaction input (1632_a_), the computer system moves (1632_b_) the cursor relative to the content in accordance with the movement of the predefined portion of the user, such as movement of the cursor 1506_b_ as shown in FIG. 15E (e.g., the cursor is moved over the text content in the three-dimensional environment in accordance with the respective direction and/or the respective magnitude of the movement of the hand, as discussed above). In some embodiments, the computer system selects (1632_c_) at least a portion of the content in accordance with the movement of the cursor, such as highlight 1509_b_ of a portion of the text content 1512_b_ as shown in FIG. 15E. For example, the portion of the text content over which the cursor was moved in accordance with the respective direction and/or respective magnitude of the movement of the hand becomes selected/highlighted in the three-dimensional environment. In some embodiments, the selection of the content in the three-dimensional environment has one or more of the characteristics of the selection of content described in methods 800, 1000, 1200 and/or 1800. Selecting a portion of content in accordance with movement of a cursor within the three-dimensional environment reduces the number of inputs needed to select content in the three-dimensional environment, thereby improving user-device interaction.

In some embodiments, the cursor is displayed over content including text in the environment (1634*a*), such as text content 1512*a* and/or text content 1512*b* in FIG. 15A. In some embodiments, while the cursor is displayed over a word (e.g., at a beginning, an end, or over a middle portion of the word) in the content in the environment, the computer system detects (1634*b*), via the one or more input devices, a second interaction input that includes the predefined portion of the user performing a respective gesture twice within a time threshold (e.g., 0.01, 0.02, 0.05, 0.1, 0.2, 0.3, 0.5, or 1 seconds) of one another, such as a double pinch input provided by hand 1503*d* as shown in FIG. 15E (e.g., an air pinch gesture corresponding to a double pinch gesture performed by the hand of the user (e.g., in which the tip of the index finger and thumb of the hand of the user come into contact and release, twice over)). In some embodiments, the air pinch gesture has one or more of the characteristics of pinch gestures described in methods 800, 1000, 1200 and/or 1800. In some embodiments, in response to detecting the second interaction input (1634*c*), the computer system selects (1634*d*) the word in the text over which the cursor (e.g., cursor 1506*a* in FIG. 15E) was displayed when the second interaction input was received, such as the highlight 1509*a* of the word "scelerisque" as shown in FIG. 15F. For example, the word in the text becomes selected/highlighted in the three-dimensional environment. In some embodiments, the word in the text becomes selected/highlighted irrespective of the location of the gaze when the second interaction input was detected. In some embodiments, the word in the text becomes selected/highlighted without movement of the hand in a respective direction and/or with a respective magnitude corresponding to selection of the word. In some embodiments, the selection of the word in the content has one or more of the characteristics of the selection of content described in methods 800, 1000, 1200 and/or 1800. Selecting a word in text content within the three-dimensional environment in response to detecting a double pinch gesture reduces the number of inputs needed to select a word in text content in the three-dimensional environment, thereby improving user-device interaction.

In some embodiments, the cursor is displayed over content including text in the environment (1636*a*), such as text content 1512*a* and/or text content 1512*b* in FIG. 15A. In some embodiments, while the cursor is displayed over a word (e.g., at a beginning, an end, or over a middle portion of the word) in the content in the environment, the computer system detects (1636*b*), via the one or more input devices, a second interaction input that includes the predefined portion of the user performing a respective gesture thrice within a time threshold (e.g., 0.01, 0.02, 0.05, 0.1, 0.2, 0.3, 0.5, or 1 seconds) of one another, such as triple pinch input provided by hand 1507*a* as shown in FIG. 15E (e.g., an air pinch gesture corresponding to a triple pinch gesture performed by the hand of the user (e.g., in which the tip of the index finger and thumb of the hand of the user come into contact and release, thrice over)). In some embodiments, the air pinch gesture has one or more of the characteristics of pinch gestures described in methods 800, 1000, 1200 and/or 1800. In some embodiments, in response to detecting the second interaction input (1636*c*), the computer system selects (1636*d*) a paragraph in the text in which the word (e.g., "amet" in FIG. 15E) was located when the second interaction input was received, such as highlight 1509*c* of the top paragraph as shown in FIG. 15F. For example, a paragraph containing the word in the text becomes selected/highlighted in the three-dimensional environment. In some embodiments, the paragraph becomes selected/highlighted irrespective of the location of the gaze when the second interaction input was received. In some embodiments, the paragraph in the text becomes selected/highlighted without movement of the hand in a respective direction and/or with a respective magnitude corresponding to selection of the paragraph. In some embodiments, the selection of the paragraph in the content has one or more of the characteristics of the selection of content described in methods 800, 1000, 1200 and/or 1800. Selecting a paragraph in text content within the three-dimensional environment in response to detecting a triple pinch gesture reduces the number of inputs needed to select a paragraph in text content in the three-dimensional environment, thereby improving user-device interaction.

In some embodiments, the cursor is displayed over content in the environment (1638*a*), such as text content 1512*a* and/or text content 1512*b* in FIG. 15A (e.g., the cursor is displayed over text content in the three-dimensional environment). In some embodiments, while a portion of the content is selected (e.g., highlighted) in the environment and while the cursor is displayed over the portion of the content that is selected, such as the highlighted portion 1509*b* in FIG. 15E (e.g., the cursor is displayed over the portion of the text content that is highlighted), the computer system detects (1638*b*), via the one or more input devices, a second interaction input that includes a respective gesture performed by the predefined portion of the user (1638*c*), such as a pinch input provided by hand 1505*d* in FIG. 15E (e.g., an air pinch gesture performed by the hand of the user (e.g., in which the tip of the index finger and thumb of the hand of the user come into contact), as discussed above. In some embodiments, the respective gesture has one or more of the characteristics of pinch gestures described in methods 800, 1000, 1200 and/or 1800) and movement of the predefined portion of the user after the respective gesture while the predefined portion of the user is in a first pose (1638*d*), such as movement of the hand 1505*d* as shown in FIG. 15E (e.g., movement of the hand of the user in a respective direction with a respective magnitude while the hand of the user remains in the pinch hand shape).

In some embodiments, in response to detecting the second interaction input (1638*e*), the computer system selects (16380 at least an additional portion of the content in addition to the portion of the content in accordance with the movement of the predefined portion of the user, such as the extension of the highlighted portion 1509*b* as shown in FIG. 15F. For example, the selection/highlighting of the portion of the text content over which the cursor was positioned when the second interaction input was detected is extended such that additional text content becomes selected/highlighted in the three-dimensional environment in accordance with the respective direction and/or the respective magnitude of the movement of the hand of the user, such as described previously with respect to cursor movement based on the movement of the predefined portion of the user. In some embodiments, the selection of the additional content in the three-dimensional environment has one or more of the characteristics of the selection of content described in methods 800, 1000, 1200 and/or 1800. Selecting portions of content in addition to a portion that is already selected in accordance with a movement of the predefined portion of the user while the cursor is located within the already selected content reduces the number of inputs needed to select additional portions of content in the three-dimensional environment, thereby improving user-device interaction.

In some embodiments, while detecting the second interaction input, the cursor is not displayed (1640), such as ceasing display of the cursor (e.g., cursor 1506*b*) as shown in FIG. 15F. For example, the cursor ceases to be displayed while the additional portion of the content is selected in addition to the portion of the content that was already selected before the second interaction input was detected. In some embodiments, when the second interaction input ends (e.g., when the index finger and the thumb of the hand of the user are no longer touching), the cursor is redisplayed in the three-dimensional environment. For example, the cursor is redisplayed at the location of the gaze (e.g., at the center of the region or bound defined by the gaze) in the three-dimensional environment. Ceasing display of a cursor when selecting additional portions of content that is already selected in the three-dimensional environment avoids cluttering the user interface during selection, thereby improving user-device interaction.

In some embodiments, the cursor is displayed over content in the environment (1642*a*), such as text content 1512*a* and/or text content 1512*b* in FIG. 15A (e.g., the cursor is displayed over text content in the three-dimensional environment). In some embodiments, while a portion of the content is selected (e.g., highlighted) in the environment, such as the highlighted portion 1509*b* in FIG. 15F, and while the cursor is displayed outside of the portion of the content that is selected (e.g., the cursor is displayed over a word or portion of the content that is not a part of the portion of the text content that is highlighted), the computer system detects (1642*b*), via the one or more input devices, a second interaction input that includes a respective gesture performed by the predefined portion of the user (e.g., hand 1505*e* in FIG. 15F) (e.g., an air pinch gesture performed by the hand of the user (e.g., in which the tip of the index finger and thumb of the hand of the user come into contact and release), as discussed above). In some embodiments, the respective gesture has one or more of the characteristics of pinch gestures described in methods 800, 1000, 1200 and/or 1800.

In some embodiments, in response to detecting the second interaction input (1642*c*), the computer system deselects (1642*d*) the portion of the content that was selected before the second interaction input was received, such as the deselection of the highlighted portion 1509*b* as shown in FIG. 15G. For example, the portion of the text content that was selected/highlighted before the second interaction input was received becomes deselected/unhighlighted in the three-dimensional environment. In some embodiments, the portion of the text content becomes deselected/unhighlighted irrespective of a location of the gaze of the user. Deselecting a portion of content that is already selected in response to detecting a pinch gesture while the cursor is located outside the selected portion of the content reduces the number of inputs needed to deselect portions of content in the three-dimensional environment, thereby improving user-device interaction.

In some embodiments, while the predefined portion of the user moves less than a threshold amount (1644*a*), such as while the hand 1503*b* and/or hand 1505*b* remain stationary as shown in FIG. 15B (e.g., while the hand of the user remains stationary (e.g., moving at 0 m/s) or within 0.25, 0.5, 0.75, 1 or 2 m/s of being stationary and/or moves less than 0.1, 0.3, 0.5, 1, 3, 5 or 10 cm. In some embodiments, the hand of the user is required to be in a ready state configuration for the below operations to occur), while the cursor is displayed at a third location in the environment, such as the location of cursor 1508*a* in FIG. 15B, and the gaze of the user is directed to a fourth location, such as the location of gaze 1508*a* in FIG. 15B (e.g., the cursor is at a location in the three-dimensional environment that is different from the location of the gaze in the three-dimensional environment, but is within the threshold distance (e.g., 0.5, 1, 2, 2.5, 3.5, 4, 5, 8, or 10 cm) of the location of the gaze. In some embodiments, the cursor is displayed at the location of the gaze in the three-dimensional environment), the computer system detects (1644*b*), via the one or more input devices, movement of the gaze from the fourth location to a fifth location, different from the fourth location in the environment, such as movement of the gaze 1508*a* as shown in FIG. 15B (e.g., the gaze of the user moves as the hand of the user remains (e.g., substantially) stationary, as described above).

In some embodiments, in response to detecting the movement of the gaze (1644*c*), the computer system moves (1644*d*) the cursor to a sixth location, different from the third location, in the environment in accordance with the movement of the gaze, such as movement of the cursor 1506*a* as shown in FIG. 15C, wherein the sixth location is within the threshold distance of the fifth location (e.g., within the region 1510*a* in FIG. 15C). For example, the cursor is moved in the three-dimensional environment to remain within the region or bound defined by the updated location of the gaze of the user as the gaze moves. In some embodiments, the sixth location is at or near the fifth location, which optionally corresponds to the center of the region or bound. In some embodiments, the sixth location is at or near a boundary of the region or bound defined by the gaze of the user, or at some location in between the center and a point on the boundary. Moving a cursor within the three-dimensional environment based on a movement of the gaze of the user while a hand of the user remains substantially stationary ensures that the cursor remains relatively close to the area of interest, thereby improving user-device interaction.

In some embodiments, the gaze of the user is used to determine a region in the environment to which movement of the cursor is constrained (1646*a*), such as region 1510*a* and/or region 1510*b* in FIG. 15A (e.g., a circular or spherical region, a square-shaped region, a rectangular-shaped region, an oval-shaped region, or a triangular-shaped region within the three-dimensional environment, as described above). In some embodiments, the gaze of the user defines a center of the region or bound. In some embodiments, a location of the region in the environment is based on a smoothed location of the gaze in the environment over a time period (1646*b*) (e.g., 0.1, 0.3, 0.5, 1, 3, 5, 10 or 20 seconds), as described herein with reference to FIG. 15A. For example, the location of the region defined by the location of the gaze is smoothed to account for quick and/or sudden movements or jitters (e.g., darting) of the eye(s) of the user, from which the location of the region is determined. In some embodiments, such sudden movements and/or jitters of the eye(s) of the user are disregarded by the computer system when defining the region or bound that is based on the location of the gaze of the user. In some embodiments, a dataset corresponding to such sudden movements and/or jitters of the eye(s) of the user are averaged, filtered, concatenated, or indexed when defining the region or bound. Smoothing the region defined by the gaze of the user within the three-dimensional environment to account for jitters in eye movement improves efficiency and accuracy when moving a cursor within the three-dimensional environment, thereby improving user-device interaction.

In some embodiments, while the cursor is displayed in the environment (1648*a*) (e.g., displayed over content in the three-dimensional environment), in accordance with a determination that the cursor is displayed over selectable content, such as selectable content 1514*a*/1514*b* shown in FIG. 15G (e.g., a hyperlink embedded in a word, words, or image that is selectable to cause the computer system to display (e.g., navigate to a web page associated with the hyperlink) additional content corresponding to the hyperlink, a selectable option (e.g., a button) that is selectable to cause the computer system to perform a corresponding operation, or a text input field that is selectable to initiate a process to enter text, based on user input, into the text input field), the cursor is displayed with a first visual appearance (1648*b*), such as the circular appearance of the cursor 1506*a*/1506*b* as shown in FIG. 15G (e.g., the cursor is displayed with a first shape, such as a circular shape. In some embodiments, the cursor is displayed with a respective color and/or at a respective size). In some embodiments, in accordance with a determination that the cursor is not displayed over selectable content, such as text content 1512*a*/1512*b* in FIG. 15A (e.g., the cursor is displayed over a word or image that does not correspond to a hyperlink, or displayed over other content in the environment that is not selectable), the cursor is displayed with a second visual appearance, different from the first visual appearance (1648*c*), such as the appearance of the cursor 1506*a*/1506*b* shown in FIG. 15A. For example, the cursor is displayed with a second shape, different from the first shape, such as a rectangular/linear shape. In some embodiments, the color and/or size of the cursor are different when the cursor is displayed over selectable content versus when the cursor is not displayed over selectable content. Altering display of a cursor when the cursor is displayed over selectable content within the three-dimensional environment facilitates discovery that the content contains selectable content, thereby improving user-device interaction.

FIGS. 17A-17E illustrate examples of a computer system facilitating content selection and scrolling in accordance with some embodiments.

Figure 17A:
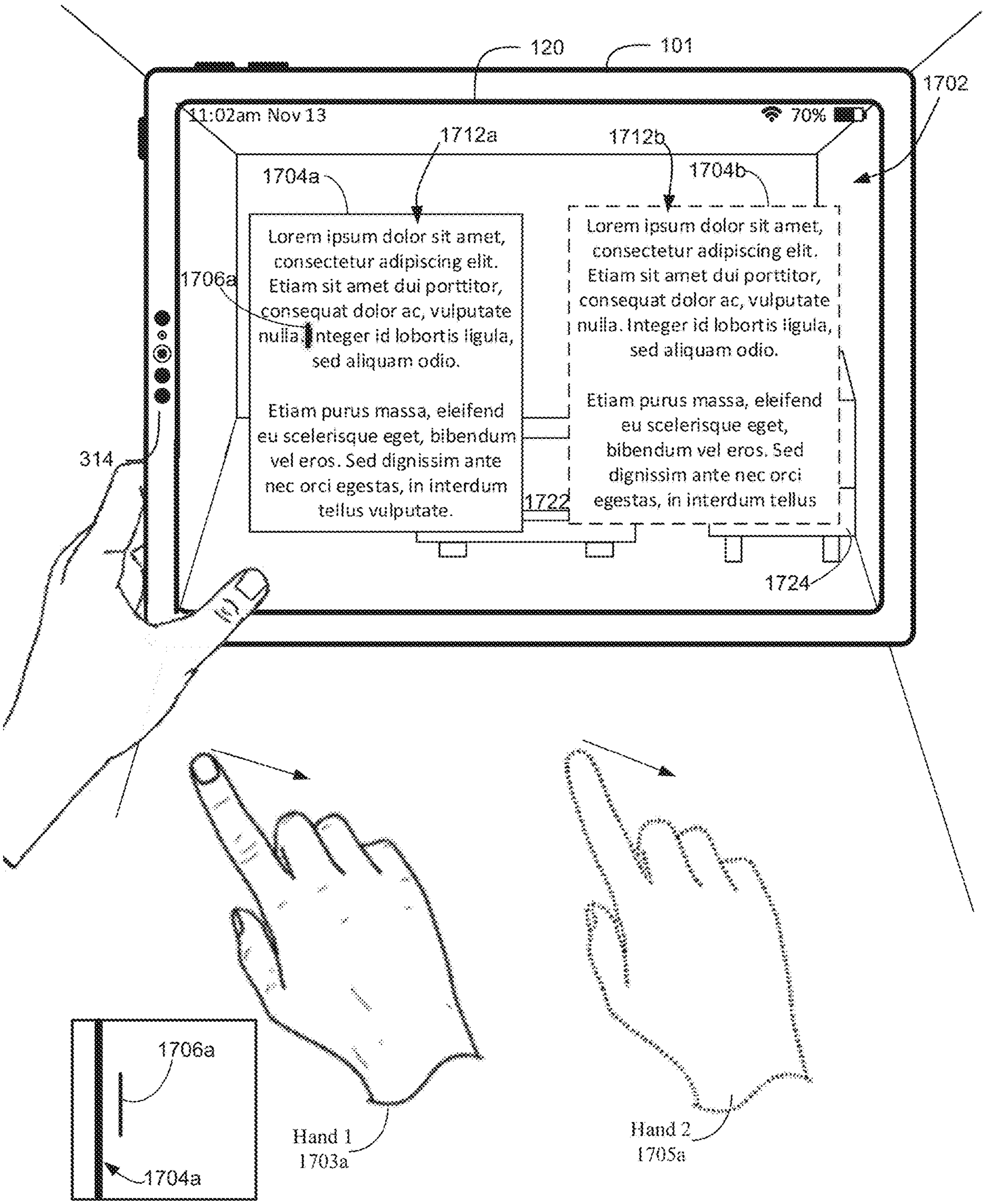
FIGS. 17A-17E illustrate examples of a computer system facilitating content selection and scrolling in accordance with some embodiments.

FIG. 17A illustrates a computer system (e.g., an electronic device) 101 displaying, via a display generation component (e.g., display generation component 120 of FIG. 1), a three-dimensional environment 1702 from a viewpoint of a user of the computer system 101. As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 17A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 1702; in some embodiments, the physical environment is visible via passive passthrough, such as through a transparent or translucent portion of display generation component 120. For example, three-dimensional environment 1702 includes a representation 1724 of a sofa (partially occluded by object 1704*b*), which is optionally a representation of a physical sofa in the physical environment; three-dimensional environment 1702 also includes a representation 1722 of a table (e.g., partially occluded by objects 1704*a* and 1704*b*), which is optionally a representation of a physical table in the physical environment. Three-dimensional environment 1702 also includes representations of the physical floor, ceiling and back and side walls of the room in which computer system 101 is located.

In FIG. 17A, three-dimensional environment 1702 also includes virtual objects 1704*a* and 1704*b*. Virtual objects 1704*a* and 1704*b* are optionally one or more of user interfaces of applications (e.g., messaging user interfaces, content browsing user interfaces, etc.), three-dimensional objects (e.g., virtual clocks, virtual balls, virtual cars, etc.), representations of content (e.g., representations of photographs, videos, movies, music, etc.) or any other element displayed by computer system 101 that is not included in the physical environment of computer system 101. In FIG. 17A, virtual objects 1704*a* and 1704*b* are two-dimensional objects, but the examples described herein could apply analogously to three-dimensional objects. Additionally, in FIG. 17A, virtual objects 1704*a* and 1704*b* are optionally displaying text content (e.g., "Lorem ipsum dolor . . . ") 1712*a* and 1712*b*, respectively, in three-dimensional environment 1702. Further, in some embodiments, computer system 101 does not display objects 1704*a* and 1704*b* concurrently; in such embodiments, the below-described interactions with objects 1704*a* and 1704*b* optionally occur independently.

In FIG. 17A, object 1704*a* includes cursor 1706*a* (e.g., which is optionally operating as a text insertion cursor, as will be described in more detail below and which is also described in the FIG. 15 series of figures) and object 1704*b* optionally does not include a cursor in three-dimensional environment 1702. For example, the cursor 1706*a* indicates where new text/content will be inserted in response to receiving an input corresponding to an insert request (e.g., such as a typing or a paste or insert operation). In FIG. 17A, the cursor 1706*a* is optionally displayed within the text content 1712*a* (e.g., at the beginning of the word "Integer") in the virtual object 1704*a* in three-dimensional environment 1702. In some embodiments, the cursor is displayed in three-dimensional environment 1702 separated from a surface of the virtual object in which the cursor is displayed. For example, as shown in the sideview in FIG. 17A, the cursor 1706*a* is displayed a predefined distance (e.g., 0.25, 0.5, 1, 1.5, 1.75, 2, 3, or 5 cm) from the surface of virtual object 1704*a* in three-dimensional environment 1702. Additionally or alternatively, in some embodiments, the cursor is displayed in three-dimensional environment 1702 with a shadow that corresponds to the distance between (e.g., a rear surface of) the cursor and the surface of the virtual object over which the cursor is displayed. For example, as shown in FIG. 17A, the cursor 1706*a* is displayed with a virtual shadow that is virtually cast onto the surface of virtual object 1704*a*. As discussed in more detail later, the appearance of the shadow of the cursor 1706*a* optionally changes in response to changes in the distance between the cursor and the surface of the virtual object in which the cursor is displayed in three-dimensional environment 1702.

In some embodiments, in response to detecting a long air pinch and drag movement of a hand of the user of the computer system 101, the computer system 101 performs one or more respective operations depending on whether a cursor is present in three-dimensional environment 1702. In FIG. 17A, hands 1703*a* and/or 1705*a* are providing a long air pinch gesture (e.g., one in which the thumb and the tip of the index finger of the user come together and contact each other to form a pinch hand shape, and remain in contact for longer than a time threshold such as 0.1, 0.2, 0.3, 0.5, 1, 1.5, 2, 3, or 5 seconds) directed to virtual objects 1704*a* and/or 1704*b*, respectively, followed by downward and rightward movement of the hand while remaining in the pinch hand shape. In some embodiments, a gaze of the user of the computer system 101 is directed to the text content in the virtual object as the hand of the user performs the long pinch air gesture followed by the hand movement while remaining in the pinch hand shape. The magnitudes of the movements of hands 1703*a* and/or 1705*a* are optionally the same. It should be understood that while multiple hands and corresponding inputs are illustrated in FIGS. 17A-17E, such hands and inputs need not be detected by computer system 101 concurrently; rather, in some embodiments, computer system 101 independently responds to the hands and/or inputs illustrated and described in response to detecting such hands and/or inputs independently.

Figure 17B:
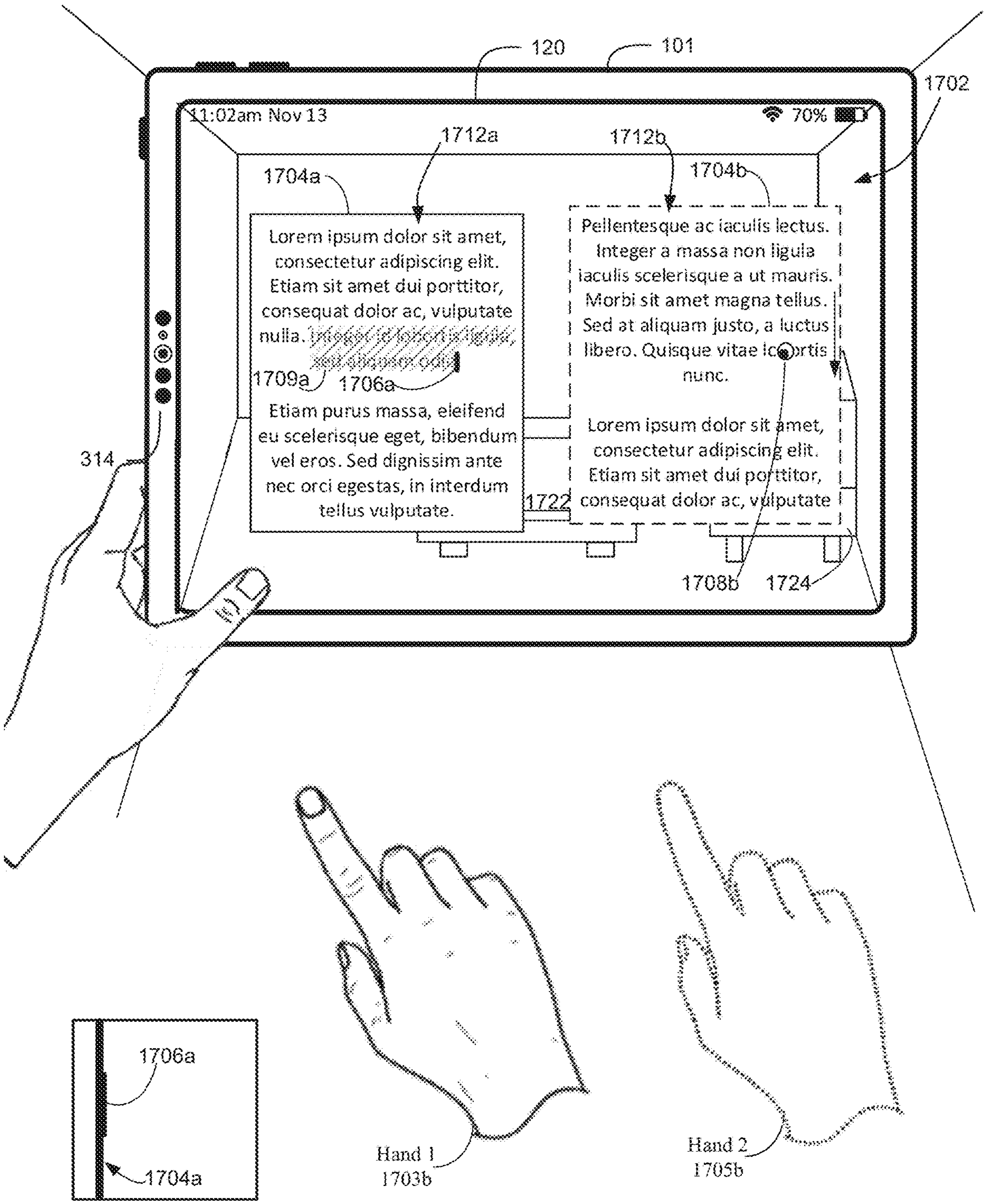

In FIG. 17B, in response to detecting the long air pinch gesture followed by the movement of the hand of the user in the downward and rightward direction, computer system 101 optionally performs a content selection operation and/or a content scrolling operation depending on whether a cursor is present in the virtual object to which the input was directed. For example, as shown in FIG. 17B, in response to detecting the long air pinch gesture followed by the movement of the hand 1703*a* while remaining in the pinch hand shape, computer system 101 moves the cursor 1706*a* and selects/highlights a portion of the text content 1712*a* in accordance with the magnitude and direction of the movement of the hand 1703*a*. As shown, in response to the downward and rightward movement of the hand 1703*a* while remaining in the pinch hand shape, computer system 101 has optionally selected/highlighted the sentence starting with the word "Integer" and ending with the word "odio", as indicated by highlighting 1709*a*, in the text content 1712*a* in virtual object 1704*a*, and has moved the cursor 1706*a* to an end of the word "odio", in accordance with the movement of the hand 1703*a*. For example, the detected magnitude of the movement of the hand 1703*a* caused the computer system 101 to move the cursor 1706*a* from the beginning of the word "Integer" to the end of the word "odio" and select/highlight the text in between, as shown. In some embodiments, the gaze of the user is required to be directed to the text content 1712*a* to cause the computer system 101 to perform the content selection operation in virtual object 1704*a*.

Alternatively, in FIG. 17B, in response to detecting the long air pinch gesture followed by the movement of the hand 1705*a* while remaining in the pinch hand shape, computer system 101 optionally performs a scrolling operation through the text content 1712*b* in virtual object 1704*b*. For example, the text content 1712*b* is scrolled downward in the virtual object 1704*b* in accordance with the downward component of the movement of the hand 1705*a*, and an amount that the text content 1712*b* is scrolled in virtual object 1704*b* is optionally based on the magnitude of the movement of the hand 1705*a*. Thus, if no cursor is present in an object in three-dimensional environment 1702, in response to detecting a long air pinch gesture followed by a hand movement while remaining in the pinch hand shape, computer system 101 optionally scrolls the content in the virtual object rather than selecting/highlighting the content, as discussed above.

In some embodiments, in response to detecting an air pinch gesture of the hand of the user directed to a virtual object that contains a cursor, computer system 101 changes the distance between the cursor and the surface of the virtual object in which the cursor is displayed. In some such embodiments, the change in the distance between the cursor and the surface of the virtual object also changes an appearance of the virtual shadow of the cursor that is cast onto the surface of the virtual object. For example, as shown in the sideview of FIG. 17B, in response to detecting the long air pinch gesture provided by hand 1703*a*, the distance between (e.g., the rear surface of) the cursor 1706*a* and the (e.g., user-facing) surface of the virtual object 1704*a* is decreased such that the cursor 1706*a* is contacting (e.g., or at least partially contacting, or at least closer to) the surface of the virtual object 1704*a*. Additionally, as shown in FIG. 17B, because the cursor 1706*a* is contacting or closer to the surface of virtual object 1704*a*, the cursor 1706*a* appears smaller (e.g., than the cursor 1706*a* in FIG. 17A) from the viewpoint of the user, and the virtual shadow of the cursor 1706*a* is optionally no longer visible from the viewpoint of the user (e.g., because there is no longer a virtual shadow for the cursor 1706*a* to cast onto the surface of the virtual object 1704*a*).

Additionally, in some embodiments, the movement of the cursor toward the surface of the virtual object over which the cursor is displayed is actively updated in accordance with an increasing duration of the air pinch gesture provided by the hand of the user of computer system 101. For example, the movement of the cursor 1706*a* toward the surface of the virtual object 1704*a* is animated to respond to an increasing duration of the air pinch gesture provided by hand 1703*a*. Thus, visually, the gradual movement of the cursor 1706*a* toward the surface of the virtual object 1704*a* (e.g., which appears as a decrease in size of the cursor 1706*a* from the viewpoint of the user), and thus the gradual reduction in the appearance of the shadow cast by the cursor 1706*a* onto the surface of the virtual object 1704*a*, optionally serves as an indication of a status of meeting the criteria for qualifying the air pinch gesture as a long air pinch gesture. As described above, a long air pinch gesture is optionally one in which the thumb and the tip of the index finger of the user come together and contact each other, and remain in contact for longer than a time threshold such as 0.1, 0.2, 0.3, 0.5, 1, 1.5, 2, 3, or 5 seconds. Accordingly, a moment in time at which the cursor 1706*a* contacts the surface of the virtual object 1704*a* (e.g., and the shadow of the cursor 1706*a* is no longer visible) or the cursor 1706*a* reaches its minimum distance from the surface of virtual object 1704*a* in response to computer system 101 detecting the air pinch gesture provided by the hand 1703*a* is optionally the moment in time at which the time threshold is met (i.e., the criteria are satisfied).

In some embodiments, the movement of the cursor toward the surface of the virtual object over which the cursor is displayed is actively updated in accordance with a progress of the hand of the user toward performing the air pinch gesture. For example, the movement of the cursor 1706*a* toward the surface of the virtual object 1704*a* is animated to respond to a decrease in a distance between two fingers (e.g., the index finger and the thumb) of the hand 1703*a* as the hand 1703*a* forms the pinch hand shape. Thus, visually, the gradual movement of the cursor 1706*a* toward the surface of the virtual object 1704*a* (e.g., which appears as a decrease in size of the cursor 1706*a* from the viewpoint of the user), and thus the gradual reduction in the appearance of the shadow cast by the cursor 1706*a* onto the surface of the virtual object 1704*a*, optionally serves as an indication of a progress toward performing the pinch hand shape. Accordingly, a moment in time at which the cursor 1706*a* contacts the surface of the virtual object 1704*a* (e.g., and the shadow of the cursor 1706*a* is no longer visible) or the cursor 1706*a* reaches its minimum distance from the surface of virtual object 1704*a* in response to computer system 101 detecting the air pinch gesture provided by the hand 1703*a* is optionally the moment in time at which the computer system 101 recognizes that the hand 1703*a* is in a pinch hand shape.

Additionally, in some embodiments, the computer system 101 changes a visual appearance of the cursor when the criteria for qualifying the air pinch gesture as a long air pinch gesture are met, signifying that one or more operations for selecting/highlighting the text content 1712*a* can be performed (e.g., such as highlighting 1709*a*). For example, the computer system 101 changes a color of the cursor 1706*a* (e.g., from the color black to the color blue, red, or grey) in virtual object 1704*a*. In some embodiments, the computer system 101 changes a size of the cursor in the three-dimensional environment 1702 when the criteria are met. For example, the cursor 1706*a* is optionally has a first size in the three-dimensional environment 1702 before the computer system 101 detects the long air pinch gesture, as shown in FIG. 17A, and when the criteria are met for enabling selection operations to be performed after detecting the long air pinch gesture, the cursor 1706*a* has a second size, smaller than the first size, in the three-dimensional environment, as shown in FIG. 17B. In some embodiments, the computer system 101 changes the distance between the cursor 1706*a* and the surface of the object 1704*a* that contains the text content 1712*a* when the criteria are met. For example, as described above, as the hand (e.g., hand 1703*a*) of the user performs the long air pinch gesture, the computer system 101 decreases the distance between the cursor 1706*a* and the surface of the object 1704*a*, until the cursor 1706*a* contacts the surface of the object 1704*a*, as show in the side view in FIG. 17B. When the criteria are met for enabling selection operations to be performed on the text content 1712*a*, the computer system 101 optionally increases the distance between the cursor 1706*a* and the surface of the object 1704*a*. In some embodiments, the increasing of the distance between the cursor 1706*a* and the surface of the object 1704*a* is performed over a predefined duration (e.g., 0.5, 1, 1.5, 2, 2.5, 3, or 5 seconds), such that the cursor 1706*a* appears to pop up off of the surface of the object 1704*a* towards the viewpoint of the user. In some such embodiments, the computer system 101 changes an angular size of the cursor in accordance with the change in the distance between the cursor and the surface of the object over which the cursor is displayed. For example, the angular size of the cursor 1706*a* is a first angular size when the cursor 1706*a* is contacting the surface of the object 1704*a*, and the angular size of the cursor 1706*a* is a second angular size, larger than the first angular size, when the cursor is not contacting the surface of the object 1704*a*.

In FIG. 17B, hand 1703*b* is optionally releasing the long air pinch gesture directed to virtual object 1704*a* and/or hand 1705*b* is optionally providing an air pinch gesture directed to virtual object 1704*b* in three-dimensional environment 1702. For example, computer system 101 detects a separation between the index finger and the thumb of the hand 1703*b* and/or detects the index finger and the thumb of the hand 1705*b* come together and touch to form a pinch hand shape. Additionally, in FIG. 17B, attention (e.g., a gaze) of the user of the computer system 101 is directed to the virtual object 1704*b* as the hand 1705*b* provides the air pinch gesture. For example, a gaze point 1708*b* is detected by computer system 101 as being directed to a location within the text content 1712*b* in virtual object 1704*b*.

Figure 17C:
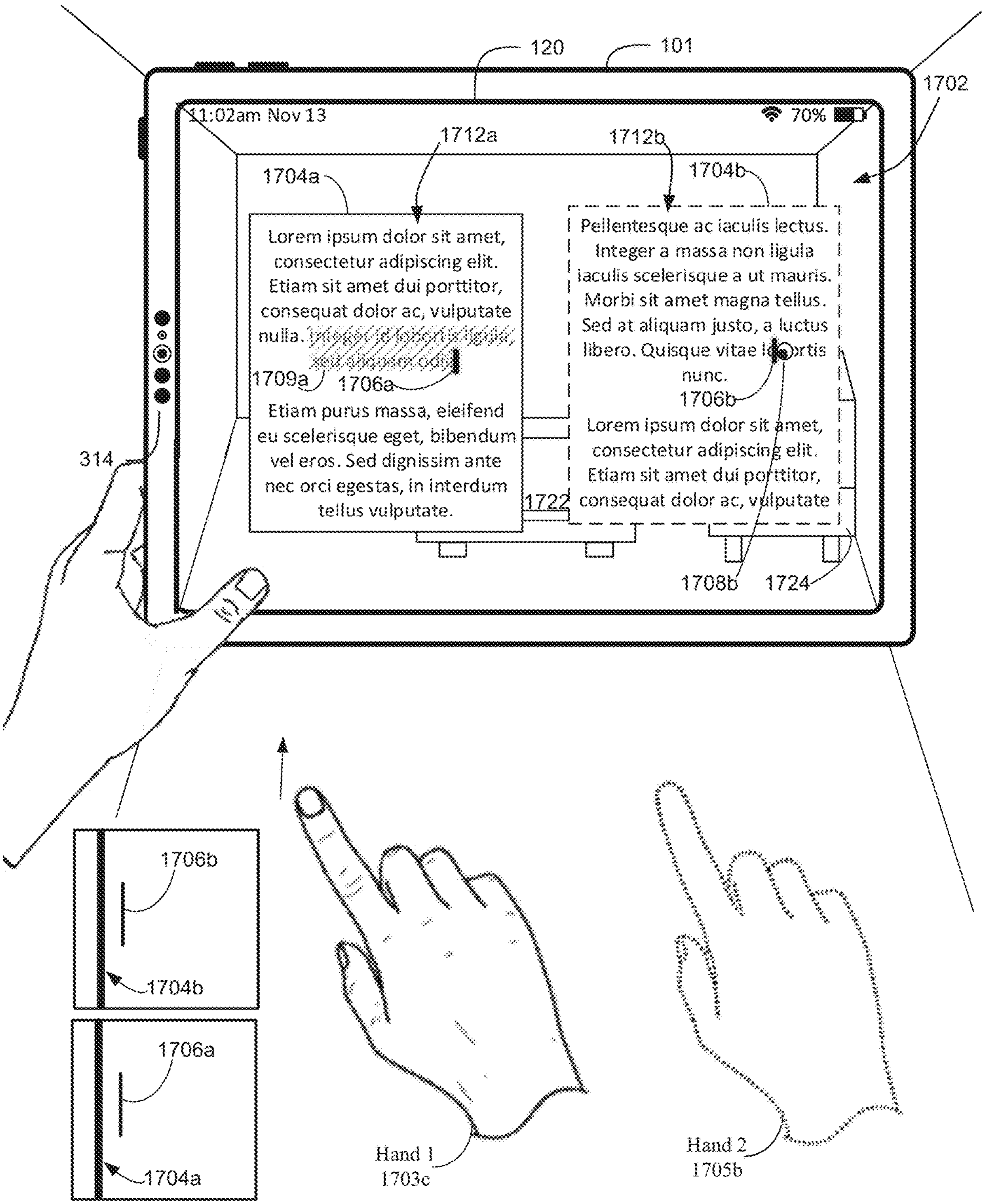

In FIG. 17C, in response to detecting the release of the air pinch gesture of the hand 1703*b* from FIG. 17B, computer system 101 optionally changes the distance between the cursor 1706*a* and the surface of the virtual object 1704*a*. For example, as shown in the bottom sideview in FIG. 17C, computer system 101 has increased the distance between (e.g., the rear surface of) the cursor 1706*a* and the (e.g., user-facing) surface of the virtual object 1704*a* to be the original predefined distance (e.g., shown previously in FIG. 17A). Additionally, because the distance between the cursor 1706*a* and the surface of the virtual object 1704*a* has been increased by computer system 101, the virtual shadow cast by the cursor 1706*a* onto the surface of the virtual object 1704*a* is once again visible in three-dimensional environment 1702. As mentioned previously, the movement of the cursor 1706*a* toward the surface of the virtual object 1704*a* is optionally animated to follow a progress of the air pinch gesture provided by the hand of the user. Similarly, in some embodiments, the movement of the cursor 1706*a* away from the surface of the virtual object 1704*a* is animated to follow a progress of the detected release of the air pinch gesture provided by the hand of the user. In some such embodiments, the angular size of the cursor 1706*a* appears to gradually increase over virtual object 1704*a* (e.g., over a period of 0.01, 0.02, 0.05, 0.1, 0.2, 0.3, 0.5, 1, or 1.5 s), and the virtual shadow cast by the cursor 1706*a* onto the surface of the virtual object 1704*a* appears to gradually become visible and thus increase in size, in response to the computer system 101 detecting the release of the pinch hand gesture of hand 1703*b*. In some embodiments, the size of the cursor changes in the three-dimensional environment as the cursor moves away from the surface of the object over which the cursor is displayed. For example, the size of the cursor 1706*a* gradually increases over the virtual object 1704*a* (e.g., over the period of 0.01, 0.02, 0.05, 0.1, 0.2, 0.3, 0.5, 1, or 1.5 s) in response to the computer system 101 detecting the release of the pinch hand gesture of hand 1703*b*.

Additionally, in FIG. 17C, in response to detecting the air pinch gesture provided by hand 1705*b*, computer system 101 optionally displays cursor 1706*b* in virtual object 1704*b*. In some embodiments, the cursor 1706*b* is displayed at a location of the gaze 1708*b* (e.g., within the word "lobortis" in text content 1712*b*) in response to the computer system 101 detecting the air pinch gesture provided by hand 1705*b*. The cursor 1706*b* displayed in virtual object 1704*b* optionally has one or more of the characteristics of the cursor 1706*a* displayed in virtual object 1704*a* and described above. For example, as shown in the top sideview in FIG. 17C, the cursor 1706*b* is displayed the predefined distance from the surface of the virtual object 1704*b* in three-dimensional environment 1702. Just as objects 1704*a* and 1704*b* are not necessarily concurrently displayed by computer system 101, cursors 1706*a* and 1706*b* are also optionally not concurrently displayed by computer system 101. In such embodiments, computer system 101 optionally performs the cursor operations described herein independently.

In FIG. 17C, hand 1703*c* is providing a quick air pinch gesture followed by a drag air gesture directed to virtual object 1704*a* in three-dimensional environment 1702. For example, computer system 101 detects the hand 1703*c* provide a quick pinch gesture (e.g., one in which the thumb and the tip of the index finger of the user come together and contact each other), followed by, within a time threshold such as 0.01, 0.02, 0.05, 0.1, 0.2, 0.3, 0.5, 1, 1.5, or 2 seconds, movement of the hand 1703*c* in an upward direction while the hand remains in the pinch hand shape. In some embodiments, the quick air pinch and drag gesture provided by the hand 1703*c* is detected irrespective of the current location of the gaze of the user. In some embodiments, the quick air pinch and drag gesture provided by the hand 1703*c* is detected while the gaze of the user is directed to virtual object 1704*a* in three-dimensional environment 1702.

Figure 17D:
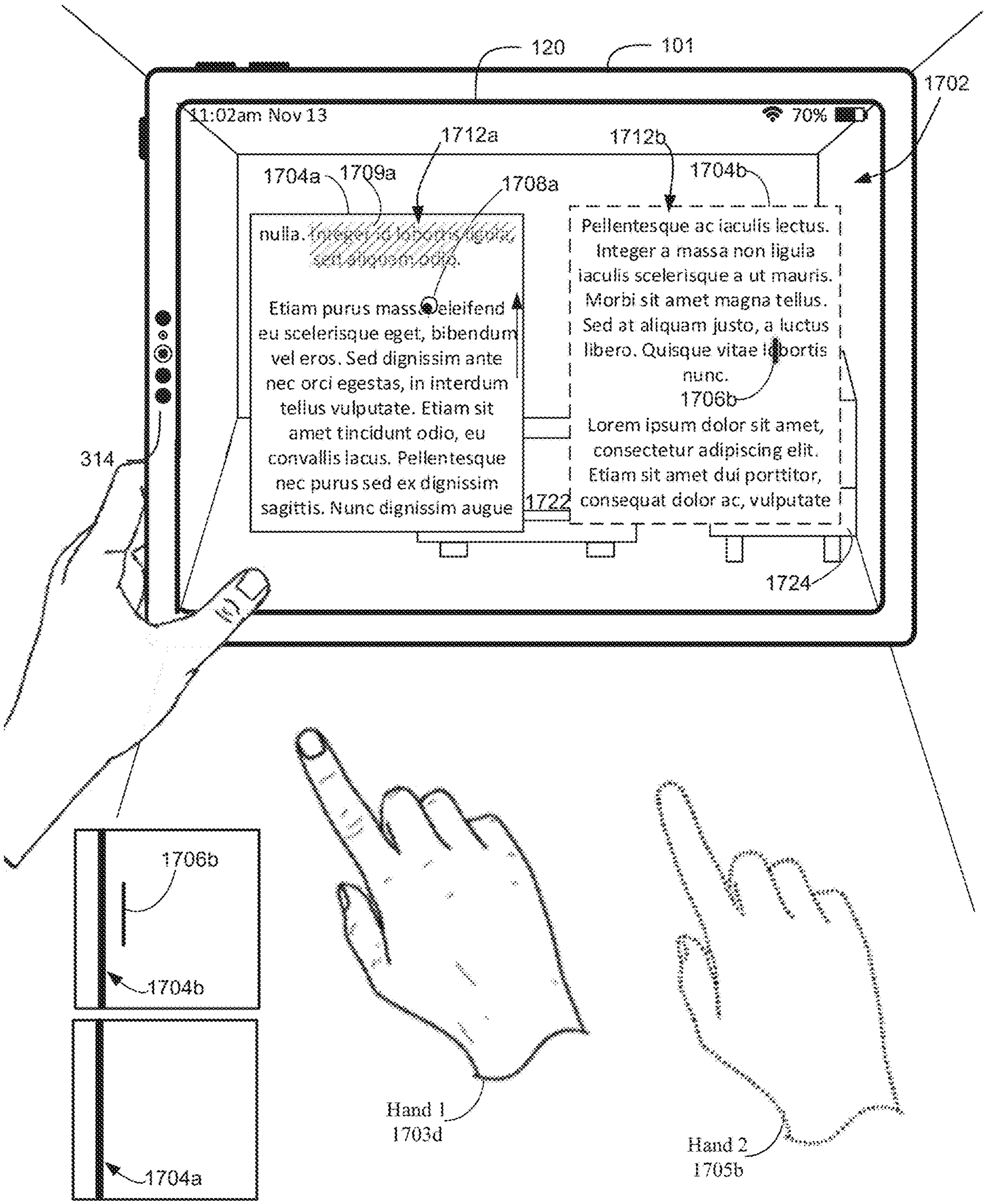

In FIG. 17D, in response to detecting the quick air pinch and drag gesture performed by the movement of the hand 1703*c* from FIG. 17C, computer system 101 optionally performs a scrolling operation in virtual object 1704*a* in three-dimensional environment 1702. For example, as shown in FIG. 17D, computer system 101 scrolls upward through the text content 1712*a* in virtual object 1704*a* in accordance with the upward movement of the hand 1703*c* while remaining in the pinch hand shape. Additionally, an amount that the text content 1712*a* is scrolled in virtual object 1704*a* is optionally based on the magnitude of the movement of the hand 1703*c*. In some embodiments, in response to detecting the quick air pinch and drag gesture provided by the hand 1703*c*, computer system 101 ceases display of the cursor (e.g., 1706*a*) in virtual object 1704*a* in three-dimensional environment 1702, as shown in FIG. 17D. In some embodiments, if a portion of the content was highlighted/selected when the input from hand 1703*c* was received, that portion of the text content remains highlighted/selected in response to the input from hand 1703*c*. For example, as shown in FIG. 17D, as the computer system 101 scrolls through the text content 1712*a* in virtual object 1704*a* in response to the input from hand 1703*c*, the portion of the text content 1712*a* that was previously highlighted/selected, as indicated by highlighting 1709*a*, remains highlighted/selected in virtual object 1704*a*.

In some embodiments, a quick air pinch and drag gesture provided by the hand of the user causes the content in the virtual object to which the hand input is directed to be scrolled irrespective of whether a cursor is displayed in the virtual object. For example, with reference to FIG. 17A, if the hand 1705*a* were to provide a quick pinch air gesture directed to virtual object 1704*b*, in which no cursor is included, followed by movement of the hand while remaining in the pinch hand shape, the computer system 101 would scroll through the text content 1712*b* in the virtual object 1704*b* according to the movement of the hand (e.g., as similarly shown in FIG. 17B) despite no cursor being displayed in virtual object 1704*b*.

In FIG. 17D, hand 1703*d* is releasing the air pinch gesture after causing the computer system 101 to scroll through the text content 1712*a* in virtual object 1704*a*. For example, computer system 101 detects that the tip of the index finger and the thumb of the hand 1703*d* of the user are no longer in contact (e.g., no longer forming the pinch hand shape). Additionally, in FIG. 17D, attention (e.g., a gaze) of the user of the computer system 101 is directed to the virtual object 1704*a* as the hand 1703*d* releases the air pinch gesture. For example, a gaze point 1708*a* is detected by computer system 101 as being directed to a location within the text content 1712*a* in virtual object 1704*a*.

Figure 17E:
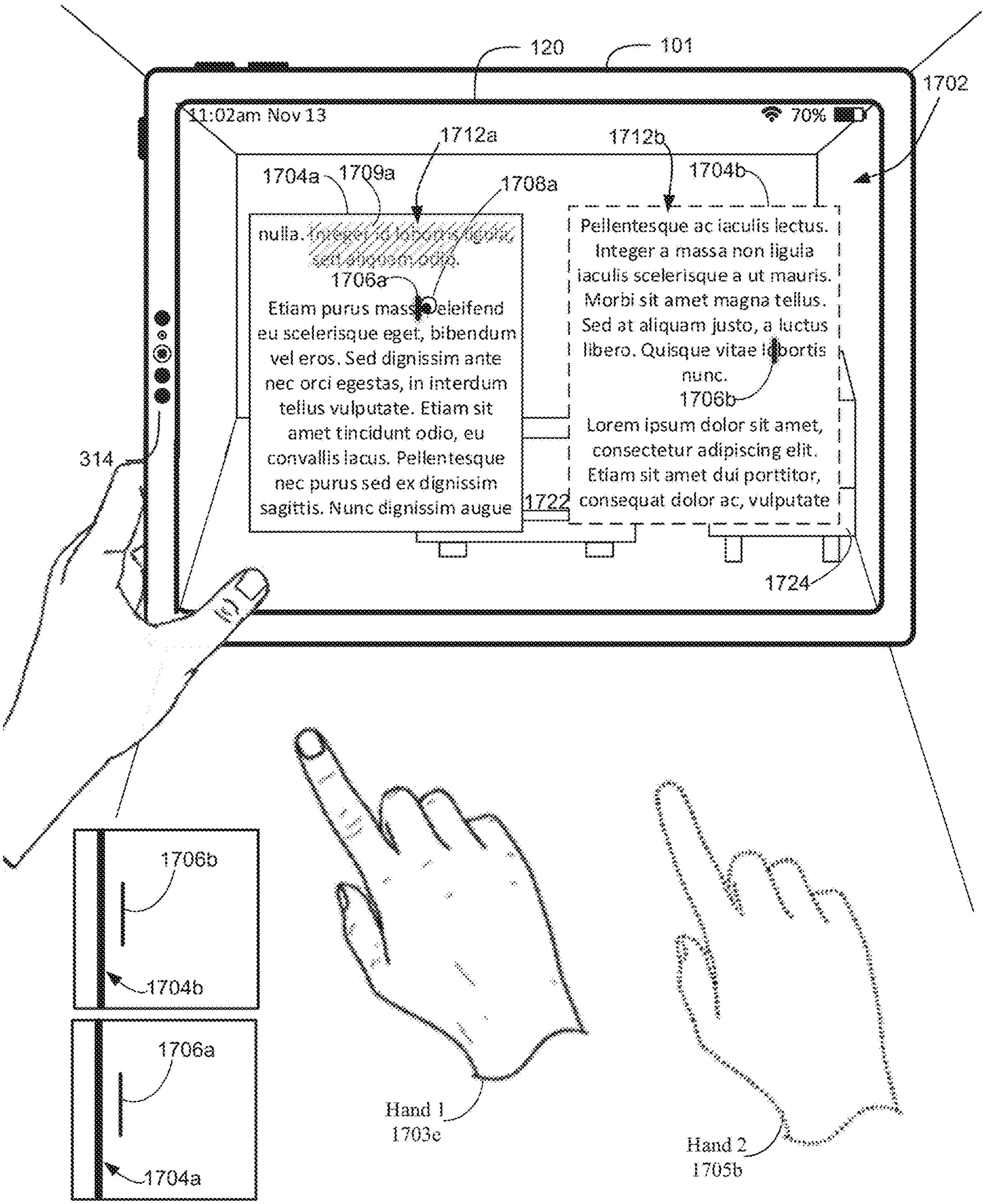
Figure 18A:
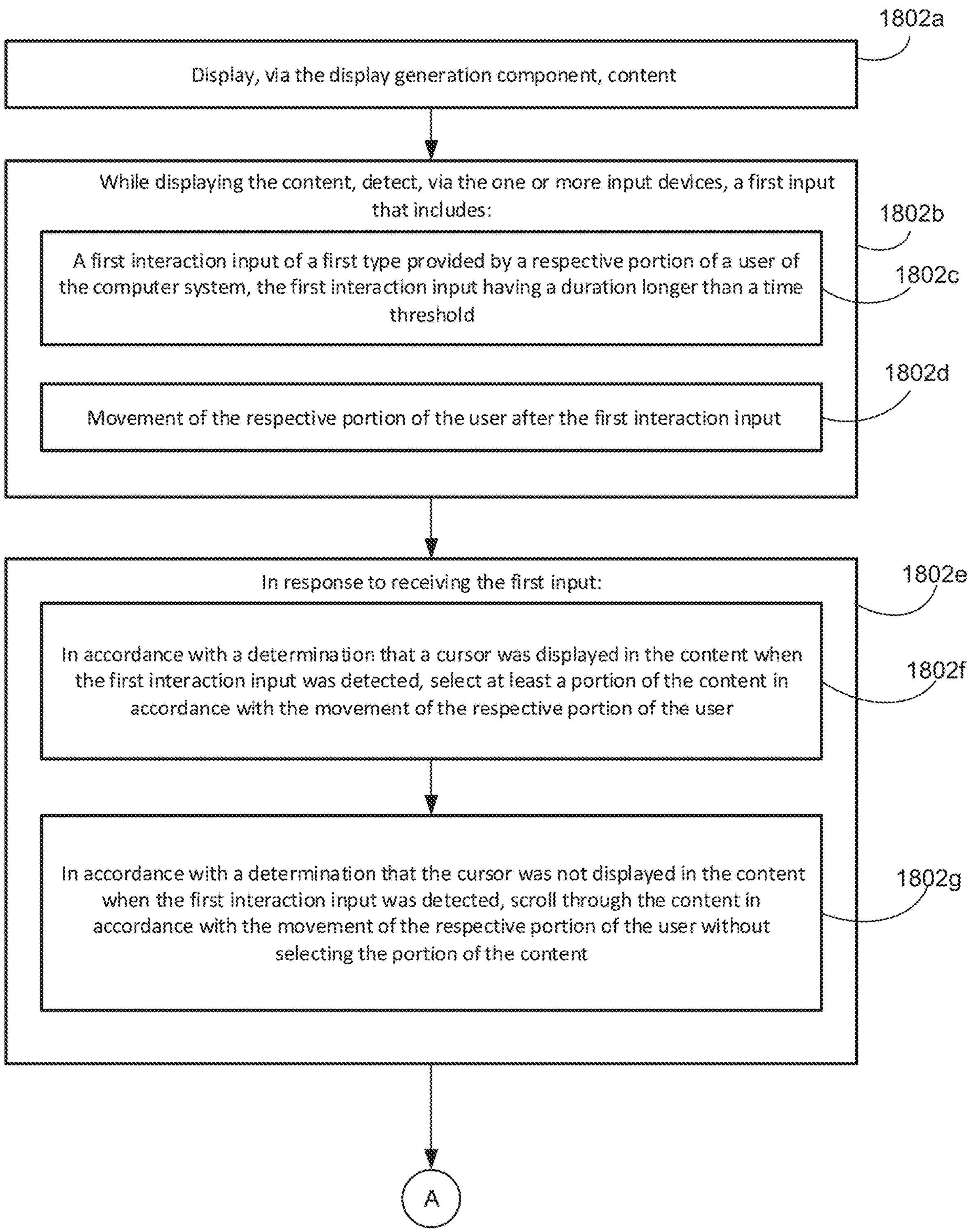
FIGS. 18A-18G is a flowchart illustrating a method of facilitating content selection and scrolling in accordance with some embodiments.
Figure 18B:
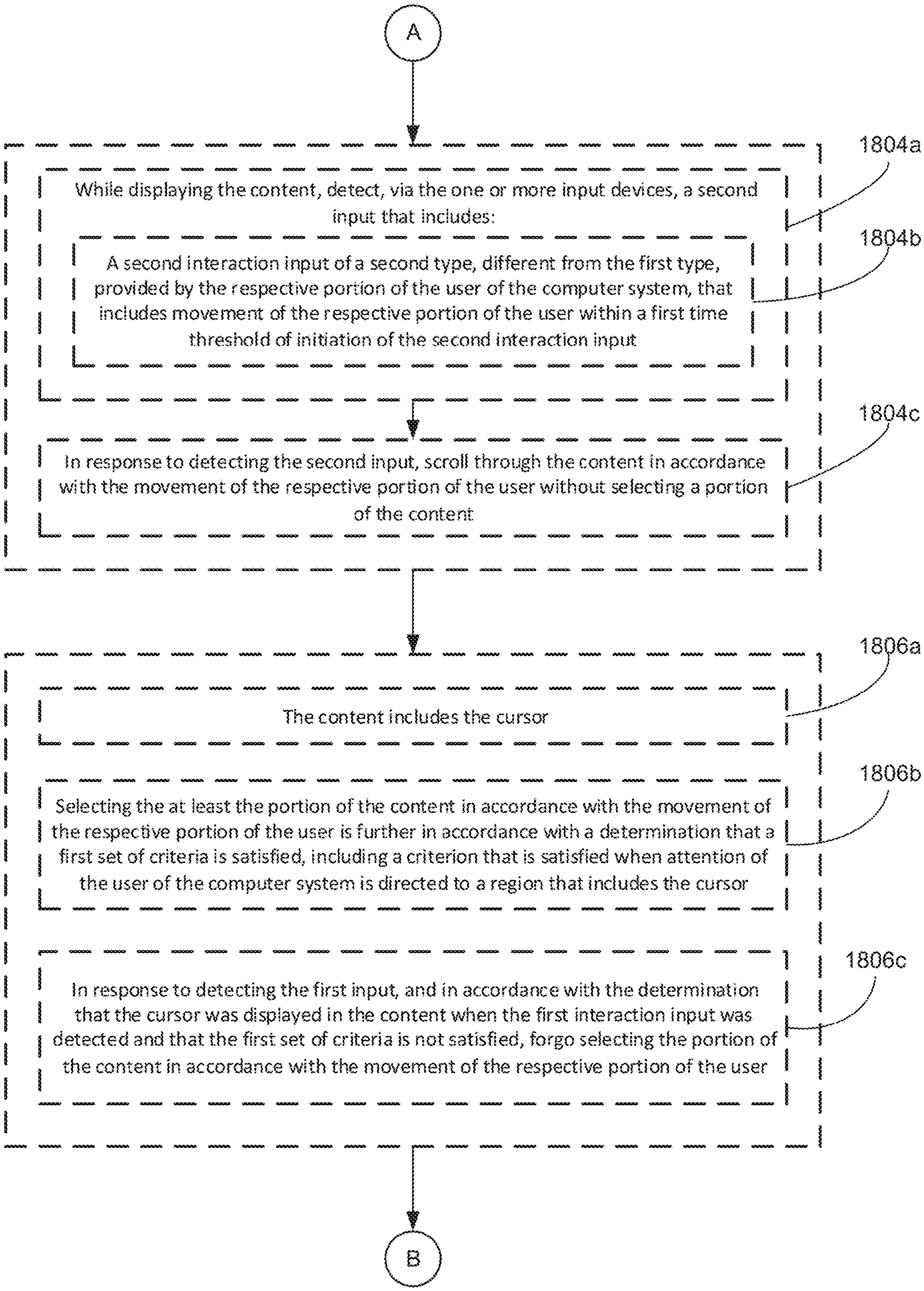
Figure 18C:
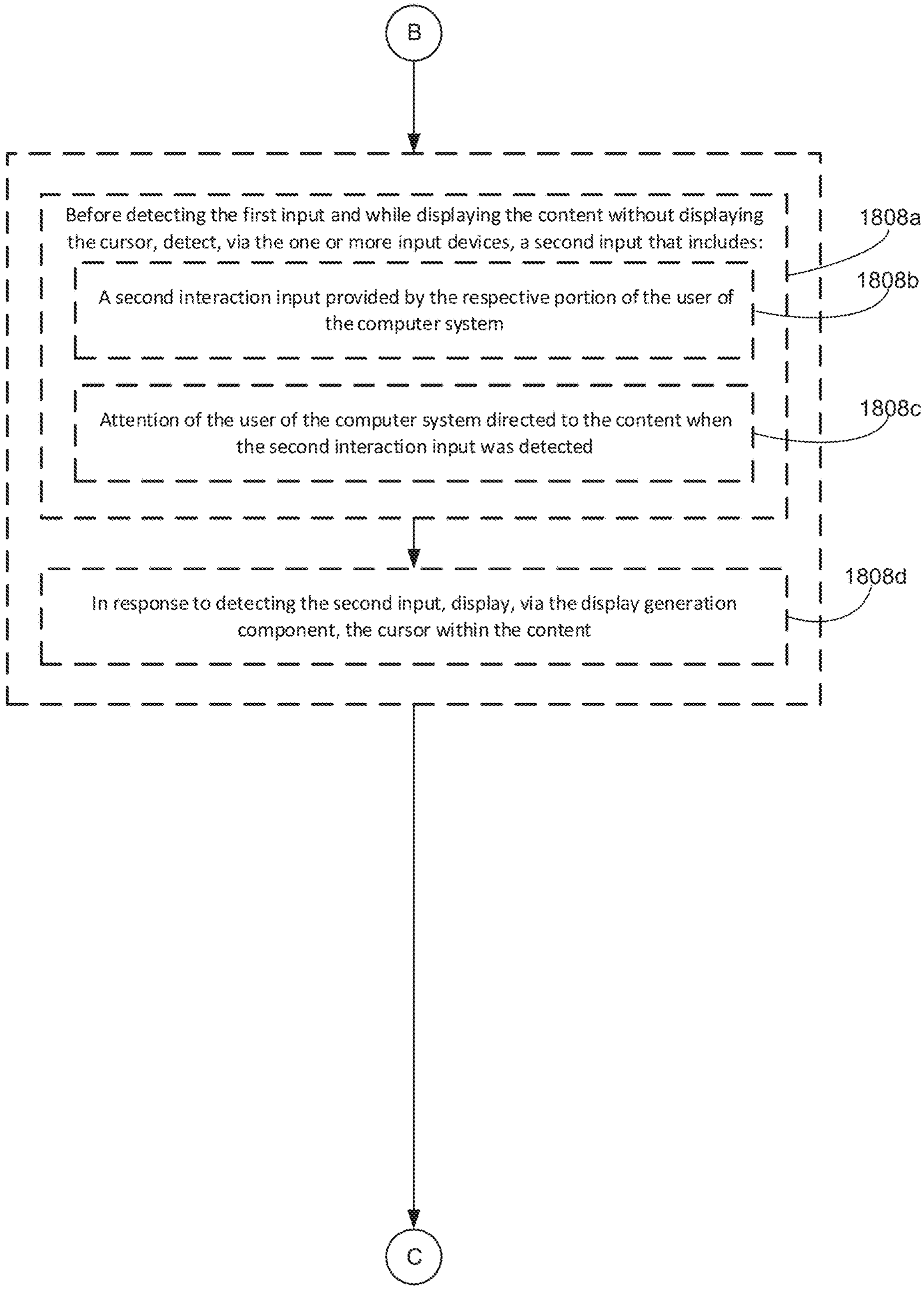
Figure 18D:
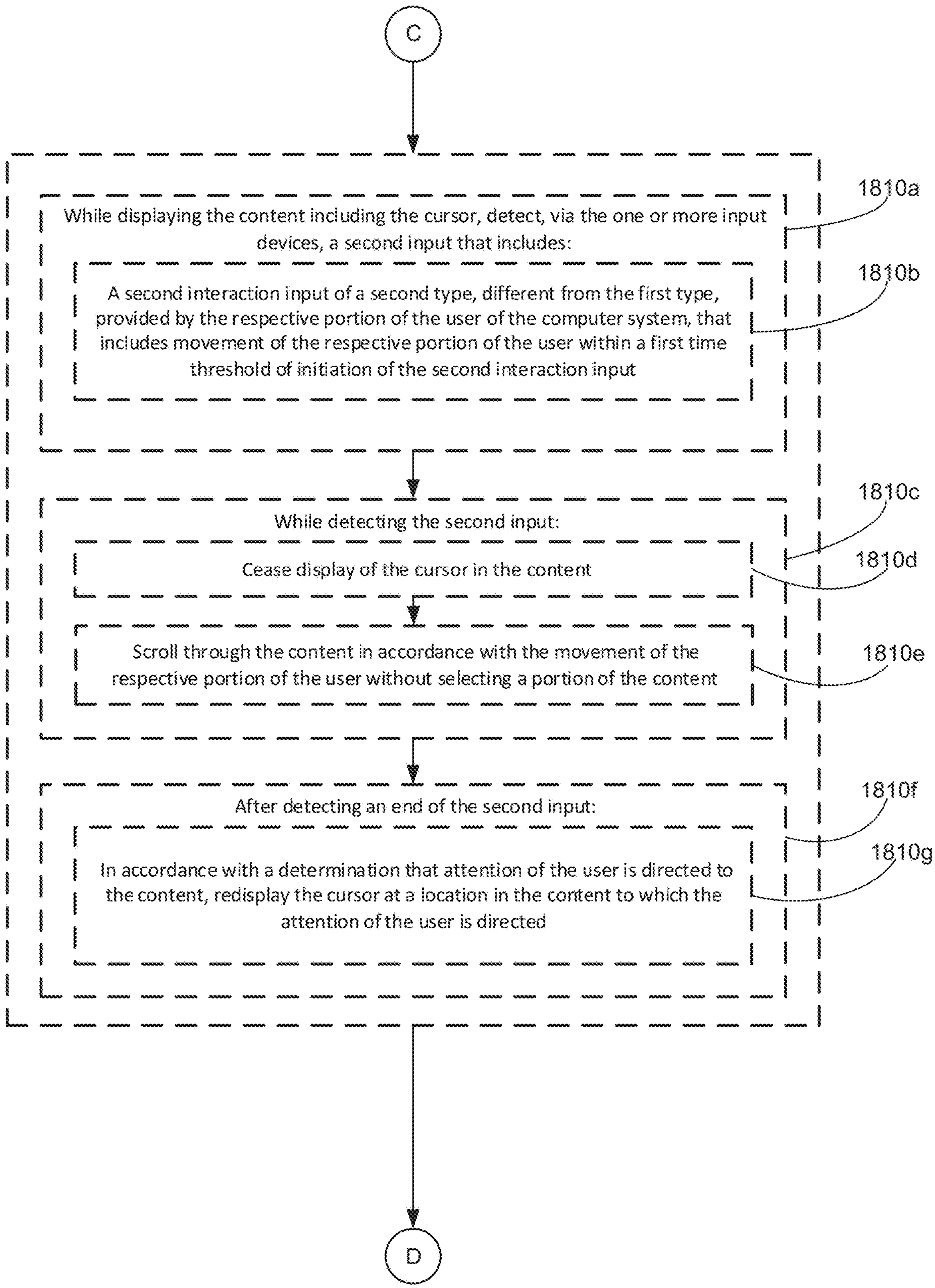
Figure 18E:
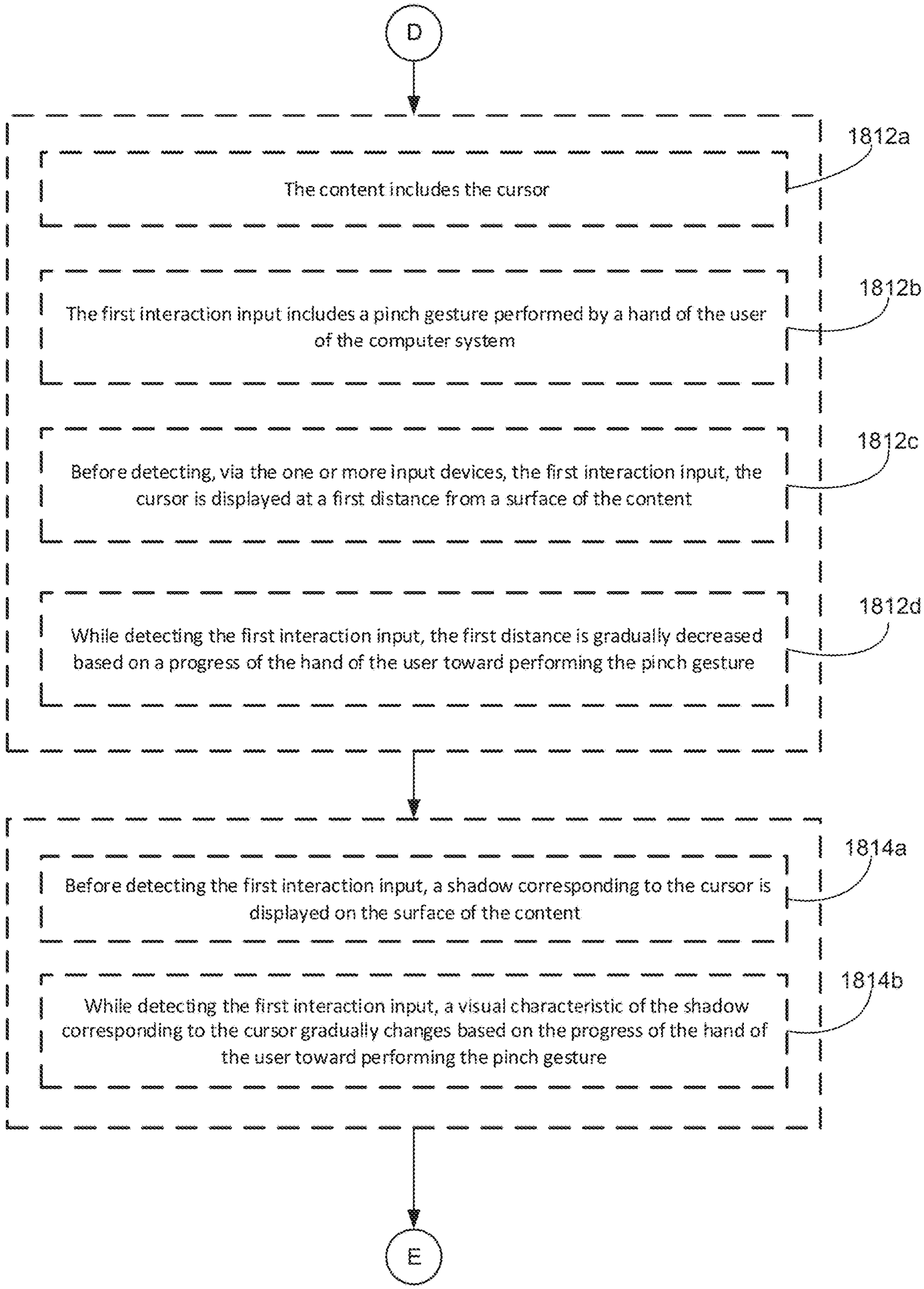
Figure 18F:
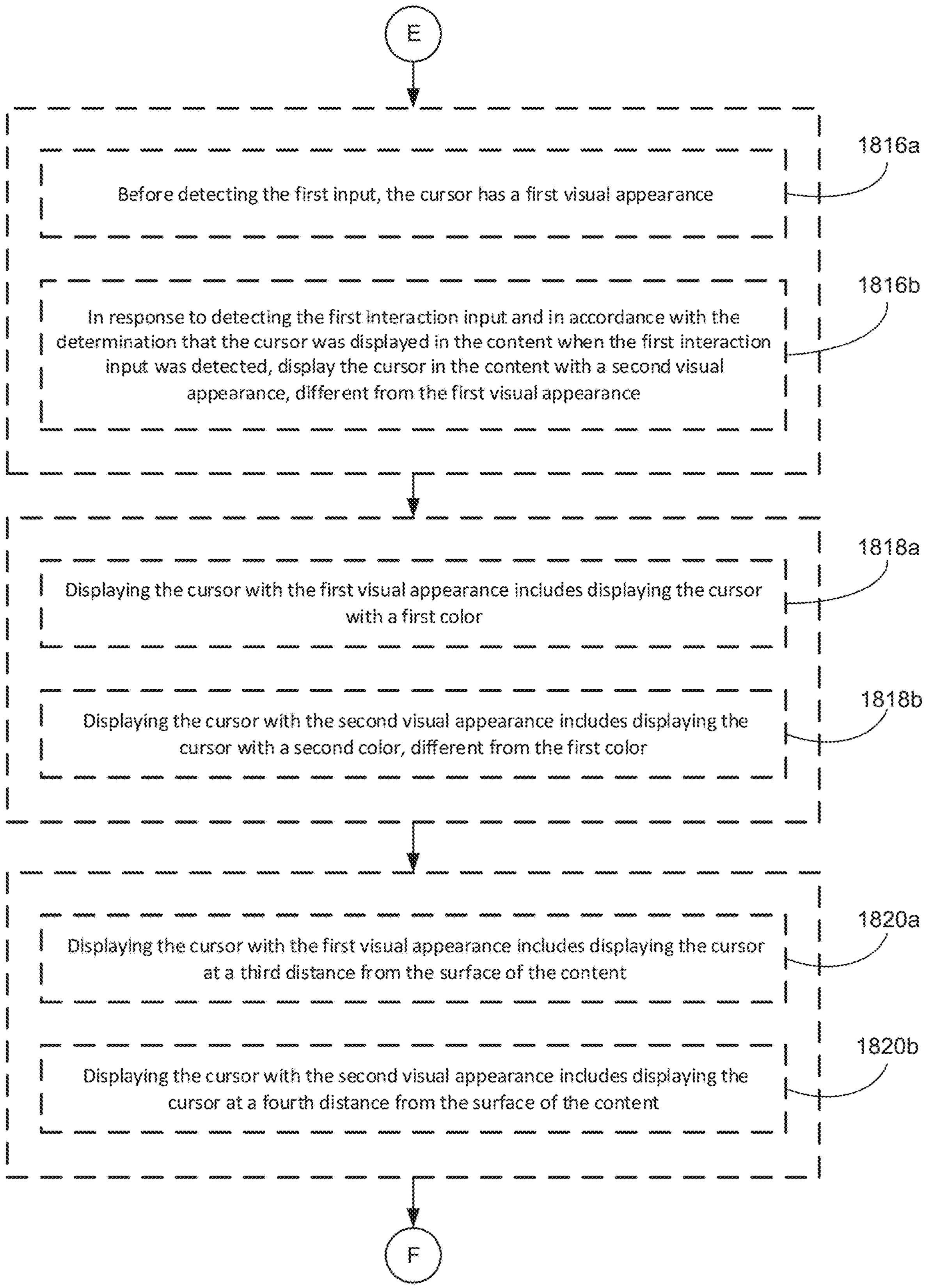
Figure 18G:
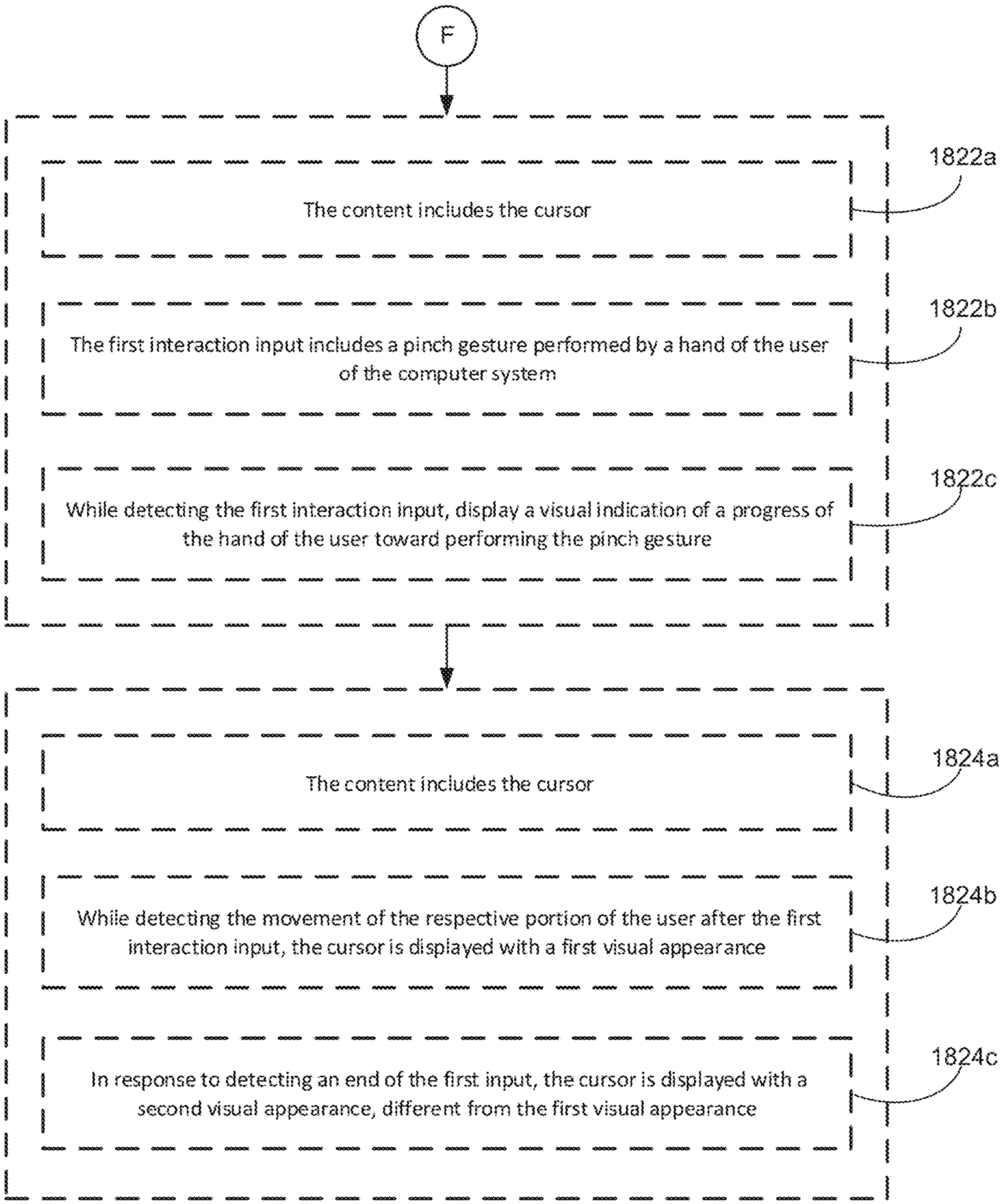

In response to detecting the release of the air pinch hand gesture by hand 1703*d* from FIG. 17D, computer system 101 optionally redisplays the cursor 1706*a* in virtual object 1704*a*, as shown in FIG. 17E. In some embodiments, the computer system 101 redisplays the cursor 1706*a* at the location of the gaze 1708*a* in virtual object 1704*a* (e.g., toward the end of the word "massa" in text content 1712*a*) when the air pinch gesture was released. As shown in the bottom sideview in FIG. 17E, the cursor 1706*a* is optionally redisplayed in three-dimensional environment 1702 at the predefined distance from the surface of the virtual object 1704*a*. Additionally, the virtual shadow of the cursor 1706*a* is once again visible on the surface of the virtual object 1704*a* in three-dimensional environment 1702. As described herein, the cursor 1706*a* is optionally once again controllable (e.g., by hand 1703*e*) to perform content selection and/or scrolling operations in three-dimensional environment 1702.

FIGS. 18A-18G is a flowchart illustrating a method 1800 of facilitating content selection and scrolling in accordance with some embodiments. In some embodiments, the method 1800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1800 are, optionally, combined and/or the order of some operations is, optionally, changed.

In some embodiments, method 1800 is performed at a computer system (e.g., electronic device 101) in communication with a display generation component (e.g., 120), one or more input devices (e.g., 314). In some embodiments, the computer system is or includes an electronic device. In some embodiments, the electronic device has one or more of the characteristics of the electronic device in methods 800, 1000, 1200, 1400 and/or 1600. In some embodiments, the display generation component has one or more of the characteristics of the display generation component in methods 800, 1000, 1200, 1400 and/or 1600. In some embodiments, the one or more input devices have one or more of the characteristics of the one or more input devices in methods 800, 1000, 1200, 1400 and/or 1600.

In some embodiments, the computer system displays (1802*a*), via the display generation component, content, such as text content 1712*a* and/or text content 1712*b* in three-dimensional environment 1702 in FIG. 17A (e.g., displaying a three-dimensional environment, such as a three-dimensional environment as described with reference to methods 800, 1000, 1200, 1400 and/or 1600, or a user interface of an application that is displayed via the display generation component as described with reference to method 1600). In some embodiments, the content is displayed in a user interface of a window or object in the three-dimensional environment. In some embodiments, the content includes text content. In some embodiments, the content includes selectable content (e.g., a link) for causing display of supplemental content (e.g., a web page of a web browser application). In some embodiments, the content includes image or video content. Other types of content that is displayable is also within the scope of this disclosure.

In some embodiments, while displaying the content, the computer system detects (1802*b*), via the one or more input devices, a first input that includes a first interaction input (e.g., an air gesture) of a first type provided by a respective portion of a user (e.g., a hand) of the computer system, such as the long air pinch gesture performed by hand 1703*a* and/or hand 1705*a* as shown in FIG. 17A (e.g., an air pinch gesture performed by the hand of the user of the computer system—such as the thumb and index finger of the hand of the user starting more than a threshold distance (e.g., 0.1, 0.2, 0.5, 1, 2, or 5 cm) apart and coming together and touching at the tips—that is detected by a hand tracking device in communication with the computer system. In some embodiments, the first interaction input has one or more of the characteristics of similar pinch gesture inputs described in methods 800, 1000, 1200, 1400 and/or 1600 such as an air pinch gesture), the first interaction input having a duration longer than a time threshold (1802*c*). In some embodiments, the air pinch gesture is of a first type when a duration of the pinch (e.g., the duration of the hand holding the pinch hand shape in which the thumb tip is touching the finger tip) is longer than a time threshold (e.g., 0.1, 0.2, 0.3, 0.5, 1, 1.5, 2, 3, or 5 seconds)), after which the pinch is released (e.g., the thumb tip and index finger tip move more than a threshold distance (e.g., 0.1, 0.2, 0.5, 1, 2, or 5 cm) apart from one another). In some embodiments, the pinch gesture is of a second type if the duration of the pinch does not meet the time threshold (e.g., the pinch is released before the time threshold). In some embodiments, the pinch gesture is of the first type when another characteristic of the pinch gesture (e.g., hand movement, pinch speed, pinch number (e.g., double, triple, etc. pinch), etc.) satisfies one or more criteria, and is of a second type when the other characteristic of the pinch gesture does not satisfy the one or more criteria.

In some embodiments, the first input includes movement of the respective portion of the user after the first interaction input (1802*d*), such as movement of the hand 1703*a* and/or hand 1705*a* as shown in FIG. 17A (e.g., movement of the hand of the user in space, such as a movement while the hand is holding the pinch hand shape (e.g., the tips of the thumb and index finger remain touching) such as an air drag gesture). In some embodiments, the movement of the hand of the user is in a respective direction (e.g., in a vertical direction, a horizontal direction, or a diagonal direction) in space. In some embodiments, in response to detecting the first input (1802*e*), in accordance with a determination that a cursor was displayed in the content when the first interaction input was detected, such as cursor 1706*a* in object 1704*a* shown in FIG. 17A (e.g., such as a cursor as described with reference to methods 800, 1000, 1200, 1400 and/or 1600. In some embodiments, the cursor is a pointer or other visual indicator that is controlled via user input. In some embodiments, the cursor is located within the content (e.g., text content), such as described with reference to method 1000. In some embodiments, the cursor is controlled by the respective portion of the user (e.g., such as described with reference to methods 800, 1000, 1200, 1400 and/or 1600)), the computer system selects (18020 at least a portion of the content in accordance with the movement of the respective portion of the user, such as selection/highlight 1709*a* of a portion of the text content 1712*a* as shown in FIG. 17B (e.g., altering an appearance of at least a portion of the content (e.g., by highlighting, fading, bolding, underlining, etc.)). In some embodiments in which the content is text content, a portion of the text content becomes highlighted/selected for further interaction (e.g., copying, cutting, etc.). In some embodiments, an amount of the content that becomes highlighted/selected corresponds to a magnitude of the movement of the hand. In some embodiments, the portion of the content that becomes highlighted/selected corresponds to a direction of the movement of the hand. For example, movement of the hand of the user with a first magnitude selects/highlights a first amount of the portion of the content, and movement of the hand of the user with a second magnitude, greater than the first magnitude, selects/highlights a second amount, greater than the first amount, of the portion of the content. Movement of the hand of the user in a first direction (e.g., an upward direction) optionally selects/highlights a portion of the content that is above the location of the cursor, and movement of the user in a second direction, opposite the first direction, (e.g., a downward direction) optionally selects/highlights a portion of the content that is below the location of the cursor. In some embodiments in which the content is image content, the image becomes highlighted/selected for further interaction. In some embodiments, the portion of the content that becomes selected (e.g., highlighted) corresponds to an amount that the hand of the user moves while holding the pinch hand shape.

In some embodiments, in accordance with a determination that the cursor was not displayed in the content when the first interaction input was detected (e.g., object 1704*b* does not contain a cursor in FIG. 17A), the computer system scrolls (1802*g*) through the content in accordance with the movement of the respective portion of the user (e.g., analogously to as described above with respect to selecting the portion of the content) without selecting the portion of the content, such as scrolling through the text content 1712*b* as shown in FIG. 17B (e.g., altering display of the user interface of the window or object that the content is displayed in). In some embodiments, the user interface is scrolled through to reveal additional content (e.g., additional text and/or images that were previously not displayed/visible in the three-dimensional environment). In some embodiments, an amount of the content that is scrolled through corresponds to a magnitude of the movement of the hand. For example, movement of the hand of the user with a first magnitude causes the content to scroll a first amount, and movement of the hand of the user with a second magnitude, greater than the first magnitude, causes the content to scroll a second amount, greater than the first amount. In some embodiments, the content is scrolled based on the respective direction of the movement of the hand of the user while holding the pinch hand shape. For example, movement of the hand of the user while holding the pinch hand shape in an upward direction causes the content to scroll upwards. In some embodiments, movement of the hand of the user while holding the pinch hand shape in a downward direction causes the content to scroll downwards. In some embodiments, as the content is scrolled through, the content does not become selected (e.g., is not altered in appearance (e.g., highlighted)) because the cursor is not displayed in the content. Selecting content or scrolling through content in the three-dimensional environment based on whether a cursor is present in the three-dimensional environment enables content selection and content scrolling to be performed without displaying additional controls, thereby improving user-device interaction.

In some embodiments, while displaying the content, the computer system detects (1804*a*), via the one or more input devices, a second input that includes a second interaction input of a second type, different from the first type, provided by the respective portion of the user of the computer system, such as pinch input provided by hand 1703*c* as shown in FIG. 17C (e.g., a pinch gesture, such as an air pinch gesture, performed by the hand of the user of the computer system, as described above, that is detected by a hand tracking device in communication with the computer system. In some embodiments, the second interaction input has one or more of the characteristics of similar pinch gesture inputs described in methods 800, 1000, 1200, 1400 and/or 1600), that includes movement of the respective portion of the user (e.g., greater than a threshold distance such as 0.1, 0.3, 0.5, 1, 3, 5 or 10 cm) within a first time threshold of initiation of the second interaction input (1804*b*), such as movement of the hand 1703*c* as shown in FIG. 17C (e.g., the pinch gesture is of a second type when a duration between the initiation of the pinch gesture (e.g., when the thumb tip is touching the finger tip) and the subsequent movement of the hand is shorter than the first time threshold (e.g., 0.01, 0.02, 0.05, 0.1, 0.2, 0.3, 0.5, 1, 1.5, or 2 seconds)). The subsequent movement is optionally movement of the hand of the user in space, such as a movement while the hand is holding the pinch hand shape (e.g., the tips of the thumb and index finger remain touching), as described above. In some embodiments, the movement of the hand of the user is in a respective direction (e.g., in a vertical direction, a horizontal direction, or a diagonal direction) in space. In some embodiments, the air pinch gesture is of the second type when another characteristic of the air pinch gesture (e.g., hand movement, pinch speed, and/or pinch number (e.g., double, triple, etc. pinch)) does not satisfy the one or more criteria. In some embodiments, the air pinch gesture is of the first type if the movement of the hand of the user does not occur until after the first time threshold after the initiation of the air pinch gesture.

In some embodiments, in response to detecting the second input, the computer system scrolls (1804*c*) through the content in accordance with the movement of the respective portion of the user without selecting a portion of the content, such as scrolling through the text content 1712*a* as shown in FIG. 17D. For example, altering display of the user interface of the window or object that the content is displayed in. In some embodiments, the user interface is scrolled through to reveal additional content (e.g., additional text and/or images that were previously not displayed/visible in the three-dimensional environment). In some embodiments, an amount of the content that is scrolled through corresponds to a magnitude of the movement of the hand, as described above. In some embodiments, the content is scrolled in a direction based on the respective direction of the movement of the hand of the user while holding the pinch hand shape, as described above. In some embodiments, as the content is scrolled through, the content does not become selected (e.g., is not altered in appearance (e.g., highlighted)) despite the cursor being displayed in the content (e.g., because the second interaction input was of the second type). Scrolling through content that includes a cursor in the three-dimensional environment in response to detecting a short air pinch and drag gesture enables content scrolling to be performed without displaying additional controls, thereby improving user-device interaction.

In some embodiments, the content includes the cursor (1806*a*), such as cursor 1706*a* in FIG. 17A (e.g., such as a cursor as described with reference to methods 800, 1000, 1200, 1400 and/or 1600. In some embodiments, the cursor is controlled by the respective portion of the user, as described above). In some embodiments, selecting the at least the portion of the content in accordance with the movement of the respective portion of the user is further in accordance with a determination that a first set of criteria is satisfied, including a criterion that is satisfied when attention of the user of the computer system is directed to a region that includes the cursor (1806*b*), such as the gaze of the user directed to object 1704*a* as described herein with reference to FIG. 17B (e.g., the criterion is satisfied when the attention of the user is directed to the region that includes the cursor when and/or while the first input is detected). In some embodiments, the first set of criteria is satisfied when the attention of the user is directed to a portion of the content in which the cursor is displayed (e.g., within a threshold distance of the cursor, such as 0.25, 0.5, 1, 2, 3, 5, or 10 cm). In some embodiments, the first set of criteria is not satisfied when the attention of the user is not directed to at least a portion of the content in which the cursor is displayed.

In some embodiments, in response to detecting the first input, and in accordance with the determination that the cursor was displayed in the content when the first interaction input was detected and that the first set of criteria is not satisfied (e.g., because the gaze of the user is not directed to within the threshold distance of the cursor, as discussed above), the computer system forgoes (1806*c*) selecting the portion of the content in accordance with the movement of the respective portion of the user, as described herein with reference to FIG. 17B. For example, the portion of the content does not become selected/highlighted in response to detecting the first input. In some embodiments, the content is instead scrolled through in response to detecting the first input when the gaze of the user is not directed to within the threshold distance of the cursor. Requiring gaze of the user to be directed toward a cursor in the three-dimensional environment for content to be selected in response to detecting a long air pinch and drag gesture avoids unintentional selection of content, thereby improving user-device interaction.

In some embodiments, before detecting the first input and while displaying the content without displaying the cursor, such as text content 1712*b* in FIG. 17A, the computer system detects (1808*a*), via the one or more input devices, a second input that includes a second interaction input provided by the respective portion of the user of the computer system (1808*b*), such as pinch input provided by hand 1705*b* as shown in FIG. 17B (e.g., a pinch gesture, such as an air pinch gesture, performed by the hand of the user of the computer system, as described above, that is detected by a hand tracking device in communication with the computer system. In some embodiments, the second interaction input has one or more of the characteristics of similar pinch gesture inputs described in methods 800, 1000, 1200, 1400 and/or 1600), and attention of the user of the computer system directed to the content when the second interaction input was detected (1808*c*), such as gaze 1708*b* directed to a location within text content 1712*b* as shown in FIG. 17B (e.g., the gaze of the user that is directed to a portion of the content when the hand of the user provided the pinch gesture).

In some embodiments, in response to detecting the second input, the computer system displays (1808*d*), via the display generation component, the cursor within the content, such as display of cursor 1706*b* at the location of the gaze 1708*b* as shown in FIG. 17C. In some embodiments, the cursor is displayed at a location within the content to which the attention of the user was directed when the second input was received. In some embodiments, the cursor is displayed within the content at a location different from the location of the attention. For example, the cursor is displayed at a location within the content that is 0.5, 1, 1.5, 2, 3, 5, or 10 cm from the location to which the attention was directed when the second input was received. Displaying a cursor within content in the three-dimensional environment in response to detecting an air pinch gesture while attention of the user is directed to the content reduces the number of inputs needed to display a cursor in the three-dimensional environment, thereby improving user-device interaction.

In some embodiments, while displaying the content including the cursor, such as display of cursor 1706*a* over text content 1712*a* as shown in FIG. 17A, the computer system detects (1810*a*), via the one or more input devices, a second input that includes a second interaction input of a second type, different from the first type, provided by the respective portion of the user of the computer system, such as pinch input provided by hand 1703*c* as shown in FIG. 17C (e.g., a pinch gesture, such as an air pinch gesture, performed by the hand of the user of the computer system, as described above, that is detected by a hand tracking device in communication with the computer system. In some embodiments, the second interaction input has one or more of the characteristics of similar pinch gesture inputs described in methods 800, 1000, 1200, 1400 and/or 1600), that includes movement of the respective portion of the user (e.g., greater than a threshold distance such as 0.1, 0.3, 0.5, 1, 3, 5 or 10 cm) within a first time threshold of initiation of the second interaction input (1810*b*), such as movement of the hand 1703*c* as shown in FIG. 17C (e.g., the pinch gesture is of a second type when a duration between the initiation of the air pinch gesture (e.g., when the thumb tip is touching the finger tip) and the subsequent movement of the hand is shorter than the first time threshold (e.g., 0.01, 0.02, 0.05, 0.1, 0.2, 0.3, 0.5, 1, 1.5, or 2 seconds)). The subsequent movement is optionally movement of the hand of the user in space, such as a movement while the hand is holding the pinch hand shape (e.g., the tips of the thumb and index finger remain touching), as described above. In some embodiments, the movement of the hand of the user is in a respective direction (e.g., in a vertical direction, a horizontal direction, or a diagonal direction) in space. In some embodiments, the pinch gesture is of the second type when another characteristic of the pinch gesture (e.g., hand movement, pinch speed, and/or pinch number (e.g., double, triple, etc. pinch)) does not satisfy the one or more criteria. In some embodiments, the pinch gesture is of the first type if the movement of the hand of the user does not occur until after the first time threshold after the initiation of the pinch gesture.

In some embodiments, while detecting the second input (1810*c*), the computer system ceases (1810*d*) display of the cursor in the content, such as ceasing display of the cursor (e.g., cursor 1706*a*) as shown in FIG. 17D (e.g., the cursor ceases being displayed after and/or in response to detecting the movement of the hand of the user in the pinch hand shape). In some embodiments, the computer system scrolls (1810*e*) through the content in accordance with the movement of the respective portion of the user without selecting a portion of the content, such as scrolling through the text content 1712*a* as shown in FIG. 17D (e.g., altering display of the user interface of the window or object that the content is displayed in. In some embodiments, an amount of the content that is scrolled through corresponds to a magnitude of the movement of the hand, as described above). In some embodiments, the content is scrolled based on the respective direction of the movement of the hand of the user while holding the pinch hand shape, as described above.

In some embodiments, after detecting an end of the second input (18100, in accordance with a determination that attention of the user is directed to the content, such as gaze 1708*a* directed to a location within the text content 1712*a* as shown in FIG. 17E, the computer system redisplays (1810*g*) the cursor at a location in the content to which the attention of the user is directed, such as the redisplay of cursor 1706*a* at the location of the gaze 1708*a* as shown in FIG. 17E. For example, when the hand of the user is no longer moving in the pinch hand shape, the cursor is redisplayed at a location of the gaze of the user in the content. In some embodiments, if the gaze of the user is not directed to the content when the hand of the user stops moving in the pinch hand shape, the cursor is not redisplayed in the three-dimensional environment. In some embodiments, the cursor is redisplayed in the three-dimensional environment when the hand of the user is no longer performing the pinch gesture (e.g., the index finger and thumb of the hand are no longer in contact). Ceasing display of a cursor within content in the three-dimensional environment when the content is scrolled through, and redisplaying the cursor at the location of the gaze of the user after scrolling through the content, avoids cluttering the display of the content during scrolling, thereby improving user-device interaction.

In some embodiments, the content includes the cursor (1812*a*), such as display of cursor 1706*a* over text content 1712*a* in FIG. 17A (e.g., such as a cursor as described with reference to methods 800, 1000, 1200, 1400 and/or 1600. In some embodiments, the cursor is controlled by the respective portion of the user, as described above). In some embodiments, the first interaction input includes a pinch gesture performed by a hand (e.g., hand 1703*a* in FIG. 17A) of the user of the computer system (1812*b*) (e.g., such as an air pinch gesture, as described above). In some embodiments, before detecting, via the one or more input devices, the first interaction input, the cursor is displayed at a first distance from a surface of the content (1812*c*), such as display of cursor 1706*a* a first distance from the surface of object 1704*a* as shown in the sideview of FIG. 17A (e.g., the cursor is displayed 0.5, 1, 1.5, 2, 3, 5, 7, or 10 cm from (e.g., in front of, separated from) the surface of the user interface or object containing the content, as described above). In some embodiments, a first side of the cursor is facing a viewpoint of the user and a second side of the cursor is facing the surface of the content and is disposed the first distance from the surface).

In some embodiments, while detecting the first interaction input, the first distance is gradually decreased based on a progress of the hand of the user toward performing the pinch gesture (1812*d*), such as toward the surface of the object 1704*a* as shown in the sideview of FIG. 17B. For example, as the index finger and the thumb of the user approach each other to form the pinch hand shape, the distance between the second side of the cursor and the surface of the content decreases. In some embodiments, an amount that the first distance decreases is based on the progress (e.g., a changing distance between the index finger and the thumb) of the hand of the user toward forming the pinch hand shape. In some embodiments, when the index finger and the thumb of the hand of the user are in contact, such that the hand of the user is performing the pinch gesture, the second side of the cursor is contacting (e.g., or is within 0.15, 0.25, 0.5, 1, 1.5, 2 or 3 cm of contacting) the surface of the content. In some embodiments, moving the index finger and the thumb of the hand apart, such that the hand of the user is no longer performing the pinch gesture, analogously moves the cursor away from the surface of the content. Adjusting a distance between a cursor and a surface of content in the three-dimensional environment as the user performs a pinch hand gesture provides feedback about a state of the computer system, thereby improving user-device interaction.

In some embodiments, before detecting the first interaction input, a shadow corresponding to the cursor is displayed on the surface of the content (1814*a*), such as virtual shadow of cursor 1706*a* shown in FIG. 17A (e.g., the computer system displays the shadow as if the cursor, described above, casts a virtual shadow onto the surface of the user interface or object containing the content). In some embodiments, a size and/or level of contrast of the shadow is based on the first distance (e.g., the distance between the cursor and the surface of the content). In some embodiments, while detecting the first interaction input, a visual characteristic of the shadow corresponding to the cursor gradually changes based on the progress of the hand of the user toward performing the air pinch gesture (1814*b*), such as ceasing display of the shadow of the cursor 1706*a* as shown in FIG. 17B. For example, the size and/or level of contrast of the shadow changes as the distance between the cursor and the surface of the content changes. As described above, the distance between the cursor and the surface of the content gradually decreases as the index finger and the thumb of the hand of the user gradually approach each other to form the pinch hand shape. In some embodiments, as the distance between the cursor and the surface of the content decreases, the size of the shadow optionally decreases, and the level of contrast of the shadow optionally increases. In some embodiments, as the distance between the cursor and the surface of the content increases, the size of the shadow optionally increases, and the level of contrast of the shadow optionally decreases. For example, when the index finger and the thumb of the hand of the user are in contact, such that the hand of the user is performing the pinch gesture, the shadow is no longer visible on the surface of the content in the three-dimensional environment (e.g., because the second side of the cursor is contacting the surface of the contact). Thus, the shadow corresponding to the cursor optionally visually indicates the progress of the index finger and thumb of the hand of the user forming the pinch hand shape. Adjusting a visual characteristic of a shadow corresponding to a cursor displayed within content in the three-dimensional environment as the user performs a pinch hand gesture provides feedback about the progress of the pinch hand gesture, thereby improving user-device interaction.

In some embodiments, before detecting the first input, the cursor has a first visual appearance (1816*a*), such as the appearance of the cursor 1706*a* shown in FIG. 17A (e.g., the cursor has a first color (e.g., red, blue, black, or grey), a first size (e.g., height and width), and/or a first shape (e.g., rectangular, circular, or oval) in the three-dimensional environment). In some embodiments, in response to detecting the first interaction input and in accordance with the determination that the cursor was displayed in the content when the first interaction input was detected, the computer system displays (1816*b*) the cursor in the content with a second visual appearance, different from the first visual appearance, such as the appearance of the cursor 1706*a* shown in FIG. 17B. For example, in response to detecting the hand of the user perform the air pinch gesture while the cursor is displayed within the content, the visual appearance of the cursor changes in the three-dimensional environment, as described in more detail below. In some embodiments, display of the cursor with the second visual appearance indicates that the computer system is performing selection operations (e.g., as previously described), and that content can now be selected/highlighted (e.g., by moving the hand of the user in the pinch hand shape in a respective direction with a respective magnitude, as described above). In some embodiments, when the first input ends (e.g., when the hand of the user is no longer performing the air pinch gesture), the visual appearance of the cursor reverts to the first visual appearance. Adjusting a visual appearance of a cursor displayed within content in the three-dimensional environment when the user performs a hand gesture for selecting content provides feedback that selection operations will be performed in response to further input, thereby improving user-device interaction.

In some embodiments, displaying the cursor with the first visual appearance includes displaying the cursor with a first color (1818*a*) (e.g., the color of the cursor is a first color (e.g., black) before the first interaction input is detected, as mentioned above). In some embodiments, displaying the cursor with the second visual appearance includes displaying the cursor with a second color, different from the first color (1818*b*), as described herein with reference to FIG. 17B. For example, the color of the cursor changes from black to red, blue, grey, yellow, orange, or purple after the first interaction input is detected. As described above, displaying the cursor with the second color optionally indicates that the content can now be selected/highlighted in the three-dimensional environment. Adjusting a color of a cursor displayed within content in the three-dimensional environment when the user performs a hand gesture for selecting content provides feedback that selection operations will be performed in response to further input, thereby improving user-device interaction.

In some embodiments, displaying the cursor with the first visual appearance includes displaying the cursor at a third distance from the surface of the content (1820*a*) (e.g., the second side of the cursor is disposed at the third distance, which is optionally smaller than, equal to, or larger than the first distance, from the surface of the user interface or object containing the content, as similarly described above). In some embodiments, displaying the cursor with the second visual appearance includes displaying the cursor at a fourth distance (e.g., different from the third distance or the same as the third distance) from the surface of the content (1820*b*), such as display of cursor 1706*a* a respective distance from the surface of object 1704*a* as shown in FIG. 17C. For example, while detecting the first interaction input, the distance between the second side of the cursor and the surface of the content optionally decreases until the cursor contacts the surface of the content. In some embodiments, in response to detecting the first interaction input (e.g., in response to detecting the conditions of the first input that result in selecting the portion of the content), the cursor moves away from the surface of the content to the fourth distance, such that the cursor optionally returns to a position in front of the surface of the content. Adjusting a distance between a cursor and a surface of content in the three-dimensional environment when the user performs a hand gesture for selecting content provides feedback that selection operations will be performed in response to further input, thereby improving user-device interaction.

In some embodiments, the content includes the cursor (1822*a*), such as display of cursor 1706*a* over text content 1712*a* shown in FIG. 17A (e.g., such as a cursor as described with reference to methods 800, 1000, 1200, 1400 and/or 1600). In some embodiments, the cursor is controlled by the respective portion of the user, as described above. As described above, the cursor is optionally displayed a respective distance from the surface of the content. In some embodiments, the cursor has a respective size (e.g., a height and width) from a viewpoint of the user at the respective distance. In some embodiments, the first interaction input includes a pinch gesture performed by a hand of the user of the computer system (1822*b*), such as pinch input provided by hand 1703*a* as shown in FIG. 17A (e.g., such as an air pinch gesture, as described above).

In some embodiments, while detecting the first interaction input, the computer system displays (1822*c*) a visual indication of a progress of the hand of the user toward performing the air pinch gesture, such as moving the cursor 1706*a* toward the surface of object 1704*a* as shown in the sideview of FIG. 17B. For example, as the index finger and the thumb of the user approach each other to form the pinch hand shape, the distance between the cursor and the surface of the content decreases. In some embodiments, the respective size of the cursor at which the cursor is displayed from the viewpoint of the user decreases as the distance between the cursor and the surface of the content decreases in the three-dimensional environment. For example, while the user provides the pinch hand gesture, the cursor appears to scale down in the three-dimensional environment as the cursor moves closer toward the surface of the content (e.g., as the distance between the cursor and the viewpoint of the user increases). In some embodiments, the cursor is displayed at a smaller size in the three-dimensional environment, such that as the user is providing the pinch hand gesture, the cursor decreases in size and moves farther away from the viewpoint of the user. In some embodiments, in response to detecting an end of the first interaction input (e.g., when the hand of the user is no longer performing the pinch gesture), the cursor analogously increases in size and/or appears to increase in size as the cursor moves closer to the viewpoint of the user. Displaying a visual indication of a progress of the hand of the user toward performing an air pinch gesture provides feedback about a state of the user input, thereby improving user-device interaction.

In some embodiments, the content includes the cursor (1824*a*), such as display of cursor 1706*a* over text content 1712*a* as shown in FIG. 17A (e.g., such as a cursor as described with reference to methods 800, 1000, 1200, 1400 and/or 1600). In some embodiments, the cursor is controlled by the respective portion of the user, as described above. As described above, the cursor is optionally displayed a respective distance from the surface of the content. In some embodiments, the cursor has a respective size from a viewpoint of the user at the respective distance, as described above. In some embodiments, while detecting the movement of the respective portion of the user after the first interaction input (e.g., movement of the hand 1703*a* in FIG. 17A), the cursor is displayed with a first visual appearance (1824*b*), such as display of cursor 1706*a* at a respective size as shown in FIG. 17B (e.g., while the content becomes selected/highlighted in response to detecting the movement of the hand of the user in the pinch hand shape, the cursor is displayed at a first size from the viewpoint of the user that corresponds to a first distance between the cursor and the surface of the content). In some embodiments, while the user is moving the hand in the pinch hand shape, the cursor is contacting the surface of the content).

In some embodiments, in response to detecting an end of the first input, the cursor is displayed with a second visual appearance, different from the first visual appearance (1824*c*), such as display of cursor 1706*a* at a larger size as shown in FIG. 17C. For example, in response detecting a release of the pinch hand shape (e.g., in which the index finger and the thumb of the user are no longer touching), the cursor is displayed at a second distance, larger than the first distance, from the surface of the content, such as 0.5, 1, 1.5, 2, 3, 5, 7, or 10 cm from the surface of the content. In some embodiments, because the cursor is displayed at the second distance, the cursor optionally appears closer to the viewpoint of the user. In some embodiments, the cursor appears larger in the three-dimensional environment as a result of the cursor being displayed at the second distance from the surface of the content. In some embodiments, in response to detecting the end of the first input, the size of the cursor increases in the three-dimensional environment as the cursor is moved farther away from the surface of the content and closer to the viewpoint of the user. Accordingly, in some embodiments, in response to detecting a subsequent pinch hand gesture, the cursor would appear smaller in the three-dimensional environment as a result of the cursor being displayed at a shorter distance from the surface of the content, such as previously described. Changing a visual appearance of a cursor when the first input ends provides feedback about the type of operation that will be performed by the computer system in response to further input, thereby improving user-device interaction.

In some embodiments, aspects/operations of methods 800, 1000, 1200, 1400, 1600 and 1800 may be interchanged, substituted, and/or added between these methods. For example, the three-dimensional environments of methods 800, 1000, 1200, 1400, 1600, 1800, the cursors of methods 800, 1000, 1200, 1400, 1600, 1800 the objects of methods 800, 1000, 1200, 1400, 1600, 1800 and/or the inputs of methods 800, 1000, 1200, 1400, 1600, 1800 are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A method comprising:

at an electronic device in communication with a display generation component and one or more input devices:

while displaying, via the display generation component, a user interface that includes a first region and a second region, wherein the first region includes a cursor, detecting, via the one or more input devices, a first input that includes a first cursor movement input;

in response to detecting the first input, moving the cursor within the first region to a first location in the first region in accordance with the first input;

while the cursor is located at the first location in the first region in accordance with the first input, detecting, via the one or more input devices, a second input that includes:

a gaze of a user of the electronic device directed toward the second region in the user interface, and a first interaction input directed to a first user interface element included in the second region in the user interface;

in response to detecting the second input, performing interaction with the first user interface element in accordance with the first interaction input;

after performing the interaction with the first user interface element in accordance with the first interaction input, detecting, via the one or more input devices, a third input that includes:

the gaze of the user of the electronic device directed to a second location, different from the first location, in the first region in the user interface, and a second cursor movement input that is detected while the gaze of the user of the electronic device is directed to a portion of the first region in the user interface that is different from the first location; and in response to detecting the third input, moving the cursor within the first region starting from the first location in the first region and moving away from the first location in the first region in accordance with the second cursor movement input.

2. The method of claim 1, wherein the first region includes a drawing user interface, and moving the cursor within the first region in accordance with the first input includes creating content within the drawing user interface based on the movement of the cursor.

3. The method of claim 1, wherein the gaze of the user of the electronic device directed to the first region as part of the third input is directed to a location in the first region other than the first location in the first region.

4. The method of claim 3, wherein when the first input is detected:

in accordance with a determination that the gaze of the user of the electronic device is directed to a third location in the first region, the cursor starts at the third location and is moved away from the third location to the first location in the first region in accordance with the first cursor movement input, and in accordance with a determination that the gaze of the user of the electronic device is directed to a fourth location, different from the third location, in the first region, the cursor starts at the fourth location and is moved away from the fourth location to the first location in the first region in accordance with the first cursor movement input.

5. The method of claim 1, further comprising:

after performing the interaction with the first user interface element in accordance with the first interaction input, detecting, via the one or more input devices, a fourth input that includes:

the gaze of the user of the electronic device directed to the first region in the user interface, and a third cursor movement input; and in response to detecting the third input, in accordance with a determination that the fourth input is detected after a time threshold of an end of the first input, moving the cursor within the first region starting from a third location, different from the first location and the second location, in the first region and moving away from the third location in the first region in accordance with the third cursor movement input.

6. The method of claim 1, further comprising:

while detecting the second input, displaying, in the first region, a visual indication of the first location associated with the cursor.

7. The method of claim 1, wherein the first interaction input directed to the first user interface element included in the second region is a cursor movement input that controls a second cursor, different from the cursor, in the second region.

8. The method of claim 1, wherein:

the first cursor movement input is provided by a predefined portion of the user of the electronic device, in accordance with a determination that the predefined portion of the user is closer than a threshold distance from a location corresponding to the first region while the first cursor movement input is detected, the cursor is displayed, in the first region, at a first relative location relative to a respective portion of the predefined portion of the user, and in accordance with a determination that the predefined portion of the user is further than the threshold distance from the location corresponding to the first region while the first cursor movement input is detected, the cursor is displayed, in the first region, at a second relative location, different from the first relative location, relative to the respective portion of the predefined portion of the user.

9. The method of claim 8, further comprising:

while the first cursor movement input is being detected:

while the predefined portion of the user is further than the threshold distance from the location corresponding to the first region and while the cursor is displayed, in the first region, at the second relative location relative to the respective portion of the predefined portion of the user, detecting movement of the predefined portion of the user to a distance closer than the threshold distance from the first region; and while detecting the movement of the predefined portion of the user to the distance closer than the threshold distance from the first region, moving display of the cursor, in the first region, from the second relative location relative to the respective portion of the predefined portion of the user to the first relative location relative to the respective portion of the predefined portion of the user in accordance with the movement of the predefined portion of the user to the distance closer than the threshold distance from the first region.

10. The method of claim 1, wherein the first cursor movement input directed to the first region and the first interaction input directed to the second region are provided by a predefined portion of the user, and performing the interaction with the first user interface element in accordance with the first interaction input is in accordance with a determination that the predefined portion of the user is not engaged with the first region, the method further comprising:

detecting, via the one or more input devices, a fourth input that includes the gaze of the user of the electronic device directed to the second region and a second interaction input provided by the predefined portion of the user; and in response to detecting the fourth input:

in accordance with a determination that the predefined portion of the user is engaged with the first region when the fourth input is detected, performing interaction in the first region in accordance with the second interaction input without performing interaction in the second region in accordance with the second interaction input.

11. An electronic device, comprising:

one or more processors;

memory; and one or more programs, wherein the one or more programs are stored in the memory and configured to be executed by the one or more processors, the one or more programs including instructions for:

while displaying, via a display generation component, a user interface that includes a first region and a second region, wherein the first region includes a cursor, detecting, via one or more input devices, a first input that includes a first cursor movement input;

in response to detecting the first input, moving the cursor within the first region to a first location in the first region in accordance with the first input;

while the cursor is located at the first location in the first region in accordance with the first input, detecting, via the one or more input devices, a second input that includes:

a gaze of a user of the electronic device directed toward the second region in the user interface, and a first interaction input directed to a first user interface element included in the second region in the user interface;

in response to detecting the second input, performing interaction with the first user interface element in accordance with the first interaction input;

after performing the interaction with the first user interface element in accordance with the first interaction input, detecting, via the one or more input devices, a third input that includes:

the gaze of the user of the electronic device directed to a second location, different from the first location, in the first region in the user interface, and a second cursor movement input that is detected while the gaze of the user of the electronic device is directed to a portion of the first region in the user interface that is different from the first location; and in response to detecting the third input, moving the cursor within the first region starting from the first location in the first region and moving away from the first location in the first region in accordance with the second cursor movement input.

12. The electronic device of claim 11, wherein the first region includes a drawing user interface, and moving the cursor within the first region in accordance with the first input includes creating content within the drawing user interface based on the movement of the cursor.

13. The electronic device of claim 11, wherein the gaze of the user of the electronic device directed to the first region as part of the third input is directed to a location in the first region other than the first location in the first region.

14. The electronic device of claim 13, wherein when the first input is detected:

in accordance with a determination that the gaze of the user of the electronic device is directed to a third location in the first region, the cursor starts at the third location and is moved away from the third location to the first location in the first region in accordance with the first cursor movement input, and in accordance with a determination that the gaze of the user of the electronic device is directed to a fourth location, different from the third location, in the first region, the cursor starts at the fourth location and is moved away from the fourth location to the first location in the first region in accordance with the first cursor movement input.

15. The electronic device of claim 11, wherein the one or more programs further include instructions for:

after performing the interaction with the first user interface element in accordance with the first interaction input, detecting, via the one or more input devices, a fourth input that includes:

the gaze of the user of the electronic device directed to the first region in the user interface, and a third cursor movement input; and in response to detecting the third input, in accordance with a determination that the fourth input is detected after a time threshold of an end of the first input, moving the cursor within the first region starting from a third location, different from the first location and the second location, in the first region and moving away from the third location in the first region in accordance with the third cursor movement input.

16. The electronic device of claim 11, wherein the one or more programs further include instructions for:

while detecting the second input, displaying, in the first region, a visual indication of the first location associated with the cursor.

17. The electronic device of claim 11, wherein the first interaction input directed to the first user interface element included in the second region is a cursor movement input that controls a second cursor, different from the cursor, in the second region.

18. The electronic device of claim 11, wherein:

the first cursor movement input is provided by a predefined portion of the user of the electronic device, in accordance with a determination that the predefined portion of the user is closer than a threshold distance from a location corresponding to the first region while the first cursor movement input is detected, the cursor is displayed, in the first region, at a first relative location relative to a respective portion of the predefined portion of the user, and in accordance with a determination that the predefined portion of the user is further than the threshold distance from the location corresponding to the first region while the first cursor movement input is detected, the cursor is displayed, in the first region, at a second relative location, different from the first relative location, relative to the respective portion of the predefined portion of the user.

19. The electronic device of claim 18, wherein the one or more programs further include instructions for:

while the first cursor movement input is being detected:

while the predefined portion of the user is further than the threshold distance from the location corresponding to the first region and while the cursor is displayed, in the first region, at the second relative location relative to the respective portion of the predefined portion of the user, detecting movement of the predefined portion of the user to a distance closer than the threshold distance from the first region; and while detecting the movement of the predefined portion of the user to the distance closer than the threshold distance from the first region, moving display of the cursor, in the first region, from the second relative location relative to the respective portion of the predefined portion of the user to the first relative location relative to the respective portion of the predefined portion of the user in accordance with the movement of the predefined portion of the user to the distance closer than the threshold distance from the first region.

20. The electronic device of claim 11, wherein the first cursor movement input directed to the first region and the first interaction input directed to the second region are provided by a predefined portion of the user, and performing the interaction with the first user interface element in accordance with the first interaction input is in accordance with a determination that the predefined portion of the user is not engaged with the first region, the one or more programs further include instructions for:

detecting, via the one or more input devices, a fourth input that includes the gaze of the user of the electronic device directed to the second region and a second interaction input provided by the predefined portion of the user; and in response to detecting the fourth input:

in accordance with a determination that the predefined portion of the user is engaged with the first region when the fourth input is detected, performing interaction in the first region in accordance with the second interaction input without performing interaction in the second region in accordance with the second interaction input.

21. A non-transitory computer readable storage medium storing one or more programs, the one or more programs comprising instructions, which when executed by one or more processors of an electronic device, cause the electronic device to perform a method comprising:

while displaying, via a display generation component, a user interface that includes a first region and a second region, wherein the first region includes a cursor, detecting, via one or more input devices, a first input that includes a first cursor movement input;

in response to detecting the first input, moving the cursor within the first region to a first location in the first region in accordance with the first input;

while the cursor is located at the first location in the first region in accordance with the first input, detecting, via the one or more input devices, a second input that includes:

a gaze of a user of the electronic device directed toward the second region in the user interface, and a first interaction input directed to a first user interface element included in the second region in the user interface;

in response to detecting the second input, performing interaction with the first user interface element in accordance with the first interaction input;

after performing the interaction with the first user interface element in accordance with the first interaction input, detecting, via the one or more input devices, a third input that includes:

the gaze of the user of the electronic device directed to a second location, different from the first location, in the first region in the user interface, and a second cursor movement input that is detected while the gaze of the user of the electronic device is directed to a portion of the first region in the user interface that is different from the first location; and in response to detecting the third input, moving the cursor within the first region starting from the first location in the first region and moving away from the first location in the first region in accordance with the second cursor movement input.

22. The non-transitory computer readable storage medium of claim 21, wherein the first region includes a drawing user interface, and moving the cursor within the first region in accordance with the first input includes creating content within the drawing user interface based on the movement of the cursor.

23. The non-transitory computer readable storage medium of claim 21, wherein the gaze of the user of the electronic device directed to the first region as part of the third input is directed to a location in the first region other than the first location in the first region.

24. The non-transitory computer readable storage medium of claim 23, wherein when the first input is detected:

in accordance with a determination that the gaze of the user of the electronic device is directed to a third location in the first region, the cursor starts at the third location and is moved away from the third location to the first location in the first region in accordance with the first cursor movement input, and in accordance with a determination that the gaze of the user of the electronic device is directed to a fourth location, different from the third location, in the first region, the cursor starts at the fourth location and is moved away from the fourth location to the first location in the first region in accordance with the first cursor movement input.

25. The non-transitory computer readable storage medium of claim 21, wherein the method further comprises:

after performing the interaction with the first user interface element in accordance with the first interaction input, detecting, via the one or more input devices, a fourth input that includes:

the gaze of the user of the electronic device directed to the first region in the user interface, and a third cursor movement input; and in response to detecting the third input, in accordance with a determination that the fourth input is detected after a time threshold of an end of the first input, moving the cursor within the first region starting from a third location, different from the first location and the second location, in the first region and moving away from the third location in the first region in accordance with the third cursor movement input.

26. The non-transitory computer readable storage medium of claim 21, wherein the method further comprises:

while detecting the second input, displaying, in the first region, a visual indication of the first location associated with the cursor.

27. The non-transitory computer readable storage medium of claim 21, wherein the first interaction input directed to the first user interface element included in the second region is a cursor movement input that controls a second cursor, different from the cursor, in the second region.

28. The non-transitory computer readable storage medium of claim 21, wherein:

the first cursor movement input is provided by a predefined portion of the user of the electronic device, in accordance with a determination that the predefined portion of the user is closer than a threshold distance from a location corresponding to the first region while the first cursor movement input is detected, the cursor is displayed, in the first region, at a first relative location relative to a respective portion of the predefined portion of the user, and in accordance with a determination that the predefined portion of the user is further than the threshold distance from the location corresponding to the first region while the first cursor movement input is detected, the cursor is displayed, in the first region, at a second relative location, different from the first relative location, relative to the respective portion of the predefined portion of the user.

29. The non-transitory computer readable storage medium of claim 28, wherein the method further comprises:

while the first cursor movement input is being detected:

while the predefined portion of the user is further than the threshold distance from the location corresponding to the first region and while the cursor is displayed, in the first region, at the second relative location relative to the respective portion of the predefined portion of the user, detecting movement of the predefined portion of the user to a distance closer than the threshold distance from the first region; and while detecting the movement of the predefined portion of the user to the distance closer than the threshold distance from the first region, moving display of the cursor, in the first region, from the second relative location relative to the respective portion of the predefined portion of the user to the first relative location relative to the respective portion of the predefined portion of the user in accordance with the movement of the predefined portion of the user to the distance closer than the threshold distance from the first region.

30. The non-transitory computer readable storage medium of claim 21, wherein the first cursor movement input directed to the first region and the first interaction input directed to the second region are provided by a predefined portion of the user, and performing the interaction with the first user interface element in accordance with the first interaction input is in accordance with a determination that the predefined portion of the user is not engaged with the first region, the method further comprising:

detecting, via the one or more input devices, a fourth input that includes the gaze of the user of the electronic device directed to the second region and a second interaction input provided by the predefined portion of the user; and in response to detecting the fourth input:

in accordance with a determination that the predefined portion of the user is engaged with the first region when the fourth input is detected, performing interaction in the first region in accordance with the second interaction input without performing interaction in the second region in accordance with the second interaction input.

* * * * *